United States Patent
Cripe et al.

(10) Patent No.: US 12,480,097 B2
(45) Date of Patent: Nov. 25, 2025

(54) SYNCYTIAL ONCOLYTIC HERPES SIMPLEX MUTANTS AS POTENT CANCER THERAPEUTICS

(71) Applicant: RESEARCH INSTITUTE AT NATIONWIDE CHILDREN'S HOSPITAL, Columbus, OH (US)

(72) Inventors: Timothy P. Cripe, Columbus, OH (US); Kevin A. Cassady, Columbus, OH (US); Pin-Yi Wang, Columbus, OH (US); Julia K. Halley, Columbus, OH (US)

(73) Assignee: Research Institute at Nationwide Children's Hospital, Columbus, OH (US)

(*) Notice: Subject to any disclaimer, the term of this patent is extended or adjusted under 35 U.S.C. 154(b) by 977 days.

(21) Appl. No.: 17/438,877

(22) PCT Filed: Mar. 13, 2020

(86) PCT No.: PCT/US2020/022806
§ 371 (c)(1),
(2) Date: Sep. 13, 2021

(87) PCT Pub. No.: WO2020/186238
PCT Pub. Date: Sep. 17, 2020

(65) Prior Publication Data
US 2022/0154149 A1 May 19, 2022

Related U.S. Application Data

(60) Provisional application No. 62/932,725, filed on Nov. 8, 2019, provisional application No. 62/818,577, filed on Mar. 14, 2019.

(51) Int. Cl.
| | | |
|---|---|---|
| *C12N 15/869* | (2006.01) | |
| *A61K 35/763* | (2015.01) | |
| *A61P 35/00* | (2006.01) | |
| *C12N 7/00* | (2006.01) | |
| *C12N 15/86* | (2006.01) | |

(52) U.S. Cl.
CPC ............ *C12N 7/00* (2013.01); *A61K 35/763* (2013.01); *A61P 35/00* (2018.01); *C12N 15/86* (2013.01); *C12N 15/8695* (2013.01); *C12N 2710/00052* (2013.01); *C12N 2710/16621* (2013.01); *C12N 2710/16622* (2013.01); *C12N 2710/16632* (2013.01); *C12N 2710/16643* (2013.01); *C12N 2710/16651* (2013.01)

(58) Field of Classification Search
CPC ...... C12N 7/00; C12N 15/86; C12N 15/8695; C12N 2710/00052; C12N 2710/16621; C12N 2710/16622; C12N 2710/16632; C12N 2710/16643; C12N 2710/16651; A61K 35/763; A61P 35/00; A61P 35/04
See application file for complete search history.

(56) References Cited

U.S. PATENT DOCUMENTS

| | | | | |
|---|---|---|---|---|
| 2018/0133269 A1* | 5/2018 | Nakashima | ............ | C12N 15/86 |
| 2018/0193430 A1 | 7/2018 | Feng et al. | | |

FOREIGN PATENT DOCUMENTS

| | | | | |
|---|---|---|---|---|
| CA | 3055627 A1 | 9/2018 | | |
| JP | 2003-505103 A | 2/2003 | | |
| WO | WO-01/09361 A1 | 2/2001 | | |
| WO | WO-2005005637 A2 * | 1/2005 | ........... | C07K 14/005 |
| WO | WO-2018161825 A1 * | 9/2018 | ........... | A61K 35/763 |

OTHER PUBLICATIONS

Aghi et al (2008). Oncolytic herpes virus with defective ICP6 specifically replicates in quiescent cells with homozygous genetic mutations in p16. Oncogene (2008) 27, 4249-4254. (Year: 2008).*
Law GA, Herr AE, Cwick JP, Taylor Mp. A New Approach to Assessing HSV-1 Recombination during Intercellular Spread. Viruses. Apr. 25, 2018;10(5):220. (Year: 2018).*
Bolovan CA, Sawtell NM, Thompson RL. ICP34.5 mutants of herpes simplex virus type 1 strain 17syn+ are attenuated for neurovirulence in mice and for replication in confluent primary mouse embryo cell cultures. J Virol. Jan. 1994;68(1):48-55. (Year: 1994).*
Chase M, Chung RY, Chiocca EA. An oncolytic viral mutant that delivers the CYP2B1 transgene and augments cyclophosphamide chemotherapy. Nat Biotechnol. May 1998;16(5):444-8. (Year: 1998).*
International Search Report and Written Opinion dated Jun. 25, 2020, from application No. PCT/US2020/022806.
Sanjuan et al., "Evolution of oncolytic viruses," Current Opinion in Virology, 2015, vol. 13, pp. 1-5.
Currier et al., "Efficacy and Safety of the Oncolytic Herpes Simplex Virus rRp450 Alone and Combined With Cyclophosphamide," Mol. Ther., May 2008, vol. 16., No. 5, pp. 879-885.

* cited by examiner

*Primary Examiner* — Janet L Andres
*Assistant Examiner* — Samadhan Jaising Jadhao
(74) *Attorney, Agent, or Firm* — Foley & Lardner LLP

(57) ABSTRACT

The disclosure provides a non-natural herpes simplex virus ("HSV"), compositions comprising, or alternatively consisting essentially of, or yet further consisting of the HSV, and methods of producing the HSV, or infecting a cell with the HSV. Also provided herein are methods of treating cancer or inhibiting the growth or metastasis of cancer cell in a subject in need thereof.

16 Claims, 21 Drawing Sheets
Specification includes a Sequence Listing.

Sequence of EGFP cassette

AACACATTAATTAAAAACCTCCCACACCTCCCCCTGAACCTGAAACATA
AAATGAATGCAATTGTTGTTGTTAACTTGTTTATTGCAGCTTATAATGGT
TACAAATAAAGCAATAGCATCACAAATTTCACAAATAAAGCATTTTTTC
ACTGCATTCTAGTTGTGGTTTGTCCAAACTCATCAATGTATCTTATCATG
TCTGCTCGAAGCGGCCGGCCGCCCCGACTCTAGACTACACATTGATCCTA
GCAGAAGCACAGGCTGCAGGGTGACGGTCCATCCCGCTCTCCTGGGCACA
AGACATGGGCAGCGTGCCATCATCCTGCTCCTCCACCTCCGGCGGGAAGC
CATGGCTAAGCTTCTTGTACAGCTCGTCCATGCCGAGAGTGATCCCGGCG
GCGGTCACGAACTCCAGCAGGACCATGTGATCGCGCTTCTCGTTGGGGTC
TTTGCTCAGGGCGGACTGGGTGCTCAGGTAGTGGTTGTCGGGCAGCAGCA
CGGGGCCGTCGCCGATGGGGGTGTTCTGCTGGTAGTGGTCGGCGAGCTGC
ACGCTGCCGTCCTCGATGTTGTGGCGGATCTTGAAGTTCACCTTGATGCC
GTTCTTCTGCTTGTCGGCCATGATATAGACGTTGTGGCTGTTGTAGTTGT
ACTCCAGCTTGTGCCCCAGGATGTTGCCGTCCTCCTTGAAGTCGATGCCC
TTCAGCTCGATGCGGTTCACCAGGGTGTCGCCCTCGAACTTCACCTCGGC
GCGGGTCTTGTAGTTGCCGTCGTCCTTGAAGAAGATGGTGCGCTCCTGGA
CGTAGCCTTCGGGCATGGCGGACTTGAAGAAGTCGTGCTGCTTCATGTGG
TCGGGGTAGCGGCTGAAGCACTGCACGCCGTAGGTCAGGGTGGTCACGAG
GGTGGGCCAGGGCACGGGCAGCTTGCCGGTGGTGCAGATGAACTTCAGGG

FIG. 5C (Cont. 1)

```
TCAGCTTGCCGTAGGTGGCATCGCCCTCGCCCTCGCCGGACACGCTGAAC
TTGTGGCCGTTTACGTCGCCGTCCAGCTCGACCAGGATGGGCACCACCCC
GGTGAACAGCTCCTCGCCCTTGCTCACCATCCGGGAATTGCGGCCGCGGG
TACAATTCCGCAGCTTTAGAGCAGAAGTAACACTTCCGTACAGGCCTAG
AAGTAAAGGCAACATCCACTGAGGAGCAGTTCTTTGATTTGCACCACCAC
CGGATCCGGGACCTGAAATAAAAGACAAAAAGACTAAACTTACCAGTTAA
CTTTCTGGTTTTTCAGTTCCTCGAGTACCGGATCCTCTAGAGTCCGGAGG
CTGGATCGGTCCCGGTGTCTTCTATGGAGGTCAAAACAGCGTGGATGGCG
TCTCCAGGCGATCTGACGGTTCACTAAACGAGCTCTGCTTATATAGACCT
CCCACCGTACACGCCTACCGCCCATTTGCGTCAATGGGGCGGAGTTGTTA
CGACATTTTGGAAAGTCCCGTTGATTTGGTGCCAAAACAAACTCCCATT
GACGTCAATGGGGTGGAGACTTGGAAATCCCCGTGAGTCAAACCGCTATC
CACGCCCATTGATGTACTGCCAAAACCGCATCACCATGGTAATAGCGATG
ACTAATACGTAGATGTACTGCCAAGTAGGAAAGTCCCATAAGGTCATGTA
CTGGGCATAATGCCAGGCGGGCCATTTACCGTCATTGACGTCAATAGGGG
GCGTACTTGGCATATGATACACTTGATGTACTGCCAAGTGGGCAGTTTAC
CGTAAATACTCCACCCATTGACGTCAATGGAAAGTCCCTATTGGCGTTAC
TATGGGAACATACGTCATTATTGACGTCAATGGGCGGGGGTCGTTGGGCG
GTCAGCCAGGCGGGCCATTTACCGTAAGTTATGTAACGACCTGCAGGCAT
GCAAGCTCGAATTCGAACACGCAGATGCAGTCGGGGCGGCAGATCTTAAT
TAATGGCTGGTTGTTTGTTGT
```

FIG. 5C (Cont. 2)

*Mut-3ΔICP6, an attenuated version of Mut-3, induces superior cytotoxicity in the human neuroblastoma cell line CHP-134 compared to oncolytic herpes virus rRp450*

*Mut-3ΔICP6 induces superior cytotoxicity in the murine neuroblastoma cell lines Neuro-2a & 975A2 compared to rRp450*

*Mut-3ΔICP6 produces a significantly higher virus yield than rRp450 in the murine neuroblastoma cell line 975A2 over 48 and 72hrs infection time periods*

*Mut-3Δ34.5 & Mut-3ΔICP6 are significantly less potent than the Mut-3 virus against differentiated human keratinocyte cells*

*Intravenous injection of 1e6 pfu of wild-type strain KOS virus is lethal to naïve Blab/c mice*

*Naïve Balb/c mice can tolerate intravenous injection of up to 1e8 pfu of Mut-3Δ34.5(C8G5) or Mut-3ΔICP6(D7-1)*

| Wild-type KOS | | Brain | Heart | Kidney | Liver | Lung | Ovary | Spleen |
|---|---|---|---|---|---|---|---|---|
| 1e7_#1 | plaque | ▨ | ▨ | - | ▨ | ▨ | ▨ | - |
| 1e7_#2 | plaque | + | - | - | - | - | + | - |
| 1e7_#3 | plaque | + | - | + | - | - | + | - |
| 1e7_#4 | plaque | + | - | + | - | - | + | - |
| 1e6_#1 | plaque | + | - | + | ▨ | - | ▨ | - |
| 1e6_#2 | plaque | + | - | + | - | - | + | - |
| 1e6_#3 | plaque | - | - | + | - | - | + | - |

FIG. 14

| 24hrs pvi | | Brain | Heart | Kidney | Liver | Lung | Ovary | Spleen |
|---|---|---|---|---|---|---|---|---|
| C8G5 (Mut3-Δ34.5) | | | | | | | | |
| #1 | plaque | - | - | + | + | - | + | - |
| #2 | plaque | - | + | - | - | - | - | - |
| #3 | plaque | - | + | + | - | - | - | - |
| #4 | plaque | - | - | + | - | - | - | - |
| D7-1 (Mut3-ΔICP6) | | | | | | | | |
| #1 | plaque | + | + | + | - | ▨ | + | - |
| #2 | plaque | - | + | + | + | - | + | - |
| #3 | plaque | + | + | + | - | - | - | - |
| #4 | plaque | - | - | + | + | - | + | - |

FIG. 15

| 14 days pvi | Brain | Heart | Kidney | Liver | Lung | Ovary | Spleen |
|---|---|---|---|---|---|---|---|
| C8G5 (Mut3-Δ34.5) | | | | | | | |
| #1 plaque | - | - | - | - | - | - | - |
| #2 plaque | - | - | - | - | - | - | - |
| #3 plaque | - | - | - | - | - | - | - |
| #4 plaque | - | - | - | - | - | - | - |
| D7-1 (Mut3-ΔICP6) | | | | | | | |
| #1 plaque | - | - | - | - | - | - | - |
| #2 plaque | - | - | - | - | - | - | - |
| #3 plaque | - | - | - | - | - | - | - |
| #4 plaque | - | - | - | - | - | - | - |

FIG. 16

| 28 days pvi | Brain | Heart | Kidney | Liver | Lung | Ovary | Spleen |
|---|---|---|---|---|---|---|---|
| C8G5 (Mut3-Δ34.5) | | | | | | | |
| #1 plaque | - | - | ▨ | ▨ | ▨ | ▨ | ▨ |
| #2 plaque | - | - | - | - | - | - | - |
| #3 plaque | - | - | - | - | - | - | - |
| #4 plaque | - | - | - | - | - | - | - |
| D7-1 (Mut3-ΔICP6) | | | | | | | |
| #1 plaque | - | - | - | - | - | - | - |
| #2 plaque | - | - | - | - | - | - | - |
| #3 plaque | - | - | - | - | - | - | - |
| #4 plaque | - | - | - | - | - | - | - |

FIG. 17

| 56 days pvi | | Brain | Heart | Kidney | Liver | Lung | Ovary | Spleen |
|---|---|---|---|---|---|---|---|---|
| C8G5 (Mut3-Δ34.5) | | | | | | | | |
| #1 | plaque | - | - | - | - | - | - | - |
| #2 | plaque | - | - | - | - | - | - | - |
| #3 | plaque | - | - | - | - | - | - | - |
| #4 | plaque | - | - | - | - | - | - | - |
| D7-1 (Mut3-ΔICP6) | | | | | | | | |
| #1 | plaque | - | - | - | - | - | - | - |
| #2 | plaque | - | - | - | - | - | - | - |
| #3 | plaque | - | - | - | - | - | - | - |
| #4 | plaque | - | - | - | - | - | - | - |

FIG. 18

| 85 days pvi | | Brain | Heart | Kidney | Liver | Lung | Ovary | Spleen |
|---|---|---|---|---|---|---|---|---|
| C8G5 (Mut3-Δ34.5) | | | | | | | | |
| #1 | plaque | - | - | - | - | - | - | - |
| #2 | plaque | - | - | - | - | - | - | - |
| #3 | plaque | - | - | - | - | - | - | - |
| #4 | plaque | - | - | - | - | - | - | - |
| D7-1 (Mut3-ΔICP6) | | | | | | | | |
| #1 | plaque | - | - | - | - | - | - | - |
| #2 | plaque | - | - | - | - | - | - | - |
| #3 | plaque | - | - | - | - | - | - | - |
| #4 | plaque | - | - | - | - | - | - | - |

FIG. 19

SEQUENCE LISTING

<160> NUMBER OF SEQ ID NOS: 53

<210> SEQ ID NO 1
<211> LENGTH: 726
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: mutation
<222> LOCATION: (356)..(356)
<223> OTHER INFORMATION: c356a

<400> SEQUENCE: 1
atggcccgcc gccgccgcca tcgcggcccc cgccgccccc ggccgcccgg gcccacgggc        60
gcggtcccaa ccgcacagtc ccaggtaacc tccacgccca actcggaacc cgtggtcagg       120
agcgcgcccg cggccgcccc gccgccgccc ccgccagtg ggccccgcc ttcttgttcg         180 ctgctgctgc gccagtggct ccacgttccc gagtccgcgt ccgacgacga cgacgacgac       240
tggccggaca gccccccgcc cgagccggcg ccagaggccc ggcccaccgc cgccgccccc       300
```

```
cgccccggt  cccaccgcc  cggcgcgggc  ccgggggcg   gggctaaccc  ctcccacccc  360
ccctcacgcc  ccttccgcct  tccgccgcgc  ctcgccctcc  gcctgcgcgt  caccgcagag  420
cacctggcgc  gcctgcgcct  gcgacgcgcg  ggcggggagg  gggcgccgaa  gcccccgcg   480 accccgcga   ccccgcgac   ccccacgcgg  gtgcgcttct  cgcccacgt   ccgggtgcgc  540 cacctggtgg  tctgggcctc  ggccgcccgc  ctggcgcgcc  gggctcgtg   ggcccgcgag  600 cgggccgacc  gggctcggtt  ccggcgccgg  gtggcggagg  ccgaggcggt  catcgggccg  660
tgcctggggc  ccgaggcccg  tgcccgggcc  ctggcccgcg  gagccggccc  ggcgaactcg  720
gtctaa                                                                  726
```

<210> SEQ ID NO 2
<211> LENGTH: 241
<212> TYPE: PRT
<213> ORGANISM: Artificial Sequence
<220> FEATURE:
<223> OTHER INFORMATION: Description of Artificial Sequence: Synthetic
       polypeptide
<220> FEATURE:
<221> NAME/KEY: MISC_FEATURE
<222> LOCATION: (119)..(119)
<223> OTHER INFORMATION: P119H mutation

<400> SEQUENCE: 2

Met Ala Arg Arg Arg His Arg Gly Pro Arg Arg Pro Arg Pro Pro
1               5                   10                  15

Gly Pro Thr Gly Ala Val Pro Thr Ala Gln Ser Gln Val Thr Ser Thr
                20                  25                  30

Pro Asn Ser Glu Pro Val Val Arg Ser Ala Pro Ala Ala Pro Pro
        35                  40                  45

Pro Pro Pro Ala Ser Gly Pro Pro Ser Cys Ser Leu Leu Arg
    50                  55                  60

Gln Trp Leu His Val Pro Glu Ser Ala Ser Asp Asp Asp Asp Asp
65                  70                  75                  80

Trp Pro Asp Ser Pro Pro Glu Pro Ala Pro Glu Ala Arg Pro Thr
                85                  90                  95

Ala Ala Ala Pro Arg Pro Arg Ser Pro Pro Gly Ala Gly Pro Gly
                100                 105                 110

Gly Gly Ala Asn Pro Ser His Pro Pro Ser Arg Pro Phe Arg Leu Pro
            115                 120                 125

Pro Arg Leu Ala Leu Arg Leu Arg Val Thr Ala Glu His Leu Ala Arg
    130                 135                 140

Leu Arg Leu Arg Arg Ala Gly Gly Glu Gly Ala Pro Lys Pro Pro Ala
145                 150                 155                 160

Thr Pro Ala Thr Pro Ala Thr Pro Thr Arg Val Arg Phe Ser Pro His
                165                 170                 175

Val Arg Val Arg His Leu Val Val Trp Ala Ser Ala Ala Arg Leu Ala
            180                 185                 190

Arg Arg Gly Ser Trp Ala Arg Glu Arg Ala Asp Arg Ala Arg Phe Arg
        195                 200                 205

Arg Arg Val Ala Glu Ala Glu Ala Val Ile Gly Pro Cys Leu Gly Pro
    210                 215                 220

Glu Ala Arg Ala Arg Ala Leu Ala Arg Gly Ala Gly Pro Ala Asn Ser
225                 230                 235                 240

Val

<210> SEQ ID NO 3
<211> LENGTH: 846
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 3

```
atggtgagca agggcgagga gctgttcacc ggggtggtgc ccatcctggt cgagctggac    60
ggcgacgtaa acggccacaa gttcagcgtg tccggcgagg gcgagggcga tgccacctac   120
ggcaagctga ccctgaagtt catctgcacc accggcaagc tgcccgtgcc ctggcccacc   180
ctcgtgacca ccctgaccta cggcgtgcag tgcttcagcc gctaccccga ccacatgaag   240
cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcgac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg acggcagcgt gcagctcgcc   540
gaccactacc agcagaacac ccccatcggc gacggccccg tgctgctgcc cgacaaccac   600
tacctgagca cccagtccgc cctgagcaaa gaccccaacg agaagcgcga tcacatggtc   660
ctgctggagt tcgtgaccgc cgccgggatc actctcggca tggacgagct gtacaagaag   720
cttagccatg gcttcccgcc ggaggtggag gagcaggatg atggcacgct gcccatgtct   780
tgtgcccagg agagcgggat ggaccgtcac cctgcagcct gtgcttctgc taggatcaat   840
gtgtag                                                               846
```

<210> SEQ ID NO 4
<211> LENGTH: 281
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 4

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
```

145                 150                 155                 160
Gly Ile Lys Val Asn Phe Lys Ile Arg His Asn Ile Glu Asp Gly Ser
                    165                 170                 175

Val Gln Leu Ala Asp His Tyr Gln Gln Asn Thr Pro Ile Gly Asp Gly
                180                 185                 190

Pro Val Leu Leu Pro Asp Asn His Tyr Leu Ser Thr Gln Ser Ala Leu
            195                 200                 205

Ser Lys Asp Pro Asn Glu Lys Arg Asp His Met Val Leu Leu Glu Phe
        210                 215                 220

Val Thr Ala Ala Gly Ile Thr Leu Gly Met Asp Glu Leu Tyr Lys Lys
225                 230                 235                 240

Leu Ser His Gly Phe Pro Pro Glu Val Glu Gln Asp Asp Gly Thr
                    245                 250                 255

Leu Pro Met Ser Cys Ala Gln Glu Ser Gly Met Asp Arg His Pro Ala
                260                 265                 270

Ala Cys Ala Ser Ala Arg Ile Asn Val
            275                 280

<210> SEQ ID NO 5
<211> LENGTH: 767
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 5
atggcccgcc gccgccgcca tcgcggcccc cgccgccccc ggccgccggg gcccacgggc      60
gccgtcccaa ccgcacagtc ccaggtaacc tagactagtc tagcgtaacc tccacgccca     120
actcggaacc cgcggtcagg agcgcgcccg cggccgcccc gccgccgccc ccgccggtg     180 ggccccccgcc ttcttgttcg ctgctgctgc gccagtggct ccacgttccc gagtccgcgt    240
ccgacaacga cgatgacgac gactggccgg acagcccccc gcccgagccg gcgccagagg    300
cccggcccac cgccgccgcc ccccggcccc ggccccacc gccggcgtg ggccggggg      360 gcggggctga ccccctccac cccccctcgc gcccctttccg ccttccgccg cgcctcgccc    420
tccgcctgcg cgtcaccgcg gagcacctgg cgcgcctgcg cctgcgacgc gcgggcggg     480 aggggggcgcc ggagccccccc gcgaccccccg cgaccccccgc gaccccccgcg accccccgcga    540 ccccccgcgcg ggtgcgcttc tcgccccacg tccgggtgcg ccacctggtg gtctgggcct    600
cggccgcccg cctggcgcgc gcggctcgt gggcccgcga gcgggccgac cgggctcggt     660
tccggcgccg ggtggcggag gccgaggcgg tcatcgggcc gtgcctgggg cccgaggccc    720
gtgcccgggc cctggcccgc ggagccggcc cggcgaactc ggtctaa                  767

<210> SEQ ID NO 6
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Met Ala Arg Arg Arg Arg His Arg Gly Pro Arg Pro Arg Pro Pro
1               5                   10                  15

Gly Pro Thr Gly Ala Val Pro Thr Ala Gln Ser Gln Val Thr
            20                  25                  30

<210> SEQ ID NO 7
<211> LENGTH: 723
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 7

```
atggcccgcc gccgccatcg cggccccgc cgccccggc cgcccgggcc cacgggcgcg    60
gtcccaaccg cacagtccca ggtaacctcc acgcccaact cggaacccgt ggtcaggagc   120
gcgcccgcgg ccgccccgcc gccgcccccc gccagtgggc ccccgccttc ttgttcgctg   180
ctgctgcgcc agtggctcca cgttcccgag tccgcgtccg acgacgacga cgacgactgg   240
ccggacagcc ccccgcccga gccggcgcca gaggcccggc ccaccgccgc cgcccccgc    300
ccccggtccc caccgccggg cgcgggcccg ggggcgggg ctaacccctc cccccccccc    360
tcacgcccct tccgccttcc gccgcgcctc gccctccgct gcgcgtcac cgcagagcac    420
ctggcgcgcc tgcgcctgcg acgcgcgggc ggggaggggg cgccgaagcc cccgcgacc    480
cccgcgaccc ccgcgacccc cacgcgggtg cgcttctcgc cccacgtccg ggtgcgccac   540
ctggtggtct gggcctcggc cgcccgcctg gcgcgccgcg gctcgtgggc ccgcgagcgg   600
gccgaccggg ctcggttccg gcgccgggtg gcggaggcca aggcggtcat cgggccgtgc   660
ctggggcccg aggcccgtgc ccgggccctg gcccgcggag ccggcccggc gaactcggtc   720
taa                                                                 723
```

<210> SEQ ID NO 8
<211> LENGTH: 240
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 8

```
Met Ala Arg Arg Arg His Arg Gly Pro Arg Arg Pro Arg Pro Pro Gly
1               5                   10                  15

Pro Thr Gly Ala Val Pro Thr Ala Gln Ser Gln Val Thr Ser Thr Pro
            20                  25                  30

Asn Ser Glu Pro Val Val Arg Ser Ala Pro Ala Ala Pro Pro Pro
        35                  40                  45

Pro Pro Ala Ser Gly Pro Pro Ser Cys Ser Leu Leu Arg Gln
    50                  55                  60

Trp Leu His Val Pro Glu Ser Ala Ser Asp Asp Asp Asp Asp Trp
65                  70                  75                  80

Pro Asp Ser Pro Pro Glu Pro Ala Pro Glu Ala Arg Pro Thr Ala
                85                  90                  95

Ala Ala Pro Arg Pro Arg Ser Pro Pro Gly Ala Gly Pro Gly Gly
            100                 105                 110

Gly Ala Asn Pro Ser Pro Pro Ser Arg Pro Phe Arg Leu Pro Pro
        115                 120                 125

Arg Leu Ala Leu Arg Leu Arg Val Thr Ala Glu His Leu Ala Arg Leu
    130                 135                 140

Arg Leu Arg Arg Ala Gly Gly Glu Gly Ala Pro Lys Pro Pro Ala Thr
145                 150                 155                 160
```

```
Pro Ala Thr Pro Ala Thr Pro Thr Arg Val Arg Phe Ser Pro His Val
            165                 170                 175

Arg Val Arg His Leu Val Val Trp Ala Ser Ala Arg Leu Ala Arg
        180                 185                 190

Arg Gly Ser Trp Ala Arg Glu Arg Ala Asp Arg Ala Arg Phe Arg Arg
        195                 200                 205

Arg Val Ala Glu Ala Glu Ala Val Ile Gly Pro Cys Leu Gly Pro Glu
210                 215                 220

Ala Arg Ala Arg Ala Leu Ala Arg Gly Ala Gly Pro Ala Asn Ser Val
225                 230                 235                 240

<210> SEQ ID NO 9
<211> LENGTH: 726
<212> TYPE: DNA
<213> ORGANISM: Herpes simplex virus type 1

<400> SEQUENCE: 9
atggcccgcc gccgccgcca tcgcggcccc cgccgccccc ggccgcccgg gcccacgggc      60
gcggtcccaa ccgcacagtc ccaggtaacc tccacgccca actcggaacc cgtggtcagg     120
agcgcgcccg cggccgcccc gccgccgccc ccgccagtg ggccccgcc ttcttgttcg       180 ctgctgctgc gccagtggct ccacgttccc gagtccgcgt ccgacgacga cgacgacgac     240
tggccggaca gccccgcc cgagccggcg ccagaggccc ggcccaccgc cgccgccccc       300 cgccccccggt ccccaccgcc cggcgcgggc ccggggggcg gggctaaccc ctcccacccc   360
ccctcacgcc ccttccgcct tccgccgcgc ctcgccctcc gcctgcgcgt caccgcagag     420
cacctggcgc gcctgcgcct cgacgcgcg ggcggggagg gggcgccgaa gcccccgcg      480 accccccgcga ccccccgcgac ccccacgcgg gtgcgcttct cgcccacgt ccgggtgcgc   540 cacctggtgg tctgggcctc ggccgcccgc ctggcgcgcc gggctcgtg ggcccgcgag     600 cgggccgacc gggctcggtt ccggcgccgg gtggcggagg ccgaggcggt catcgggccg     660
tgcctggggc ccgaggcccg tgcccgggcc ctggcccgcg agccggccc ggcgaactcg     720 gtctaa                                                               726

<210> SEQ ID NO 10
<211> LENGTH: 241
<212> TYPE: PRT
<213> ORGANISM: Herpes simplex virus type 1

<400> SEQUENCE: 10

Met Ala Arg Arg Arg Arg His Arg Gly Pro Arg Pro Arg Pro Pro
1               5                   10                  15

Gly Pro Thr Gly Ala Val Pro Thr Ala Gln Ser Gln Val Thr Ser Thr
            20                  25                  30

Pro Asn Ser Glu Pro Val Val Arg Ser Ala Pro Ala Ala Ala Pro
        35                  40                  45

Pro Pro Pro Ala Ser Gly Pro Pro Ser Cys Ser Leu Leu Leu Arg
        50                  55                  60

Gln Trp Leu His Val Pro Glu Ser Ala Ser Asp Asp Asp Asp Asp
65                  70                  75                  80

Trp Pro Asp Ser Pro Pro Glu Pro Ala Pro Glu Ala Arg Pro Thr
                85                  90                  95

Ala Ala Ala Pro Arg Pro Arg Ser Pro Pro Pro Gly Ala Gly Pro Gly
            100                 105                 110

Gly Gly Ala Asn Pro Ser His Pro Pro Ser Arg Pro Phe Arg Leu Pro
```

```
                    115                 120                 125
Pro Arg Leu Ala Leu Arg Leu Arg Val Thr Ala Glu His Leu Ala Arg
            130                 135                 140

Leu Arg Leu Arg Arg Ala Gly Gly Glu Gly Ala Pro Lys Pro Pro Ala
145                 150                 155                 160

Thr Pro Ala Thr Pro Ala Thr Pro Thr Arg Val Arg Phe Ser Pro His
                165                 170                 175

Val Arg Val Arg His Leu Val Val Trp Ala Ser Ala Ala Arg Leu Ala
            180                 185                 190

Arg Arg Gly Ser Trp Ala Arg Glu Arg Ala Asp Arg Ala Arg Phe Arg
            195                 200                 205

Arg Arg Val Ala Glu Ala Glu Ala Val Ile Gly Pro Cys Leu Gly Pro
            210                 215                 220

Glu Ala Arg Ala Arg Ala Leu Ala Arg Gly Ala Gly Pro Ala Asn Ser
225                 230                 235                 240

Val

<210> SEQ ID NO 11
<211> LENGTH: 1971
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
aacacattaa ttaaaaaacc tcccacacct cccctgaac ctgaaacata aaatgaatgc      60
aattgttgtt gttaacttgt ttattgcagc ttataatggt tacaaataaa gcaatagcat    120
cacaaatttc acaaataaag cattttttc actgcattct agttgtggtt tgtccaaact    180
catcaatgta tcttatcatg tctgctcgaa gcggccggcc gccccgactc tagactacac    240
attgatccta gcagaagcac aggctgcagg gtgacggtcc atcccgctct cctgggcaca    300
agacatgggc agcgtgccat catcctgctc ctccacctcc ggcgggaagc catggctaag    360
cttcttgtac agctcgtcca tgccgagagt gatcccggcg cggtcacgaa ctccagcag    420 gaccatgtga tcgcgcttct cgttggggtc tttgctcagg gcggactggg tgctcaggta    480
gtggttgtcg ggcagcagca cggggccgtc gccgatgggg gtgttctgct ggtagtggtc    540
ggcgagctgc acgctgccgt cctcgatgtt gtggcggatc ttgaagttca ccttgatgcc    600
gttcttctgc ttgtcggcca tgatatagac gttgtggctg ttgtagttgt actccagctt    660
gtgccccagg atgttgccgt cctccttgaa gtcgatgccc ttcagctcga tgcggttcac    720
cagggtgtcg ccctcgaact tcacctcggc gcgggtcttg tagttgccgt cgtccttgaa    780
gaagatggtg cgctcctgga cgtagccttc gggcatggcg acttgaaga agtcgtgctg    840 cttcatgtgg tcggggtagc ggctgaagca ctgcacgccg taggtcaggg tggtcacgag    900
ggtgggccag ggcacgggca gcttgccggt ggtgcagatg aacttcaggg tcagcttgcc    960
gtaggtggca tcgccctcgc cctcgccgga cacgctgaac ttgtggccgt tacgtcgcc   1020 gtccagctcg accaggatgg caccacccc ggtgaacagc cctcgccct tgctcaccat   1080 ccgggaattg cggccgcggg tacaattccg cagctttag agcagaagta acacttccgt   1140
acaggcctag aagtaaaggc aacatccact gaggagcagt tctttgattt gcaccaccac   1200
cggatccggg acctgaaata aaagacaaaa agactaaact taccagttaa ctttctggtt   1260
tttcagttcc tcgagtaccg gatcctctag agtccggagg ctggatcggt cccggtgtct   1320
```

-continued

```
tctatggagg tcaaaacagc gtggatggcg tctccaggcg atctgacggt tcactaaacg    1380
agctctgctt atatagacct cccaccgtac acgcctaccg cccatttgcg tcaatggggc    1440
ggagttgtta cgacattttg gaaagtcccg ttgattttgg tgccaaaaca aactcccatt    1500
gacgtcaatg gggtggagac ttggaaatcc ccgtgagtca aaccgctatc cacgcccatt    1560
gatgtactgc caaaaccgca tcaccatggt aatagcgatg actaatacgt agatgtactg    1620
ccaagtagga aagtcccata aggtcatgta ctgggcataa tgccaggcgg gccatttacc    1680
gtcattgacg tcaataggggg cgtacttgg catatgatac acttgatgta ctgccaagtg    1740
ggcagtttac cgtaaatact ccacccattg acgtcaatgg aaagtcccta ttggcgttac    1800
tatgggaaca tacgtcatta ttgacgtcaa tgggcggggg tcgttgggcg gtcagccagg    1860
cgggccattt accgtaagtt atgtaacgac ctgcaggcat gcaagctcga attcgaacac    1920
gcagatgcag tcgggcggc agatcttaat taatggctgg ttgtttgttg t              1971
```

<210> SEQ ID NO 12
<211> LENGTH: 1653
<212> TYPE: DNA
<213> ORGANISM: Artificial Sequence
<220> FEATURE:
<223> OTHER INFORMATION: Description of Artificial Sequence: Synthetic polynucleotide
<220> FEATURE:
<221> NAME/KEY: mutation
<222> LOCATION: (451)..(451)
<223> OTHER INFORMATION: g451a

<400> SEQUENCE: 12

```
atggatcgcg gggcggtggt ggggtttctt ctcggtgttt gtgttgtatc gtgcttggcg      60
ggaacgccca aaacgtcctg gagacgggtg agtgtcggcg aggacgtttc gttgcttcca    120
gctccggggc ctacggggcg cggcccgacc cagaaactac tatgggccgt ggaaccctg    180 gatgggtgcg gccccttaca cccgtcgtgg gtctcgctga tgcccccccaa gcaggtgccc    240 gagacggtcg tggatgcggc gtgcatgcgc gctccggtcc cgctggcgat ggcgtacgcc    300
cccccggccc catctgcgac cgggggtcta cgaacggact tcgtgtggca ggagcgcgcg    360
gccgtggtta accggagtct ggttattcac ggggtccgag agacggacag cggcctgtat    420
accctgtccg tgggcgacat aaaggacccg actcgcaag tggcctcggt ggtcctggtg    480
gtgcaaccgg ccccagttcc gaccccaccc ccgacccag ccgattacga cgaggatgac    540
aatgacgagg cgaggacga aagtctcgcc ggcactcccg ccagcgggac ccccggctc    600 ccgcctcccc ccgccccccc gaggtcttgg cccagcgccc ccgaagtctc acatgtgcgt    660
ggggtgaccg tgcgtatgga gactccggaa gctatcctgt tttcccccgg ggagacgttc    720
agcacgaacg tctccatcca tgccatcgcc cacgacgacc agacctactc catggacgtc    780
gtctggttga ggttcgacgt gccgacctcg tgtgccgaga tgcgaatata cgaatcgtgt    840
ctgtatcacc cgcagctccc agaatgtctg tccccggccg acgcgccgtg cgccgcgagt    900
acgtggacgt ctcgcctggc cgtccgcagc tacgcggggt gttccagaac aaacccccca    960
ccgcgctgtt cggccgaggc tcacatggag cccgtcccgg ggctggcgtg caggcggcc   1020 tccgtcaatc tggagttccg ggacgcgtcc ccacaacact ccggcctgta tctgtgtgtg   1080
gtgtacgtca cgaccatat tcacgcctgg ggccacatta ccatcagcac cgcggcgcag   1140
taccggaacg cggtggtgga acagcccctc ccacagcgcg cgcggatttt ggccgagccc   1200
acccacccgc acgtcggggc ccctccccac gcgcccccaa cccacggcgc cctgcggtta   1260
```

```
ggggcggtga tgggggccgc cctgctgctg tctgcgctgg ggttgtcggt gtgggcgtgt    1320
atgacctgtt ggcgcaggcg tgcctggcgg gcggttaaaa gcagggcctc gggtaagggg    1380
cccacgtaca ttcgcgtggc cgacagcgag ctgtacgcgg actggagctc ggacagcgag    1440
ggagaacgcg accaggtccc gtggctggcc ccccggagag acccgactc tccctccacc     1500 aatggatccg gctttgagat cttatcacca acggctccgt ctgtataccc ccgtagcgac    1560
gggcatcaat ctcgccgcca gctcacaacc tttggatccg gaaggcccga tcgccgttac    1620
tcccaggcct ccgattcgtc cgtcttctgg taa                                  1653
```

<210> SEQ ID NO 13
<211> LENGTH: 550
<212> TYPE: PRT
<213> ORGANISM: Artificial Sequence
<220> FEATURE:
<223> OTHER INFORMATION: Description of Artificial Sequence: Synthetic polypeptide
<220> FEATURE:
<221> NAME/KEY: MISC_FEATURE
<222> LOCATION: (151)..(151)
<223> OTHER INFORMATION: A151T

<400> SEQUENCE: 13

```
Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Arg Val Ser Val
                20                  25                  30

Gly Glu Asp Val Ser Leu Leu Pro Ala Pro Gly Pro Thr Gly Arg Gly
            35                  40                  45

Pro Thr Gln Lys Leu Leu Trp Ala Val Glu Pro Leu Asp Gly Cys Gly
        50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
                85                  90                  95

Met Ala Tyr Ala Pro Pro Ala Pro Ser Ala Thr Gly Gly Leu Arg Thr
            100                 105                 110

Asp Phe Val Trp Gln Glu Arg Ala Ala Val Val Asn Arg Ser Leu Val
        115                 120                 125

Ile His Gly Val Arg Glu Thr Asp Ser Gly Leu Tyr Thr Leu Ser Val
    130                 135                 140

Gly Asp Ile Lys Asp Pro Thr Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
            180                 185                 190

Pro Ala Ser Gly Thr Pro Arg Leu Pro Pro Pro Ala Pro Arg
        195                 200                 205

Ser Trp Pro Ser Ala Pro Glu Val Ser His Val Arg Gly Val Thr Val
    210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Asp Gln Thr Tyr
                245                 250                 255

Ser Met Asp Val Val Trp Leu Arg Phe Asp Val Pro Thr Ser Cys Ala
```

```
                260                 265                 270
Glu Met Arg Ile Tyr Glu Ser Cys Leu Tyr His Pro Gln Leu Pro Glu
            275                 280                 285
Cys Leu Ser Pro Ala Asp Ala Pro Cys Ala Ala Ser Thr Trp Thr Ser
290                 295                 300
Arg Leu Ala Val Arg Ser Tyr Ala Gly Cys Ser Arg Thr Asn Pro Pro
305                 310                 315                 320
Pro Arg Cys Ser Ala Glu Ala His Met Glu Pro Val Pro Gly Leu Ala
                325                 330                 335
Trp Gln Ala Ala Ser Val Asn Leu Glu Phe Arg Asp Ala Ser Pro Gln
                340                 345                 350
His Ser Gly Leu Tyr Leu Cys Val Val Tyr Val Asn Asp His Ile His
            355                 360                 365
Ala Trp Gly His Ile Thr Ile Ser Thr Ala Ala Gln Tyr Arg Asn Ala
        370                 375                 380
Val Val Glu Gln Pro Leu Pro Gln Arg Gly Ala Asp Leu Ala Glu Pro
385                 390                 395                 400
Thr His Pro His Val Gly Ala Pro Pro His Ala Pro Thr His Gly
                405                 410                 415
Ala Leu Arg Leu Gly Ala Val Met Gly Ala Ala Leu Leu Ser Ala
                420                 425                 430
Leu Gly Leu Ser Val Trp Ala Cys Met Thr Cys Trp Arg Arg Ala
            435                 440                 445
Trp Arg Ala Val Lys Ser Arg Ala Ser Gly Lys Gly Pro Thr Tyr Ile
        450                 455                 460
Arg Val Ala Asp Ser Glu Leu Tyr Ala Asp Trp Ser Ser Asp Ser Glu
465                 470                 475                 480
Gly Glu Arg Asp Gln Val Pro Trp Leu Ala Pro Pro Glu Arg Pro Asp
                485                 490                 495
Ser Pro Ser Thr Asn Gly Ser Gly Phe Glu Ile Leu Ser Pro Thr Ala
                500                 505                 510
Pro Ser Val Tyr Pro Arg Ser Asp Gly His Gln Ser Arg Arg Gln Leu
            515                 520                 525
Thr Thr Phe Gly Ser Gly Arg Pro Asp Arg Arg Tyr Ser Gln Ala Ser
        530                 535                 540
Asp Ser Ser Val Phe Trp
545                 550

<210> SEQ ID NO 14
<211> LENGTH: 1653
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 14
atggatcgcg gggcggtggt ggggtttctt ctcggtgttt gtgttgtatc gtgcttggcg      60
ggaacgccca aaacgtcctg gagacgggtg agtgtcggcg aggacgtttc gttgcttcca     120
gctccggggc ctacggggcg cggccccgacc cagaaactac tatgggccgt ggaacccctg     180
gatgggtgcg gccccttaca cccgtcgtgg gtctcgctga tgccccccaa gcaggtgccc     240
gagacggtcg tggatgcggc gtgcatgcgc gctccggtcc cgctggcgat ggcgtacgcc     300
cccccggccc catctgcgac cgggggtcta cgaacggact tcgtgtggca ggagcgcgcg     360
```

```
gccgtggtta accggagtct ggttattcac ggggtccgag agacggacag cggcctgtat    420
accctgtccg tgggcgacat aaaggacccg gctcgccaag tggcctcggt ggtcctggtg    480
gtgcaaccgg ccccagttcc gaccccaccc ccgacccccag ccgattacga cgaggatgac    540
aatgacgagg gcgaggacga aagtctcgcc ggcactccg ccagcgggac cccccggctc     600
ccgcctcccc ccgccccccc gaggtcttgg cccagcgccc cgaagtctc acatgtgcgt     660
ggggtgaccg tgcgtatgga gactccggaa gctatcctgt tttcccccgg ggagacgttc    720
agcacgaacg tctccatcca tgccatcgcc cacgacgacc agacctactc catggacgtc    780
gtctggttga ggttcgacgt gccgacctcg tgtgccgaga tgcgaatata cgaatcgtgt    840
ctgtatcacc cgcagctccc agaatgtctg tccccggccg acgcgccgtg cgccgcgagt    900
acgtggacgt ctcgcctggc cgtccgcagc tacgcggggt gttccagaac aaaccccca    960
ccgcgctgtt cggccgaggc tcacatggag cccgtcccgg ggctggcgtg caggcggcc    1020
tccgtcaatc tggagttccg ggacgcgtcc ccacaacact ccggcctgta tctgtgtgtg    1080
gtgtacgtca cgaccatat tcacgcctgg ggccacatta ccatcagcac cgcggcgcag    1140
taccggaacg cggtggtgga acagcccctc ccacagcgcg gcgcggattt ggccgagccc    1200
acccaccgc acgtcgggc ccctcccac gcgccccaa cccacggcgc cctgcggtta       1260
ggggcggtga tgggggccgc cctgctgctg tctgcactgg ggttgtcggt gtgggcgtgt    1320
atgacctgtt ggcgcaggcg tgcctggcgg gcggttaaaa gcagggcctc gggtaagggg    1380
cccacgtaca ttcgcgtggc cgacagcgag ctgtacgcgg actggagctc ggacagcgag    1440
ggagaacgcg accaggtccc gtggctggcc ccccggaga gacccgactc tccctccacc     1500
aatggatccg gctttgagat cttatcacca acggctccgt ctgtataccc ccgtagcgat    1560
gggcatcaat ctcgccgcca gctcacaacc tttggatccg gaaggcccga tcgccgttac    1620
tcccaggcct ccgattcgtc cgtcttctgg taa                                 1653

<210> SEQ ID NO 15
<211> LENGTH: 550
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Arg Val Ser Val
                20                  25                  30

Gly Glu Asp Val Ser Leu Leu Pro Ala Pro Gly Pro Thr Gly Arg Gly
            35                  40                  45

Pro Thr Gln Lys Leu Leu Trp Ala Val Glu Pro Leu Asp Gly Cys Gly
        50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
                85                  90                  95

Met Ala Tyr Ala Pro Pro Ala Pro Ser Ala Thr Gly Gly Leu Arg Thr
                100                 105                 110

Asp Phe Val Trp Gln Glu Arg Ala Ala Val Val Asn Arg Ser Leu Val
            115                 120                 125
```

```
Ile His Gly Val Arg Glu Thr Asp Ser Gly Leu Tyr Thr Leu Ser Val
    130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
                180                 185                 190

Pro Ala Ser Gly Thr Pro Arg Leu Pro Pro Pro Ala Pro Pro Arg
        195                 200                 205

Ser Trp Pro Ser Ala Pro Glu Val Ser His Val Arg Gly Val Thr Val
210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Gln Thr Tyr
                245                 250                 255

Ser Met Asp Val Val Trp Leu Arg Phe Asp Val Pro Thr Ser Cys Ala
                260                 265                 270

Glu Met Arg Ile Tyr Glu Ser Cys Leu Tyr His Pro Gln Leu Pro Glu
        275                 280                 285

Cys Leu Ser Pro Ala Asp Ala Pro Cys Ala Ala Ser Thr Trp Thr Ser
        290                 295                 300

Arg Leu Ala Val Arg Ser Tyr Ala Gly Cys Ser Arg Thr Asn Pro Pro
305                 310                 315                 320

Pro Arg Cys Ser Ala Glu Ala His Met Glu Pro Val Pro Gly Leu Ala
                325                 330                 335

Trp Gln Ala Ala Ser Val Asn Leu Glu Phe Arg Asp Ala Ser Pro Gln
            340                 345                 350

His Ser Gly Leu Tyr Leu Cys Val Val Tyr Val Asn Asp His Ile His
            355                 360                 365

Ala Trp Gly His Ile Thr Ile Ser Thr Ala Ala Gln Tyr Arg Asn Ala
        370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Thr His Gly
                405                 410                 415

Ala Leu Arg Leu Gly Ala Val Met Gly Ala Ala Leu Leu Leu Ser Ala
                420                 425                 430

Leu Gly Leu Ser Val Trp Ala Cys Met Thr Cys Trp Arg Arg Arg Ala
        435                 440                 445

Trp Arg Ala Val Lys Ser Arg Ala Ser Gly Lys Gly Pro Thr Tyr Ile
    450                 455                 460

Arg Val Ala Asp Ser Glu Leu Tyr Ala Asp Trp Ser Ser Asp Ser Glu
465                 470                 475                 480

Gly Glu Arg Asp Gln Val Pro Trp Leu Ala Pro Glu Arg Pro Asp
                485                 490                 495

Ser Pro Ser Thr Asn Gly Ser Gly Phe Glu Ile Leu Ser Pro Thr Ala
        500                 505                 510

Pro Ser Val Tyr Pro Arg Ser Asp Gly His Gln Ser Arg Gln Leu
        515                 520                 525

Thr Thr Phe Gly Ser Gly Arg Pro Asp Arg Arg Tyr Ser Gln Ala Ser
530                 535                 540

Asp Ser Ser Val Phe Trp
```

<210> SEQ ID NO 16
<211> LENGTH: 1653
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 16

```
atggatcgcg gggcggtggt ggggtttctt ctcggtgttt gtgttgtatc gtgcttggcg      60
ggaacgccca aaacgtcctg gagacgggtg agtgtcggcg aggacgtttc gttgcttcca     120
gctccggggc ctacggggcg cggcccgacc cagaaactac tatgggccgt ggaacccctg     180
gatgggtgcg gccccttaca cccgtcgtgg gtctcgctga tgccccccaa gcaggtgccc     240
gagacggtcg tggatgcggc gtgcatgcgc gctccggtcc cgctggcgat ggcgtacgcc     300
cccccggccc catctgcgac cggggtctca gaacggact tcgtgtggca ggagcgcgcg      360
gccgtggtta accggagtct ggttattcac ggggtccgag agacggacag cggcctgtat     420
accctgtccg tgggcgacat aaaggacccg gctcgccaag tggcctcggt ggtcctggtg     480
gtgcaaccgg ccccagttcc gaccccaccc ccgacccag ccgattacga cgaggatgac      540
aatgacgagg gcgaggacga agtctcgcc ggcactcccg ccagcgggac ccccggctc       600
ccgcctcccc ccgccccccc gaggtcttgg cccagcgccc ccgaagtctc acatgtgcgt     660
ggggtgaccg tgcgtatgga gactccggaa gctatcctgt ttccccccgg ggagacgttc     720
agcacgaacg tctccatcca tgccatcgcc cacgacgacc agacctactc catggacgtc     780
gtctggttga ggttcgacgt gccgaccctcg tgtgccgaga tgcgaatata cgaatcgtgt    840
ctgtatcacc cgcagctccc agaatgtctg tccccggccg acgcgccgtg cgccgcgagt     900
acgtggacgt ctcgcctggc cgtccgcagc tacgcggggt gttccagaac aaaccccca      960
ccgcgctgtt cggccgaggc tcacatggag cccgtcccgg ggctggcgtg gcaggcggcc    1020
tccgtcaatc tggagttccg ggacgcgtcc ccacaacact ccggcctgta tctgtgtgtg    1080
gtgtacgtca cgaccatat tcacgcctgg ggccacatta ccatcagcac cgcggcgcag     1140
taccggaacg cggtggtgga acagcccctc ccacagcgcg cgcggattt ggccgagccc     1200
acccacccgc acgtcgggc ccctcccac gcgccccaa cccacggcgc cctgcggtta       1260
ggggcggtga tggggccgc cctgctgctg tctgcgctgg ggttgtcggt gtgggcgtgt    1320
atgacctgtt ggcgcaggcg tgcctggcgg gcggttaaaa gcagggcctc gggtaagggg    1380
cccacgtaca ttcgcgtggc cgacagcgag ctgtacgcgg actggagctc ggacagcgag    1440
ggagaacgcg accaggtccc gtggctggcc ccccggaga gacccgactc tccctccacc     1500
aatggatccg gctttgagat cttatcacca acggctccgt ctgtataccc ccgtagcgac    1560
gggcatcaat ctcgccgcca gctcacaacc tttggatccg gaaggcccga tcgccgttac    1620
tcccaggcct ccgattcgtc cgtcttctgg taa                                 1653
```

<210> SEQ ID NO 17
<211> LENGTH: 550
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 17

-continued

```
Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Val Ser Val
            20                  25                  30

Gly Glu Asp Val Ser Leu Leu Pro Ala Pro Gly Pro Thr Gly Arg Gly
            35                  40                  45

Pro Thr Gln Lys Leu Leu Trp Ala Val Glu Pro Leu Asp Gly Cys Gly
        50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
                85                  90                  95

Met Ala Tyr Ala Pro Pro Ala Pro Ser Ala Thr Gly Gly Leu Arg Thr
                100                 105                 110

Asp Phe Val Trp Gln Glu Arg Ala Ala Val Val Asn Arg Ser Leu Val
            115                 120                 125

Ile His Gly Val Arg Glu Thr Asp Ser Gly Leu Tyr Thr Leu Ser Val
            130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
                180                 185                 190

Pro Ala Ser Gly Thr Pro Arg Leu Pro Pro Pro Ala Pro Pro Arg
            195                 200                 205

Ser Trp Pro Ser Ala Pro Glu Val Ser His Val Arg Gly Val Thr Val
210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Gln Thr Tyr
                245                 250                 255

Ser Met Asp Val Val Trp Leu Arg Phe Asp Val Pro Thr Ser Cys Ala
                260                 265                 270

Glu Met Arg Ile Tyr Glu Ser Cys Leu Tyr His Pro Gln Leu Pro Glu
            275                 280                 285

Cys Leu Ser Pro Ala Asp Ala Pro Cys Ala Ala Ser Thr Trp Thr Ser
        290                 295                 300

Arg Leu Ala Val Arg Ser Tyr Ala Gly Cys Ser Arg Thr Asn Pro Pro
305                 310                 315                 320

Pro Arg Cys Ser Ala Glu Ala His Met Glu Pro Val Pro Gly Leu Ala
            325                 330                 335

Trp Gln Ala Ala Ser Val Asn Leu Glu Phe Arg Asp Ala Ser Pro Gln
            340                 345                 350

His Ser Gly Leu Tyr Leu Cys Val Val Tyr Val Asn Asp His Ile His
            355                 360                 365

Ala Trp Gly His Ile Thr Ile Ser Thr Ala Ala Gln Tyr Arg Asn Ala
        370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Thr His Gly
                405                 410                 415
```

```
Ala Leu Arg Leu Gly Ala Val Met Gly Ala Ala Leu Leu Leu Ser Ala
            420                 425                 430

Leu Gly Leu Ser Val Trp Ala Cys Met Thr Cys Trp Arg Arg Arg Ala
        435                 440                 445

Trp Arg Ala Val Lys Ser Arg Ala Ser Gly Lys Gly Pro Thr Tyr Ile
    450                 455                 460

Arg Val Ala Asp Ser Glu Leu Tyr Ala Asp Trp Ser Ser Asp Ser Glu
465                 470                 475                 480

Gly Glu Arg Asp Gln Val Pro Trp Leu Ala Pro Glu Arg Pro Asp
                485                 490                 495

Ser Pro Ser Thr Asn Gly Ser Gly Phe Glu Ile Leu Ser Pro Thr Ala
            500                 505                 510

Pro Ser Val Tyr Pro Arg Ser Asp Gly His Gln Ser Arg Arg Gln Leu
        515                 520                 525

Thr Thr Phe Gly Ser Gly Arg Pro Asp Arg Arg Tyr Ser Gln Ala Ser
    530                 535                 540

Asp Ser Ser Val Phe Trp
545                 550

<210> SEQ ID NO 18
<211> LENGTH: 1653
<212> TYPE: DNA
<213> ORGANISM: Herpes simplex virus type 1

<400> SEQUENCE: 18
```

| | | |
|---|---|---:|
| atggatcgcg gggcggtggt gggtttctt ctcggtgttt gtgttgtatc gtgcttggcg | | 60 |
| ggaacgccca aaacgtcctg gagacgggtg agtgtcggcg aggacgtttc gttgcttcca | | 120 |
| gctccggggc ctacggggcg cggcccgacc cagaaactac tatgggccgt ggaaccctg | | 180 |
| gatgggtgcg gccccttaca cccgtcgtgg gtctcgctga tgcccccaa gcaggtgccc | | 240 |
| gagacggtcg tggatgcggc gtgcatgcgc gctccggtcc cgctggcgat ggcgtacgcc | | 300 |
| ccccggccc catctgcgac cggggggtcta cgaacggact tcgtgtggca ggagcgcgcg | | 360 |
| gccgtggtta accggagtct ggttattcac ggggtccgag agacggacag cggcctgtat | | 420 |
| accctgtccg tgggcgacat aaaggacccg gctcgcaag tggcctcggt ggtcctggtg | | 480 |
| gtgcaaccgg ccccagttcc gaccccaccc ccgaccccag ccgattacga cgaggatgac | | 540 |
| aatgacgagg gcgaggacga aagtctcgcc ggcactccg ccagcgggac cccccggctc | | 600 |
| ccgcctcccc ccgcccccccc gaggtcttgg cccagcgccc cgaagtctc acatgtgcgt | | 660 |
| ggggtgaccg tgcgtatgga gactccggaa gctatcctgt tttcccccgg ggagacgttc | | 720 |
| agcacgaacg tctccatcca tgccatcgcc cacgacgacc agacctactc catggacgtc | | 780 |
| gtctggttga ggttcgacgt gccgacctcg tgtgccgaga tgcgaatata cgaatcgtgt | | 840 |
| ctgtatcacc cgcagctccc agaatgtctg tccccggccg acgcgccgtg cgccgcgagt | | 900 |
| acgtggacgt ctcgcctggc cgtccgcagc tacgcggggt gttccagaac aaacccccca | | 960 |
| ccgcgctgtt cggccgaggc tcacatggag cccgtcccgg ggctggcgtg gcaggcggcc | | 1020 |
| tccgtcaatc tggagttccg ggacgcgtcc ccacaacact ccggcctgta tctgtgtgtg | | 1080 |
| gtgtacgtca cgaccatat tcacgcctgg ggccacatta ccatcagcac gcggcgcag | | 1140 |
| taccggaacg cggtggtgga acagcccctc ccacagcgcg gcgcggattt ggcccgagccc | | 1200 |
| acccacccgc acgtcgggc ccctccccac gcgccccccaa cccacggcgc cctgcggtta | | 1260 |
| ggggcggtga tggggccgc cctgctgctg tctgcgctgg ggttgtcggt gtgggcgtgt | | 1320 |

```
atgacctgtt ggcgcaggcg tgcctggcgg gcggttaaaa gcagggcctc gggtaagggg    1380
cccacgtaca ttcgcgtggc cgacagcgag ctgtacgcgg actggagctc ggacagcgag    1440
ggagaacgcg accaggtccc gtggctggcc ccccggaga gacccgactc tccctccacc     1500
aatggatccg gctttgagat cttatcacca acggctccgt ctgtatatccc cgtagcgac   1560 gggcatcaat ctcgccgcca gctcacaacc tttggatccg gaaggcccga tcgccgttac   1620
tcccaggcct ccgattcgtc cgtcttctgg taa                                 1653
```

<210> SEQ ID NO 19
<211> LENGTH: 550
<212> TYPE: PRT
<213> ORGANISM: Herpes simplex virus type 1

<400> SEQUENCE: 19

```
Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Arg Val Ser Val
                20                  25                  30

Gly Glu Asp Val Ser Leu Leu Pro Ala Pro Gly Pro Thr Gly Arg Gly
            35                  40                  45

Pro Thr Gln Lys Leu Leu Trp Ala Val Glu Pro Leu Asp Gly Cys Gly
        50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
                85                  90                  95

Met Ala Tyr Ala Pro Pro Ala Pro Ser Ala Thr Gly Gly Leu Arg Thr
                100                 105                 110

Asp Phe Val Trp Gln Glu Arg Ala Ala Val Val Asn Arg Ser Leu Val
            115                 120                 125

Ile His Gly Val Arg Glu Thr Asp Ser Gly Leu Tyr Thr Leu Ser Val
        130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
                180                 185                 190

Pro Ala Ser Gly Thr Pro Arg Leu Pro Pro Pro Ala Pro Pro Arg
            195                 200                 205

Ser Trp Pro Ser Ala Pro Glu Val Ser His Val Arg Gly Val Thr Val
        210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Asp Gln Thr Tyr
                245                 250                 255

Ser Met Asp Val Val Trp Leu Arg Phe Asp Val Pro Thr Ser Cys Ala
            260                 265                 270

Glu Met Arg Ile Tyr Glu Ser Cys Leu Tyr His Pro Gln Leu Pro Glu
        275                 280                 285

Cys Leu Ser Pro Ala Asp Ala Pro Cys Ala Ala Ser Thr Trp Thr Ser
    290                 295                 300

Arg Leu Ala Val Arg Ser Tyr Ala Gly Cys Ser Arg Thr Asn Pro Pro
305                 310                 315                 320
```

```
Pro Arg Cys Ser Ala Glu Ala His Met Glu Pro Val Pro Gly Leu Ala
                325                 330                 335

Trp Gln Ala Ala Ser Val Asn Leu Glu Phe Arg Asp Ala Ser Pro Gln
            340                 345                 350

His Ser Gly Leu Tyr Leu Cys Val Val Tyr Val Asn Asp His Ile His
        355                 360                 365

Ala Trp Gly His Ile Thr Ile Ser Thr Ala Ala Gln Tyr Arg Asn Ala
    370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Thr His Gly
                405                 410                 415

Ala Leu Arg Leu Gly Ala Val Met Gly Ala Ala Leu Leu Leu Ser Ala
                420                 425                 430

Leu Gly Leu Ser Val Trp Ala Cys Met Thr Cys Trp Arg Arg Arg Ala
            435                 440                 445

Trp Arg Ala Val Lys Ser Arg Ala Ser Gly Lys Gly Pro Thr Tyr Ile
    450                 455                 460

Arg Val Ala Asp Ser Glu Leu Tyr Ala Asp Trp Ser Ser Asp Ser Glu
465                 470                 475                 480

Gly Glu Arg Asp Gln Val Pro Trp Leu Ala Pro Glu Arg Pro Asp
                485                 490                 495

Ser Pro Ser Thr Asn Gly Ser Gly Phe Glu Ile Leu Ser Pro Thr Ala
                500                 505                 510

Pro Ser Val Tyr Pro Arg Ser Asp Gly His Gln Ser Arg Gln Leu
                515                 520                 525

Thr Thr Phe Gly Ser Gly Arg Pro Asp Arg Arg Tyr Ser Gln Ala Ser
            530                 535                 540

Asp Ser Ser Val Phe Trp
545                 550

<210> SEQ ID NO 20
<211> LENGTH: 3267
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: Intron
<222> LOCATION: (58)..(861)
<223> OTHER INFORMATION: intron
<220> FEATURE:
<221> NAME/KEY: mutation
<222> LOCATION: (848)..(848)
<223> OTHER INFORMATION: a848c
<220> FEATURE:
<221> NAME/KEY: Intron
<222> LOCATION: (1529)..(1663)
<223> OTHER INFORMATION: intron
<220> FEATURE:
<221> NAME/KEY: mutation
<222> LOCATION: (1712)..(1712)
<223> OTHER INFORMATION: g1712a

<400> SEQUENCE: 20
atggagcccc gccccggagc gagtacccgc cggcctgagg gccgccccca gcgcgaggtg      60
aggggccggg cgccatgtct ggggcgccat gtctggggcg ccatgtctgg ggcgccatgt     120
ctggggcgcc atgttggggg gcgccatgtt ggggggcgcc atgttggggg accccgacc     180
```

-continued

| | |
|---|---|
| cttacactgg aaccggccgc catgttgggg gaccccact catacacggg agccgggcgc | 240 |
| catgttgggg cgccatgtta gggggcgtgg aacccccgtga cactatatat acagggaccg | 300 |
| gggggcgccat gttaggggggc gcggaacccc ctgaccctat atatacaggg accggggtcg | 360 |
| ccctgttagg ggtcgccatg tgaccccctg actttatata tacagacccc caacacctac | 420 |
| acatggcccc tttgactcag acgcagggcc cggggtcgcc gtgggacccc cctgactcat | 480 |
| acacagagac acgccccccac aacaaacaca cagggaccgg ggtcgccgtg ttaggggggcg | 540 |
| tggtccccac tgactcatac gcagggcccc cttactcaca cgcatctagg ggggtggggga | 600 |
| ggagccgccc gccatatttg ggggacgccg tgggaccccc gactccggtg cgtctggagg | 660 |
| gcgggagaag agggaagaag aggggtcggg atccaaagga cggacccaga ccacctttgg | 720 |
| ttgcagaccc ctttctcccc cctcttccga ggccagcagg ggggcaggac tttgtgaggc | 780 |
| ggggggggggag ggggaactcg tgggcgctga ttgacgcggg aaatcccccc attcttaccc | 840 |
| gcccccccctt tttcccctca gcccgccccg gatgtctggg tgtttccctg cgaccgagac | 900 |
| ctgccggaca gcagcgactc ggaggcgagg accgaagtgg gggggcgggg ggacgccgac | 960 |
| caccatgacg acgactccgc ctccgaggcg gacagcacgg acacggaact gttcgagacg | 1020 |
| gggctgctgg ggccgcaggg cgtggatggg ggggcggtct cggggggggag ccccccccgc | 1080 |
| gaggaagacc ccggcagttg cggggggcgcc ccccctcgag aggacggggg gagcgacgag | 1140 |
| ggcgacgtgt gcgccgtgtg cacggatgag atcgcgcccc acctgcgctg cgacaccttc | 1200 |
| ccgtgcatgc accgcttctg catcccgtgc atgaaaacct ggatgcaatt gcgcaacacc | 1260 |
| tgcccgctgt gcaacgccaa gctggtgtac ctgatagtgg gcgtgacgcc cagcgggtcg | 1320 |
| ttcagcacca tcccgatcgt gaacgacccc cagacccgca tggaggccga ggaggccgtc | 1380 |
| agggcgggca cggccgtgga ctttatctgg acgggcaatc agcggttcgc cccgcggtac | 1440 |
| ctgaccctgg gggggcacac ggtgagggcc ctgtcgccca cccacccgga acccaccacg | 1500 |
| gacgaggatg acgacgacct ggacgacggt gaggcggggg gcggcaagga ccctggggga | 1560 |
| ggaggaggag gaggggggggg agggaggaat aggcgggcgg gcgaggaaag ggcgggccgg | 1620 |
| ggaggggggcg taacctgatc gcgccccccg ttgtctcttg cagcagacta cgtaccgccc | 1680 |
| gcccccccgcc ggacgccccg cgccccccca cacagaggcg ccgccgcgcc cccgtgacg | 1740 |
| ggcggggcgt ctcacgcagc ccccccagccg gccgcggctc ggacagcgcc ccctcggcg | 1800 |
| cccatcgggc cacacggcag cagtaacacc aacaccacca caacagcag cggcggcggc | 1860 |
| ggctcccgcc agtcgcgagc cgcggcgccg cggggggcgt ctggcccctc cggggggggtt | 1920 |
| ggggttgggg ttggggttgt tgaagcggag gcggggcggc cgaggggccg gacgggcccc | 1980 |
| cttgtcaaca gacccgcccc ccttgcaaac aacagagacc ccatagtgat cagcgactcc | 2040 |
| cccccggcct ctccccacag gccccccgcg gcgcccatgc caggctccgc ccccccgcccc | 2100 |
| gggcccccccg cgtccgcggc gcgtcggga cccgcgcgcc cccgcgcggc cgtggccccg | 2160 |
| tgcgtgcgag cgccgcctcc ggggcccggc ccccgcgccc cggcccccgg ggcggagccg | 2220 |
| gccgcccgcc ccgcggacgc gcgccgtgtg cccagtcgc actcgtccct ggctcaggcc | 2280 |
| gcgaaccaag aacagagtct gtgccggggcg cgtgcgacgg tggcgcgcgg ctcgggggggg | 2340 |
| ccgggcgtgg agggtgggca cgggccctcc cgcggcgccg ccccctccgg cgccgccccg | 2400 |
| ctccccctccg ccgcctctgt cgagcaggag gcggcggtgc gtccgaggaa gaggcgcggg | 2460 |
| tcgggccagg aaaaccccctc ccccccagtcc acgcgtcccc cctcgcgcc ggcagggggcc | 2520 |
| aagagggcgg cgacgcaccc cccctccgac tcagggccgg ggggggcgcgg ccagggtggg | 2580 |

```
cccgggaccc ccctgacgtc ctcggcggcc tccgcctctt cctcctctgc ctcttcctcc    2640
tcggccccga cccccgcggg ggccgcctct tccgccgccg gggccgcgtc ctcctccgct    2700
tccgcctcct cgggcggggc cgtcggtgcc ctgggaggga gacaagagga aacctccctc    2760
ggcccccgcg ctgcttctgg gccgcggggg ccgaggaagt gtgcccggaa gacgcgccac    2820
gcggagactt ccggggccgt ccccgcgggc ggcctcacgc gctacctgcc catctcgggg    2880
gtctctagcg tggtcgccct gtcgccttac gtgaacaaga cgatcacggg ggactgcctg    2940
cccatcctgg acatggagac ggggaacatc ggggcgtacg tggtcctggt ggaccagacg    3000
ggaaacatgg cgacccggct gcgggccgcg gtccccggct ggagccgccg cacctgctc      3060 cccgagaccg cgggtaacca cgtgatgccc cccgagtacc cgacggcccc cgcgtcggag    3120
tggaacagcc tctggatgac ccccgtgggg aacatgctgt tcgaccaggg caccctagtg    3180
ggcgccctgg acttccgcag cctgcggtct cggcacccgt ggtccgggga gcaggggcg      3240 tcgacccggg acgagggaaa acaataa                                        3267
```

<210> SEQ ID NO 21
<211> LENGTH: 775
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (258)..(258)
<223> OTHER INFORMATION: R258H

<400> SEQUENCE: 21

```
Met Glu Pro Arg Pro Gly Ala Ser Thr Arg Arg Pro Glu Gly Arg Pro
1               5                   10                  15

Gln Arg Glu Pro Ala Pro Asp Val Trp Val Phe Pro Cys Asp Arg Asp
            20                  25                  30

Leu Pro Asp Ser Ser Asp Ser Glu Ala Glu Thr Glu Val Gly Gly Arg
        35                  40                  45

Gly Asp Ala Asp His His Asp Asp Ser Ala Ser Glu Ala Asp Ser
    50                  55                  60

Thr Asp Thr Glu Leu Phe Glu Thr Gly Leu Leu Gly Pro Gln Gly Val
65                  70                  75                  80

Asp Gly Gly Ala Val Ser Gly Gly Ser Pro Pro Arg Glu Glu Asp Pro
                85                  90                  95

Gly Ser Cys Gly Gly Ala Pro Pro Arg Glu Asp Gly Gly Ser Asp Glu
            100                 105                 110

Gly Asp Val Cys Ala Val Cys Thr Asp Glu Ile Ala Pro His Leu Arg
        115                 120                 125

Cys Asp Thr Phe Pro Cys Met His Arg Phe Cys Ile Pro Cys Met Lys
    130                 135                 140

Thr Trp Met Gln Leu Arg Asn Thr Cys Pro Leu Cys Asn Ala Lys Leu
145                 150                 155                 160

Val Tyr Leu Ile Val Gly Val Thr Pro Ser Gly Ser Phe Ser Thr Ile
                165                 170                 175

Pro Ile Val Asn Asp Pro Gln Thr Arg Met Glu Ala Glu Glu Ala Val
            180                 185                 190

Arg Ala Gly Thr Ala Val Asp Phe Ile Trp Thr Gly Asn Gln Arg Phe
        195                 200                 205
```

```
Ala Pro Arg Tyr Leu Thr Leu Gly Gly His Thr Val Arg Ala Leu Ser
210                 215                 220

Pro Thr His Pro Glu Pro Thr Thr Asp Glu Asp Asp Asp Asp Leu Asp
225                 230                 235                 240

Asp Ala Asp Tyr Val Pro Pro Ala Pro Arg Arg Thr Pro Arg Ala Pro
                245                 250                 255

Pro His Arg Gly Ala Ala Ala Pro Pro Val Thr Gly Gly Ala Ser His
                260                 265                 270

Ala Ala Pro Gln Pro Ala Ala Ala Arg Thr Ala Pro Pro Ser Ala Pro
            275                 280                 285

Ile Gly Pro His Gly Ser Ser Asn Thr Asn Thr Thr Thr Asn Ser Ser
290                 295                 300

Gly Gly Gly Gly Ser Arg Gln Ser Arg Ala Ala Ala Pro Arg Gly Ala
305                 310                 315                 320

Ser Gly Pro Ser Gly Gly Val Gly Val Gly Val Gly Val Val Glu Ala
                325                 330                 335

Glu Ala Gly Arg Pro Arg Gly Arg Thr Gly Pro Leu Val Asn Arg Pro
            340                 345                 350

Ala Pro Leu Ala Asn Asn Arg Asp Pro Ile Val Ile Ser Asp Ser Pro
            355                 360                 365

Pro Ala Ser Pro His Arg Pro Pro Ala Ala Pro Met Pro Gly Ser Ala
        370                 375                 380

Pro Arg Pro Gly Pro Pro Ala Ser Ala Ala Ala Ser Gly Pro Ala Arg
385                 390                 395                 400

Pro Arg Ala Ala Val Ala Pro Cys Val Arg Ala Pro Pro Pro Gly Pro
                405                 410                 415

Gly Pro Arg Ala Pro Ala Pro Gly Ala Glu Pro Ala Ala Arg Pro Ala
            420                 425                 430

Asp Ala Arg Arg Val Pro Gln Ser His Ser Ser Leu Ala Gln Ala Ala
        435                 440                 445

Asn Gln Glu Gln Ser Leu Cys Arg Ala Arg Ala Thr Val Ala Arg Gly
    450                 455                 460

Ser Gly Gly Pro Gly Val Glu Gly Gly His Gly Pro Ser Arg Gly Ala
465                 470                 475                 480

Ala Pro Ser Gly Ala Ala Pro Leu Pro Ser Ala Ala Ser Val Glu Gln
                485                 490                 495

Glu Ala Ala Val Arg Pro Arg Lys Arg Arg Gly Ser Gly Gln Glu Asn
            500                 505                 510

Pro Ser Pro Gln Ser Thr Arg Pro Pro Leu Ala Pro Ala Gly Ala Lys
        515                 520                 525

Arg Ala Ala Thr His Pro Pro Ser Asp Ser Gly Pro Gly Gly Arg Gly
    530                 535                 540

Gln Gly Gly Pro Gly Thr Pro Leu Thr Ser Ala Ala Ser Ala Ser
545                 550                 555                 560

Ser Ser Ser Ala Ser Ser Ser Ser Ala Pro Thr Pro Ala Gly Ala Ala
                565                 570                 575

Ser Ser Ala Ala Gly Ala Ala Ser Ser Ser Ala Ser Ala Ser Ser Gly
            580                 585                 590

Gly Ala Val Gly Ala Leu Gly Gly Arg Gln Glu Glu Thr Ser Leu Gly
        595                 600                 605

Pro Arg Ala Ala Ser Gly Pro Arg Gly Pro Arg Lys Cys Ala Arg Lys
    610                 615                 620

Thr Arg His Ala Glu Thr Ser Gly Ala Val Pro Ala Gly Gly Leu Thr
```

```
                625                 630                 635                 640
        Arg Tyr Leu Pro Ile Ser Gly Val Ser Val Val Ala Leu Ser Pro
                            645                 650                 655

Tyr Val Asn Lys Thr Ile Thr Gly Asp Cys Leu Pro Ile Leu Asp Met
                        660                 665                 670

Glu Thr Gly Asn Ile Gly Ala Tyr Val Leu Val Asp Gln Thr Gly
                    675                 680                 685

Asn Met Ala Thr Arg Leu Arg Ala Ala Val Pro Gly Trp Ser Arg Arg
                690                 695                 700

Thr Leu Leu Pro Glu Thr Ala Gly Asn His Val Met Pro Pro Glu Tyr
        705                 710                 715                 720

Pro Thr Ala Pro Ala Ser Glu Trp Asn Ser Leu Trp Met Thr Pro Val
                            725                 730                 735

Gly Asn Met Leu Phe Asp Gln Gly Thr Leu Val Gly Ala Leu Asp Phe
                        740                 745                 750

Arg Ser Leu Arg Ser Arg His Pro Trp Ser Gly Glu Gln Gly Ala Ser
                    755                 760                 765

Thr Arg Asp Glu Gly Lys Gln
            770                 775

<210> SEQ ID NO 22
<211> LENGTH: 3229
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: Intron
<222> LOCATION: (58)..(822)
<223> OTHER INFORMATION: intron
<220> FEATURE:
<221> NAME/KEY: Intron
<222> LOCATION: (1490)..(1625)
<223> OTHER INFORMATION: intron

<400> SEQUENCE: 22
atggagcccc gccccggagc gagtacccgc cggcctgagg ccgcccccca gcgcgaggtg      60
aggggccggg cgccatgtct ggggcgccat attggggggc gccatattgg ggggcgccat     120
gttgggggac cccgacccct acactggaaa ccggccgcca tgttggggga ccccactca     180 tacacgggag ccgggcgcca tgttggggcg ccatgttagg gggcgtggaa ccccgtgaca     240
ctatatatac agggaccggg ggcgccatgt taggggggtgc ggaaccccct gaccctatat     300
atacagggac cggggtcgcc ctgttggggg tcgccatgtg accccctgac tttatatata     360
cagaccccca acacatacac atggcccctt tgactcagac gcagggcccg gggtcgccgt     420
gggaccccct gactcataca cagagacacg ccccacaac aaacacacag gaccggggt     480 cgccgtgttg ggggcgtggt ccccactgac tcatacgcag gccccccta ctcacacgca     540 tctaggggg tggggaggag ccgccgcca tatttggggg acgccgtggg accccgact     600 ccggtgcgtc tggagggcgg gagaagaggg aagaagaggg gtcgggatcc aaaggacgga     660
cccagaccac ctttggttgc agacccctt ctcccccctc ttccgaggcc agcaggggg     720 caggactttg tgaggcgggg gggggagagg gggaactcgt gggtgctgat tgacgcggga     780 aatcccccc cattcttacc cgccccctt ttttccccctt agcccgcccc ggatgtctgg     840
gtgtttccct gcgaccgaga cctgccggac agcagcgact ctgaggcgga gaccgaagtg     900 gggggcggg gggacgccga ccaccatgac gacgactccg cctccgaggc ggacagcacg     960
```

```
gacacggaac tgttcgagac ggggctgctg gggccgcagg gcgtggatgg ggggcggtc    1020 tcgggggga gccccccccg cgaggaagac cccggcagtt gcggggcgc ccccctcga     1080 gaggacgggg ggagcgacga gggtgacgtg tgcgccgtgt gcacggatga gatcgcgccc    1140
cacctgcgct gcgacacctt cccgtgcatg caccgcttct gcatcccgtg catgaaaacc    1200
tggatgcaat tgcgcaacac ctgccgctg tgcaacgcca agctggtgta cctgatagtg      1260
ggcgtgacgc ccagcgggtc gttcagcacc atcccgatcg tgaacgaccc ccagacccgc    1320
atggaggccg aggaggccgt cagggcgggc acggccgtgg actttatctg gacgggcaat    1380
cagcggttcg ccccgcggta cctgaccctg ggggggcaca cggtgagggc cctgtcgccc    1440
acccacccgg aacccaccac ggacgaggat gacgacgacc tggacgacgg tgaggcgggg    1500
ggcggcaagg accctggggg aggaggagga ggaggggggg ggagggagga ataggcgggc    1560
gggcgaggaa agggcgggcc ggggagggg cgtaacctga tcgcgccccc cgttgtctct     1620
tgcagcagac tacgtaccgc ccgccccccg ccggacgccc cgcgcccccc cacgcagagg    1680
cgccgccgcg ccccccgtga cgggcggggc gtctcacgca gccccccagc cggccgcggc    1740
tcggacagcg cccccctcgg cgcccatcgg gccacacggc agcagtaaca ccaacaccac    1800
caccaacagc agcggcggcg gcggctcccg ccagtcgcga gccgcggcgc cgcggggggc    1860 gtctggccc tccgggggg ttggggttgg ggttgggtt gttgaagcgg aggcggggcg       1920 gccgagggc cggacgggcc cccttgtcaa cagacccgcc cccttgcaa acaacagaga       1980 ccccatagtg atcagcgact ccccccggc ctctccccac aggccccccg cggcgcccat      2040
gccaggctcc gccccccgcc ccgggccccc cgcgtccgcg gccgcgtcgg gacccgcgcg    2100
cccccgcgcg gccgtggccc cgtgcgtgcg agcgccgcct ccggggcccg gccccgcgc     2160 cccggccccc ggggcggagc cggccgcccg ccccgcggac gcgcgccgtg tgccccagtc    2220
gcactcgtcc ctggctcagg ccgcgaacca agaacagagt ctgtgccggg cgcgtgcgac    2280
ggtggcgcgc ggctcggggg ggccgggcgt ggagggtggg cacgggccct ccgcggcgc     2340 cgcccctcc ggcgccgccc cgctcccctc cgccgcctct gtcgagcagg aggcggcggt     2400
gcgtccgagg aagaggcgcg ggtcgggcca ggaaaacccc tccccccagt ccacgcgtcc    2460 cccctcgcg ccggcagggg ccaagagggc ggcgacgcac cccccctccg actcagggcc     2520 ggggggcgc ggccagggtg ggccccggac ccccctgacg tcctcggcgg cctccgcctc     2580
ttcctcctct gcctcttcct cctcggcccc gaccccgcg gggccgcct cttccgccgc      2640 cggggccgcg tcctcctccg cttccgcctc ctcgggcggg gccgtcggtg ccctgggagg    2700
gagacaagag gaaacctccc tcggccccg cgctgcttct gggccgcggg ggccgaggaa     2760 gtgtgccga aagacgcgcc acgcggagac ttccggggcc gtcccgcgg gcggcctcac     2820 gcgctacctg cccatctcgg gggtctctag cgtggtcgcc ctgtcgcctt acgtgaacaa    2880
gactatcacg ggggactgcc tgcccatcct ggacatggag acgggaaaca tcggggcgta    2940
cgtggtcctg gtgaccagac gggaaacat ggcgacccgg ctgcgggccg cggtccccgg     3000
ctggagccgc cgcaccctgc tccccgagac cgcgggtaac cacgtgatgc ccccgagta     3060 cccgacggcc cccgcgtcgg agtggaacag cctctggatg accccgtgg ggaacatgct     3120 gttcgaccag ggcaccctag tgggcgccct ggacttccgc agcctgcggt ctcggcaccc    3180
gtggtccggg gagcagggg cgtcgacccg ggacgaggga aaacaataa                 3229
```

<210> SEQ ID NO 23

<211> LENGTH: 775
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

```
Met Glu Pro Arg Pro Gly Ala Ser Thr Arg Arg Pro Glu Gly Arg Pro
1               5                   10                  15

Gln Arg Glu Pro Ala Pro Asp Val Trp Val Phe Pro Cys Asp Arg Asp
            20                  25                  30

Leu Pro Asp Ser Ser Asp Ser Glu Ala Glu Thr Glu Val Gly Gly Arg
        35                  40                  45

Gly Asp Ala Asp His His Asp Asp Ser Ala Ser Glu Ala Asp Ser
    50                  55                  60

Thr Asp Thr Glu Leu Phe Glu Thr Gly Leu Leu Gly Pro Gln Gly Val
65              70                  75                  80

Asp Gly Gly Ala Val Ser Gly Gly Ser Pro Pro Arg Glu Glu Asp Pro
                85                  90                  95

Gly Ser Cys Gly Gly Ala Pro Pro Arg Glu Asp Gly Gly Ser Asp Glu
            100                 105                 110

Gly Asp Val Cys Ala Val Cys Thr Asp Glu Ile Ala Pro His Leu Arg
        115                 120                 125

Cys Asp Thr Phe Pro Cys Met His Arg Phe Cys Ile Pro Cys Met Lys
130                 135                 140

Thr Trp Met Gln Leu Arg Asn Thr Cys Pro Leu Cys Asn Ala Lys Leu
145                 150                 155                 160

Val Tyr Leu Ile Val Gly Val Thr Pro Ser Gly Ser Phe Ser Thr Ile
                165                 170                 175

Pro Ile Val Asn Asp Pro Gln Thr Arg Met Glu Ala Glu Glu Ala Val
            180                 185                 190

Arg Ala Gly Thr Ala Val Asp Phe Ile Trp Thr Gly Asn Gln Arg Phe
        195                 200                 205

Ala Pro Arg Tyr Leu Thr Leu Gly Gly His Thr Val Arg Ala Leu Ser
    210                 215                 220

Pro Thr His Pro Glu Pro Thr Thr Asp Glu Asp Asp Asp Leu Asp
225                 230                 235                 240

Asp Ala Asp Tyr Val Pro Ala Pro Arg Thr Pro Arg Ala Pro
                245                 250                 255

Pro Arg Arg Gly Ala Ala Pro Pro Val Thr Gly Gly Ala Ser His
            260                 265                 270

Ala Ala Pro Gln Pro Ala Ala Arg Thr Ala Pro Ser Ala Pro
    275                 280                 285

Ile Gly Pro His Gly Ser Ser Asn Thr Asn Thr Thr Asn Ser Ser
290                 295                 300

Gly Gly Gly Gly Ser Arg Gln Ser Arg Ala Ala Ala Pro Arg Gly Ala
305                 310                 315                 320

Ser Gly Pro Ser Gly Gly Val Gly Val Gly Val Val Glu Ala
                325                 330                 335

Glu Ala Gly Arg Pro Arg Gly Arg Thr Gly Pro Leu Val Asn Arg Pro
            340                 345                 350

Ala Pro Leu Ala Asn Asn Arg Asp Pro Ile Val Ile Ser Asp Ser Pro
        355                 360                 365

Pro Ala Ser Pro His Arg Pro Pro Ala Ala Pro Met Pro Gly Ser Ala
```

```
            370                 375                 380
Pro Arg Pro Gly Pro Pro Ala Ser Ala Ala Ser Gly Pro Ala Arg
385                 390                 395                 400

Pro Arg Ala Ala Val Ala Pro Cys Val Arg Ala Pro Pro Gly Pro
                405                 410                 415

Gly Pro Arg Ala Pro Ala Pro Gly Ala Glu Pro Ala Ala Arg Pro Ala
                420                 425                 430

Asp Ala Arg Arg Val Pro Gln Ser His Ser Ser Leu Ala Gln Ala Ala
            435                 440                 445

Asn Gln Glu Gln Ser Leu Cys Arg Ala Arg Ala Thr Val Ala Arg Gly
        450                 455                 460

Ser Gly Gly Pro Gly Val Glu Gly Gly His Gly Pro Ser Arg Gly Ala
465                 470                 475                 480

Ala Pro Ser Gly Ala Ala Pro Leu Pro Ser Ala Ala Ser Val Glu Gln
                485                 490                 495

Glu Ala Ala Val Arg Pro Arg Lys Arg Arg Gly Ser Gly Gln Glu Asn
            500                 505                 510

Pro Ser Pro Gln Ser Thr Arg Pro Pro Leu Ala Pro Ala Gly Ala Lys
        515                 520                 525

Arg Ala Ala Thr His Pro Pro Ser Asp Ser Gly Pro Gly Gly Arg Gly
    530                 535                 540

Gln Gly Gly Pro Gly Thr Pro Leu Thr Ser Ser Ala Ala Ser Ala Ser
545                 550                 555                 560

Ser Ser Ser Ala Ser Ser Ser Ser Ala Pro Thr Pro Ala Gly Ala Ala
                565                 570                 575

Ser Ser Ala Ala Gly Ala Ala Ser Ser Ala Ser Ala Ser Ser Gly
            580                 585                 590

Gly Ala Val Gly Ala Leu Gly Gly Arg Gln Glu Glu Thr Ser Leu Gly
            595                 600                 605

Pro Arg Ala Ala Ser Gly Pro Arg Gly Pro Arg Lys Cys Ala Arg Lys
    610                 615                 620

Thr Arg His Ala Glu Thr Ser Gly Ala Val Pro Ala Gly Gly Leu Thr
625                 630                 635                 640

Arg Tyr Leu Pro Ile Ser Gly Val Ser Ser Val Ala Leu Ser Pro
                645                 650                 655

Tyr Val Asn Lys Thr Ile Thr Gly Asp Cys Leu Pro Ile Leu Asp Met
                660                 665                 670

Glu Thr Gly Asn Ile Gly Ala Tyr Val Val Leu Val Asp Gln Thr Gly
            675                 680                 685

Asn Met Ala Thr Arg Leu Arg Ala Ala Val Pro Gly Trp Ser Arg Arg
690                 695                 700

Thr Leu Leu Pro Glu Thr Ala Gly Asn His Val Met Pro Pro Glu Tyr
705                 710                 715                 720

Pro Thr Ala Pro Ala Ser Glu Trp Asn Ser Leu Trp Met Thr Pro Val
                725                 730                 735

Gly Asn Met Leu Phe Asp Gln Gly Thr Leu Val Gly Ala Leu Asp Phe
                740                 745                 750

Arg Ser Leu Arg Ser Arg His Pro Trp Ser Gly Glu Gln Gly Ala Ser
            755                 760                 765

Thr Arg Asp Glu Gly Lys Gln
    770                 775

<210> SEQ ID NO 24
```

```
<211> LENGTH: 3275
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: Intron
<222> LOCATION: (58)..(862)
<223> OTHER INFORMATION: intron
<220> FEATURE:
<221> NAME/KEY: Intron
<222> LOCATION: (1530)..(1668)
<223> OTHER INFORMATION: intron

<400> SEQUENCE: 24
atggagcccc gccccggagc gagtacccgc cggcctgagg gccgccccca gcgcgaggtg      60
aggggccggg cgccatgtct ggggcgccat gtctggggcg ccatgtctgg ggcgccatgt     120
ctggggcgcc atgttggggg cgccatgtt ggggggcgcc atgttgggg accccccgacc     180 cttacactgg aaccggccgc catgttgggg gaccccccact catacacggg agccgggcgc    240
catgttgggg cgccatgtta gggggcgtgg aaccccgtga cactatatat acagggaccg    300
ggggcgccat gttagggggc gcggaacccc ctgaccctat atatacaggg accgggtcg     360 ccctgttagg ggtcgccatg tgaccccctg actttatata tacagacccc caacacctac    420
acatggcccc tttgactcag acgcagggcc cggggtcgcc gtgggacccc cctgactcat    480
acacagagac acgccccac aacaaacaca cagggaccgg ggtcgccgtg ttagggggcg     540
tggtccccac tgactcatac gcagggcccc cttactcaca cgcatctagg ggggtgggga    600
ggagccgccc gccatatttg ggggacgccg tgggaccccc gactccggtg cgtctggagg    660 gcggagaag agggaagaag aggggtcggg atccaaagga cggacccaga ccacctttgg     720
ttgcagaccc ctttctcccc cctcttccga ggccagcagg ggggcaggac tttgtgaggc    780
ggggggggag gggaactcg tgggcgctga ttgacgcggg aaatcccccc attcttaccc     840 gcccccctt ttttccctc agcccgcccc ggatgtctgg gtgtttccct gcgaccgaga      900
cctgccggac agcagcgact cggaggcgga gaccgaagtg ggggggcggg gggacgccga    960
ccaccatgac gacgactccg cctccgaggc ggacagcacg gacacggaac tgttcgagac   1020
ggggctgctg ggggccgcagg gcgtggatgg ggggcggtc tcgggggga gccccccccg    1080 cgaggaagac cccggcagtt gcgggggcgc ccccctcga gaggacgggg ggagcgacga   1140
gggcgacgtg tgcgccgtgt gcacggatga gatcgcgccc cacctgcgct gcgacacctt   1200
cccgtgcatg caccgcttct gcatcccgtg catgaaaacc tggatgcaat gcgcaacac   1260 ctgcccgctg tgcaacgcca agctggtgta cctgatagtg ggcgtgacgc ccagcgggtc   1320
gttcagcacc atcccgatcg tgaacgaccc ccagacccgc atggaggccg aggaggccgt   1380
cagggcgggc acggccgtgg actttatctg gacgggcaat cagcggttcg ccccgcggta   1440
cctgaccctg gggggcaca cggtgagggc cctgtcgccc acccaccctg agcccaccac    1500
ggacgaggat gacgacgacc tggacgacgg tgaggcgggg gggcggcgag gaccctgggg   1560
gaggaggagg agggggggg ggggaggaa taggcgggcg ggcgggcgag gaaagggcgg    1620 gccgggagg gggcgtaacc tgatcgcgcc ccccgttgtc tcttgcagca gactacgtac    1680
cgcccgcccc ccgccggacg ccccgcgccc cccacgcag aggcgccgcc gcgccccccg    1740
tgacgggcgg ggcgtctcac gcagcccccc agcggccgc ggctcggaca cgcccccct    1800 cggcgcccat cgggccacac ggcagcagta acactaacac caccaccaac agcagcggcg   1860
```

| | |
|---|---:|
| gcggcggctc cgccagtcg cgagccgcgg tgccgcgggg ggcgtctggc ccctccgggg | 1920 |
| gggttggggt tgttgaagcg gaggcggggc ggccgagggg ccggacgggc cccttgtca | 1980 |
| acagacccgc ccccttgca acaacagag accccatagt gatcagcgac tccccccgg | 2040 |
| cctctcccca caggccccc gcggcgccca tgccaggctc cgcccccgc cccggtcccc | 2100 |
| ccgcgtccgc ggccgcgtcg ggcccgcgc gccccgcgc ggccgtggcc ccgtgtgtgc | 2160 |
| gggcgccgcc tccggggccc ggccccgcg ccccggcccc cggggcggag ccggccgccc | 2220 |
| gccccgcgga cgcgcgccgt gtgccccagt cgcactcgtc cctggctcag gccgcgaacc | 2280 |
| aagaacagag tctgtgccgg gcgcgtgcga cggtggcgcg cggctcgggg gggccgggcg | 2340 |
| tggagggtgg acacgggccc tcccgcggcg ccgcccctc cggcgccgcc ccctccggcg | 2400 |
| cccccccgct cccctccgcc gcctctgtcg agcaggaggc ggcggtgcgt ccgaggaaga | 2460 |
| ggcgcgggtc gggccaggaa aacccctccc ccagtccac gcgtccccc ctcgcgccgg | 2520 |
| caggggccaa gagggcggcg acgcaccccc cctccgactc agggccgggg gggcgcggcc | 2580 |
| agggagggcc cgggaccccc ctgacgtcct cggcggcctc cgcctcttcc tcctccgcct | 2640 |
| cttcctcctc ggccccgact cccgcggggg ccacctcttc cgccaccggg gccgcgtcct | 2700 |
| cctccgcttc cgcctcctcg ggcggggccg tcggtgccct gggagggaga caagaggaaa | 2760 |
| cctccctcgg cccccgcgct gcttctgggc cgcgggggcc gaggaagtgt gcccggaaga | 2820 |
| cgcgccacgc ggagacttcc ggggccgtcc ccgcgggcgg cctcacgcgc tacctgccca | 2880 |
| tctcgggggt ctctagcgtg gtcgccctgt cgccttacgt gaacaagacg atcacggggg | 2940 |
| actgcctgcc catcctggac atggagacgg ggaacatcgg ggcgtacgtg gtcctggtgg | 3000 |
| accagacggg aaacatggcg acccggctgc gggccgcggt cccggctgg agccgccgca | 3060 |
| ccctgctccc cgagaccgcg ggtaaccacg tgacgccccc cgagtacccg acggcccccg | 3120 |
| cgtcggagtg gaacagcctc tggatgaccc ccgtggggaa catgctgttc gaccagggca | 3180 |
| ccctagtggg cgccctggac ttccgcagcc tgccggtctcg gcacccgtgg tccggggagc | 3240 |
| aggggggcgtc gacccgggac gagggaaaac aataa | 3275 |

```
<210> SEQ ID NO 25
<211> LENGTH: 3267
<212> TYPE: DNA
<213> ORGANISM: Herpes simplex virus type 1
<220> FEATURE:
<221> NAME/KEY: Intron
<222> LOCATION: (58)..(861)
<223> OTHER INFORMATION: intron
<220> FEATURE:
<221> NAME/KEY: Intron
<222> LOCATION: (1529)..(1663)
<223> OTHER INFORMATION: intron

<400> SEQUENCE: 25
```

| | |
|---|---:|
| atggagcccc gccccggagc gagtacccgc cggcctgagg gccgccccca gcgcgaggtg | 60 |
| aggggccggg cgccatgtct ggggcgccat gtctggggcg ccatgtctgg ggcgccatgt | 120 |
| ctggggcgcc atgttggggg gcgccatgtt ggggggcgcc atgttggggg acccccgacc | 180 |
| cttacactgg aaccgccgc catgttgggg gaccccact catacacggg agccgggcgc | 240 |
| catgttgggg cgccatgtta gggggcgtgg aacccgtga cactatatat acagggaccg | 300 |
| ggggcgccat gttagggggc gcggaacccc ctgaccctat atatacaggg accggggtcg | 360 |
| ccctgttagg ggtcgccatg tgaccccctg actttatata tacagacccc caacacctac | 420 |
| acatggcccc tttgactcag acgcagggcc cggggtcgcc gtgggacccc cctgactcat | 480 |

-continued

| | | |
|---|---|---|
| acacagagac acgccccac aacaaacaca cagggaccgg ggtcgccgtg ttagggggcg | 540 | |
| tggtccccac tgactcatac gcagggcccc cttactcaca cgcatctagg ggggtgggga | 600 | |
| ggagccgccc gccatatttg ggggacgccg tgggaccccc gactccggtg cgtctggagg | 660 | |
| gcgggagaag agggaagaag aggggtcggg atccaaagga cggacccaga ccacctttgg | 720 | |
| ttgcagaccc ctttctcccc cctcttccga ggccagcagg ggggcaggac tttgtgaggc | 780 | |
| ggggggggag ggggaactcg tgggcgctga ttgacgcggg aaatccccc attcttaccc | 840 | |
| gcccccttt tttcccctca gcccgccccg gatgtctggg tgtttccctg cgaccgagac | 900 | |
| ctgccggaca gcagcgactc ggaggcgag accgaagtgg gggggcgggg ggacgccgac | 960 | |
| caccatgacg acgactccgc ctccgaggcg gacagcacgg acacggaact gttcgagacg | 1020 | |
| gggctgctgg ggccgcaggg cgtggatggg ggggcggtct cggggggggag ccccccccgc | 1080 | |
| gaggaagacc ccggcagttg cggggcgcc cccctcgag aggacggggg gagcgacgag | 1140 | |
| ggcgacgtgt gcgccgtgtg cacggatgag atcgcgcccc acctgcgctg cgacaccttc | 1200 | |
| ccgtgcatgc accgcttctg catcccgtgc atgaaaacct ggatgcaatt gcgcaacacc | 1260 | |
| tgcccgctgt gcaacgccaa gctggtgtac ctgatagtgg gcgtgacgcc cagcgggtcg | 1320 | |
| ttcagcacca tcccgatcgt gaacgacccc cagacccgca tggaggccga ggaggccgtc | 1380 | |
| agggcgggca cggccgtgga ctttatctgg acgggcaatc agcggttcgc cccgcggtac | 1440 | |
| ctgaccctgg gggggcacac ggtgagggcc ctgtcgccca cccaccggga acccaccacg | 1500 | |
| gacgaggatg acgacgacct ggacgacggt gaggcggggg gcggcaagga ccctggggga | 1560 | |
| ggaggaggag gaggggggg agggaggaat aggcgggcgg gcgaggaaag ggcgggccgg | 1620 | |
| ggaggggcg taacctgatc gcgcccccg ttgtctcttg cagcagacta cgtaccgccc | 1680 | |
| gcccccccgcc ggacgccccg cgccccccca cgcagaggcg ccgccgcgcc cccgtgacg | 1740 | |
| ggcgggggcgt ctcacgcagc cccccagccg gccgcggctc ggacagcgcc cccctcggcg | 1800 | |
| cccatcgggc cacacggcag cagtaacacc aacaccacca caacagcag cggcggcggc | 1860 | |
| ggctcccgcc agtcgcgagc cgcggcgccg cggggggcgt ctggccctc cgggggggtt | 1920 | |
| ggggttgggg ttggggttgt tgaagcggag gcggggcggc cgaggggccg gacgggcccc | 1980 | |
| cttgtcaaca gacccgcccc ccttgcaaac aacagagacc ccatagtgat cagcgactcc | 2040 | |
| ccccccggcct ctcccacag gccccccgcg gcgcccatgc caggctccgc ccccccgccc | 2100 | |
| gggccccccg cgtccgcggc cgcgtcggga cccgcgcgcc cccgcgcggc cgtggccccg | 2160 | |
| tgcgtgcgag cgccgcctcc ggggcccggc cccgcgcc cggccccgg gcggagccg | 2220 | |
| gccgcccgcc ccgcggacgc gcgccgtgtg ccccagtcgc actcgtccct ggctcaggcc | 2280 | |
| gcgaaccaag aacagagtct gtgccgggcg cgtgcgacgc tggcgcgcgg ctcggggggg | 2340 | |
| ccgggcgtgg agggtgggca cgggccctcc cgcggcgccg cccctccgg cgccgccccg | 2400 | |
| ctccctccg ccgcctctgt cgagcaggag gcggcggtgc gtccgaggaa gaggcgcggg | 2460 | |
| tcgggccagg aaaaccctc cccccagtcc acgcgtcccc ccctcgcgcc ggcaggggcc | 2520 | |
| aagagggcgg cgacgcaccc cccctccgac tcagggccgg ggggcgcgg caggtgggg | 2580 | |
| cccgggaccc ccctgacgtc ctcggcgcc tccgcctctt cctcctctgc ctcttcctcc | 2640 | |
| tcggccccga ccccgcggg ggccgcctct tccgcgccg gggccgcgtc ctcctccgct | 2700 | |
| tccgcctcct cggcgggc cgtcggtgcc ctggagggga acaagagga aacctccctc | 2760 | |
| ggccccgcg ctgcttctgg gccgcggggg ccgaggaagt gtgcccggaa gacgcgccac | 2820 | |

-continued

```
gcggagactt ccggggccgt ccccgcgggc ggcctcacgc gctacctgcc catctcgggg    2880
gtctctagcg tggtcgccct gtcgccttac gtgaacaaga cgatcacggg ggactgcctg    2940
cccatcctgg acatggagac ggggaacatc ggggcgtacg tggtcctggt ggaccagacg    3000
ggaaacatgg cgacccggct gcgggccgcg gtccccggct ggagccgccg caccctgctc    3060
cccgagaccg cgggtaacca cgtgatgccc cccgagtacc cgacggcccc cgcgtcggag    3120
tggaacagcc tctggatgac ccccgtgggg aacatgctgt tcgaccaggg caccctagtg    3180
ggcgccctgg acttccgcag cctgcggtct cggcacccgt ggtccgggga gcaggggcg     3240 tcgacccggg acgagggaaa acaataa                                         3267
```

<210> SEQ ID NO 26
<211> LENGTH: 775
<212> TYPE: PRT
<213> ORGANISM: Herpes simplex virus type 1

<400> SEQUENCE: 26

```
Met Glu Pro Arg Pro Gly Ala Ser Thr Arg Arg Pro Glu Gly Arg Pro
  1               5                  10                  15

Gln Arg Glu Pro Ala Pro Asp Val Trp Val Phe Pro Cys Asp Arg Asp
                 20                  25                  30

Leu Pro Asp Ser Ser Asp Ser Glu Ala Glu Thr Glu Val Gly Gly Arg
             35                  40                  45

Gly Asp Ala Asp His His Asp Asp Ser Ala Ser Glu Ala Asp Ser
         50                  55                  60

Thr Asp Thr Glu Leu Phe Glu Thr Gly Leu Leu Gly Pro Gln Gly Val
 65                  70                  75                  80

Asp Gly Gly Ala Val Ser Gly Ser Pro Pro Arg Glu Glu Asp Pro
                 85                  90                  95

Gly Ser Cys Gly Gly Ala Pro Pro Arg Glu Asp Gly Gly Ser Asp Glu
                100                 105                 110

Gly Asp Val Cys Ala Val Cys Thr Asp Glu Ile Ala Pro His Leu Arg
            115                 120                 125

Cys Asp Thr Phe Pro Cys Met His Arg Phe Cys Ile Pro Cys Met Lys
        130                 135                 140

Thr Trp Met Gln Leu Arg Asn Thr Cys Pro Leu Cys Asn Ala Lys Leu
145                 150                 155                 160

Val Tyr Leu Ile Val Gly Val Thr Pro Ser Gly Ser Phe Ser Thr Ile
                165                 170                 175

Pro Ile Val Asn Asp Pro Gln Thr Arg Met Glu Ala Glu Glu Ala Val
            180                 185                 190

Arg Ala Gly Thr Ala Val Asp Phe Ile Trp Thr Gly Asn Gln Arg Phe
        195                 200                 205

Ala Pro Arg Tyr Leu Thr Leu Gly Gly His Thr Val Arg Ala Leu Ser
    210                 215                 220

Pro Thr His Pro Glu Pro Thr Asp Glu Asp Asp Asp Leu Asp
225                 230                 235                 240

Asp Ala Asp Tyr Val Pro Pro Ala Pro Arg Arg Thr Pro Arg Ala Pro
                245                 250                 255

Pro Arg Arg Gly Ala Ala Ala Pro Val Thr Gly Gly Ala Ser His
            260                 265                 270

Ala Ala Pro Gln Pro Ala Ala Ala Arg Thr Ala Pro Pro Ser Ala Pro
        275                 280                 285

Ile Gly Pro His Gly Ser Ser Asn Thr Asn Thr Thr Asn Ser Ser
```

-continued

```
              290                 295                 300
Gly Gly Gly Gly Ser Arg Gln Ser Arg Ala Ala Ala Pro Arg Gly Ala
305                 310                 315                 320

Ser Gly Pro Ser Gly Gly Val Gly Val Gly Val Gly Val Val Glu Ala
                325                 330                 335

Glu Ala Gly Arg Pro Arg Gly Arg Thr Gly Pro Leu Val Asn Arg Pro
                340                 345                 350

Ala Pro Leu Ala Asn Asn Arg Asp Pro Ile Val Ile Ser Asp Ser Pro
                355                 360                 365

Pro Ala Ser Pro His Arg Pro Pro Ala Ala Pro Met Pro Gly Ser Ala
                370                 375                 380

Pro Arg Pro Gly Pro Pro Ala Ser Ala Ala Ser Gly Pro Ala Arg
385                 390                 395                 400

Pro Arg Ala Ala Val Ala Pro Cys Val Arg Ala Pro Pro Gly Pro
                405                 410                 415

Gly Pro Arg Ala Pro Ala Pro Gly Ala Glu Pro Ala Ala Arg Pro Ala
                420                 425                 430

Asp Ala Arg Arg Val Pro Gln Ser His Ser Ser Leu Ala Gln Ala Ala
                435                 440                 445

Asn Gln Glu Gln Ser Leu Cys Arg Ala Arg Ala Thr Val Ala Arg Gly
    450                 455                 460

Ser Gly Gly Pro Gly Val Glu Gly Gly His Gly Pro Ser Arg Gly Ala
465                 470                 475                 480

Ala Pro Ser Gly Ala Ala Pro Leu Pro Ser Ala Ala Ser Val Glu Gln
                485                 490                 495

Glu Ala Ala Val Arg Pro Arg Lys Arg Arg Gly Ser Gly Gln Glu Asn
                500                 505                 510

Pro Ser Pro Gln Ser Thr Arg Pro Pro Leu Ala Pro Ala Gly Ala Lys
                515                 520                 525

Arg Ala Ala Thr His Pro Pro Ser Asp Ser Gly Pro Gly Gly Arg Gly
                530                 535                 540

Gln Gly Gly Pro Gly Thr Pro Leu Thr Ser Ser Ala Ala Ser Ala Ser
545                 550                 555                 560

Ser Ser Ser Ala Ser Ser Ser Ala Pro Thr Pro Ala Gly Ala Ala
                565                 570                 575

Ser Ser Ala Ala Gly Ala Ala Ser Ser Ser Ala Ser Ala Ser Ser Gly
                580                 585                 590

Gly Ala Val Gly Ala Leu Gly Gly Arg Gln Glu Glu Thr Ser Leu Gly
                595                 600                 605

Pro Arg Ala Ala Ser Gly Pro Arg Gly Pro Arg Lys Cys Ala Arg Lys
610                 615                 620

Thr Arg His Ala Glu Thr Ser Gly Ala Val Pro Ala Gly Gly Leu Thr
625                 630                 635                 640

Arg Tyr Leu Pro Ile Ser Gly Val Ser Ser Val Val Ala Leu Ser Pro
                645                 650                 655

Tyr Val Asn Lys Thr Ile Thr Gly Asp Cys Leu Pro Ile Leu Asp Met
                660                 665                 670

Glu Thr Gly Asn Ile Gly Ala Tyr Val Val Leu Val Asp Gln Thr Gly
                675                 680                 685

Asn Met Ala Thr Arg Leu Arg Ala Ala Val Pro Gly Trp Ser Arg Arg
                690                 695                 700

Thr Leu Leu Pro Glu Thr Ala Gly Asn His Val Met Pro Pro Glu Tyr
705                 710                 715                 720
```

```
Pro Thr Ala Pro Ala Ser Glu Trp Asn Ser Leu Trp Met Thr Pro Val
                725                 730                 735
Gly Asn Met Leu Phe Asp Gln Gly Thr Leu Val Gly Ala Leu Asp Phe
            740                 745                 750
Arg Ser Leu Arg Ser Arg His Pro Trp Ser Gly Glu Gln Gly Ala Ser
        755                 760                 765
Thr Arg Asp Glu Gly Lys Gln
    770                 775

<210> SEQ ID NO 27
<211> LENGTH: 3591
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: mutation
<222> LOCATION: (3464)..(3464)
<223> OTHER INFORMATION: c3464t

<400> SEQUENCE: 27
atggagacaa agcccaagac ggcaaccacc atcaaggtcc cccccgggcc cctgggatac      60
gtgtacgctc gcgcgtgtcc gtccgaaggc atcgagcttc tggcgttact gtcggcacgc     120
agcggcgatt ccgacgtcgc cgtggcgccc tggtcgtgg gcctgaccgt ggagagcggc      180
tttgaggcca cgtggccgt ggtcgtgggt tctcgcacga cggggctcgg gggtaccgcg      240
gtgtccctga aactgacgcc ctcgcactac agctcgtccg tgtacgtctt tcacggcggc     300
cggcacctgg accccagcac ccaggccccg aacctgacgc gactttgcga gcgggcacgc     360
cgccattttg gcttttcgga ctacaccccc cggcccggcg acctcaaaca cgagacgacg     420
ggggaggcgc tgtgtgagcg cctcggcctg acccggacc gcgccctcct gtatctggtc      480
gttaccgagg gcttcaagga ggccgtgtgc atcaacaaca cctttctgca cctgggaggc     540
tcggacaagg taaccatagg cggggcggag gtgcaccgca tacccgtgta cccgttgcag     600
ctgttcatgc cggattttag ccgtgtcatc gcagagccgt tcaacgccaa ccaccgatcg     660
atcggggaga attttaccta cccgcttccg ttttttaacc gcccccctcaa ccgcctcctg    720 ttcgaggcgg tcgtgggacc cgccgccgtg gcactgcgat gccgaaacgt ggacgccgtg     780
gcccgcgcgg ccgcccacct ggcgtttgac gaaaaccacg agggcgccgc cctccccgcc     840
gacattacgt tcacggcctt cgaagccagc cagggtaaga cccgcggggc ggggcgcgac     900
ggcggcggca agggcccggc gggcgggttc gaacagcgcc tggcctccgt catggccgga     960
gacgccgccc tggccctcga ttctatcgtg tcgatggccg tctttgacga gccgcccacc    1020
gacatctccg cgtggccgct gttcgagggc caggacacgc ccgcggcccg cgccaacgcc    1080 gtcgggcgt acctggcgcg cgccgcggga ctcgtggggg ccatggtatt tagcaccaac    1140
tcggccctcc atctcaccga ggtggacgac gccggcccgg cggacccaaa ggaccacagc    1200
aaaccctcct tttaccgctt cttcctcgtg cccgggaccc acgtggcggc caacccacag    1260
gtggaccgcg agggacacgt ggtgcccggg ttcgagggtc ggcccaccgc gcccctcgtc    1320
gcggaacccc aggaatttgc cggcgagcac ctggccatgc tgtgtgggtt ttcccccggcg  1380 ctgctggccca agatgctgtt ttacctggag cgctgcgacg cggcgtgat cgtcgggcgc    1440 caggagatgg acgtgtttcg atacgtcgcg gactccaacc agaccgacgt gccctgtaac    1500
ctatgcacct tcgacacgcg ccacgcctgc gtacacacga cgctcatgcg cctccgggcg   1560
```

```
cgccatccaa agttcgccag cgccgcccgc ggagccatcg gcgtcttcgg gaccatgaac    1620
agcatgtaca gcgactgcga cgtgctggga aactacgccg ccttctcggc cctgaagcgc    1680
gcggacggat ccgagaccgc ccggaccatc atgcaggaga cgtaccgcgc ggcgaccgag    1740
cgcgtcatgg ccgaactcga gaccctgcag tacgtggacc aggcggtccc cacggccatg    1800
gggcggctgg agaccatcat caccaaccgc gaggccctgc atacggtggt gaacaacgtc    1860
aggcaggtcg tggaccgcga ggtggagcag ctgatgcgca acctggtgga ggggaggaac    1920
ttcaagtttc gcgacggtct gggcgaggcc aaccacgcca tgtccctgac gctggacccg    1980
tacgcgtgcg gccgtgcccc ctgcttcag cttctcgggc ggcgatccaa cctcgccgtg     2040
taccaggacc tggccctgag tcagtgccac ggggtgttcg ccgggcagtc ggtcgagggg    2100
cgcaactttc gcaatcaatt ccaaccggtg ctgcggcggc gcgtgatgga catgtttaac    2160
aacgggtttc tgtcggccaa aacgctgacg gtcgcgctct cggaggggc ggctatctgc     2220 gcccccagcc taacggccgg ccagacggcc ccgccgaga gcagcttcga gggcgacgtt     2280
gcccgcgtga ccctggggtt tcccaaggag ctgcgcgtca agagccgcgt gttgttcgcg    2340
ggcgcgagcg ccaacgcgtc cgaggccgcc aaggcgcggg tcgccagcct ccagagcgcc    2400
taccagaagc ccgacaagcg cgtggacatc ctcctcggac cgctgggctt tctgctgaag    2460
cagttccacg cggccatctt ccccaacggc aagcccccgg ggtccaacca gccgaacccg    2520
cagtggttct ggacggccct ccaacgcaac cagcttcccg cccggctcct gtcgcgcgag    2580
gacatcgaga ccatcgcgtt cattaaaaag ttttccctgg actacggcgc gataaacttt    2640
attaacctgg cccccaacaa cgtgagcgag ctggcgatgt actacatggc aaaccagatt    2700
ctgcggtact gcgatcactc gacatacttc atcaacaccc ttacggccat catcgcgggg    2760
tcccgccgtc ccccagcgt gcaggctgcg gccgcgtggt ccgcgcaggg cggggcgggc     2820
ctggaggccg gggcccgcgc gctgatggac gccgtgacg cgcatccggg cgcgtggacg      2880
tccatgttcg ccagctgcaa cctgctgcgg cccgtcatgg cggcgcgccc catggtcgtg    2940
ttggggttga gcatcagcaa gtactacggc atggccggca acgaccgtgt gtttcaggcc    3000
gggaactggg ccagcctgat gggcggcaaa aacgcgtgcc cgctccttat ttttgaccgc    3060
acccgcaagt tcgtcctggc ctgtccccgg gccgggtttg tgtgcgcggc ctcaagcctc    3120
ggcggcggag cgcacgaaag ctcgctgtgc gagcagctcc ggggcattat ctccgagggc    3180
ggggcggccg tcgccagtag cgtgttcgtg gcgaccgtga aaagcctggg gccccgcacc    3240
cagcagctgc agatcgagga ctggctggcg ctcctggagg acgagtacct aagcgaggag    3300
atgatggagc tgaccgcgcg tgccctggag cgcggcaacg gcgagtggtc gacggacgcg    3360
gccctggagg tggcgcacga ggccgaggcc ctagtcagcc aactcggcaa cgccggggag    3420
gtgtttaact ttggggattt tggctgcgag gacgacaacg cgatgccgtt cggcggcccg    3480
ggggccccgg gaccggcatt tgccggccgc aaacgggcgt tccacgggga tgacccgttt    3540
ggggaggggc cccccgacaa aaagggagac ctgacgttgg atatgctgtg a             3591
```

<210> SEQ ID NO 28
<211> LENGTH: 1196
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE

<222> LOCATION: (1155)..(1155)
<223> OTHER INFORMATION: T1155M

<400> SEQUENCE: 28

```
Met Glu Thr Lys Pro Lys Thr Ala Thr Thr Ile Lys Val Pro Pro Gly
1               5                   10                  15

Pro Leu Gly Tyr Val Tyr Ala Arg Ala Cys Pro Ser Glu Gly Ile Glu
                20                  25                  30

Leu Leu Ala Leu Leu Ser Ala Arg Ser Gly Asp Ser Asp Val Ala Val
            35                  40                  45

Ala Pro Leu Val Val Gly Leu Thr Val Glu Ser Gly Phe Glu Ala Asn
50                  55                  60

Val Ala Val Val Gly Ser Arg Thr Thr Gly Leu Gly Gly Thr Ala
65                  70                  75                  80

Val Ser Leu Lys Leu Thr Pro Ser His Tyr Ser Ser Val Tyr Val
                85                  90                  95

Phe His Gly Gly Arg His Leu Asp Pro Ser Thr Gln Ala Pro Asn Leu
                100                 105                 110

Thr Arg Leu Cys Glu Arg Ala Arg His Phe Gly Phe Ser Asp Tyr
            115                 120                 125

Thr Pro Arg Pro Gly Asp Leu Lys His Glu Thr Thr Gly Glu Ala Leu
130                 135                 140

Cys Glu Arg Leu Gly Leu Asp Pro Asp Arg Ala Leu Leu Tyr Leu Val
145                 150                 155                 160

Val Thr Glu Gly Phe Lys Glu Ala Val Cys Ile Asn Asn Thr Phe Leu
                165                 170                 175

His Leu Gly Gly Ser Asp Lys Val Thr Ile Gly Gly Ala Glu Val His
                180                 185                 190

Arg Ile Pro Val Tyr Pro Leu Gln Leu Phe Met Pro Asp Phe Ser Arg
            195                 200                 205

Val Ile Ala Glu Pro Phe Asn Ala Asn His Arg Ser Ile Gly Glu Asn
210                 215                 220

Phe Thr Tyr Pro Leu Pro Phe Phe Asn Arg Pro Leu Asn Arg Leu Leu
225                 230                 235                 240

Phe Glu Ala Val Val Gly Pro Ala Ala Val Ala Leu Arg Cys Arg Asn
                245                 250                 255

Val Asp Ala Val Ala Arg Ala Ala His Leu Ala Phe Asp Glu Asn
                260                 265                 270

His Glu Gly Ala Ala Leu Pro Ala Asp Ile Thr Phe Thr Ala Phe Glu
            275                 280                 285

Ala Ser Gln Gly Lys Thr Pro Arg Gly Gly Arg Asp Gly Gly Gly Lys
290                 295                 300

Gly Pro Ala Gly Gly Phe Glu Gln Arg Leu Ala Ser Val Met Ala Gly
305                 310                 315                 320

Asp Ala Ala Leu Ala Leu Asp Ser Ile Val Ser Met Ala Val Phe Asp
                325                 330                 335

Glu Pro Pro Thr Asp Ile Ser Ala Trp Pro Leu Phe Glu Gly Gln Asp
                340                 345                 350

Thr Ala Ala Ala Arg Ala Asn Ala Val Gly Ala Tyr Leu Ala Arg Ala
            355                 360                 365

Ala Gly Leu Val Gly Ala Met Val Phe Ser Thr Asn Ser Ala Leu His
370                 375                 380

Leu Thr Glu Val Asp Asp Ala Gly Pro Ala Asp Pro Lys Asp His Ser
385                 390                 395                 400
```

```
Lys Pro Ser Phe Tyr Arg Phe Phe Leu Val Pro Gly Thr His Val Ala
                405                 410                 415

Ala Asn Pro Gln Val Asp Arg Glu Gly His Val Pro Gly Phe Glu
            420                 425                 430

Gly Arg Pro Thr Ala Pro Leu Val Gly Thr Gln Glu Phe Ala Gly
            435                 440                 445

Glu His Leu Ala Met Leu Cys Gly Phe Ser Pro Ala Leu Leu Ala Lys
    450                 455                 460

Met Leu Phe Tyr Leu Glu Arg Cys Asp Gly Val Ile Val Gly Arg
465                 470                 475                 480

Gln Glu Met Asp Val Phe Arg Tyr Val Ala Asp Ser Asn Gln Thr Asp
                485                 490                 495

Val Pro Cys Asn Leu Cys Thr Phe Asp Thr Arg His Ala Cys Val His
            500                 505                 510

Thr Thr Leu Met Arg Leu Arg Ala Arg His Pro Lys Phe Ala Ser Ala
            515                 520                 525

Ala Arg Gly Ala Ile Gly Val Phe Gly Thr Met Asn Ser Met Tyr Ser
    530                 535                 540

Asp Cys Asp Val Leu Gly Asn Tyr Ala Ala Phe Ser Ala Leu Lys Arg
545                 550                 555                 560

Ala Asp Gly Ser Glu Thr Ala Arg Thr Ile Met Gln Glu Thr Tyr Arg
                565                 570                 575

Ala Ala Thr Glu Arg Val Met Ala Glu Leu Glu Thr Leu Gln Tyr Val
            580                 585                 590

Asp Gln Ala Val Pro Thr Ala Met Gly Arg Leu Glu Thr Ile Ile Thr
            595                 600                 605

Asn Arg Glu Ala Leu His Thr Val Val Asn Val Arg Gln Val Val
    610                 615                 620

Asp Arg Glu Val Glu Gln Leu Met Arg Asn Leu Val Glu Gly Arg Asn
625                 630                 635                 640

Phe Lys Phe Arg Asp Gly Leu Gly Glu Ala Asn His Ala Met Ser Leu
                645                 650                 655

Thr Leu Asp Pro Tyr Ala Cys Gly Pro Cys Pro Leu Leu Gln Leu Leu
            660                 665                 670

Gly Arg Arg Ser Asn Leu Ala Val Tyr Gln Asp Leu Ala Leu Ser Gln
            675                 680                 685

Cys His Gly Val Phe Ala Gly Gln Ser Val Glu Gly Arg Asn Phe Arg
    690                 695                 700

Asn Gln Phe Gln Pro Val Leu Arg Arg Arg Val Met Asp Met Phe Asn
705                 710                 715                 720

Asn Gly Phe Leu Ser Ala Lys Thr Leu Thr Val Ala Leu Ser Glu Gly
                725                 730                 735

Ala Ala Ile Cys Ala Pro Ser Leu Thr Ala Gly Gln Thr Ala Pro Ala
            740                 745                 750

Glu Ser Ser Phe Glu Gly Asp Val Ala Arg Val Thr Leu Gly Phe Pro
            755                 760                 765

Lys Glu Leu Arg Val Lys Ser Arg Val Leu Phe Ala Gly Ala Ser Ala
    770                 775                 780

Asn Ala Ser Glu Ala Ala Lys Ala Arg Val Ala Ser Leu Gln Ser Ala
785                 790                 795                 800

Tyr Gln Lys Pro Asp Lys Arg Val Asp Ile Leu Leu Gly Pro Leu Gly
                805                 810                 815
```

Phe Leu Leu Lys Gln Phe His Ala Ala Ile Phe Pro Asn Gly Lys Pro
                820                 825                 830

Pro Gly Ser Asn Gln Pro Asn Pro Gln Trp Phe Trp Thr Ala Leu Gln
            835                 840                 845

Arg Asn Gln Leu Pro Ala Arg Leu Leu Ser Arg Glu Asp Ile Glu Thr
        850                 855                 860

Ile Ala Phe Ile Lys Lys Phe Ser Leu Asp Tyr Gly Ala Ile Asn Phe
865                 870                 875                 880

Ile Asn Leu Ala Pro Asn Asn Val Ser Glu Leu Ala Met Tyr Tyr Met
                885                 890                 895

Ala Asn Gln Ile Leu Arg Tyr Cys Asp His Ser Thr Tyr Phe Ile Asn
            900                 905                 910

Thr Leu Thr Ala Ile Ile Ala Gly Ser Arg Arg Pro Pro Ser Val Gln
        915                 920                 925

Ala Ala Ala Trp Ser Ala Gln Gly Gly Ala Gly Leu Glu Ala Gly
            930             935                 940

Ala Arg Ala Leu Met Asp Ala Val Asp Ala His Pro Gly Ala Trp Thr
945                 950                 955                 960

Ser Met Phe Ala Ser Cys Asn Leu Leu Arg Pro Val Met Ala Ala Arg
                965                 970                 975

Pro Met Val Val Leu Gly Leu Ser Ile Ser Lys Tyr Tyr Gly Met Ala
            980                 985                 990

Gly Asn Asp Arg Val Phe Gln Ala  Gly Asn Trp Ala Ser  Leu Met Gly
        995                 1000                 1005

Gly Lys  Asn Ala Cys Pro Leu  Leu Ile Phe Asp Arg  Thr Arg Lys
    1010                 1015                 1020

Phe Val  Leu Ala Cys Pro Arg  Ala Gly Phe Val Cys  Ala Ala Ser
    1025                 1030                 1035

Ser Leu  Gly Gly Gly Ala His  Glu Ser Ser Leu Cys  Glu Gln Leu
    1040                 1045                 1050

Arg Gly  Ile Ile Ser Glu Gly  Gly Ala Ala Val Ala  Ser Ser Val
    1055                 1060                 1065

Phe Val  Ala Thr Val Lys Ser  Leu Gly Pro Arg Thr  Gln Gln Leu
    1070                 1075                 1080

Gln Ile  Glu Asp Trp Leu Ala  Leu Leu Glu Asp Glu  Tyr Leu Ser
    1085                 1090                 1095

Glu Glu  Met Met Glu Leu Thr  Ala Arg Ala Leu Glu  Arg Gly Asn
    1100                 1105                 1110

Gly Glu  Trp Ser Thr Asp Ala  Ala Leu Glu Val Ala  His Glu Ala
    1115                 1120                 1125

Glu Ala  Leu Val Ser Gln Leu  Gly Asn Ala Gly Glu  Val Phe Asn
    1130                 1135                 1140

Phe Gly  Asp Phe Gly Cys Glu  Asp Asp Asn Ala Met  Pro Phe Gly
    1145                 1150                 1155

Gly Pro  Gly Ala Pro Gly Pro  Ala Phe Ala Gly Arg  Lys Arg Ala
    1160                 1165                 1170

Phe His  Gly Asp Asp Pro Phe  Gly Glu Gly Pro Pro  Asp Lys Lys
    1175                 1180                 1185

Gly Asp  Leu Thr Leu Asp Met  Leu
    1190                 1195

<210> SEQ ID NO 29
<211> LENGTH: 3591
<212> TYPE: DNA

<213> ORGANISM: Artificial Sequence
<220> FEATURE:
<223> OTHER INFORMATION: Description of Artificial Sequence: Synthetic
      polynucleotide

<400> SEQUENCE: 29

| | | | | |
|---|---|---|---|---|
| atggagacaa | agcccaagac | ggcaaccacc | atcaaggtcc | cccccgggcc | cctgggatac | 60 |
| gtgtacgctc | gcgcgtgtcc | gtccgaaggc | atcgagcttc | tggcgttact | gtcggcacgc | 120 |
| agcggcgatt | ccgacgtcgc | cgtggcgccc | ctggtcgtgg | gcctgaccgt | ggagagcggc | 180 |
| tttgaggcca | acgtggccgt | ggtcgtgggt | tctcgcacga | cggggctcgg | ggtaccgcg | 240 |
| gtgtccctga | aactgacgcc | ctcgcactac | agctcgtccg | tgtacgtctt | tcacggcggc | 300 |
| cggcacctgg | accccagcac | ccaggccccg | aacctgacgc | gactttgcga | gcgggcacgc | 360 |
| cgccattttg | gcttttcgga | ctacaccccc | cggcccggcg | acctcaaaca | cgagacgacg | 420 |
| ggggaggcgc | tgtgtgagcg | cctcggcctg | gacccggacc | gcgccctcct | gtatctggtc | 480 |
| gttaccgagg | gcttcaagga | ggccgtgtgc | atcaacaaca | cctttctgca | cctgggaggc | 540 |
| tcggacaagg | taaccatagg | cggggcggag | gtgcaccgca | tacccgtgta | cccgttgcag | 600 |
| ctgttcatgc | cggattttag | ccgtgtcatc | gcagagccgt | tcaacgccaa | ccaccgatcg | 660 |
| atcggggaga | attttaccta | cccgcttccg | ttttttaacc | gccccctcaa | ccgcctcctg | 720 |
| ttcgaggcgt | tcgtgggacc | cgccgccgtg | gcactgcgat | gccgaaacgt | ggacgccgtg | 780 |
| gccgcgcgg | ccgcccacct | ggcgtttgac | gaaaaccacg | agggcgccgc | cctccccgcc | 840 |
| gacattacgt | tcacggcctt | cgaagccagc | cagggtaaga | ccccgcgggg | cgggcgcgac | 900 |
| ggcggcggca | agggcccggc | gggcgggttc | gaacagcgcc | tggcctccgt | catggccgga | 960 |
| gacgccgccc | tggccctcga | ttctatcgtg | tcgatggccg | tctttgacga | gccgcccacc | 1020 |
| gacatctccg | cgtggccgct | gttcgagggc | caggacacgg | ccgcggcccg | cgccaacgcc | 1080 |
| gtcggggcgt | acctggcgcg | cgccgcggga | ctcgtggggg | ccatggtatt | tagcaccaac | 1140 |
| tcggccctcc | atctcaccga | ggtggacgac | gccggcccgg | cggacccaaa | ggaccacagc | 1200 |
| aaaccctcct | tttaccgctt | cttcctcgtg | cccgggaccc | acgtggcggc | caacccacag | 1260 |
| gtggaccgcg | agggacacgt | ggtgcccggg | ttcgagggtc | ggcccaccgc | gcccctcgtc | 1320 |
| ggcggaaccc | aggaatttgc | cggcgagcac | ctggccatgc | tgtgtgggtt | ttccccggcg | 1380 |
| ctgctggcca | agatgctgtt | ttacctggag | cgctgcgacg | gcggcgtgat | cgtcgggcgc | 1440 |
| caggagatgg | acgtgtttcg | atacgtcgcg | gactccaacc | agaccgacgt | gccctgtaac | 1500 |
| ctatgcacct | tcgacacgcg | ccacgcctgc | gtacacacga | cgctcatgcg | cctccgggcg | 1560 |
| cgccatccaa | agttcgccag | cgccgcccgc | ggagccatcg | gcgtcttcgg | gaccatgaac | 1620 |
| agcatgtaca | gcgactgcga | cgtgctggga | aactacgccg | cctctcggcc | cctgaagcgc | 1680 |
| gcggacggat | ccgagaccgc | ccggaccatc | atgcaggaga | cgtaccgcgc | ggcgaccgag | 1740 |
| cgcgtcatgg | ccgaactcga | gaccctgcag | tacgtggacc | aggcggtccc | cacggccatg | 1800 |
| ggcggctgg | agaccatcat | caccaaccgc | gaggccctgc | atacggtggt | gaacaacgtc | 1860 |
| aggcaggtcg | tggaccgcga | ggtggagcag | ctgatgcgca | acctggtgga | ggggaggaac | 1920 |
| ttcaagtttc | gcgacggtct | gggcgaggcc | aaccacgcca | tgtccctgac | gctggacccg | 1980 |
| tacgcgtgcg | gccgtgccc | cctgcttcag | cttctcgggc | ggcgatccaa | cctcgccgtg | 2040 |
| taccaggacc | tggccctgag | tcagtgccac | ggggtgttcg | ccgggcagtc | ggtcgagggg | 2100 |
| cgcaactttc | gcaatcaatt | ccaaccggtg | ctgcggcggc | gcgtgatgga | catgtttaac | 2160 |

```
aacgggtttc tgtcggccaa aacgctgacg gtcgcgctct cggagggggc ggctatctgc    2220
gcccccagcc taacggccgg ccagacggcc cccgccgaga gcagcttcga gggcgacgtt    2280
gcccgcgtga ccctggggtt tcccaaggag ctgcgcgtca agagccgcgt gttgttcgcg    2340
ggcgcgagcg ccaacgcgtc cgaggccgcc aaggcgcggg tcgccagcct ccagagcgcc    2400
taccagaagc ccgacaagcg cgtggacatc ctcctcggac cgctgggctt tctgctgaag    2460
cagttccacg cggccatctt ccccaacggc aagcccccgg ggtccaacca gccgaacccg    2520
cagtggttct ggacggccct ccaacgcaac cagcttcccg cccggctcct gtcgcgcgag    2580
gacatcgaga ccatcgcgtt cattaaaaag ttttccctgg actacggcgc gataaacttt    2640
attaacctgg cccccaacaa cgtgagcgag ctggcgatgt actacatggc aaaccagatt    2700
ctgcggtact gcgatcactc gacatacttc atcaacaccc ttacggccat catcgcgggg    2760
tcccgccgtc cccccagcgt gcaggctgcg gccgcgtggt ccgcgcaggg cggggcgggc    2820
ctggaggccg ggcccgcgc gctgatggac gccgtggacg cgcatccggg cgcgtggacg    2880
tccatgttcg ccagctgcaa cctgctgcgg cccgtcatgg cggcgcgccc catggtcgtg    2940
ttggggttga gcatcagcaa gtactacggc atggccggca acgaccgtgt gtttcaggcc    3000
gggaactggg ccagcctgat gggcggcaaa acgcgtgcc cgctccttat ttttgaccgc    3060
acccgcaagt tcgtcctggc ctgtccccgg gccgggtttg tgtgcgcggc ctcaagcctc    3120
ggcggcggag cgcacgaaag ctcgctgtgc gagcagctcc ggggcattat ctccgagggc    3180
ggggcggccg tcgccagtag cgtgttcgtg gcgaccgtga aaagcctggg gccccgcacc    3240
cagcagctgc agatcgagga ctggctggcg ctcctggagg acgagtacct aagcgaggag    3300
atgatggagc tgaccgcgcg tgccctggag gcgcggcaacg gcgagtggtc gacggacgcg    3360
gccctggagg tggcgcacga ggccgaggcc ctagtcagcc aactcggcaa cgccggggag    3420
gtgtttaact ttggggattt tggctgcgag gacgacaacg cgacgccgtt cggcggcccg    3480
ggggccccgg gaccggcatt tgccggccgc aaacgggcgt tccacgggga tgacccgttt    3540
ggggaggggc cccccgacaa aaagggagac ctgacgttgg atatgctgtg a            3591
```

<210> SEQ ID NO 30
<211> LENGTH: 1196
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

```
Met Glu Thr Lys Pro Lys Thr Ala Thr Thr Ile Lys Val Pro Pro Gly
1               5                   10                  15

Pro Leu Gly Tyr Val Tyr Ala Arg Ala Cys Pro Ser Glu Gly Ile Glu
            20                  25                  30

Leu Leu Ala Leu Leu Ser Ala Arg Ser Gly Asp Ser Asp Val Ala Val
        35                  40                  45

Ala Pro Leu Val Val Gly Leu Thr Val Glu Ser Gly Phe Glu Ala Asn
    50                  55                  60

Val Ala Val Val Gly Ser Arg Thr Gly Leu Gly Gly Thr Ala
65                  70                  75                  80

Val Ser Leu Lys Leu Thr Pro Ser His Tyr Ser Ser Val Tyr Val
                85                  90                  95

Phe His Gly Gly Arg His Leu Asp Pro Ser Thr Gln Ala Pro Asn Leu
            100                 105                 110
```

```
Thr Arg Leu Cys Glu Arg Ala Arg Arg His Phe Gly Phe Ser Asp Tyr
        115                 120                 125

Thr Pro Arg Pro Gly Asp Leu Lys His Glu Thr Thr Gly Glu Ala Leu
        130                 135                 140

Cys Glu Arg Leu Gly Leu Asp Pro Asp Arg Ala Leu Leu Tyr Leu Val
145                 150                 155                 160

Val Thr Glu Gly Phe Lys Glu Ala Val Cys Ile Asn Asn Thr Phe Leu
                165                 170                 175

His Leu Gly Gly Ser Asp Lys Val Thr Ile Gly Gly Ala Glu Val His
                180                 185                 190

Arg Ile Pro Val Tyr Pro Leu Gln Leu Phe Met Pro Asp Phe Ser Arg
        195                 200                 205

Val Ile Ala Glu Pro Phe Asn Ala Asn His Arg Ser Ile Gly Glu Asn
        210                 215                 220

Phe Thr Tyr Pro Leu Pro Phe Phe Asn Arg Pro Leu Asn Arg Leu Leu
225                 230                 235                 240

Phe Glu Ala Val Val Gly Pro Ala Ala Val Ala Leu Arg Cys Arg Asn
                245                 250                 255

Val Asp Ala Val Ala Arg Ala Ala His Leu Ala Phe Asp Glu Asn
        260                 265                 270

His Glu Gly Ala Ala Leu Pro Ala Asp Ile Thr Phe Thr Ala Phe Glu
        275                 280                 285

Ala Ser Gln Gly Lys Thr Pro Arg Gly Gly Arg Asp Gly Gly Gly Lys
        290                 295                 300

Gly Pro Ala Gly Gly Phe Glu Gln Arg Leu Ala Ser Val Met Ala Gly
305                 310                 315                 320

Asp Ala Ala Leu Ala Leu Asp Ser Ile Val Ser Met Ala Val Phe Asp
                325                 330                 335

Glu Pro Pro Thr Asp Ile Ser Ala Trp Pro Leu Phe Glu Gly Gln Asp
                340                 345                 350

Thr Ala Ala Ala Arg Ala Asn Ala Val Gly Ala Tyr Leu Ala Arg Ala
        355                 360                 365

Ala Gly Leu Val Gly Ala Met Val Phe Ser Thr Asn Ser Ala Leu His
        370                 375                 380

Leu Thr Glu Val Asp Asp Ala Gly Pro Ala Asp Pro Lys Asp His Ser
385                 390                 395                 400

Lys Pro Ser Phe Tyr Arg Phe Phe Leu Val Pro Gly Thr His Val Ala
                405                 410                 415

Ala Asn Pro Gln Val Asp Arg Glu Gly His Val Val Pro Gly Phe Glu
        420                 425                 430

Gly Arg Pro Thr Ala Pro Leu Val Gly Gly Thr Gln Glu Phe Ala Gly
        435                 440                 445

Glu His Leu Ala Met Leu Cys Gly Phe Ser Pro Ala Leu Leu Ala Lys
        450                 455                 460

Met Leu Phe Tyr Leu Glu Arg Cys Asp Gly Val Ile Val Gly Arg
465                 470                 475                 480

Gln Glu Met Asp Val Phe Arg Tyr Val Ala Asp Ser Asn Gln Thr Asp
                485                 490                 495

Val Pro Cys Asn Leu Cys Thr Phe Asp Thr Arg His Ala Cys Val His
                500                 505                 510

Thr Thr Leu Met Arg Leu Arg Ala Arg His Pro Lys Phe Ala Ser Ala
        515                 520                 525
```

```
Ala Arg Gly Ala Ile Gly Val Phe Gly Thr Met Asn Ser Met Tyr Ser
    530                 535                 540

Asp Cys Asp Val Leu Gly Asn Tyr Ala Ala Phe Ser Ala Leu Lys Arg
545                 550                 555                 560

Ala Asp Gly Ser Glu Thr Ala Arg Thr Ile Met Gln Glu Thr Tyr Arg
                565                 570                 575

Ala Ala Thr Glu Arg Val Met Ala Glu Leu Glu Thr Leu Gln Tyr Val
            580                 585                 590

Asp Gln Ala Val Pro Thr Ala Met Gly Arg Leu Glu Thr Ile Ile Thr
        595                 600                 605

Asn Arg Glu Ala Leu His Thr Val Val Asn Asn Val Arg Gln Val Val
    610                 615                 620

Asp Arg Glu Val Glu Gln Leu Met Arg Asn Leu Val Glu Gly Arg Asn
625                 630                 635                 640

Phe Lys Phe Arg Asp Gly Leu Gly Glu Ala Asn His Ala Met Ser Leu
                645                 650                 655

Thr Leu Asp Pro Tyr Ala Cys Gly Pro Cys Pro Leu Leu Gln Leu Leu
            660                 665                 670

Gly Arg Arg Ser Asn Leu Ala Val Tyr Gln Asp Leu Ala Leu Ser Gln
        675                 680                 685

Cys His Gly Val Phe Ala Gly Gln Ser Val Glu Gly Arg Asn Phe Arg
    690                 695                 700

Asn Gln Phe Gln Pro Val Leu Arg Arg Val Met Asp Met Phe Asn
705                 710                 715                 720

Asn Gly Phe Leu Ser Ala Lys Thr Leu Thr Val Ala Leu Ser Glu Gly
                725                 730                 735

Ala Ala Ile Cys Ala Pro Ser Leu Thr Ala Gly Gln Thr Ala Pro Ala
            740                 745                 750

Glu Ser Ser Phe Glu Gly Asp Val Ala Arg Val Thr Leu Gly Phe Pro
        755                 760                 765

Lys Glu Leu Arg Val Lys Ser Arg Val Leu Phe Ala Gly Ala Ser Ala
    770                 775                 780

Asn Ala Ser Glu Ala Ala Lys Ala Arg Val Ala Ser Leu Gln Ser Ala
785                 790                 795                 800

Tyr Gln Lys Pro Asp Lys Arg Val Asp Ile Leu Leu Gly Pro Leu Gly
                805                 810                 815

Phe Leu Leu Lys Gln Phe His Ala Ala Ile Phe Pro Asn Gly Lys Pro
            820                 825                 830

Pro Gly Ser Asn Gln Pro Asn Pro Gln Trp Phe Trp Thr Ala Leu Gln
        835                 840                 845

Arg Asn Gln Leu Pro Ala Arg Leu Leu Ser Arg Glu Asp Ile Glu Thr
    850                 855                 860

Ile Ala Phe Ile Lys Lys Phe Ser Leu Asp Tyr Gly Ala Ile Asn Phe
865                 870                 875                 880

Ile Asn Leu Ala Pro Asn Asn Val Ser Glu Leu Ala Met Tyr Tyr Met
                885                 890                 895

Ala Asn Gln Ile Leu Arg Tyr Cys Asp His Ser Thr Tyr Phe Ile Asn
            900                 905                 910

Thr Leu Thr Ala Ile Ile Ala Gly Ser Arg Arg Pro Pro Ser Val Gln
        915                 920                 925

Ala Ala Ala Ala Trp Ser Ala Gln Gly Gly Ala Gly Leu Glu Ala Gly
    930                 935                 940

Ala Arg Ala Leu Met Asp Ala Val Asp Ala His Pro Gly Ala Trp Thr
```

Ser Met Phe Ala Ser Cys Asn Leu Leu Arg Pro Val Met Ala Ala Arg
945                 950                 955                 960

Pro Met Val Val Leu Gly Leu Ser Ile Ser Lys Tyr Tyr Gly Met Ala
        965                 970                 975

Gly Asn Asp Arg Val Phe Gln Ala Gly Asn Trp Ala Ser Leu Met Gly
            980                 985                 990

Gly Lys Asn Ala Cys Pro Leu Leu Ile Phe Asp Arg Thr Arg Lys
    995                 1000                1005

Phe Val Leu Ala Cys Pro Arg Ala Gly Phe Val Cys Ala Ala Ser
    1010                1015                1020

Ser Leu Gly Gly Gly Ala His Glu Ser Ser Leu Cys Glu Gln Leu
    1025                1030                1035

Arg Gly Ile Ile Ser Glu Gly Gly Ala Ala Val Ala Ser Ser Val
    1040                1045                1050

Phe Val Ala Thr Val Lys Ser Leu Gly Pro Arg Thr Gln Gln Leu
    1055                1060                1065

Gln Ile Glu Asp Trp Leu Ala Leu Leu Glu Asp Glu Tyr Leu Ser
    1070                1075                1080

Glu Glu Met Met Glu Leu Thr Ala Arg Ala Leu Glu Arg Gly Asn
    1085                1090                1095

Gly Glu Trp Ser Thr Asp Ala Ala Leu Glu Val Ala His Glu Ala
    1100                1105                1110

Glu Ala Leu Val Ser Gln Leu Gly Asn Ala Gly Glu Val Phe Asn
    1115                1120                1125

Phe Gly Asp Phe Gly Cys Glu Asp Asp Asn Ala Thr Pro Phe Gly
    1130                1135                1140

Gly Pro Gly Ala Pro Gly Pro Ala Phe Ala Gly Arg Lys Arg Ala
    1145                1150                1155

Phe His Gly Asp Asp Pro Phe Gly Glu Gly Pro Pro Asp Lys Lys
    1160                1165                1170

Gly Asp Leu Thr Leu Asp Met Leu
    1175                1180

<210> SEQ ID NO 31
<211> LENGTH: 3591
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 31
atggagacaa agcccaagac ggcaaccacc atcaaggtcc ccccggggcc cctgggatac    60
gtgtacgctc gcgcgtgtcc gtccgaaggc atcgagcttc tggcgttact gtcggcgcgc   120
agcggcgatg ccgacgtcgc cgtggcgccc ctggtcgtgg gcctgaccgt ggagagcggc   180
tttgaggcca acgtagccgt ggtcgtgggt tctcgcacga cggggctcgg gggtaccgcg   240
gtgtccctga aactgacgcc atcgcactac agctcgtccg tgtacgtctt tcacggcggc   300
cggcacctgg accccagcac ccaggcccca aacctgacgc gactctgcga gcgggcacgc   360
cgccattttg gcttttcgga ctacaccccc cggcccggcg acctcaaaca cgagacgacg   420
ggggaggcgc tgtgtgagcg cctcggcctg gacccggacc gcgccctcct gtatctggtc   480
gttaccgagg gcttcaagga ggccgtgtgc atcaacaaca cctttctgca cctgggaggc   540

```
tcggacaagg taaccatagg cggggcggag gtgcaccgca tacccgtgta tccgttgcag    600
ctgttcatgc cggattttag ccgggtcatc gccgagccgt tcaacgccaa ccaccgatcg    660
atcggggaga attttaccta cccgcttccg ttttttaacc gcccctcaa  ccgcctcctg    720
ttcgaggcgt tcgtgggacc cgccgccgtg gcactgcgat gccgaaacgt ggacgccgtg    780
gcccgcgcgg ccgcccacct ggcgtttgac gaaaaccacg agggcgccgc cctccccgcc    840
gacattacgt tcacggcctt cgaagccagc cagggtaaga ccccgcgggg tgggcgcgac    900
ggcggcggca agggcccggc gggcgggttc gaacagcgcc tggcctccgt catggccgga    960
gacgccgccc tggccctcga gtctatcgtg tcgatggccg tcttcgacga gccgcccacc   1020
gacatctccg cgtggccgct gtgcgagggc caggacacgg ccgcggcccg cgacaacgcc   1080
gtcggggcgt acctggcgcg cgccgcggga ctcgtggggg ccatggtatt tagcaccaac   1140
tcggccctcc atctcaccga ggtggacgac gccggtccgg cggacccaaa ggaccacagc   1200
aaaccctcct tttaccgctt cttcctcgtg cccgggaccc acgtggcggc caacccacag   1260
gtggaccgcg agggacacgt ggtgcccggg ttcgagggtc ggcccaccgc gcccctcgtc   1320
ggcggaaccc aggaatttgc cggcgagcac ctggccatgc tgtgtgggtt ttccccggcg   1380
ctgctggcca agatgctgtt ttacctggag cgctgcgacg gcggcgtgat cgtcgggcgc   1440
caggagatgg acgtgtttcg atacgtcgcg gactccaacc agaccgacgt gccctgcaac   1500
ctgtgcacct tcgacacgcg ccacgcctgc gtacacacga cgctcatgcg cctccgggcg   1560
cgccatccca gttcgccag  cgccgcccgc ggagccatcg gcgtcttcgg gaccatgaac   1620
agcatgtaca cgcgactgcga cgtgctggga aactacgccg ccttctcggc cctgaagcgc   1680
gcggacggat ccgagaccgc ccggaccatc atgcaggaga cgtaccgcgc ggcgaccgag   1740
cgcgtcatgg ccgaactcga gaccctgcag tacgtggacc aggcggtccc cacggccatg   1800
gggcggctgg agaccatcat caccaaccgc gaggccctgc atacggtggt gaacaacgtc   1860
aggcaggtcg tggaccgcga ggtggagcag ctgatgcgca acctggtgga ggggaggaac   1920
ttcaagtttc gcgacggtct gggcgaggcc aaccacgcca tgtccctgac gctggacccg   1980
tacgcgtgcg ggccatgccc cctgcttcag cttctcgggc ggcgatccaa cctgccgtg   2040
tatcaggacc tggccctgag ccagtgccac ggggtgttcg ccgggcagtc ggtcgagggg   2100
cgcaactttc gcaatcaatt ccaaccggtg ctgcggcggc gcgtgatgga catgtttaac   2160
aacgggtttc tgtcggccaa aacgctgacg gtcgcgctct cggagggggc ggctatctgc   2220
gccccccagcc taacgccgg ccagacggcc ccgccgaga  gcagcttcga gggcgacgtt   2280
gcccgcgtga ccctggggtt tcccaaggag ctgcgcgtca agagccgcgt gttgttcgcg   2340
ggcgcgagcg ccaacgcgtc cgaggccgcc aaggcgcggg tcgccagcct ccagagcgcc   2400
taccagaagc ccgacaagcg cgtggacatc ctcctcggac cgctgggctt tctgctgaag   2460
cagttccacg cggccatctt ccccaacggc aagcccccgg ggtccaacca gccgaacccg   2520
cagtggttct ggacggccct ccaacgcaac cagcttcccg cccggctcct gtcgcgcgag   2580
gacatcgaga ccatcgcgtt cattaaaaag ttttccctgg actacggcgc gataaacttt   2640
attaacctgg cccccaacaa cgtgagcgag ctggcgatgt actacatggc aaaccagatt   2700
ctgcggtact gcgatcactc gacatacttc atcaacaccc tcacggccat catcgcgggg   2760
tcccgccgtc cccccagcgt gcaggcggcg gccgcgtggt ccgcgcaggg cggggcgggc   2820
ctggaggccg ggcccgcgc  gctgatggac gccgtggacg cgcatccggg cgcgtggacg   2880
tccatgttcg ccagctgcaa cctgctgcgg cccgtcatgg cggcgcgccc catggtcgtg   2940
```

-continued

```
ttggggttga gcatcagcaa atactacggc atggccggca acgaccgtgt gtttcaggcc    3000
gggaactggg ccagcctgat gggcggcaaa acgcgtgcc cgctccttat ttttgaccgc    3060
acccgcaagt tcgtcctggc ctgtccccgg gccgggtttg tgtgcgcggc ctcgaacctc    3120
ggcggcggag cgcacgaaag ctcgctgtgc gagcagctcc ggggcattat ctccgagggc    3180
ggggcggccg tcgccagtag cgtgttcgtg gcgaccgtga aaagcctggg gccccgcacc    3240
cagcagctgc agatcgagga ctggctggcg ctcctggagg acgagtacct aagcgaggag    3300
atgatggagc tgaccgcgcg tgccctggag cgcggcaacg gcgagtggtc gacggacgcg    3360
gccctggagg tggcgcacga ggccgaggcc tagtcagcc aactcggcaa cgccggggag    3420
gtgtttaact ttggggattt tggctgcgag gacgacaacg cgacgccgtt cggcggcccg    3480 ggggcccccgg gaccggcatt tgccggccgc aaacgggcgt tccacgggga tgacccgttt    3540
ggggaggggc cccccgacaa aaagggagac ctgacgttgg atatgctgtg a            3591
```

<210> SEQ ID NO 32
<211> LENGTH: 1196
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

```
Met Glu Thr Lys Pro Lys Thr Ala Thr Thr Ile Lys Val Pro Pro Gly
1               5                   10                  15

Pro Leu Gly Tyr Val Tyr Ala Arg Ala Cys Pro Ser Glu Gly Ile Glu
            20                  25                  30

Leu Leu Ala Leu Leu Ser Ala Arg Ser Gly Asp Ala Asp Val Ala Val
        35                  40                  45

Ala Pro Leu Val Val Gly Leu Thr Val Glu Ser Gly Phe Glu Ala Asn
    50                  55                  60

Val Ala Val Val Val Gly Ser Arg Thr Thr Gly Leu Gly Gly Thr Ala
65                  70                  75                  80

Val Ser Leu Lys Leu Thr Pro Ser His Tyr Ser Ser Val Tyr Val
                85                  90                  95

Phe His Gly Gly Arg His Leu Asp Pro Ser Thr Gln Ala Pro Asn Leu
            100                 105                 110

Thr Arg Leu Cys Glu Arg Ala Arg His Phe Gly Phe Ser Asp Tyr
        115                 120                 125

Thr Pro Arg Pro Gly Asp Leu Lys His Glu Thr Thr Gly Glu Ala Leu
    130                 135                 140

Cys Glu Arg Leu Gly Leu Asp Pro Asp Arg Ala Leu Leu Tyr Leu Val
145                 150                 155                 160

Val Thr Glu Gly Phe Lys Glu Ala Val Cys Ile Asn Asn Thr Phe Leu
                165                 170                 175

His Leu Gly Gly Ser Asp Lys Val Thr Ile Gly Gly Ala Glu Val His
            180                 185                 190

Arg Ile Pro Val Tyr Pro Leu Gln Leu Phe Met Pro Asp Phe Ser Arg
        195                 200                 205

Val Ile Ala Glu Pro Phe Asn Ala Asn His Arg Ser Ile Gly Glu Asn
    210                 215                 220

Phe Thr Tyr Pro Leu Pro Phe Phe Asn Arg Pro Leu Asn Arg Leu Leu
225                 230                 235                 240
```

-continued

Phe Glu Ala Val Val Gly Pro Ala Ala Val Ala Leu Arg Cys Arg Asn
                245                 250                 255

Val Asp Ala Val Ala Arg Ala Ala His Leu Ala Phe Asp Glu Asn
            260                 265                 270

His Glu Gly Ala Ala Leu Pro Ala Asp Ile Thr Phe Thr Ala Phe Glu
            275                 280                 285

Ala Ser Gln Gly Lys Thr Pro Arg Gly Gly Arg Asp Gly Gly Gly Lys
        290                 295                 300

Gly Pro Ala Gly Gly Phe Glu Gln Arg Leu Ala Ser Val Met Ala Gly
305                 310                 315                 320

Asp Ala Ala Leu Ala Leu Glu Ser Ile Val Ser Met Ala Val Phe Asp
                325                 330                 335

Glu Pro Pro Thr Asp Ile Ser Ala Trp Pro Leu Cys Glu Gly Gln Asp
            340                 345                 350

Thr Ala Ala Ala Arg Asp Asn Ala Val Gly Ala Tyr Leu Ala Arg Ala
        355                 360                 365

Ala Gly Leu Val Gly Ala Met Val Phe Ser Thr Asn Ser Ala Leu His
    370                 375                 380

Leu Thr Glu Val Asp Asp Ala Gly Pro Ala Asp Pro Lys Asp His Ser
385                 390                 395                 400

Lys Pro Ser Phe Tyr Arg Phe Phe Leu Val Pro Gly Thr His Val Ala
                405                 410                 415

Ala Asn Pro Gln Val Asp Arg Glu Gly His Val Pro Gly Phe Glu
            420                 425                 430

Gly Arg Pro Thr Ala Pro Leu Val Gly Thr Gln Glu Phe Ala Gly
        435                 440                 445

Glu His Leu Ala Met Leu Cys Gly Phe Ser Pro Ala Leu Leu Ala Lys
    450                 455                 460

Met Leu Phe Tyr Leu Glu Arg Cys Asp Gly Gly Val Ile Val Gly Arg
465                 470                 475                 480

Gln Glu Met Asp Val Phe Arg Tyr Val Ala Asp Ser Asn Gln Thr Asp
                485                 490                 495

Val Pro Cys Asn Leu Cys Thr Phe Asp Thr Arg His Ala Cys Val His
            500                 505                 510

Thr Thr Leu Met Arg Leu Arg Ala Arg His Pro Lys Phe Ala Ser Ala
        515                 520                 525

Ala Arg Gly Ala Ile Gly Val Phe Gly Thr Met Asn Ser Met Tyr Ser
    530                 535                 540

Asp Cys Asp Val Leu Gly Asn Tyr Ala Ala Phe Ser Ala Leu Lys Arg
545                 550                 555                 560

Ala Asp Gly Ser Glu Thr Ala Arg Thr Ile Met Gln Glu Thr Tyr Arg
                565                 570                 575

Ala Ala Thr Glu Arg Val Met Ala Glu Leu Glu Thr Leu Gln Tyr Val
            580                 585                 590

Asp Gln Ala Val Pro Thr Ala Met Gly Arg Leu Glu Thr Ile Ile Thr
        595                 600                 605

Asn Arg Glu Ala Leu His Thr Val Val Asn Asn Val Arg Gln Val Val
    610                 615                 620

Asp Arg Glu Val Glu Gln Leu Met Arg Asn Leu Val Glu Gly Arg Asn
625                 630                 635                 640

Phe Lys Phe Arg Asp Gly Leu Gly Glu Ala Asn His Ala Met Ser Leu
                645                 650                 655

Thr Leu Asp Pro Tyr Ala Cys Gly Pro Cys Pro Leu Leu Gln Leu Leu

-continued

Gly Arg Arg Ser Asn Leu Ala Val Tyr Gln Asp Leu Ala Leu Ser Gln
                675             680             685

Cys His Gly Val Phe Ala Gly Gln Ser Val Glu Gly Arg Asn Phe Arg
            690             695             700

Asn Gln Phe Gln Pro Val Leu Arg Arg Arg Val Met Asp Met Phe Asn
705             710             715             720

Asn Gly Phe Leu Ser Ala Lys Thr Leu Thr Val Ala Leu Ser Glu Gly
                725             730             735

Ala Ala Ile Cys Ala Pro Ser Leu Thr Ala Gly Gln Thr Ala Pro Ala
            740             745             750

Glu Ser Ser Phe Glu Gly Asp Val Ala Arg Val Thr Leu Gly Phe Pro
            755             760             765

Lys Glu Leu Arg Val Lys Ser Arg Val Leu Phe Ala Gly Ala Ser Ala
            770             775             780

Asn Ala Ser Glu Ala Ala Lys Ala Arg Val Ala Ser Leu Gln Ser Ala
785             790             795             800

Tyr Gln Lys Pro Asp Lys Arg Val Asp Ile Leu Leu Gly Pro Leu Gly
                805             810             815

Phe Leu Leu Lys Gln Phe His Ala Ala Ile Phe Pro Asn Gly Lys Pro
            820             825             830

Pro Gly Ser Asn Gln Pro Asn Pro Gln Trp Phe Trp Thr Ala Leu Gln
            835             840             845

Arg Asn Gln Leu Pro Ala Arg Leu Leu Ser Arg Glu Asp Ile Glu Thr
850             855             860

Ile Ala Phe Ile Lys Lys Phe Ser Leu Asp Tyr Gly Ala Ile Asn Phe
865             870             875             880

Ile Asn Leu Ala Pro Asn Val Ser Glu Leu Ala Met Tyr Tyr Met
                885             890             895

Ala Asn Gln Ile Leu Arg Tyr Cys Asp His Ser Thr Tyr Phe Ile Asn
            900             905             910

Thr Leu Thr Ala Ile Ile Ala Gly Ser Arg Arg Pro Pro Ser Val Gln
            915             920             925

Ala Ala Ala Trp Ser Ala Gln Gly Gly Ala Gly Leu Glu Ala Gly
            930             935             940

Ala Arg Ala Leu Met Asp Ala Val Asp Ala His Pro Gly Ala Trp Thr
945             950             955             960

Ser Met Phe Ala Ser Cys Asn Leu Leu Arg Pro Val Met Ala Ala Arg
            965             970             975

Pro Met Val Val Leu Gly Leu Ser Ile Ser Lys Tyr Tyr Gly Met Ala
            980             985             990

Gly Asn Asp Arg Val Phe Gln Ala  Gly Asn Trp Ala Ser  Leu Met Gly
                995             1000            1005

Gly Lys  Asn Ala Cys Pro Leu  Leu Ile Phe Asp Arg  Thr Arg Lys
    1010            1015           1020

Phe Val  Leu Ala Cys Pro Arg  Ala Gly Phe Val Cys  Ala Ala Ser
    1025            1030           1035

Asn Leu  Gly Gly Gly Ala His  Glu Ser Ser Leu Cys  Glu Gln Leu
    1040            1045           1050

Arg Gly  Ile Ile Ser Glu Gly  Gly Ala Ala Val Ala  Ser Ser Val
    1055            1060           1065

Phe Val  Ala Thr Val Lys Ser  Leu Gly Pro Arg Thr  Gln Gln Leu
    1070            1075           1080

| | | | | | | | | | | |
|---|---|---|---|---|---|---|---|---|---|---|
|Gln|Ile|Glu|Asp|Trp|Leu|Ala|Leu|Leu|Glu|Asp|Glu|Tyr|Leu|Ser|
|1085| | | |1090| | | |1095| | | | | | |

Glu Glu Met Met Glu Leu Thr Ala Arg Ala Leu Glu Arg Gly Asn
1100              1105              1110

Gly Glu Trp Ser Thr Asp Ala Ala Leu Glu Val Ala His Glu Ala
1115              1120              1125

Glu Ala Leu Val Ser Gln Leu Gly Asn Ala Gly Glu Val Phe Asn
1130              1135              1140

Phe Gly Asp Phe Gly Cys Glu Asp Asp Asn Ala Thr Pro Phe Gly
1145              1150              1155

Gly Pro Gly Ala Pro Gly Pro Ala Phe Ala Gly Arg Lys Arg Ala
1160              1165              1170

Phe His Gly Asp Asp Pro Phe Gly Glu Gly Pro Pro Asp Lys Lys
1175              1180              1185

Gly Asp Leu Thr Leu Asp Met Leu
1190              1195

<210> SEQ ID NO 33
<211> LENGTH: 3591
<212> TYPE: DNA
<213> ORGANISM: Herpes simplex virus type 1

<400> SEQUENCE: 33

```
atggagacaa agcccaagac ggcaaccacc atcaaggtcc cccccgggcc cctgggatac      60
gtgtacgctc gcgcgtgtcc gtccgaaggc atcgagcttc tggcgttact gtcggcacgc     120
agcggcgatt ccgacgtcgc cgtggcgccc ctggtcgtgg gcctgaccgt ggagagcggc     180
tttgaggcca cgtggccgtg gtcgtgggt tctcgcacga cggggctcgg gggtaccgcg      240
gtgtccctga aactgacgcc ctcgcactac agctcgtccg tgtacgtctt tcacggcggc     300
cggcacctgg accccagcac ccaggccccg aacctgacgc gactttgcga gcgggcacgc     360
cgccattttg gcttttcgga ctacaccccc cggcccggcg acctcaaaca cgagacgacg     420
ggggaggcgc tgtgtgagcg cctcggcctg gaccgggacc gcgccctcct gtatctggtc     480
gttaccgagg gcttcaagga ggccgtgtgc atcaacaaca cctttctgca cctgggaggc     540
tcggacaagg taaccatagg cggggcggag gtgcaccgca tacccgtgta cccgttgcag     600
ctgttcatgc cggattttag ccgtgtcatc gcagagccgt tcaacgccaa ccaccgatcg     660
atcggggaga attttaccta cccgcttccg tttttttaacc gcccccctcaa ccgcctcctg     720
ttcgaggcgg tcgtgggacc cgccgccgtg gcactgcgat gccgaaacgt ggacgccgtg     780
gcccgcgcgg ccgcccacct ggcgtttgac gaaaaccacg agggcgccgc cctccccgcc     840
gacattacgt tcacggcctt cgaagccagc caggtaagac cccgcgggg cgggcgcgac     900
ggcggcggca agggcccggc gggcgggttc gaacagcgcc tggcctccgt catggccgga     960
gacgccgccc tggccctcga ttctatcgtg tcgatggccg tctttgacga gccgccaccc    1020
gacatctccg cgtggccgct gttcgagggc caggacacgg ccgcggcccg cgccaacgcc    1080
gtcggggcgt acctggcgcg cgccgcggga ctcgtggggg ccatggtatt tagcaccaac    1140
tcggccctcc atctcaccga ggtggacgac gccggcccgg cggacccaaa ggaccacagc    1200
aaaccctcct tttaccgctt cttcctcgtg cccgggaccc acgtggcggc caacccacag    1260
gtggaccgcg agggacacgt ggtgcccggg ttcgagggtc ggcccaccgc gcccctcgtc    1320
ggcggaaccc aggaatttgc cggcgagcac ctggccatgc tgtgtgggtt ttccccggcg    1380
```

```
ctgctggcca agatgctgtt ttacctggag cgctgcgacg gcggcgtgat cgtcgggcgc    1440
caggagatgg acgtgtttcg atacgtcgcg gactccaacc agaccgacgt gccctgtaac    1500
ctatgcacct tcgacacgcg ccacgcctgc gtacacacga cgctcatgcg cctccgggcg    1560
cgccatccaa agttcgccag cgccgcccgc ggagccatcg cgtcttcgg gaccatgaac     1620 agcatgtaca gcgactgcga cgtgctggga aactacgccg ccttctcggc cctgaagcgc    1680
gcggacggat ccgagaccgc ccggaccatc atgcaggaga cgtaccgcgc ggcgaccgag    1740
cgcgtcatgg ccgaactcga gaccctgcag tacgtggacc aggcggtccc cacggccatg    1800
gggcggctgg agaccatcat caccaaccgc gaggccctgc atacggtggt gaacaacgtc    1860
aggcaggtcg tggaccgcga ggtggagcag ctgatgcgca acctggtgga ggggaggaac    1920
ttcaagtttc gcgacggtct gggcgaggcc aaccacgcca tgtccctgac gctggacccg    1980
tacgcgtgcg ggccgtgccc cctgcttcag cttctcgggc ggcgatccaa cctcgccgtg    2040
taccaggacc tggccctgag tcagtgccac ggggtgttcg ccgggcagtc ggtcgagggg    2100
cgcaactttc gcaatcaatt ccaaccggtg ctgcggcggc gcgtgatgga catgtttaac    2160
aacgggtttc tgtcggccaa aacgctgacg gtcgcgctct cggaggggc ggctatctgc     2220 gcccccagcc taacggccgg ccagacggcc cccgccgaga gcagcttcga gggcgacgtt    2280
gcccgcgtga ccctggggtt tcccaaggag ctgcgcgtca agagccgcgt gttgttcgcg    2340
ggcgcgagcg ccaacgcgtc cgaggccgcc aaggcgcggg tcgccagcct ccagagcgcc    2400
taccagaagc ccgacaagcg cgtggacatc ctcctcggac cgctgggctt tctgctgaag    2460
cagttccacg cggccatctt ccccaacggc aagcccccgg ggtccaacca gccgaacccg    2520
cagtggttct ggacggccct ccaacgcaac cagcttcccg cccggctcct gtcgcgcgag    2580
gacatcgaga ccatcgcgtt cattaaaaag ttttccctgg actacggcgc gataaacttt    2640
attaacctgg cccccaacaa cgtgagcgag ctggcgatgt actacatggc aaaccagatt    2700
ctgcggtact gcgatcactc gacatacttc atcaacaccc ttacggccat catcgcgggg    2760
tcccgccgtc cccccagcgt gcaggctgcg gccgcgtggt ccgcgcaggg cggggcgggc    2820
ctggaggccg gggcccgcgc gctgatggac gccgtggacg cgcatccggg cgcgtggacg    2880
tccatgttcg ccagctgcaa cctgctgcgg cccgtcatgg cggcgcgccc catggtcgtg    2940
ttggggttga gcatcagcaa gtactacggc atggccggca acgaccgtgt gtttcaggcc    3000
gggaactggg ccagcctgat gggcggcaaa aacgcgtgcc cgctccttat ttttgaccgc    3060
acccgcaagt tcgtcctggc ctgtccccgg gccgggtttg tgtgcgcggc ctcaagcctc    3120
ggcggcggag cgcacgaaag ctcgctgtgc gagcagctcc ggggcattat ctccgagggc    3180
ggggcggccg tcgccagtag cgtgttcgtg gcgaccgtga aaagcctggg gccccgcacc    3240
cagcagctgc agatcgagga ctggctggcg ctcctggagg acgagtacct aagcgaggag    3300
atgatggagc tgaccgcgcg tgccctggag cgcggcaacg gcgagtggtc gacggacgcg    3360
gccctggagg tggcgcacga ggccgaggcc ctagtcagcc aactcggcaa cgccggggag    3420
gtgtttaact ttggggattt tggctgcgag gacgacaacg cgacgccgtt cggcggcccg    3480
ggggccccgg gaccggcatt tgccggccgc aaacgggcgt tccacgggga tgacccgttt    3540
ggggaggggc cccccgacaa aaagggagac ctgacgttgg atatgctgtg a              3591
```

<210> SEQ ID NO 34
<211> LENGTH: 1196
<212> TYPE: PRT
<213> ORGANISM: Herpes simplex virus type 1

<400> SEQUENCE: 34

```
Met Glu Thr Lys Pro Lys Thr Ala Thr Thr Ile Lys Val Pro Pro Gly
1               5                   10                  15

Pro Leu Gly Tyr Val Tyr Ala Arg Ala Cys Pro Ser Glu Gly Ile Glu
                20                  25                  30

Leu Leu Ala Leu Leu Ser Ala Arg Ser Gly Asp Ser Asp Val Ala Val
            35                  40                  45

Ala Pro Leu Val Val Gly Leu Thr Val Glu Ser Gly Phe Glu Ala Asn
    50                  55                  60

Val Ala Val Val Gly Ser Arg Thr Thr Gly Leu Gly Gly Thr Ala
65                  70                  75                  80

Val Ser Leu Lys Leu Thr Pro Ser His Tyr Ser Ser Val Tyr Val
                85                  90                  95

Phe His Gly Gly Arg His Leu Asp Pro Ser Thr Gln Ala Pro Asn Leu
                100                 105                 110

Thr Arg Leu Cys Glu Arg Ala Arg Arg His Phe Gly Phe Ser Asp Tyr
            115                 120                 125

Thr Pro Arg Pro Gly Asp Leu Lys His Glu Thr Thr Gly Glu Ala Leu
130                 135                 140

Cys Glu Arg Leu Gly Leu Asp Pro Asp Arg Ala Leu Leu Tyr Leu Val
145                 150                 155                 160

Val Thr Glu Gly Phe Lys Glu Ala Val Cys Ile Asn Asn Thr Phe Leu
                165                 170                 175

His Leu Gly Gly Ser Asp Lys Val Thr Ile Gly Gly Ala Glu Val His
            180                 185                 190

Arg Ile Pro Val Tyr Pro Leu Gln Leu Phe Met Pro Asp Phe Ser Arg
        195                 200                 205

Val Ile Ala Glu Pro Phe Asn Ala Asn His Arg Ser Ile Gly Glu Asn
        210                 215                 220

Phe Thr Tyr Pro Leu Pro Phe Asn Arg Pro Leu Asn Arg Leu Leu
225                 230                 235                 240

Phe Glu Ala Val Val Gly Pro Ala Ala Val Ala Leu Arg Cys Arg Asn
                245                 250                 255

Val Asp Ala Val Ala Arg Ala Ala His Leu Ala Phe Asp Glu Asn
        260                 265                 270

His Glu Gly Ala Ala Leu Pro Ala Asp Ile Thr Phe Thr Ala Phe Glu
        275                 280                 285

Ala Ser Gln Gly Lys Thr Pro Arg Gly Gly Arg Asp Gly Gly Gly Lys
    290                 295                 300

Gly Pro Ala Gly Gly Phe Glu Gln Arg Leu Ala Ser Val Met Ala Gly
305                 310                 315                 320

Asp Ala Ala Leu Ala Leu Asp Ser Ile Val Ser Met Ala Val Phe Asp
                325                 330                 335

Glu Pro Pro Thr Asp Ile Ser Ala Trp Pro Leu Phe Glu Gly Gln Asp
                340                 345                 350

Thr Ala Ala Ala Arg Ala Asn Ala Val Gly Ala Tyr Leu Ala Arg Ala
            355                 360                 365

Ala Gly Leu Val Gly Ala Met Val Phe Ser Thr Asn Ser Ala Leu His
        370                 375                 380

Leu Thr Glu Val Asp Asp Ala Gly Pro Ala Asp Pro Lys Asp His Ser
385                 390                 395                 400

Lys Pro Ser Phe Tyr Arg Phe Phe Leu Val Pro Gly Thr His Val Ala
```

```
                    405                 410                 415
Ala Asn Pro Gln Val Asp Arg Glu Gly His Val Pro Gly Phe Glu
                420                 425                 430
Gly Arg Pro Thr Ala Pro Leu Val Gly Thr Gln Glu Phe Ala Gly
                435                 440                 445
Glu His Leu Ala Met Leu Cys Gly Phe Ser Pro Ala Leu Leu Ala Lys
    450                 455                 460
Met Leu Phe Tyr Leu Glu Arg Cys Asp Gly Val Ile Val Gly Arg
465                 470                 475                 480
Gln Glu Met Asp Val Phe Arg Tyr Val Ala Asp Ser Asn Gln Thr Asp
                485                 490                 495
Val Pro Cys Asn Leu Cys Thr Phe Asp Thr Arg His Ala Cys Val His
                500                 505                 510
Thr Thr Leu Met Arg Leu Arg Ala Arg His Pro Lys Phe Ala Ser Ala
    515                 520                 525
Ala Arg Gly Ala Ile Gly Val Phe Gly Thr Met Asn Ser Met Tyr Ser
    530                 535                 540
Asp Cys Asp Val Leu Gly Asn Tyr Ala Ala Phe Ser Ala Leu Lys Arg
545                 550                 555                 560
Ala Asp Gly Ser Glu Thr Ala Arg Thr Ile Met Gln Glu Thr Tyr Arg
                565                 570                 575
Ala Ala Thr Glu Arg Val Met Ala Glu Leu Glu Thr Leu Gln Tyr Val
                580                 585                 590
Asp Gln Ala Val Pro Thr Ala Met Gly Arg Leu Glu Thr Ile Ile Thr
    595                 600                 605
Asn Arg Glu Ala Leu His Thr Val Asn Asn Val Arg Gln Val Val
610                 615                 620
Asp Arg Glu Val Glu Gln Leu Met Arg Asn Leu Val Glu Gly Arg Asn
625                 630                 635                 640
Phe Lys Phe Arg Asp Gly Leu Gly Glu Ala Asn His Ala Met Ser Leu
                645                 650                 655
Thr Leu Asp Pro Tyr Ala Cys Gly Pro Cys Pro Leu Leu Gln Leu Leu
    660                 665                 670
Gly Arg Arg Ser Asn Leu Ala Val Tyr Gln Asp Leu Ala Leu Ser Gln
    675                 680                 685
Cys His Gly Val Phe Ala Gly Gln Ser Val Glu Gly Arg Asn Phe Arg
    690                 695                 700
Asn Gln Phe Gln Pro Val Leu Arg Arg Val Met Asp Met Phe Asn
705                 710                 715                 720
Asn Gly Phe Leu Ser Ala Lys Thr Leu Thr Val Ala Leu Ser Glu Gly
                725                 730                 735
Ala Ala Ile Cys Ala Pro Ser Leu Thr Ala Gly Gln Thr Ala Pro Ala
                740                 745                 750
Glu Ser Ser Phe Glu Gly Asp Val Ala Arg Val Thr Leu Gly Phe Pro
    755                 760                 765
Lys Glu Leu Arg Val Lys Ser Arg Val Leu Phe Ala Gly Ala Ser Ala
    770                 775                 780
Asn Ala Ser Glu Ala Ala Lys Ala Arg Val Ala Ser Leu Gln Ser Ala
785                 790                 795                 800
Tyr Gln Lys Pro Asp Lys Arg Val Asp Ile Leu Leu Gly Pro Leu Gly
                805                 810                 815
Phe Leu Leu Lys Gln Phe His Ala Ala Ile Phe Pro Asn Gly Lys Pro
    820                 825                 830
```

Pro Gly Ser Asn Gln Pro Asn Pro Gln Trp Phe Trp Thr Ala Leu Gln
        835                 840                 845

Arg Asn Gln Leu Pro Ala Arg Leu Leu Ser Arg Glu Asp Ile Glu Thr
    850                 855                 860

Ile Ala Phe Ile Lys Lys Phe Ser Leu Asp Tyr Gly Ala Ile Asn Phe
865                 870                 875                 880

Ile Asn Leu Ala Pro Asn Asn Val Ser Glu Leu Ala Met Tyr Tyr Met
                885                 890                 895

Ala Asn Gln Ile Leu Arg Tyr Cys Asp His Ser Thr Tyr Phe Ile Asn
            900                 905                 910

Thr Leu Thr Ala Ile Ile Ala Gly Ser Arg Arg Pro Pro Ser Val Gln
        915                 920                 925

Ala Ala Ala Ala Trp Ser Ala Gln Gly Gly Ala Gly Leu Glu Ala Gly
    930                 935                 940

Ala Arg Ala Leu Met Asp Ala Val Asp Ala His Pro Gly Ala Trp Thr
945                 950                 955                 960

Ser Met Phe Ala Ser Cys Asn Leu Leu Arg Pro Val Met Ala Ala Arg
                965                 970                 975

Pro Met Val Val Leu Gly Leu Ser Ile Ser Lys Tyr Tyr Gly Met Ala
            980                 985                 990

Gly Asn Asp Arg Val Phe Gln Ala Gly Asn Trp Ala Ser Leu Met Gly
        995                 1000                1005

Gly Lys Asn Ala Cys Pro Leu Leu Ile Phe Asp Arg Thr Arg Lys
        1010                1015                1020

Phe Val Leu Ala Cys Pro Arg Ala Gly Phe Val Cys Ala Ala Ser
        1025                1030                1035

Ser Leu Gly Gly Gly Ala His Glu Ser Ser Leu Cys Glu Gln Leu
        1040                1045                1050

Arg Gly Ile Ile Ser Glu Gly Ala Ala Val Ala Ser Ser Val
        1055                1060                1065

Phe Val Ala Thr Val Lys Ser Leu Gly Pro Arg Thr Gln Gln Leu
        1070                1075                1080

Gln Ile Glu Asp Trp Leu Ala Leu Leu Glu Asp Glu Tyr Leu Ser
        1085                1090                1095

Glu Glu Met Met Glu Leu Thr Ala Arg Ala Leu Glu Arg Gly Asn
        1100                1105                1110

Gly Glu Trp Ser Thr Asp Ala Ala Leu Glu Val Ala His Glu Ala
        1115                1120                1125

Glu Ala Leu Val Ser Gln Leu Gly Asn Ala Gly Glu Val Phe Asn
        1130                1135                1140

Phe Gly Asp Phe Gly Cys Glu Asp Asp Asn Ala Thr Pro Phe Gly
        1145                1150                1155

Gly Pro Gly Ala Pro Gly Pro Ala Phe Ala Gly Arg Lys Arg Ala
        1160                1165                1170

Phe His Gly Asp Asp Pro Phe Gly Glu Gly Pro Pro Asp Lys Lys
        1175                1180                1185

Gly Asp Leu Thr Leu Asp Met Leu
        1190                1195

<210> SEQ ID NO 35
<211> LENGTH: 2208
<212> TYPE: DNA
<213> ORGANISM: Artificial Sequence
<220> FEATURE:

<223> OTHER INFORMATION: Description of Artificial Sequence: Synthetic polynucleotide
<220> FEATURE:
<221> NAME/KEY: mutation
<222> LOCATION: (1126)..(1126)
<223> OTHER INFORMATION: g1126a

<400> SEQUENCE: 35

| | | | | | |
|---|---|---|---|---|---|
| atgtttggtc | agcagctggc | gtccgacgtc | cagcagtacc | tggagcgcct | cgagaaacag | 60 |
| aggcaactta | aggtgggcgc | ggacgaggcg | tcggcgggcc | tcaccatggg | cggcgatgcc | 120 |
| ctacgagtgc | ccttttaga | tttcgcgacc | gcgaccccca | agcgccacca | gaccgtggtc | 180 |
| cctggcgtcg | ggacgctcca | cgactgctgc | gagcactcgc | cgctcttctc | ggccgtggcg | 240 |
| cggcggctgc | tgtttaatag | cctggtgccg | gcgcaactaa | aggggcgtga | tttcggggc | 300 |
| gaccacacgg | ccaagctgga | attcctggcc | cccgagttgg | tacgggcggt | ggcgcgactg | 360 |
| cggtttaagg | agtgcgcgcc | ggcggacgtg | gtgcctcagc | gtaacgccta | ctatagcgtt | 420 |
| ctgaatacgt | ttcaggccct | ccaccgctcc | gaagcctttc | gccagctggt | gcactttgtg | 480 |
| cgggactttg | cccagctgct | caaaacctcc | ttccgggcct | ccagcctcac | ggagaccacg | 540 |
| ggcccccca | aaaacgggc | caaggtggac | gtggccaccc | acggccggac | gtacggcacg | 600 |
| ctggagctgt | tccaaaaaat | gatccttatg | cacgccacct | actttctggc | cgccgtgctc | 660 |
| ctcggggacc | acgcggagca | ggtcaacacg | ttcctgcgtc | tcgtgtttga | gatcccctg | 720 |
| tttagcgacg | cggccgtgcg | ccacttccgc | cagcgcgcca | ccgtgtttct | cgtccccgg | 780 |
| cgccacggca | agacctggtt | tctggtgccc | ctcatcgcgc | tgtcgctggc | ctccttcgg | 840 |
| gggatcaaga | tcggctacac | ggcgcacatc | cgcaaggcga | ccgagccggt | gtttgaggag | 900 |
| atcgacgcct | gcctgcgggg | ctggttcggt | tcggcccgag | tggaccacgt | taaaggggaa | 960 |
| accatctcct | tctcgtttcc | ggacgggtcg | cgcagtacca | tcgtgtttgc | ctccagccac | 1020 |
| aacacaaacg | gaatccgagg | ccaggacttt | aacctgctct | tgtcgacga | ggccaacttt | 1080 |
| attcgcccgg | atgcggtcca | gacgattatg | ggctttctca | ccagaccaa | ctgcaagatt | 1140 |
| atcttcgtgt | cgtccaccaa | caccgggaag | gccagtacga | gcttttgta | caacctccgc | 1200 |
| ggggccgcag | acgagcttct | caacgtggtg | acctatatat | gcgatgatca | catgccgagg | 1260 |
| gtggtgacgc | acacaaacgc | cacggcctgt | tcttgttata | tcctcaacaa | gcccgttttc | 1320 |
| atcacgatgg | acggggcggt | tcgccggacc | gccgatttgt | ttctggccga | ttccttcatg | 1380 |
| caggagatca | tcgggggcca | ggccagggag | accggcgacg | accggcccgt | tctgaccaag | 1440 |
| tctgcggggg | agcggtttct | gttgtaccgc | ccctcgacca | ccaccaacag | cggcctcatg | 1500 |
| gcccccgatt | tgtacgtgta | cgtggatccc | gcgttcacgg | ccaacacccg | agcctccggg | 1560 |
| accggcgtcg | ctgtcgtcgg | gcggtaccgc | gacgattata | tcatcttcgc | cctggagcac | 1620 |
| tttttctcc | gcgcgctcac | gggctcggcc | cccgccgaca | tcgcccgctg | cgtcgtccac | 1680 |
| agtctgacgc | aggtcctggc | cctgcatccc | ggggcgtttc | gcggcgtccg | ggtggcggtc | 1740 |
| gagggaaata | gcagccagga | ctcggccgtc | gccatcgcca | cgcacgtgca | cacagagatg | 1800 |
| caccgcctac | tggcctcgga | gggggccgac | gcgggctcgg | gccccgagct | tctcttctac | 1860 |
| cactgcgagc | ctcccgggag | cgcggtgctg | taccccttt | tcctgctcaa | caaacagaag | 1920 |
| acgcccgcct | ttgaacactt | tattaaaaag | tttaactccg | ggggcgtcat | ggcctcccag | 1980 |
| gagatcgttt | ccgcgacggt | gcgcctgcag | accgacccgg | tcgagtatct | gctcgagcag | 2040 |
| ctaaataacc | tcaccgaaac | cgtctccccc | aacactgacg | tccgtacgta | ttccggaaaa | 2100 |

-continued

```
cggaacggcg cctcggatga ccttatggtc gccgtcatta tggccatcta cctcgcggcc    2160
caggccggac ctccgcacac attcgctcct atcatacgcg tctcgtga              2208
```

<210> SEQ ID NO 36
<211> LENGTH: 735
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (376)..(376)
<223> OTHER INFORMATION: A376T

<400> SEQUENCE: 36

```
Met Phe Gly Gln Gln Leu Ala Ser Asp Val Gln Gln Tyr Leu Glu Arg
1               5                   10                  15

Leu Glu Lys Gln Arg Gln Leu Lys Val Gly Ala Asp Glu Ala Ser Ala
            20                  25                  30

Gly Leu Thr Met Gly Gly Asp Ala Leu Arg Val Pro Phe Leu Asp Phe
        35                  40                  45

Ala Thr Ala Thr Pro Lys Arg His Gln Thr Val Pro Gly Val Gly
    50                  55                  60

Thr Leu His Asp Cys Cys Glu His Ser Pro Leu Phe Ser Ala Val Ala
65                  70                  75                  80

Arg Arg Leu Leu Phe Asn Ser Leu Val Pro Ala Gln Leu Lys Gly Arg
                85                  90                  95

Asp Phe Gly Gly Asp His Thr Ala Lys Leu Glu Phe Leu Ala Pro Glu
            100                 105                 110

Leu Val Arg Ala Val Ala Arg Leu Arg Phe Lys Glu Cys Ala Pro Ala
        115                 120                 125

Asp Val Val Pro Gln Arg Asn Ala Tyr Tyr Ser Val Leu Asn Thr Phe
    130                 135                 140

Gln Ala Leu His Arg Ser Glu Ala Phe Arg Gln Leu Val His Phe Val
145                 150                 155                 160

Arg Asp Phe Ala Gln Leu Leu Lys Thr Ser Phe Arg Ala Ser Ser Leu
                165                 170                 175

Thr Glu Thr Thr Gly Pro Pro Lys Lys Arg Ala Lys Val Asp Val Ala
            180                 185                 190

Thr His Gly Arg Thr Tyr Gly Thr Leu Glu Leu Phe Gln Lys Met Ile
        195                 200                 205

Leu Met His Ala Thr Tyr Phe Leu Ala Ala Val Leu Leu Gly Asp His
    210                 215                 220

Ala Glu Gln Val Asn Thr Phe Leu Arg Leu Val Phe Glu Ile Pro Leu
225                 230                 235                 240

Phe Ser Asp Ala Ala Val Arg His Phe Arg Gln Arg Ala Thr Val Phe
                245                 250                 255

Leu Val Pro Arg Arg His Gly Lys Thr Trp Phe Leu Val Pro Leu Ile
            260                 265                 270

Ala Leu Ser Leu Ala Ser Phe Arg Gly Ile Lys Ile Gly Tyr Thr Ala
        275                 280                 285

His Ile Arg Lys Ala Thr Glu Pro Val Phe Glu Glu Ile Asp Ala Cys
    290                 295                 300

Leu Arg Gly Trp Phe Gly Ser Ala Arg Val Asp His Val Lys Gly Glu
305                 310                 315                 320
```

```
Thr Ile Ser Phe Ser Phe Pro Asp Gly Ser Arg Ser Thr Ile Val Phe
                325                 330                 335

Ala Ser Ser His Asn Thr Asn Gly Ile Arg Gly Gln Asp Phe Asn Leu
            340                 345                 350

Leu Phe Val Asp Glu Ala Asn Phe Ile Arg Pro Asp Ala Val Gln Thr
        355                 360                 365

Ile Met Gly Phe Leu Asn Gln Thr Asn Cys Lys Ile Ile Phe Val Ser
    370                 375                 380

Ser Thr Asn Thr Gly Lys Ala Ser Thr Ser Phe Leu Tyr Asn Leu Arg
385                 390                 395                 400

Gly Ala Ala Asp Glu Leu Leu Asn Val Val Thr Tyr Ile Cys Asp Asp
                405                 410                 415

His Met Pro Arg Val Val Thr His Thr Asn Ala Thr Ala Cys Ser Cys
            420                 425                 430

Tyr Ile Leu Asn Lys Pro Val Phe Ile Thr Met Asp Gly Ala Val Arg
        435                 440                 445

Arg Thr Ala Asp Leu Phe Leu Ala Asp Ser Phe Met Gln Glu Ile Ile
    450                 455                 460

Gly Gly Gln Ala Arg Glu Thr Gly Asp Asp Arg Pro Val Leu Thr Lys
465                 470                 475                 480

Ser Ala Gly Glu Arg Phe Leu Leu Tyr Arg Pro Ser Thr Thr Thr Asn
                485                 490                 495

Ser Gly Leu Met Ala Pro Asp Leu Tyr Val Tyr Val Asp Pro Ala Phe
            500                 505                 510

Thr Ala Asn Thr Arg Ala Ser Gly Thr Gly Val Ala Val Val Gly Arg
        515                 520                 525

Tyr Arg Asp Asp Tyr Ile Ile Phe Ala Leu Glu His Phe Phe Leu Arg
    530                 535                 540

Ala Leu Thr Gly Ser Ala Pro Ala Asp Ile Ala Arg Cys Val Val His
545                 550                 555                 560

Ser Leu Thr Gln Val Leu Ala Leu His Pro Gly Ala Phe Arg Gly Val
                565                 570                 575

Arg Val Ala Val Glu Gly Asn Ser Ser Gln Asp Ser Ala Val Ala Ile
            580                 585                 590

Ala Thr His Val His Thr Glu Met His Arg Leu Leu Ala Ser Glu Gly
        595                 600                 605

Ala Asp Ala Gly Ser Gly Pro Glu Leu Leu Phe Tyr His Cys Glu Pro
    610                 615                 620

Pro Gly Ser Ala Val Leu Tyr Pro Phe Phe Leu Leu Asn Lys Gln Lys
625                 630                 635                 640

Thr Pro Ala Phe Glu His Phe Ile Lys Lys Phe Asn Ser Gly Gly Val
                645                 650                 655

Met Ala Ser Gln Glu Ile Val Ser Ala Thr Val Arg Leu Gln Thr Asp
            660                 665                 670

Pro Val Glu Tyr Leu Leu Glu Gln Leu Asn Asn Leu Thr Glu Thr Val
        675                 680                 685

Ser Pro Asn Thr Asp Val Arg Thr Tyr Ser Gly Lys Arg Asn Gly Ala
    690                 695                 700

Ser Asp Asp Leu Met Val Ala Val Ile Met Ala Ile Tyr Leu Ala Ala
705                 710                 715                 720

Gln Ala Gly Pro Pro His Thr Phe Ala Pro Ile Ile Arg Val Ser
                725                 730                 735
```

<210> SEQ ID NO 37
<211> LENGTH: 2208
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 37

| | | | | | |
|---|---|---|---|---|---|
| atgtttggtc | agcagctggc | gtccgacgtc | cagcagtacc | tggagcgcct | cgagaaacag | 60 |
| aggcaactta | aggtgggcgc | ggacgaggcg | tcggcgggcc | tcaccatggg | cggcgatgcc | 120 |
| ctacgagtgc | ccttttaga | tttcgcgacc | gcgaccccca | agcgccacca | gaccgtggtc | 180 |
| cctggcgtcg | ggacgctcca | cgactgctgc | gagcactcgc | cgctcttctc | ggccgtggcg | 240 |
| cggcggctgc | tgtttaatag | cctggtgccg | gcgcaactaa | aggggcgtga | tttcggggc | 300 |
| gaccacacgg | ccaagctgga | attcctggcc | cccgagttgg | tacgggcggt | ggcgcgactg | 360 |
| cggtttaagg | agtgcgcgcc | ggcggacgtg | gtgcctcagc | gtaacgccta | ctatagcgtt | 420 |
| ctgaatacgt | tcaggccct | ccaccgctcc | gaagcctttc | gccagctggt | gcactttgtg | 480 |
| cgggactttg | cccagctgct | caaaacctcc | ttcgggcct | ccagcctcac | ggagaccacg | 540 |
| ggcccccca | aaaacgggc | caaggtggac | gtggccaccc | acggccggac | gtacggcacg | 600 |
| ctggagctgt | tccaaaaaat | gatccttatg | cacgccacct | actttctggc | cgccgtgctc | 660 |
| ctcggggacc | acgcggagca | ggtcaacacg | ttcctgcgtc | tcgtgtttga | gatccccctg | 720 |
| tttagcgacg | cggccgtgcg | ccacttccgc | cagcgcgcca | ccgtgtttct | cgtccccgg | 780 |
| cgccacggca | agacctggtt | tctggtgccc | ctcatcgcgc | tgtcgctggc | ctcctttcgg | 840 |
| gggatcaaga | tcggctacac | ggcgcacatc | cgcaaggcga | ccgagccggt | gtttgaggag | 900 |
| atcgacgcct | gcctgcgggg | ctggttcggt | tcggcccgag | tggaccacgt | taagggggaa | 960 |
| accatctcct | tctcgtttcc | ggacgggtcg | cgcagtacca | tcgtgtttgc | ctccagccac | 1020 |
| aacacaaacg | gaatccgagg | ccaggacttt | aacctgctct | ttgtcgacga | ggccaacttt | 1080 |
| attcgcccgg | atgcggtcca | gacgattatg | ggctttctca | accaggccaa | ctgcaagatt | 1140 |
| atcttcgtgt | cgtccaccaa | caccgggaag | gccagtacga | ctttttgta | caacctccgc | 1200 |
| ggggccgcag | acgagcttct | caacgtggtg | acctatatat | gcgatgatca | catgccgagg | 1260 |
| gtggtgacgc | acacaaacgc | cacggcctgt | tcttgttata | tcctcaacaa | gcccgttttc | 1320 |
| atcacgatgg | acggggcggt | tcgccggacc | gccgatttgt | ttctggccga | ttccttcatg | 1380 |
| caggagatca | tcgggggcca | ggccagggag | accggcgacg | accggcccgt | tctgaccaag | 1440 |
| tctgcggggg | agcggtttct | gttgtaccgc | ccctcgacca | ccaccaacag | cggcctcatg | 1500 |
| gccccgatt | tgtacgtgta | cgtggatccc | gcgttcacgg | ccaacacccg | agcctccggg | 1560 |
| accggcgtcg | ctgtcgtcgg | gcggtaccgc | gacgattata | tcatcttcgc | cctggagcac | 1620 |
| tttttctcc | gcgcgctcac | gggctcggcc | ccgccgaca | tcgcccgctg | cgtcgtccac | 1680 |
| agtctgacgc | aggtcctggc | cctgcatccc | ggggcgtttc | gcggcgtccg | ggtggcggtc | 1740 |
| gagggaaata | gcagccagga | ctcggccgtc | gccatcgcca | cgcacgtgca | cacagagatg | 1800 |
| caccgcctac | tggcctcgga | gggggccgac | gcgggctcgg | gccccgagct | tctcttctac | 1860 |
| cactgcgagc | ctcccgggag | cgcggtgctg | tacccctttt | tcctgctcaa | caaacagaag | 1920 |
| acgcccgcct | ttgaacactt | tattaaaag | tttaactccg | ggggcgtcat | ggcctcccag | 1980 |
| gagatcgttt | ccgcgacggt | gcgcctgcag | accgacccgg | tcgagtatct | gctcgagcag | 2040 |
| ctaaataacc | tcaccgaaac | cgtctccccc | aacactgacg | tccgtacgta | ttccggaaaa | 2100 |

```
cggaacggcg cctcggatga ccttatggtc gccgtcatta tggccatcta cctcgcggcc   2160
caggccggac ctccgcacac attcgctcct atcatacgcg tctcgtga              2208
```

<210> SEQ ID NO 38
<211> LENGTH: 735
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

```
Met Phe Gly Gln Gln Leu Ala Ser Asp Val Gln Gln Tyr Leu Glu Arg
1               5                   10                  15

Leu Glu Lys Gln Arg Gln Leu Lys Val Gly Ala Asp Glu Ala Ser Ala
            20                  25                  30

Gly Leu Thr Met Gly Gly Asp Ala Leu Arg Val Pro Phe Leu Asp Phe
        35                  40                  45

Ala Thr Ala Thr Pro Lys Arg His Gln Thr Val Val Pro Gly Val Gly
    50                  55                  60

Thr Leu His Asp Cys Cys Glu His Ser Pro Leu Phe Ser Ala Val Ala
65                  70                  75                  80

Arg Arg Leu Leu Phe Asn Ser Leu Val Pro Ala Gln Leu Lys Gly Arg
                85                  90                  95

Asp Phe Gly Gly Asp His Thr Ala Lys Leu Glu Phe Leu Ala Pro Glu
            100                 105                 110

Leu Val Arg Ala Val Ala Arg Leu Arg Phe Lys Glu Cys Ala Pro Ala
        115                 120                 125

Asp Val Val Pro Gln Arg Asn Ala Tyr Tyr Ser Val Leu Asn Thr Phe
    130                 135                 140

Gln Ala Leu His Arg Ser Glu Ala Phe Arg Gln Leu Val His Phe Val
145                 150                 155                 160

Arg Asp Phe Ala Gln Leu Leu Lys Thr Ser Phe Arg Ala Ser Ser Leu
                165                 170                 175

Thr Glu Thr Thr Gly Pro Pro Lys Lys Arg Ala Lys Val Asp Val Ala
            180                 185                 190

Thr His Gly Arg Thr Tyr Gly Thr Leu Glu Leu Phe Gln Lys Met Ile
        195                 200                 205

Leu Met His Ala Thr Tyr Phe Leu Ala Ala Val Leu Leu Gly Asp His
    210                 215                 220

Ala Glu Gln Val Asn Thr Phe Leu Arg Leu Val Phe Glu Ile Pro Leu
225                 230                 235                 240

Phe Ser Asp Ala Ala Val Arg His Phe Arg Gln Arg Ala Thr Val Phe
                245                 250                 255

Leu Val Pro Arg Arg His Gly Lys Thr Trp Phe Leu Val Pro Leu Ile
            260                 265                 270

Ala Leu Ser Leu Ala Ser Phe Arg Gly Ile Lys Ile Gly Tyr Thr Ala
        275                 280                 285

His Ile Arg Lys Ala Thr Glu Pro Val Phe Glu Glu Ile Asp Ala Cys
    290                 295                 300

Leu Arg Gly Trp Phe Gly Ser Ala Arg Val Asp His Val Lys Gly Glu
305                 310                 315                 320

Thr Ile Ser Phe Ser Phe Pro Asp Gly Ser Arg Ser Thr Ile Val Phe
                325                 330                 335
```

Ala Ser Ser His Asn Thr Asn Gly Ile Arg Gly Gln Asp Phe Asn Leu
            340                 345                 350

Leu Phe Val Asp Glu Ala Asn Phe Ile Arg Pro Asp Ala Val Gln Thr
            355                 360                 365

Ile Met Gly Phe Leu Asn Gln Ala Asn Cys Lys Ile Ile Phe Val Ser
            370                 375                 380

Ser Thr Asn Thr Gly Lys Ala Ser Thr Ser Phe Leu Tyr Asn Leu Arg
385                 390                 395                 400

Gly Ala Ala Asp Glu Leu Leu Asn Val Val Thr Tyr Ile Cys Asp Asp
                405                 410                 415

His Met Pro Arg Val Val Thr His Thr Asn Ala Thr Ala Cys Ser Cys
            420                 425                 430

Tyr Ile Leu Asn Lys Pro Val Phe Ile Thr Met Asp Gly Ala Val Arg
            435                 440                 445

Arg Thr Ala Asp Leu Phe Leu Ala Asp Ser Phe Met Gln Glu Ile Ile
            450                 455                 460

Gly Gly Gln Ala Arg Glu Thr Gly Asp Asp Arg Pro Val Leu Thr Lys
465                 470                 475                 480

Ser Ala Gly Glu Arg Phe Leu Leu Tyr Arg Pro Ser Thr Thr Thr Asn
                485                 490                 495

Ser Gly Leu Met Ala Pro Asp Leu Tyr Val Tyr Val Asp Pro Ala Phe
            500                 505                 510

Thr Ala Asn Thr Arg Ala Ser Gly Thr Gly Val Ala Val Val Gly Arg
            515                 520                 525

Tyr Arg Asp Asp Tyr Ile Ile Phe Ala Leu Glu His Phe Phe Leu Arg
530                 535                 540

Ala Leu Thr Gly Ser Ala Pro Ala Asp Ile Ala Arg Cys Val Val His
545                 550                 555                 560

Ser Leu Thr Gln Val Leu Ala Leu His Pro Gly Ala Phe Arg Gly Val
                565                 570                 575

Arg Val Ala Val Glu Gly Asn Ser Ser Gln Asp Ser Ala Val Ala Ile
            580                 585                 590

Ala Thr His Val His Thr Glu Met His Arg Leu Leu Ala Ser Glu Gly
            595                 600                 605

Ala Asp Ala Gly Ser Gly Pro Glu Leu Leu Phe Tyr His Cys Glu Pro
            610                 615                 620

Pro Gly Ser Ala Val Leu Tyr Pro Phe Phe Leu Asn Lys Gln Lys
625                 630                 635                 640

Thr Pro Ala Phe Glu His Phe Ile Lys Lys Phe Asn Ser Gly Val
                645                 650                 655

Met Ala Ser Gln Glu Ile Val Ser Ala Thr Val Arg Leu Gln Thr Asp
            660                 665                 670

Pro Val Glu Tyr Leu Leu Glu Gln Leu Asn Asn Leu Thr Glu Thr Val
            675                 680                 685

Ser Pro Asn Thr Asp Val Arg Thr Tyr Ser Gly Lys Arg Asn Gly Ala
            690                 695                 700

Ser Asp Asp Leu Met Val Ala Val Ile Met Ala Ile Tyr Leu Ala Ala
705                 710                 715                 720

Gln Ala Gly Pro Pro His Thr Phe Ala Pro Ile Ile Arg Val Ser
                725                 730                 735

<210> SEQ ID NO 39
<211> LENGTH: 2208
<212> TYPE: DNA

<213> ORGANISM: Artificial Sequence
<220> FEATURE:
<223> OTHER INFORMATION: Description of Artificial Sequence: Synthetic polynucleotide

<400> SEQUENCE: 39

| | | | | | |
|---|---|---|---|---|---|
| atgtttggtc | agcagctggc | gtccgacgtc | cagcagtacc | tggagcgcct | cgagaaacag | 60 |
| aggcaactta | aggtgggcgc | ggacgaggcg | tcggcgggcc | tcacaatggg | cggcgatgcc | 120 |
| ctacgagtgc | ccttttaga | tttcgcgacc | gcgaccccca | agcgccacca | gaccgtggtc | 180 |
| ccgggcgtcg | ggacgctcca | cgactgctgc | gagcactcgc | cgctcttctc | ggccgtggcg | 240 |
| cggcggctgc | tgtttaatag | cctggtgccg | gcgcaactaa | aggggcgtga | tttcgggggc | 300 |
| gaccacacgg | ccaagctgga | attcctggcc | cccgagttgg | tacgggcggt | ggcgcgactg | 360 |
| cggtttaagg | agtgcgcgcc | ggcggacgtg | gtgcctcagc | gtaacgccta | ctatagcgtt | 420 |
| ctgaacacgt | tcaggcccct | ccaccgctcc | gaagccttc | gccagctggt | gcactttgtg | 480 |
| cgggactttg | cccagctgct | taaaacctcc | ttccgggcct | ccagcctcac | ggagaccacg | 540 |
| ggcccccaa | aaaacgggc | caaggtggac | gtggccaccc | acggccggac | gtacggcacg | 600 |
| ctggagctgt | tccaaaaaat | gatccttatg | cacgccacct | actttctggc | cgccgtgctc | 660 |
| ctcggggacc | acgcggagca | ggtcaacacg | ttcctgcgtc | tcgtgtttga | gatcccctg | 720 |
| tttagcgacg | cggccgtgcg | ccacttccgc | cagcgcgcca | ccgtgtttct | cgtccccgg | 780 |
| cgccacggca | agacctggtt | tctagtgccc | ctcatcgcgc | tgtcgctggc | ctccttcgg | 840 |
| gggatcaaga | tcggctacac | ggcgcacatc | cgcaaggcga | ccgagccggt | gtttgaggag | 900 |
| atcgacgcct | gcctgcgggg | ctggttcggt | tcggcccgag | tggaccacgt | taaaggggaa | 960 |
| accatctcct | tctcgtttcc | ggacgggtcg | cgcagtacca | tcgtgtttgc | ctccagccac | 1020 |
| aacacaaacg | gaatccgagg | ccaggacttt | aacctgctct | tgtcgacga | ggccaacttt | 1080 |
| attcgcccgg | atgcggtcca | gacgattatg | ggctttctca | accaggccaa | ctgcaagatt | 1140 |
| atcttcgtgt | cgtccaccaa | caccgggaag | gccagtacga | gcttttgta | caacctccgc | 1200 |
| ggggccgccg | acgagcttct | caacgtggtg | acctatatat | gcgatgatca | catgccgcgg | 1260 |
| gtggtgacgc | acacaaacgc | cacggcctgt | tcttgttata | tcctcaacaa | gcccgttttc | 1320 |
| atcacgatgg | acggggcggt | tcgccggacc | gccgatttgt | ttctggccga | ttccttcatg | 1380 |
| caggagatca | tcggggggcca | ggccagggag | accggcgacg | accggcccgt | tctgaccaag | 1440 |
| tctgcggggg | agcggtttct | gttgtaccgc | ccctcgacca | ccaccaacag | cggcctcatg | 1500 |
| gccccccgatt | tgtacgtgta | cgtggatccc | gcgttcacgg | ccaacacccg | agcctccggg | 1560 |
| accggcgtcg | ctgtcgtcgg | gcggtaccgc | gacgattata | tcatcttcgc | cctggagcac | 1620 |
| tttttctcc | gcgcgctcac | gggctcggcc | ccgccgaca | tcgcccgctg | cgtcgtccac | 1680 |
| agtctgacgc | aggtcctggc | cctgcatccc | ggggcgtttc | gcggcgtccg | ggtggcggtc | 1740 |
| gagggaaata | gcagccagga | ctcggccgtc | gccatcgcca | cgcacgtgca | cacagagatg | 1800 |
| caccgcctac | tggcctcgga | gggggccgac | gcgggctcgg | gccccgagct | tctcttctac | 1860 |
| cactgcgagc | ctcccgggag | cgcggtgctg | taccccttt | tcctgctcaa | caaacagaag | 1920 |
| acgcccgcct | ttgaacactt | tattaaaaag | tttaactccg | ggggcgtcat | ggcctcccag | 1980 |
| gagatcgttt | ccgcgacggt | gcgcctgcag | accgacccgg | tcgagtatct | gctcgagcag | 2040 |
| ctgaataacc | tcaccgaaac | cgtctccccc | aacacgacg | tccgtacgta | ttccggaaaa | 2100 |
| cggaacggcg | cctcggatga | ccttatggtc | gccgtcatta | tggccatcta | ccttgcggcc | 2160 | caggccggac ctccgcacac attcgctccc atcacacgcg tttcgtga       2208

<210> SEQ ID NO 40
<211> LENGTH: 735
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

Met Phe Gly Gln Gln Leu Ala Ser Asp Val Gln Gln Tyr Leu Glu Arg
1               5                   10                  15

Leu Glu Lys Gln Arg Gln Leu Lys Val Gly Ala Asp Glu Ala Ser Ala
            20                  25                  30

Gly Leu Thr Met Gly Gly Asp Ala Leu Arg Val Pro Phe Leu Asp Phe
        35                  40                  45

Ala Thr Ala Thr Pro Lys Arg His Gln Thr Val Val Pro Gly Val Gly
    50                  55                  60

Thr Leu His Asp Cys Cys Glu His Ser Pro Leu Phe Ser Ala Val Ala
65                  70                  75                  80

Arg Arg Leu Leu Phe Asn Ser Leu Val Pro Ala Gln Leu Lys Gly Arg
                85                  90                  95

Asp Phe Gly Gly Asp His Thr Ala Lys Leu Glu Phe Leu Ala Pro Glu
            100                 105                 110

Leu Val Arg Ala Val Ala Arg Leu Arg Phe Lys Glu Cys Ala Pro Ala
        115                 120                 125

Asp Val Val Pro Gln Arg Asn Ala Tyr Tyr Ser Val Leu Asn Thr Phe
    130                 135                 140

Gln Ala Leu His Arg Ser Glu Ala Phe Arg Gln Leu Val His Phe Val
145                 150                 155                 160

Arg Asp Phe Ala Gln Leu Leu Lys Thr Ser Phe Arg Ala Ser Ser Leu
                165                 170                 175

Thr Glu Thr Thr Gly Pro Pro Lys Lys Arg Ala Lys Val Asp Val Ala
            180                 185                 190

Thr His Gly Arg Thr Tyr Gly Thr Leu Glu Leu Phe Gln Lys Met Ile
        195                 200                 205

Leu Met His Ala Thr Tyr Phe Leu Ala Ala Val Leu Leu Gly Asp His
    210                 215                 220

Ala Glu Gln Val Asn Thr Phe Leu Arg Leu Val Phe Glu Ile Pro Leu
225                 230                 235                 240

Phe Ser Asp Ala Ala Val Arg His Phe Arg Gln Arg Ala Thr Val Phe
                245                 250                 255

Leu Val Pro Arg Arg His Gly Lys Thr Trp Phe Leu Val Pro Leu Ile
            260                 265                 270

Ala Leu Ser Leu Ala Ser Phe Arg Gly Ile Lys Ile Gly Tyr Thr Ala
        275                 280                 285

His Ile Arg Lys Ala Thr Glu Pro Val Phe Glu Glu Ile Asp Ala Cys
    290                 295                 300

Leu Arg Gly Trp Phe Gly Ser Ala Arg Val Asp His Val Lys Gly Glu
305                 310                 315                 320

Thr Ile Ser Phe Ser Phe Pro Asp Gly Ser Arg Ser Thr Ile Val Phe
                325                 330                 335

Ala Ser Ser His Asn Thr Asn Gly Ile Arg Gly Gln Asp Phe Asn Leu
            340                 345                 350

```
Leu Phe Val Asp Glu Ala Asn Phe Ile Arg Pro Asp Ala Val Gln Thr
            355                 360                 365

Ile Met Gly Phe Leu Asn Gln Ala Asn Cys Lys Ile Ile Phe Val Ser
370                 375                 380

Ser Thr Asn Thr Gly Lys Ala Ser Thr Ser Phe Leu Tyr Asn Leu Arg
385                 390                 395                 400

Gly Ala Ala Asp Glu Leu Leu Asn Val Val Thr Tyr Ile Cys Asp Asp
                405                 410                 415

His Met Pro Arg Val Val Thr His Thr Asn Ala Thr Ala Cys Ser Cys
            420                 425                 430

Tyr Ile Leu Asn Lys Pro Val Phe Ile Thr Met Asp Gly Ala Val Arg
        435                 440                 445

Arg Thr Ala Asp Leu Phe Leu Ala Asp Ser Phe Met Gln Glu Ile Ile
    450                 455                 460

Gly Gly Gln Ala Arg Glu Thr Gly Asp Asp Arg Pro Val Leu Thr Lys
465                 470                 475                 480

Ser Ala Gly Glu Arg Phe Leu Leu Tyr Arg Pro Ser Thr Thr Thr Asn
                485                 490                 495

Ser Gly Leu Met Ala Pro Asp Leu Tyr Val Tyr Val Asp Pro Ala Phe
            500                 505                 510

Thr Ala Asn Thr Arg Ala Ser Gly Thr Gly Val Ala Val Val Gly Arg
        515                 520                 525

Tyr Arg Asp Asp Tyr Ile Ile Phe Ala Leu Glu His Phe Phe Leu Arg
    530                 535                 540

Ala Leu Thr Gly Ser Ala Pro Ala Asp Ile Ala Arg Cys Val Val His
545                 550                 555                 560

Ser Leu Thr Gln Val Leu Ala Leu His Pro Gly Ala Phe Arg Gly Val
                565                 570                 575

Arg Val Ala Val Glu Gly Asn Ser Ser Gln Asp Ser Ala Val Ala Ile
            580                 585                 590

Ala Thr His Val His Thr Glu Met His Arg Leu Leu Ala Ser Glu Gly
        595                 600                 605

Ala Asp Ala Gly Ser Gly Pro Glu Leu Leu Phe Tyr His Cys Glu Pro
    610                 615                 620

Pro Gly Ser Ala Val Leu Tyr Pro Phe Phe Leu Leu Asn Lys Gln Lys
625                 630                 635                 640

Thr Pro Ala Phe Glu His Phe Ile Lys Lys Phe Asn Ser Gly Gly Val
                645                 650                 655

Met Ala Ser Gln Glu Ile Val Ser Ala Thr Val Arg Leu Gln Thr Asp
            660                 665                 670

Pro Val Glu Tyr Leu Leu Glu Gln Leu Asn Asn Leu Thr Glu Thr Val
        675                 680                 685

Ser Pro Asn Thr Asp Val Arg Thr Tyr Ser Gly Lys Arg Asn Gly Ala
    690                 695                 700

Ser Asp Asp Leu Met Val Ala Val Ile Met Ala Ile Tyr Leu Ala Ala
705                 710                 715                 720

Gln Ala Gly Pro Pro His Thr Phe Ala Pro Ile Thr Arg Val Ser
                725                 730                 735

<210> SEQ ID NO 41
<211> LENGTH: 2208
<212> TYPE: DNA
<213> ORGANISM: Herpes simplex virus type 1

<400> SEQUENCE: 41
```

```
atgtttggtc agcagctggc gtccgacgtc cagcagtacc tggagcgcct cgagaaacag    60
aggcaactta aggtgggcgc ggacgaggcg tcggcgggcc tcaccatggg cggcgatgcc   120
ctacgagtgc ccttttttaga tttcgcgacc gcgaccccca agcgccacca gaccgtggtc   180
cctggcgtcg ggacgctcca cgactgctgc gagcactcgc cgctcttctc ggccgtggcg   240
cggcggctgc tgtttaatag cctggtgccg gcgcaactaa aggggcgtga tttcggggggc   300
gaccacacgg ccaagctgga attcctggcc cccgagttgg tacgggcggt ggcgcgactg   360
cggtttaagg agtgcgcgcc ggcggacgtg gtgcctcagc gtaacgccta ctatagcgtt   420
ctgaatacgt tcaggccct ccaccgctcc gaagcctttc gccagctggt gcactttgtg   480
cgggactttg cccagctgct caaaaccctcc ttccgggcct ccagcctcac ggagaccacg   540
ggccccccca aaaacgggc caaggtggac gtggccaccc acggccggac gtacggcacg   600
ctggagctgt tccaaaaaat gatccttatg cacgccacct actttctggc cgccgtgctc   660
ctcggggacc acgcggagca ggtcaacacg ttcctgcgtc tcgtgtttga tccccctg     720
tttagcgacg cggccgtgcg ccacttccgc cagcgcgcca ccgtgtttct cgtccccgg    780
cgccacggca agacctggtt tctggtgccc ctcatcgcgc tgtcgctggc ctcctttcgg   840
gggatcaaga tcggctacac ggcgcacatc cgcaaggcga ccgagccggt gtttgaggag   900
atcgacgcct gcctgcgggg ctggttcggt tcggcccgag tggaccacgt taaaggggaa   960
accatctcct tctcgtttcc ggacgggtcg cgcagtacca tcgtgtttgc ctccagccac  1020
aacacaaacg gaatccgagg ccaggacttt aacctgctct tgtcgacga ggccaacttt   1080
attcgcccgg atgcggtcca gacgattatg ggctttctca accaggccaa ctgcaagatt  1140
atcttcgtgt cgtccaccaa caccgggaag gccagtacga gcttttttgta caacctccgc  1200
ggggccgcag acgagcttct caacgtggtg acctatatat gcgatgatca catgccgagg  1260
gtggtgacgc acacaaacgc cacggcctgt tcttgttata tcctcaacaa gcccgttttc  1320
atcacgatgg acggggcggt tcgccggacc gccgatttgt ttctggccga ttccttcatg  1380
caggagatca tcgggggcca ggccagggag accggcgacg accggcccgt tctgaccaag  1440
tctgcggggg agcggtttct gttgtaccgc ccctcgacca ccaccaacag cggcctcatg  1500
gcccccgatt tgtacgtgta cgtggatccc gcgttcacgg ccaacacccg agcctccggg  1560
accggcgtcg ctgtcgtcgg gcggtaccgc gacgattata tcatcttcgc cctggagcac  1620
ttttttctcc gcgcgctcac gggctcggcc cccgccgaca tcgcccgctg cgtcgtccac  1680
agtctgacgg aggtcctggc cctgcatccc ggggcgtttc gcggcgtccg ggtggcggtc  1740
gagggaaata gcagccagga ctcggccgtc gccatcgcca cgcacgtgca cacagagatg  1800
caccgcctac tggcctcgga gggggccgac gcgggctcgg gccccgagct tctcttctac  1860
cactgcgagc ctcccgggag cgcggtgctg taccccttttt tcctgctcaa caaacagaag  1920
acgcccgcct tgaacactt tattaaaaag tttaactccg ggggcgtcat ggcctcccag  1980
gagatcgttt ccgcgacggt gcgcctgcag accgacccgg tcgagtatct gctcgagcag  2040
ctaaataacc tcaccgaaac cgtctccccc aacactgacg tccgtacgta ttccggaaaa  2100
cggaacggcg cctcggatga ccttatggtc gccgtcatta tggccatcta cctcgcggcc  2160
caggccggac ctccgcacac attcgctcct atcatacgcg tctcgtga              2208
```

<210> SEQ ID NO 42
<211> LENGTH: 735
<212> TYPE: PRT

<213> ORGANISM: Herpes simplex virus type 1

<400> SEQUENCE: 42

Met Phe Gly Gln Gln Leu Ala Ser Asp Val Gln Gln Tyr Leu Glu Arg
1               5                   10                  15

Leu Glu Lys Gln Arg Gln Leu Lys Val Gly Ala Asp Glu Ala Ser Ala
            20                  25                  30

Gly Leu Thr Met Gly Gly Asp Ala Leu Arg Val Pro Phe Leu Asp Phe
        35                  40                  45

Ala Thr Ala Thr Pro Lys Arg His Gln Thr Val Val Pro Gly Val Gly
    50                  55                  60

Thr Leu His Asp Cys Cys Glu His Ser Pro Leu Phe Ser Ala Val Ala
65                  70                  75                  80

Arg Arg Leu Leu Phe Asn Ser Leu Val Pro Ala Gln Leu Lys Gly Arg
                85                  90                  95

Asp Phe Gly Gly Asp His Thr Ala Lys Leu Glu Phe Leu Ala Pro Glu
            100                 105                 110

Leu Val Arg Ala Val Ala Arg Leu Arg Phe Lys Glu Cys Ala Pro Ala
        115                 120                 125

Asp Val Val Pro Gln Arg Asn Ala Tyr Tyr Ser Val Leu Asn Thr Phe
130                 135                 140

Gln Ala Leu His Arg Ser Glu Ala Phe Arg Gln Leu Val His Phe Val
145                 150                 155                 160

Arg Asp Phe Ala Gln Leu Leu Lys Thr Ser Phe Arg Ala Ser Ser Leu
                165                 170                 175

Thr Glu Thr Thr Gly Pro Pro Lys Lys Arg Ala Lys Val Asp Val Ala
            180                 185                 190

Thr His Gly Arg Thr Tyr Gly Thr Leu Glu Leu Phe Gln Lys Met Ile
        195                 200                 205

Leu Met His Ala Thr Tyr Phe Leu Ala Ala Val Leu Leu Gly Asp His
210                 215                 220

Ala Glu Gln Val Asn Thr Phe Leu Arg Leu Val Phe Glu Ile Pro Leu
225                 230                 235                 240

Phe Ser Asp Ala Ala Val Arg His Phe Arg Gln Arg Ala Thr Val Phe
                245                 250                 255

Leu Val Pro Arg Arg His Gly Lys Thr Trp Phe Leu Val Pro Leu Ile
            260                 265                 270

Ala Leu Ser Leu Ala Ser Phe Arg Gly Ile Lys Ile Gly Tyr Thr Ala
        275                 280                 285

His Ile Arg Lys Ala Thr Glu Pro Val Phe Glu Glu Ile Asp Ala Cys
290                 295                 300

Leu Arg Gly Trp Phe Gly Ser Ala Arg Val Asp His Val Lys Gly Glu
305                 310                 315                 320

Thr Ile Ser Phe Ser Phe Pro Asp Gly Ser Arg Ser Thr Ile Val Phe
                325                 330                 335

Ala Ser Ser His Asn Thr Asn Gly Ile Arg Gly Gln Asp Phe Asn Leu
            340                 345                 350

Leu Phe Val Asp Glu Ala Asn Phe Ile Arg Pro Asp Ala Val Gln Thr
        355                 360                 365

Ile Met Gly Phe Leu Asn Gln Ala Asn Cys Lys Ile Ile Phe Val Ser
370                 375                 380

Ser Thr Asn Thr Gly Lys Ala Ser Thr Ser Phe Leu Tyr Asn Leu Arg
385                 390                 395                 400

Gly Ala Ala Asp Glu Leu Leu Asn Val Val Thr Tyr Ile Cys Asp Asp
            405                 410                 415

His Met Pro Arg Val Val Thr His Thr Asn Ala Thr Ala Cys Ser Cys
        420                 425                 430

Tyr Ile Leu Asn Lys Pro Val Phe Ile Thr Met Asp Gly Ala Val Arg
            435                 440                 445

Arg Thr Ala Asp Leu Phe Leu Ala Asp Ser Phe Met Gln Glu Ile Ile
        450                 455                 460

Gly Gly Gln Ala Arg Glu Thr Gly Asp Asp Arg Pro Val Leu Thr Lys
465                 470                 475                 480

Ser Ala Gly Glu Arg Phe Leu Leu Tyr Arg Pro Ser Thr Thr Thr Asn
                485                 490                 495

Ser Gly Leu Met Ala Pro Asp Leu Tyr Val Tyr Val Asp Pro Ala Phe
            500                 505                 510

Thr Ala Asn Thr Arg Ala Ser Gly Thr Gly Val Ala Val Val Gly Arg
        515                 520                 525

Tyr Arg Asp Asp Tyr Ile Ile Phe Ala Leu Glu His Phe Phe Leu Arg
    530                 535                 540

Ala Leu Thr Gly Ser Ala Pro Ala Asp Ile Ala Arg Cys Val Val His
545                 550                 555                 560

Ser Leu Thr Gln Val Leu Ala Leu His Pro Gly Ala Phe Arg Gly Val
                565                 570                 575

Arg Val Ala Val Glu Gly Asn Ser Ser Gln Asp Ser Ala Val Ala Ile
            580                 585                 590

Ala Thr His Val His Thr Glu Met His Arg Leu Leu Ala Ser Glu Gly
        595                 600                 605

Ala Asp Ala Gly Ser Gly Pro Glu Leu Leu Phe Tyr His Cys Glu Pro
    610                 615                 620

Pro Gly Ser Ala Val Leu Tyr Pro Phe Phe Leu Leu Asn Lys Gln Lys
625                 630                 635                 640

Thr Pro Ala Phe Glu His Phe Ile Lys Lys Phe Asn Ser Gly Gly Val
                645                 650                 655

Met Ala Ser Gln Glu Ile Val Ser Ala Thr Val Arg Leu Gln Thr Asp
            660                 665                 670

Pro Val Glu Tyr Leu Leu Glu Gln Leu Asn Asn Leu Thr Glu Thr Val
        675                 680                 685

Ser Pro Asn Thr Asp Val Arg Thr Tyr Ser Gly Lys Arg Asn Gly Ala
    690                 695                 700

Ser Asp Asp Leu Met Val Ala Val Ile Met Ala Ile Tyr Leu Ala Ala
705                 710                 715                 720

Gln Ala Gly Pro Pro His Thr Phe Ala Pro Ile Ile Arg Val Ser
                725                 730                 735

<210> SEQ ID NO 43
<211> LENGTH: 3414
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 43
atggccagcc gcccagccgc atcctctccc gtcgaagcgc gggccccggt tgggggacag      60
gaggccggcg ccccagcgc agccacccag ggggaggccg ccggggcccc tctcgcccac     120
ggccaccacg tgtactgcca gcgagtcaat ggcgtgatgg tgctttccga caagacgccc     180

-continued

| | |
|---|---|
| gggtccgcgt cctaccgcat cagcgatagc aactttgtcc aatgtggttc caactgcacc | 240 |
| atgatcatcg acggagacgt ggtgcgcggg cgccccagg acccggggc cgcggcatcc | 300 |
| cccgctccct tcgttgcggt gacaaacatc ggagccggca gcgacggcgg gaccgccgtc | 360 |
| gtggcattcg ggggaacccc acgtcgctcg gcgggacgt ctaccggtac ccagacggcc | 420 |
| gacgtcccca ccgaggccct tggggcccc cctcctcctc cccgcttcac cctgggtggc | 480 |
| ggctgttgtt cctgtcgcga cacacggcgc cgctctgcgg tattcggggg ggaggggggat | 540 |
| ccagtcggcc ccgcggagtt cgtctcggac gaccggtcgt ccgattccga ctcggatgac | 600 |
| tcggaggaca cggactcgga gacgctgtca cacgcctcct cggacgtgtc cggcgggggcc | 660 |
| acgtacgacg acgcccttga ctccgattcg tcatcggatg actccctgca gatagatggc | 720 |
| cccgtgtgtc gcccgtggag caatgacacc gcgcccctgg atgtttgccc cgggaccccc | 780 |
| ggcccgggcg ccgacgccgg tggtccctca gcggtagacc cacacgcgcc gacgccagag | 840 |
| gccgcgctg gtcttgcggc cgatcccgcc gtggcccggg acgacgcgga ggggctttcg | 900 |
| gacccccggc cacgtctggg aacgggcacg gcctaccccg tcccctgga actcacgccc | 960 |
| gagaacgcgg aggccgtggc gcgctttctg ggagatgccg tgaaccgcga acccgcgctc | 1020 |
| atgctggagt acttttgccg gtgcgcccgc gaggaaacca gcgtgtccc ccccaggaca | 1080 |
| ttcggcagcc cccctcgcct cacggaggac gactttgggc ttctcaacta cgcgctcgtg | 1140 |
| gagatgcagc gcctgtgtct ggacgttcct ccggtcccgc cgaacgcata catgccctat | 1200 |
| tatctcaggg agtatgtgac gcggctggtc aacgggttca gccgctggt gagccggtcc | 1260 |
| gctcgccttt accgcatcct gggggtttctg gtgcacctgc ggatccggac ccgggaggcc | 1320 |
| tcctttgagg agtggctgcg atccaaggaa gtgccctgg attttggcct gacggaaagg | 1380 |
| cttcgcgagc acgaagccca gctggtgatc ctgcccagg ctctggacca ttacgactgt | 1440 |
| ctgatccaca gcacaccgca cacgctggtc gagcggggc tgcaatcggc cctgaagtat | 1500 |
| gaggagtttt acctaaagcg ttttggcggg cactacatgg agtccgtctt ccagatgtac | 1560 |
| acccgcatcg ccggcttttt ggcctgccgg gccacgcgcg gcatgcgcca catcgccctg | 1620 |
| gggcgagagg ggtcgtggtg ggaaatgttc aagttctttt tccaccgcct ctacgaccac | 1680 |
| cagatcgtac cgtcgacccc cgccatgctg aacctgggga cccgcaacta ctacacctcc | 1740 |
| agctgctacc tggtaaaccc ccaggccacc acaaacaagg cgaccctgcg ggccatcacc | 1800 |
| agcaacgtca gtgccatcct cgcccgcaac ggggggcatcg ggctatgcgt gcaggcgttt | 1860 |
| aacgactccg gcccccggac cgccagcgtc atgcccgccc tcaaggtcct tgactcgctg | 1920 |
| gtggcggcgc acaacaaaga gagcgcgcgt ccgaccggcg cgtgcgtgta cctggagccg | 1980 |
| tggcacaccg acgtgcgggc cgtgctccgg atgaaggggg tcctcgccgg cgaagaggcc | 2040 |
| cagcgctgcg acaatatctt cagcgccctc tggatgccag acctgttttt caagcgcctg | 2100 |
| attcgccacc tggacggcga gaagaacgtc acatggaccc tgttcgaccg ggacaccagc | 2160 |
| atgtcgctcg ccgactttca cggggaggag ttcgagaagc tctaccagca cctcgaggtc | 2220 |
| atggggttcg gcgagcagat acccatccag gagctggcct atggcattgt gcgcagtgcg | 2280 |
| gccacgaccg ggagcccctt cgtcatgttc aaagacgcg tgaaccgcca ctacatctac | 2340 |
| gacacccagg gggcggccat cgccggctcc aacctctgca ccgagatcgt ccatccggcc | 2400 |
| tccaagcgat ccagtggggt ctgcaacctg ggaagcgtga atctggcccg atgcgtctcc | 2460 |
| aggcagacgt ttgactttgg gcggctccgc gacgccgtgc aggcgtgcgt gctgatggtg | 2520 |

```
aacatcatga tcgacagcac gctacaaccc acgccccagt gcacccgcgg caacgacaac    2580
ctgcggtcca tgggaatcgg catgcagggc ctgcacacgg cctgcctgaa gctggggctg    2640
gatctggagt ctgtcgaatt tcaggacctg aacaaacaca tcgccgaggt gatgctgctg    2700
tcggcgatga agaccagcaa cgcgctgtgc gttcgcgggg cccgtccctt caaccacttt    2760
aagcgcagca tgtatcgcgc cggccgcttt cactgggagc gctttccgga cgcccggccg    2820
cggtacgagg cgagtgggga gatgctacgc cagagcatga tgaaacacgg cctgcgcaac    2880
agccagtttg tcgcgctgat gcccaccgcc gcctcggcgc agatctcgga cgtcagcgag    2940
ggctttgccc ccctgttcac caacctgttc agcaaggtga cccgggacgg cgagacgctg    3000
cgccccaaca cgctcctgct aaaggaactg gaacgcacgt ttagcgggaa cgcctcctg    3060
gaggtgatgg acagtctcga cgccaagcag tggtccgtgg cgcaggcgct cccgtgcctg    3120
gagcccaccc accccctccg gcgattcaag accgcgtttg actacgacca gaagttgctg    3180
atcgacctgt gtgcggaccg cgcccccctac gtcgaccata gccaatccat gaccctgtat    3240
gtcacggaga aggcggacgg gaccctccca gcctccaccc tggtccgcct tctggtccac    3300
gcatataagc gcggactaaa aacagggatg tactactgca aggttcgcaa ggcgaccaac    3360
agcgggtct ttggcggcga cgacaacatt gtctgcacga gctgcgcgct gtga          3414
```

<210> SEQ ID NO 44
<211> LENGTH: 1137
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 44

```
Met Ala Ser Arg Pro Ala Ala Ser Ser Pro Val Glu Ala Arg Ala Pro
1               5                   10                  15

Val Gly Gly Gln Glu Ala Gly Gly Pro Ser Ala Ala Thr Gln Gly Glu
            20                  25                  30

Ala Ala Gly Ala Pro Leu Ala His Gly His His Val Tyr Cys Gln Arg
        35                  40                  45

Val Asn Gly Val Met Val Leu Ser Asp Lys Thr Pro Gly Ser Ala Ser
    50                  55                  60

Tyr Arg Ile Ser Asp Ser Asn Phe Val Gln Cys Gly Ser Asn Cys Thr
65                  70                  75                  80

Met Ile Ile Asp Gly Asp Val Val Arg Gly Arg Pro Gln Asp Pro Gly
                85                  90                  95

Ala Ala Ala Ser Pro Ala Pro Phe Val Ala Val Thr Asn Ile Gly Ala
            100                 105                 110

Gly Ser Asp Gly Gly Thr Ala Val Val Ala Phe Gly Thr Pro Arg
        115                 120                 125

Arg Ser Ala Gly Thr Ser Thr Gly Thr Gln Thr Ala Asp Val Pro Thr
    130                 135                 140

Glu Ala Leu Gly Gly Pro Pro Pro Pro Arg Phe Thr Leu Gly Gly
145                 150                 155                 160

Gly Cys Cys Ser Cys Arg Asp Thr Arg Arg Ser Ala Val Phe Gly
                165                 170                 175

Gly Glu Gly Asp Pro Val Gly Pro Ala Glu Phe Val Ser Asp Asp Arg
            180                 185                 190

Ser Ser Asp Ser Asp Ser Asp Ser Glu Asp Thr Asp Ser Glu Thr
        195                 200                 205
```

Leu Ser His Ala Ser Ser Asp Val Ser Gly Ala Thr Tyr Asp Asp
        210                 215                 220

Ala Leu Asp Ser Asp Ser Ser Asp Asp Ser Leu Gln Ile Asp Gly
225                 230                 235                 240

Pro Val Cys Arg Pro Trp Ser Asn Asp Thr Ala Pro Leu Asp Val Cys
                245                 250                 255

Pro Gly Thr Pro Gly Pro Gly Ala Asp Ala Gly Gly Pro Ser Ala Val
            260                 265                 270

Asp Pro His Ala Pro Thr Pro Glu Ala Gly Ala Gly Leu Ala Ala Asp
            275                 280                 285

Pro Ala Val Ala Arg Asp Asp Ala Glu Gly Leu Ser Asp Pro Arg Pro
290                 295                 300

Arg Leu Gly Thr Gly Thr Ala Tyr Pro Val Pro Leu Glu Leu Thr Pro
305                 310                 315                 320

Glu Asn Ala Glu Ala Val Ala Arg Phe Leu Gly Asp Ala Val Asn Arg
                325                 330                 335

Glu Pro Ala Leu Met Leu Glu Tyr Phe Cys Arg Cys Ala Arg Glu Glu
                340                 345                 350

Thr Lys Arg Val Pro Pro Arg Thr Phe Gly Ser Pro Arg Leu Thr
        355                 360                 365

Glu Asp Asp Phe Gly Leu Leu Asn Tyr Ala Leu Val Glu Met Gln Arg
370                 375                 380

Leu Cys Leu Asp Val Pro Val Pro Pro Asn Ala Tyr Met Pro Tyr
385                 390                 395                 400

Tyr Leu Arg Glu Tyr Val Thr Arg Leu Val Asn Gly Phe Lys Pro Leu
                405                 410                 415

Val Ser Arg Ser Ala Arg Leu Tyr Arg Ile Leu Gly Val Leu Val His
            420                 425                 430

Leu Arg Ile Arg Thr Arg Glu Ala Ser Phe Glu Glu Trp Leu Arg Ser
        435                 440                 445

Lys Glu Val Ala Leu Asp Phe Gly Leu Thr Glu Arg Leu Arg Glu His
450                 455                 460

Glu Ala Gln Leu Val Ile Leu Ala Gln Ala Leu Asp His Tyr Asp Cys
465                 470                 475                 480

Leu Ile His Ser Thr Pro His Thr Leu Val Glu Arg Gly Leu Gln Ser
                485                 490                 495

Ala Leu Lys Tyr Glu Glu Phe Tyr Leu Lys Arg Phe Gly His Tyr
            500                 505                 510

Met Glu Ser Val Phe Gln Met Tyr Thr Arg Ile Ala Gly Phe Leu Ala
            515                 520                 525

Cys Arg Ala Thr Arg Gly Met Arg His Ile Ala Leu Gly Arg Glu Gly
530                 535                 540

Ser Trp Trp Glu Met Phe Lys Phe Phe Phe His Arg Leu Tyr Asp His
545                 550                 555                 560

Gln Ile Val Pro Ser Thr Pro Ala Met Leu Asn Leu Gly Thr Arg Asn
                565                 570                 575

Tyr Tyr Thr Ser Ser Cys Tyr Leu Val Asn Pro Gln Ala Thr Thr Asn
            580                 585                 590

Lys Ala Thr Leu Arg Ala Ile Thr Ser Asn Val Ser Ala Ile Leu Ala
        595                 600                 605

Arg Asn Gly Gly Ile Gly Leu Cys Val Gln Ala Phe Asn Asp Ser Gly
610                 615                 620

```
Pro Gly Thr Ala Ser Val Met Pro Ala Leu Lys Val Leu Asp Ser Leu
625                 630                 635                 640

Val Ala Ala His Asn Lys Glu Ser Ala Arg Pro Thr Gly Ala Cys Val
                645                 650                 655

Tyr Leu Glu Pro Trp His Thr Asp Val Arg Ala Val Leu Arg Met Lys
            660                 665                 670

Gly Val Leu Ala Gly Glu Ala Gln Arg Cys Asp Asn Ile Phe Ser
        675                 680                 685

Ala Leu Trp Met Pro Asp Leu Phe Lys Arg Leu Ile Arg His Leu
690                 695                 700

Asp Gly Glu Lys Asn Val Thr Trp Thr Leu Phe Asp Arg Asp Thr Ser
705                 710                 715                 720

Met Ser Leu Ala Asp Phe His Gly Glu Phe Glu Lys Leu Tyr Gln
                725                 730                 735

His Leu Glu Val Met Gly Phe Gly Glu Gln Ile Pro Ile Gln Glu Leu
                740                 745                 750

Ala Tyr Gly Ile Val Arg Ser Ala Ala Thr Thr Gly Ser Pro Phe Val
                755                 760                 765

Met Phe Lys Asp Ala Val Asn Arg His Tyr Ile Tyr Asp Thr Gln Gly
770                 775                 780

Ala Ala Ile Ala Gly Ser Asn Leu Cys Thr Glu Ile Val His Pro Ala
785                 790                 795                 800

Ser Lys Arg Ser Ser Gly Val Cys Asn Leu Gly Ser Val Asn Leu Ala
                805                 810                 815

Arg Cys Val Ser Arg Gln Thr Phe Asp Phe Gly Arg Leu Arg Asp Ala
                820                 825                 830

Val Gln Ala Cys Val Leu Met Val Asn Ile Met Ile Asp Ser Thr Leu
                835                 840                 845

Gln Pro Thr Pro Gln Cys Thr Arg Gly Asn Asp Asn Leu Arg Ser Met
                850                 855                 860

Gly Ile Gly Met Gln Gly Leu His Thr Ala Cys Leu Lys Leu Gly Leu
865                 870                 875                 880

Asp Leu Glu Ser Val Glu Phe Gln Asp Leu Asn Lys His Ile Ala Glu
                885                 890                 895

Val Met Leu Leu Ser Ala Met Lys Thr Ser Asn Ala Leu Cys Val Arg
                900                 905                 910

Gly Ala Arg Pro Phe Asn His Phe Lys Arg Ser Met Tyr Arg Ala Gly
                915                 920                 925

Arg Phe His Trp Glu Arg Phe Pro Asp Ala Arg Pro Arg Tyr Glu Gly
930                 935                 940

Glu Trp Glu Met Leu Arg Gln Ser Met Met Lys His Gly Leu Arg Asn
945                 950                 955                 960

Ser Gln Phe Val Ala Leu Met Pro Thr Ala Ala Ser Ala Gln Ile Ser
                965                 970                 975

Asp Val Ser Glu Gly Phe Ala Pro Leu Phe Thr Asn Leu Phe Ser Lys
                980                 985                 990

Val Thr Arg Asp Gly Glu Thr Leu Arg Pro Asn Thr Leu Leu Leu Lys
                995                 1000                1005

Glu Leu Glu Arg Thr Phe Ser Gly Lys Arg Leu Leu Glu Val Met
                1010                1015                1020

Asp Ser Leu Asp Ala Lys Gln Trp Ser Val Ala Gln Ala Leu Pro
                1025                1030                1035

Cys Leu Glu Pro Thr His Pro Leu Arg Arg Phe Lys Thr Ala Phe
```

-continued

```
                 1040                1045                1050
Asp Tyr Asp Gln Lys Leu Leu Ile Asp Leu Cys Ala Asp Arg Ala
        1055                1060                1065

Pro Tyr Val Asp His Ser Gln Ser Met Thr Leu Tyr Val Thr Glu
    1070                1075                1080

Lys Ala Asp Gly Thr Leu Pro Ala Ser Thr Leu Val Arg Leu Leu
    1085                1090                1095

Val His Ala Tyr Lys Arg Gly Leu Lys Thr Gly Met Tyr Tyr Cys
    1100                1105                1110

Lys Val Arg Lys Ala Thr Asn Ser Gly Val Phe Gly Gly Asp Asp
    1115                1120                1125

Asn Ile Val Cys Thr Ser Cys Ala Leu
    1130                1135

<210> SEQ ID NO 45
<211> LENGTH: 3414
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 45
atggccagcc gcccagccgc atcctctccc gtcgaagcgc gggccccggt tgggggacag      60
gaggccggcg gccccagcgc agccacccag ggggaggccg ccggggcccc tctcgcccac     120
ggccaccacg tgtactgcca gcgagtcaat ggcgtgatgg tgctttccga caagacgccc     180
gggtccgcgt cctaccgcat cagcgatagc aactttgtcc aatgtggttc caactgcacc     240
atgatcatcg acggagacgt ggtgcgcggg cgccccagg accoggggc cgcggcatcc       300 ccgctccct tcgttgcggt gacaaacatc ggagccggca gcgacggcgg gaccgccgtc      360
gtggcattcg ggggaacccc acgtcgctcg gcggggacgt ctaccggtac ccagacggcc     420
gacgtcccca ccgaggccct tgggggcccc cctcctcctc cccgcttcac cctgggtggc     480
ggctgttgtt cctgtcgcga cacacggcgc cgctctgcgg tattcggggg ggaggggat      540 ccagtcggcc ccgcggagtt cgtctcggac gaccggtcgt ccgattccga ctcggatgac     600
tcggaggaca cggactcgga gacgctgtca cacgcctcct cggacgtgtc cggcggggcc     660
acgtacgacg acgcccttga ctccgattcg tcatcggatg actccctgca gatagatggc     720
cccgtgtgtc gcccgtggag caatgacacc gcgcccctgg atgtttgccc cgggaccccc     780
ggcccgggcg ccgacgccgg tggtcccctca gcggtagacc cacacgcgcc gacgccagag    840
gccggcgctg gtcttgcggc cgatcccgcc gtggcccggg acgacgcgga ggggcttcg      900 gaccccggc cacgtctggg aacgggcacg gcctacccg tcccctgga actcacgccc        960 gagaacgcgg aggccgtggc gcgctttctg ggagatgccg tgaaccgcga acccgcgctc    1020
atgctggagt acttttgccg gtgcgcccgc gaggaaacca agcgtgtccc cccaggaca     1080 ttcggcagcc cccctcgcct cacggaggac gactttgggc ttctcaacta cgcgctcgtg    1140
gagatgcagc gcctgtgtct ggacgttcct ccggtcccgc gaacgcata catgccctat    1200 tatctcaggg agtatgtgac gcggctggtc aacgggttca gccgctggt gagccggtcc    1260 gctcgccttt accgcatcct gggggttctg gtgcacctgc ggatccggac ccgggaggcc    1320
tcctttgagg agtggctgcg atccaaggaa gtgcccctgg attttggcct gacggaaagg    1380
cttcgcgagc acgaagccca gctggtgatc ctggcccagg ctctggacca ttacgactgt    1440
```

```
ctgatccaca gcacaccgca cacgctggtc gagcggggc tgcaatcggc cctgaagtat   1500
gaggagtttt acctaaagcg ttttggcggg cactacatgg agtccgtctt ccagatgtac   1560
acccgcatcg ccggcttttt ggcctgccgg gccacgcgcg gcatgcgcca catcgccctg   1620
gggcgagagg ggtcgtggtg ggaaatgttc aagttctttt tccaccgcct ctacgaccac   1680
cagatcgtac cgtcgacccc cgccatgctg aacctgggga cccgcaacta ctacacctcc   1740
agctgctacc tggtaaaccc ccaggccacc acaaacaagg cgaccctgcg ggccatcacc   1800
agcaacgtca gtgccatcct cgcccgcaac ggggggcatcg ggctatgcgt gcaggcgttt   1860
aacgactccg ccccgggac cgccagcgtc atgcccgccc tcaaggtcct tgactcgctg   1920
gtggcggcgc acaacaaaga gagcgcgcgt ccgaccggcg cgtgcgtgta cctggagccg   1980
tggcacaccg acgtgcgggc cgtgctccgg atgaagggg tcctcgccgg cgaagaggcc   2040
cagcgctgcg acaatatctt cagcgccctc tggatgccag acctgttttt caagcgcctg   2100
attcgccacc tggacggcga gaagaacgtc acatggaccc tgttcgaccg ggacaccagc   2160
atgtcgctcg ccgactttca cggggaggag ttcgagaagc tctaccagca cctcgaggtc   2220
atggggttcg gcgagcagat acccatccag gagctggcct atggcattgt gcgcagtgcg   2280
gccacgaccg ggagcccctt cgtcatgttc aaagacgcgg tgaaccgcca ctacatctac   2340
gacacccagg gggcggccat cgccggctcc aacctctgca ccgagatcgt ccatccggcc   2400
tccaagcgat ccagtggggt ctgcaacctg ggaagcgtga atctggcccg atgcgtctcc   2460
aggcagacgt ttgactttgg gcggctccgc gacgccgtgc aggcgtgcgt gctgatggtg   2520
aacatcatga tcgacagcac gctacaaccc acgcccagt gcaccgcgg caacgacaac   2580
ctgcggtcca tgggaatcgg catgcagggc ctgcacacgg cctgcctgaa gctggggctg   2640
gatctggagt ctgccgaatt tcaggacctg aacaaacaca tcgccgaggt gatgctgctg   2700
tcggcgatga agaccagcaa cgcgctgtgc gttcgcgggg cccgtcctt caaccacttt   2760
aagcgcagca tgtatcgcgc cggccgcttt cactgggagc gctttccgga cgcccggccg   2820
cggtacgagg gcgagtggga gatgctacgc cagagcatga tgaaacacgg cctgcgcaac   2880
agccagtttg tcgcgctgat gcccaccgcc gcctcggcgc agatctcgga cgtcagcgag   2940
ggctttgccc ccctgttcac caacctgttc agcaaggtga cccgggacgg cgagacgctg   3000
cgccccaaca cgctcctgct aaaggaactg gaacgcacgt ttagcgggaa cgcctcctg   3060
gaggtgatgg acagtctcga cgccaagcag tggtccgtgg cgcaggcgct cccgtgcctg   3120
gagcccaccc accccctccg gcgattcaag accgcgtttg actacgacca gaagttgctg   3180
atcgacctgt gtgcggaccg cgccccctac gtcgaccata gccaatccat gaccctgtat   3240
gtcacggaga aggcggacgg gaccctccca gcctccaccc tggtccgcct tctggtccac   3300
gcatataagc gcggactaaa aacagggatg tactactgca aggttcgcaa ggcgaccaac   3360
agcggggtct ttggcggcga cgacaacatt gtctgcatga gctgcgcgct gtga         3414
```

<210> SEQ ID NO 46
<211> LENGTH: 1137
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 46

Met Ala Ser Arg Pro Ala Ala Ser Ser Pro Val Glu Ala Arg Ala Pro
1               5                   10                  15

-continued

Val Gly Gly Gln Glu Ala Gly Gly Pro Ser Ala Ala Thr Gln Gly Glu
            20                  25                  30

Ala Ala Gly Ala Pro Leu Ala His Gly His His Val Tyr Cys Gln Arg
        35                  40                  45

Val Asn Gly Val Met Val Leu Ser Asp Lys Thr Pro Gly Ser Ala Ser
 50                  55                  60

Tyr Arg Ile Ser Asp Ser Asn Phe Val Gln Cys Gly Ser Asn Cys Thr
 65                  70                  75                  80

Met Ile Ile Asp Gly Asp Val Val Arg Gly Arg Pro Gln Asp Pro Gly
                85                  90                  95

Ala Ala Ala Ser Pro Ala Pro Phe Val Ala Val Thr Asn Ile Gly Ala
            100                 105                 110

Gly Ser Asp Gly Gly Thr Ala Val Val Ala Phe Gly Gly Thr Pro Arg
        115                 120                 125

Arg Ser Ala Gly Thr Ser Thr Gly Thr Gln Thr Ala Asp Val Pro Thr
    130                 135                 140

Glu Ala Leu Gly Gly Pro Pro Pro Pro Arg Phe Thr Leu Gly Gly
145                 150                 155                 160

Gly Cys Cys Ser Cys Arg Asp Thr Arg Arg Ser Ala Val Phe Gly
                165                 170                 175

Gly Glu Gly Asp Pro Val Gly Pro Ala Glu Phe Val Ser Asp Asp Arg
            180                 185                 190

Ser Ser Asp Ser Asp Ser Asp Ser Glu Asp Thr Asp Ser Glu Thr
        195                 200                 205

Leu Ser His Ala Ser Ser Val Ser Gly Gly Ala Thr Tyr Asp Asp
    210                 215                 220

Ala Leu Asp Ser Asp Ser Ser Asp Ser Leu Gln Ile Asp Gly
225                 230                 235                 240

Pro Val Cys Arg Pro Trp Ser Asn Asp Thr Ala Pro Leu Asp Val Cys
                245                 250                 255

Pro Gly Thr Pro Gly Pro Gly Ala Asp Ala Gly Gly Pro Ser Ala Val
            260                 265                 270

Asp Pro His Ala Pro Thr Pro Glu Ala Gly Ala Gly Leu Ala Ala Asp
        275                 280                 285

Pro Ala Val Ala Arg Asp Asp Ala Glu Gly Leu Ser Asp Pro Arg Pro
290                 295                 300

Arg Leu Gly Thr Gly Thr Ala Tyr Pro Val Pro Leu Glu Leu Thr Pro
305                 310                 315                 320

Glu Asn Ala Glu Ala Val Ala Arg Phe Leu Gly Asp Ala Val Asn Arg
                325                 330                 335

Glu Pro Ala Leu Met Leu Glu Tyr Phe Cys Arg Cys Ala Arg Glu Glu
            340                 345                 350

Thr Lys Arg Val Pro Pro Arg Thr Phe Gly Ser Pro Pro Arg Leu Thr
        355                 360                 365

Glu Asp Asp Phe Gly Leu Leu Asn Tyr Ala Leu Val Glu Met Gln Arg
    370                 375                 380

Leu Cys Leu Asp Val Pro Pro Val Pro Asn Ala Tyr Met Pro Tyr
385                 390                 395                 400

Tyr Leu Arg Glu Tyr Val Thr Arg Leu Val Asn Gly Phe Lys Pro Leu
                405                 410                 415

Val Ser Arg Ser Ala Arg Leu Tyr Arg Ile Leu Gly Val Leu Val His
            420                 425                 430

-continued

Leu Arg Ile Arg Thr Arg Glu Ala Ser Phe Glu Trp Leu Arg Ser
        435                 440                 445

Lys Glu Val Ala Leu Asp Phe Gly Leu Thr Arg Leu Arg Glu His
450                 455                 460

Glu Ala Gln Leu Val Ile Leu Ala Gln Ala Leu Asp His Tyr Asp Cys
465                 470                 475                 480

Leu Ile His Ser Thr Pro His Thr Leu Val Glu Arg Gly Leu Gln Ser
                485                 490                 495

Ala Leu Lys Tyr Glu Glu Phe Tyr Leu Lys Arg Phe Gly Gly His Tyr
            500                 505                 510

Met Glu Ser Val Phe Gln Met Tyr Thr Arg Ile Ala Gly Phe Leu Ala
        515                 520                 525

Cys Arg Ala Thr Arg Gly Met Arg His Ile Ala Leu Gly Arg Glu Gly
530                 535                 540

Ser Trp Trp Glu Met Phe Lys Phe Phe Phe His Arg Leu Tyr Asp His
545                 550                 555                 560

Gln Ile Val Pro Ser Thr Pro Ala Met Leu Asn Leu Gly Thr Arg Asn
                565                 570                 575

Tyr Tyr Thr Ser Ser Cys Tyr Leu Val Asn Pro Gln Ala Thr Thr Asn
            580                 585                 590

Lys Ala Thr Leu Arg Ala Ile Thr Ser Asn Val Ser Ala Ile Leu Ala
        595                 600                 605

Arg Asn Gly Gly Ile Gly Leu Cys Val Gln Ala Phe Asn Asp Ser Gly
610                 615                 620

Pro Gly Thr Ala Ser Val Met Pro Ala Leu Lys Val Leu Asp Ser Leu
625                 630                 635                 640

Val Ala Ala His Asn Lys Glu Ser Ala Arg Pro Thr Gly Ala Cys Val
                645                 650                 655

Tyr Leu Glu Pro Trp His Thr Asp Val Arg Ala Val Leu Arg Met Lys
            660                 665                 670

Gly Val Leu Ala Gly Glu Glu Ala Gln Arg Cys Asp Asn Ile Phe Ser
        675                 680                 685

Ala Leu Trp Met Pro Asp Leu Phe Phe Lys Arg Leu Ile Arg His Leu
690                 695                 700

Asp Gly Glu Lys Asn Val Thr Trp Thr Leu Phe Asp Arg Asp Thr Ser
705                 710                 715                 720

Met Ser Leu Ala Asp Phe His Gly Glu Glu Phe Glu Lys Leu Tyr Gln
                725                 730                 735

His Leu Glu Val Met Gly Phe Gly Glu Gln Ile Pro Ile Gln Glu Leu
            740                 745                 750

Ala Tyr Gly Ile Val Arg Ser Ala Ala Thr Thr Gly Ser Pro Phe Val
        755                 760                 765

Met Phe Lys Asp Ala Val Asn Arg His Tyr Ile Tyr Asp Thr Gln Gly
770                 775                 780

Ala Ala Ile Ala Gly Ser Asn Leu Cys Thr Glu Ile Val His Pro Ala
785                 790                 795                 800

Ser Lys Arg Ser Ser Gly Val Cys Asn Leu Gly Ser Val Asn Leu Ala
                805                 810                 815

Arg Cys Val Ser Arg Gln Thr Phe Asp Phe Gly Arg Leu Arg Asp Ala
            820                 825                 830

Val Gln Ala Cys Val Leu Met Val Asn Ile Met Ile Asp Ser Thr Leu
        835                 840                 845

Gln Pro Thr Pro Gln Cys Thr Arg Gly Asn Asp Asn Leu Arg Ser Met

```
                850                 855                 860
Gly Ile Gly Met Gln Gly Leu His Thr Ala Cys Leu Lys Leu Gly Leu
865                 870                 875                 880

Asp Leu Glu Ser Ala Glu Phe Gln Asp Leu Asn Lys His Ile Ala Glu
                885                 890                 895

Val Met Leu Leu Ser Ala Met Lys Thr Ser Asn Ala Leu Cys Val Arg
            900                 905                 910

Gly Ala Arg Pro Phe Asn His Phe Lys Arg Ser Met Tyr Arg Ala Gly
        915                 920                 925

Arg Phe His Trp Glu Arg Phe Pro Asp Ala Arg Pro Arg Tyr Glu Gly
    930                 935                 940

Glu Trp Glu Met Leu Arg Gln Ser Met Met Lys His Gly Leu Arg Asn
945                 950                 955                 960

Ser Gln Phe Val Ala Leu Met Pro Thr Ala Ala Ser Ala Gln Ile Ser
                965                 970                 975

Asp Val Ser Glu Gly Phe Ala Pro Leu Phe Thr Asn Leu Phe Ser Lys
            980                 985                 990

Val Thr Arg Asp Gly Glu Thr Leu Arg Pro Asn Thr Leu Leu Leu Lys
        995                 1000                1005

Glu Leu Glu Arg Thr Phe Ser Gly Lys Arg Leu Leu Glu Val Met
    1010                1015                1020

Asp Ser Leu Asp Ala Lys Gln Trp Ser Val Ala Gln Ala Leu Pro
    1025                1030                1035

Cys Leu Glu Pro Thr His Pro Leu Arg Arg Phe Lys Thr Ala Phe
    1040                1045                1050

Asp Tyr Asp Gln Lys Leu Leu Ile Asp Leu Cys Ala Asp Arg Ala
    1055                1060                1065

Pro Tyr Val Asp His Ser Gln Ser Met Thr Leu Tyr Val Thr Glu
    1070                1075                1080

Lys Ala Asp Gly Thr Leu Pro Ala Ser Thr Leu Val Arg Leu Leu
    1085                1090                1095

Val His Ala Tyr Lys Arg Gly Leu Lys Thr Gly Met Tyr Tyr Cys
    1100                1105                1110

Lys Val Arg Lys Ala Thr Asn Ser Gly Val Phe Gly Gly Asp Asp
    1115                1120                1125

Asn Ile Val Cys Met Ser Cys Ala Leu
    1130                1135

<210> SEQ ID NO 47
<211> LENGTH: 3780
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 47 gaacccctte gccatggagc ccagtatctt gctcctcctt gctctccttg tgggcttctt    60
gttactctta gtcaggggac acccaaagtc ccgtggcaac ttcccaccag gacctcgtcc   120
ccttcccctc ttggggaacc tcctgcagtt ggacagaggg ggcctcctca attccttcat   180
gcagcttcga gaaaaatatg gagatgtgtt cacagtacac ctgggaccaa ggcctgtggt   240
catgctatgt gggacagaca ccataaagga ggctctggtg gccaagctg aggatttctc    300 tggtcgggga acaatcgctg tgattgagcc aatcttcaag gaatatggtg tgatctttgc   360
```

```
caatgggaa  cgctggaagg  cccttcggcg  attctctctg  gctaccatga  gagactttgg   420
gatgggaaag  aggagtgtgg  aagaacggat  tcaggaggaa  gcccaatgtt  tggtggagga   480
actgcggaaa  tcccagggag  ccccactgga  tcccaccttc  ctcttccagt  gcatcacagc   540
caacatcatc  tgctccattg  tgtttggaga  gcgctttgac  tacacagacc  gccagttcct   600
gcgcctgttg  gagctgttct  accggacctt  ttccctccta  agttcattct  ccagccaggt   660
gtttgagttc  ttctctgggt  tcctgaaata  cttttcctggt  gcccacagac  aaatctccaa   720
aaacctccag  gaaatcctcg  attacattgg  ccatattgtg  gagaagcaca  gggccacctt   780
agacccaagc  gctccacgag  acttcatcga  cacttacctt  ctgcgcatgg  agaaggagaa   840
gtcgaaccac  cacacagagt  tccatcatga  gaacctcatg  atctccctgc  tctctctctt   900
ctttgctggc  actgagacca  gcagcaccac  actccgctat  ggtttcctgc  tgatgctcaa   960 gtaccccat  gtcgcagaga  aagtccaaaa  ggagattgat  caggtgatcg  gctcacaccg   1020
gctaccaacc  cttgatgacc  gcagtaaaat  gccatacact  gatgcagtta  tccatgagat   1080
tcagaggttt  tcagatcttg  tccctattgg  agtaccacac  agagtcacca  aagacaccat   1140
gttccgaggg  tacctgcttc  caagaacac  tgaagtgtac  cccatcctga  gttcagctct   1200
ccatgaccca  cagtactttg  accacccaga  cagcttcaat  cctgaacact  cctggatgc   1260 caatggggca  ctgaaaaaga  gtgaagcttt  catgcccttc  tccacaggaa  agcgcatttg   1320
tcttggcgaa  ggcattgccc  gaatgaatt  gttcctcttc  ttcaccacca  tcctccagaa   1380
cttctctgtg  tcaagccatt  tggctcccaa  ggacattgac  ctcacgccca  aggagagtgg   1440
cattggaaaa  atacctccaa  cgtaccagat  ctgcttctca  gctcggtgat  ccggctgagg   1500
cagccatgtg  ccccagttct  gttgggaatg  gaacttgttt  attgcagctt  ataatggtta   1560
caaataaagc  aatagcatca  caaatttcac  aaataaagca  ttttttttcac  tgcattctag   1620 ttgtggtttg  tccaaactca  tcaatgtatc  ttatcatgtc  tggatccccg  ggcgagctcg   1680
aattcctcct  tgaggagtg  gctgcgatcc  aaggaagtgg  ccctggactt  tggcctgacg   1740
gaaaggcttc  gcgagcacga  agcccagctg  gtgatcctgg  cccaggctct  ggaccattac   1800
gactgtctga  tccacagcac  accgcacacg  ctggtcgagc  gggggctgca  atcggccctg   1860
aagtatgagg  agttttacct  aaagcgcttt  ggcgggcact  acatggagtc  cgtcttccag   1920
atgtacaccc  gcatcgccgg  cttttttggcc  tgccgggcca  cgcgcggcat  gcgccacatc   1980
gccctggggc  gagaggggtc  gtggtgggaa  atgttcaagt  tctttttcca  ccgcctctac   2040
gaccaccaga  tcgtaccgtc  gaccccgccc  atgctgaacc  tggggacccg  caactactac   2100
acctccagct  gctacctggt  aaaccccag  gccaccacaa  acaaggcgac  cctgcgggcc   2160
atcaccagca  acgtcagcgc  catcctcgcc  cgcaacgggg  gcatcgggct  atgcgtgcag   2220
gcgtttaacg  actccggccc  cgggaccgct  agcgtcatac  ccgccctcaa  ggtcctcgac   2280
tcgctggtgg  cggcgcacaa  caaagagagc  gcgcgtccaa  ccggcgcgtg  cgtgtacctg   2340
gagccgtggc  acaccgacgt  gcgggccgtg  ctccggatga  aggggtcct  cgccggcgaa   2400 gaggcccagc  gctgcgacaa  tatcttcagc  gccctctgga  tgccagacct  gttttttcaag   2460 cgcctgattc  gccacctgga  cggcgagaag  aacgtcacat  ggaccctgtt  cgaccgggac   2520
accagcatgt  cgctcgccga  cttcacgggg  gaggagttcg  agaagctcta  ccagcacctc   2580
gaggtcatgg  ggttcggcga  gcagataccc  atccaggagc  tggcctatgg  cattgtgcgc   2640
agtgcggcca  cgaccgggag  ccccttcgtc  atgttcaaag  acgcggtgaa  ccgccactac   2700
atctacgaca  cccaggggc  ggccatcgcc  ggctccaacc  tctgcaccga  gatcgtccat   2760
```

```
ccggcctcca agcgatccag tggggtctgc aatctgggaa gcgtgaatct ggcccgatgc    2820
gtctccaggc agacgtttga ctttgggcgg ctccgcgacg ccgtgcaggc gtgcgtgctg    2880
atggtgaaca tcatgatcga cagcacgcta caacccacgc cccagtgcac ccgcggcaac    2940
gacaacctgc ggtccatggg aatcggcatg cagggcctgc acacggcctg cctgaagctg    3000
gggctggatc tggagtctgt cgaatttcag gacctgaaca acacatcgc cgaggtgatg    3060 ctgctgtcgg cgatgaagac cagcaacgcg ctgtgcgttc gcggggcccg tcccttcaac    3120
cactttaagc gcagcatgta tcgcgccggc cgctttcact gggagcgctt tccggacgcc    3180
cggccgcggt acgagggcga gtgggagatg ctacgccaga gcatgatgaa acacggcctg    3240
cgcaacagcc agtttgtcgc gctgatgccc accgccgcct cggcgcagat tcggacgtc    3300 agcgagggct ttgcccccct gttcaccaac ctgttcagca aggtgacccg ggacggcgag    3360
acgctgcgcc ccaacacgct cctgctaaag gaactggaac gcacgtttag cgggaagcgc    3420
ctcctggagg tgatggacag tctcgacgcc aagcagtggt ccgtggcgca ggcgctcccg    3480
tgcctggagc ccacccaccc cctccggcga ttcaagaccg cgtttgacta cgaccagaag    3540
ttgctgatcg acctgtgtgc ggaccgcgcc ccctacgtcg accatagcca atccatgacc    3600
ctgtatgtca cggagaaggc ggacgggacc ctcccagcct ccaccctggt ccgccttctg    3660
gtccacgcat ataagcgcgg actaaaaaca gggatgtact actgcaaggt tcgcaaggcg    3720
accaacagcg gggtctttgg cggcgacgac aacattgtct gcacgagctg cgcgctgtga    3780
```

<210> SEQ ID NO 48
<211> LENGTH: 491
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48

```
Met Glu Pro Ser Ile Leu Leu Leu Ala Leu Leu Val Gly Phe Leu
1               5                   10                  15

Leu Leu Leu Val Arg Gly His Pro Lys Ser Arg Gly Asn Phe Pro Pro
            20                  25                  30

Gly Pro Arg Pro Leu Pro Leu Leu Gly Asn Leu Leu Gln Leu Asp Arg
        35                  40                  45

Gly Gly Leu Leu Asn Ser Phe Met Gln Leu Arg Glu Lys Tyr Gly Asp
    50                  55                  60

Val Phe Thr Val His Leu Gly Pro Arg Pro Val Met Leu Cys Gly
65                  70                  75                  80

Thr Asp Thr Ile Lys Glu Ala Leu Val Gly Gln Ala Glu Asp Phe Ser
                85                  90                  95

Gly Arg Gly Thr Ile Ala Val Ile Glu Pro Ile Phe Lys Glu Tyr Gly
            100                 105                 110

Val Ile Phe Ala Asn Gly Glu Arg Trp Lys Ala Leu Arg Arg Phe Ser
        115                 120                 125

Leu Ala Thr Met Arg Asp Phe Gly Met Gly Lys Arg Ser Val Glu Glu
    130                 135                 140

Arg Ile Gln Glu Glu Ala Gln Cys Leu Val Glu Glu Leu Arg Lys Ser
145                 150                 155                 160

Gln Gly Ala Pro Leu Asp Pro Thr Phe Leu Phe Gln Cys Ile Thr Ala
                165                 170                 175
```

```
Asn Ile Ile Cys Ser Ile Val Phe Gly Glu Arg Phe Asp Tyr Thr Asp
                180                 185                 190

Arg Gln Phe Leu Arg Leu Leu Glu Leu Phe Tyr Arg Thr Phe Ser Leu
            195                 200                 205

Leu Ser Ser Phe Ser Ser Gln Val Phe Glu Phe Phe Ser Gly Phe Leu
        210                 215                 220

Lys Tyr Phe Pro Gly Ala His Arg Gln Ile Ser Lys Asn Leu Gln Glu
225                 230                 235                 240

Ile Leu Asp Tyr Ile Gly His Ile Val Glu Lys His Arg Ala Thr Leu
                245                 250                 255

Asp Pro Ser Ala Pro Arg Asp Phe Ile Asp Thr Tyr Leu Leu Arg Met
            260                 265                 270

Glu Lys Glu Lys Ser Asn His His Thr Glu Phe His His Glu Asn Leu
        275                 280                 285

Met Ile Ser Leu Leu Ser Leu Phe Phe Ala Gly Thr Glu Thr Ser Ser
        290                 295                 300

Thr Thr Leu Arg Tyr Gly Phe Leu Leu Met Leu Lys Tyr Pro His Val
305                 310                 315                 320

Ala Glu Lys Val Gln Lys Glu Ile Asp Gln Val Ile Gly Ser His Arg
                325                 330                 335

Leu Pro Thr Leu Asp Asp Arg Ser Lys Met Pro Tyr Thr Asp Ala Val
            340                 345                 350

Ile His Glu Ile Gln Arg Phe Ser Asp Leu Val Pro Ile Gly Val Pro
        355                 360                 365

His Arg Val Thr Lys Asp Thr Met Phe Arg Gly Tyr Leu Leu Pro Lys
370                 375                 380

Asn Thr Glu Val Tyr Pro Ile Leu Ser Ser Ala Leu His Asp Pro Gln
385                 390                 395                 400

Tyr Phe Asp His Pro Asp Ser Phe Asn Pro Glu His Phe Leu Asp Ala
                405                 410                 415

Asn Gly Ala Leu Lys Lys Ser Glu Ala Phe Met Pro Phe Ser Thr Gly
            420                 425                 430

Lys Arg Ile Cys Leu Gly Glu Gly Ile Ala Arg Asn Glu Leu Phe Leu
        435                 440                 445

Phe Phe Thr Thr Ile Leu Gln Asn Phe Ser Val Ser Ser His Leu Ala
        450                 455                 460

Pro Lys Asp Ile Asp Leu Thr Pro Lys Glu Ser Gly Ile Gly Lys Ile
465                 470                 475                 480

Pro Pro Thr Tyr Gln Ile Cys Phe Ser Ala Arg
                485                 490
```

<210> SEQ ID NO 49
<211> LENGTH: 3414
<212> TYPE: DNA
<213> ORGANISM: Herpes simplex virus type 1

<400> SEQUENCE: 49
atggccagcc gcccagccgc atcctctccc gtcgaagcgc gggccccggt tggggacag      60 gaggccggcg ccccagcgc agccacccag ggggaggccg ccggggcccc tctcgcccac     120
ggccaccacg tgtactgcca gcgagtcaat ggcgtgatgg tgctttccga caagacgccc     180
gggtccgcgt cctaccgcat cagcgatagc aactttgtcc aatgtggttc caactgcacc     240
atgatcatcg acgagacgt ggtgcgcggg cgccccagg accgggggc cgcggcatcc      300 cccgctccct tcgttgcggt gacaaacatc ggagccggca gcgacggcgg gaccgccgtc     360

```
gtggcattcg ggggaacccc acgtcgctcg gcggggacgt ctaccggtac ccagacggcc    420
gacgtcccca ccgaggccct tgggggcccc cctcctcctc cccgcttcac cctgggtggc    480
ggctgttgtt cctgtcgcga cacacggcgc cgctctgcgg tattcggggg ggagggggat    540
ccagtcggcc ccgcggagtt cgtctcggac gaccggtcgt ccgattccga ctcggatgac    600
tcggaggaca cggactcgga gacgctgtca cacgcctcct cggacgtgtc cggcggggcc    660
acgtacgacg acgcccttga ctccgattcg tcatcggatg actccctgca gatagatggc    720
cccgtgtgtc gcccgtggag caatgacacc gcgccctgg  atgtttgccc cgggaccccc    780 ggccccgggcg ccgacgccgg tggtccctca gcggtagacc cacacgcgcc gacgccagag    840
gccggcgctg gtcttgcggc cgatcccgcc gtggcccggg acgacgcgga ggggctttcg    900
gaccccgggc cacgtctggg aacgggcacg gcctacccg  tccccctgga actcacgccc    960
gagaacgcgg aggccgtggc gcgctttctg ggagatgccg tgaaccgcga cccgcgctc   1020 atgctggagt acttttgccg gtgcgcccgc gaggaaacca gcgtgtccc  cccaggaca   1080 ttcggcagcc cccctcgcct cacggaggac gactttgggc ttctcaacta cgcgctcgtg   1140
gagatgcagc gcctgtgtct ggacgttcct ccggtcccgc cgaacgcata catgccctat   1200
tatctcaggg agtatgtgac gcggctggtc aacgggttca agccgctggt gagccggtcc   1260
gctcgccttt accgcatcct gggggttctg gtgcacctgc ggatccggac ccggaggcc    1320 tcctttgagg agtggctgcg atccaaggaa gtggccctgg attttggcct gacggaaagg   1380
cttcgcgagc acgaagccca gctggtgatc ctggcccagg ctctggacca ttacgactgt   1440
ctgatccaca gcacaccgca cacgctggtc gagcggggggc tgcaatcggc cctgaagtat   1500
gaggagtttt acctaaagcg ttttggcggg cactacatgg agtccgtctt ccagatgtac   1560
acccgcatcg ccggcttttt ggcctgccgg gccacgcgcg gcatgcgcca catcgccctg   1620
gggcgagagg ggtcgtggtg ggaaatgttc aagttctttt tccaccgcct ctacgaccac   1680
cagatcgtac cgtcgacccc cgccatgctg aacctgggga cccgcaacta ctacacctcc   1740
agctgctacc tggtaaaccc ccaggccacc acaaacaagg cgaccctgcg ggccatcacc   1800
agcaacgtca gtgccatcct cgcccgcaac ggggggcatcg ggctatgcgt gcaggcgttt   1860
aacgactccg gccccgggac cgccagcgtc atgcccgccc tcaaggtcct tgactcgctg   1920
gtggcggcgc acaacaaaga gagcgcgcgt ccgaccggcg cgtgcgtgta cctggagccg   1980
tggcacaccg acgtgcgggc cgtgctccgg atgaagggg  tcctcgccgg cgaagaggcc   2040
cagcgctgcg acaatatctt cagcgccctc tggatgccag acctgttttt caagcgcctg   2100
attcgccacc tggacggcga agaacgtc  acatggaccc tgttcgaccg ggacaccagc   2160
atgtcgctcg ccgactttca cggggaggag ttcgagaagc tctaccagca cctcgaggtc   2220
atggggttcg gcgagcagat acccatccag gagctggcct atggcattgt gcgcagtgcg   2280
gccacgaccg ggagcccctt cgtcatgttc aaagacgcgg tgaaccgcca ctacatctac   2340
gacacccagg gggcggccat cgccggctcc aacctctgca ccgagatcgt ccatccggcc   2400
tccaagcgat ccagtggggt ctgcaacctg ggaagcgtga atctggcccg atgcgtctcc   2460
aggcagacgt ttgactttgg gcggctccgc gacgccgtgc aggcgtgcgt gctgatggtg   2520
aacatcatga tcgacagcac gctacaaccc acgccccagt gcacccgcgg caacgacaac   2580
ctgcggtcca tgggaatcgg catgcagggc ctgcacacgg cctgcctgaa gctgggcgtg   2640
gatctggagt ctgtcgaatt tcaggacctg aacaaacaca tcgccgaggt gatgctgctg   2700
```

```
tcggcgatga agaccagcaa cgcgctgtgc gttcgcgggg cccgtccctt caaccacttt    2760
aagcgcagca tgtatcgcgc cggccgcttt cactgggagc gctttccgga cgccggccg     2820 cggtacgagg gcgagtggga gatgctacgc cagagcatga tgaaacacgg cctgcgcaac    2880
agccagtttg tcgcgctgat gcccaccgcc gcctcggcgc agatctcgga cgtcagcgag    2940
ggctttgccc ccctgttcac caacctgttc agcaaggtga cccgggacgg cgagacgctg    3000
cgccccaaca cgctcctgct aaaggaactg gaacgcacgt ttagcgggaa gcgcctcctg    3060
gaggtgatgg acagtctcga cgccaagcag tggtccgtgg cgcaggcgct cccgtgcctg    3120
gagcccaccc accccctccg gcgattcaag accgcgtttg actacgacca gaagttgctg    3180
atcgacctgt gtgcggaccg cgcccccctac gtcgaccata gccaatccat gaccctgtat    3240
gtcacggaga aggcggacgg gaccctccca gcctccaccc tggtccgcct tctggtccac    3300
gcatataagc gcggactaaa aacagggatg tactactgca aggttcgcaa ggcgaccaac    3360
agcggggtct tggcggcga cgacaacatt gtctgcacga gctgcgcgct gtga          3414
```

<210> SEQ ID NO 50
<211> LENGTH: 1137
<212> TYPE: PRT
<213> ORGANISM: Herpes simplex virus type 1

<400> SEQUENCE: 50

```
Met Ala Ser Arg Pro Ala Ala Ser Ser Pro Val Glu Ala Arg Ala Pro
1               5                   10                  15

Val Gly Gly Gln Glu Ala Gly Gly Pro Ser Ala Ala Thr Gln Gly Glu
            20                  25                  30

Ala Ala Gly Ala Pro Leu Ala His Gly His His Val Tyr Cys Gln Arg
        35                  40                  45

Val Asn Gly Val Met Val Leu Ser Asp Lys Thr Pro Gly Ser Ala Ser
    50                  55                  60

Tyr Arg Ile Ser Asp Ser Asn Phe Val Gln Cys Gly Ser Asn Cys Thr
65                  70                  75                  80

Met Ile Ile Asp Gly Asp Val Val Arg Gly Arg Pro Gln Asp Pro Gly
                85                  90                  95

Ala Ala Ala Ser Pro Ala Pro Phe Val Ala Val Thr Asn Ile Gly Ala
            100                 105                 110

Gly Ser Asp Gly Gly Thr Ala Val Val Ala Phe Gly Thr Pro Arg
        115                 120                 125

Arg Ser Ala Gly Thr Ser Thr Gly Thr Gln Thr Ala Asp Val Pro Thr
    130                 135                 140

Glu Ala Leu Gly Gly Pro Pro Pro Pro Arg Phe Thr Leu Gly Gly
145                 150                 155                 160

Gly Cys Cys Ser Cys Arg Asp Thr Arg Arg Arg Ser Ala Val Phe Gly
                165                 170                 175

Gly Glu Gly Asp Pro Val Gly Pro Ala Glu Phe Val Ser Asp Asp Arg
            180                 185                 190

Ser Ser Asp Ser Asp Ser Asp Ser Glu Asp Thr Asp Ser Glu Thr
    195                 200                 205

Leu Ser His Ala Ser Ser Asp Val Ser Gly Gly Ala Thr Tyr Asp Asp
        210                 215                 220

Ala Leu Asp Ser Asp Ser Ser Asp Asp Ser Leu Gln Ile Asp Gly
225                 230                 235                 240

Pro Val Cys Arg Pro Trp Ser Asn Asp Thr Ala Pro Leu Asp Val Cys
                245                 250                 255
```

```
Pro Gly Thr Pro Gly Pro Gly Ala Asp Ala Gly Gly Pro Ser Ala Val
            260                 265                 270

Asp Pro His Ala Pro Thr Pro Glu Ala Gly Ala Gly Leu Ala Ala Asp
        275                 280                 285

Pro Ala Val Ala Arg Asp Asp Ala Glu Gly Leu Ser Asp Pro Arg Pro
290                 295                 300

Arg Leu Gly Thr Gly Thr Ala Tyr Pro Val Pro Leu Glu Leu Thr Pro
305                 310                 315                 320

Glu Asn Ala Glu Ala Val Ala Arg Phe Leu Gly Asp Ala Val Asn Arg
                325                 330                 335

Glu Pro Ala Leu Met Leu Glu Tyr Phe Cys Arg Cys Ala Arg Glu Glu
            340                 345                 350

Thr Lys Arg Val Pro Pro Arg Thr Phe Gly Ser Pro Pro Arg Leu Thr
        355                 360                 365

Glu Asp Asp Phe Gly Leu Leu Asn Tyr Ala Leu Val Glu Met Gln Arg
370                 375                 380

Leu Cys Leu Asp Val Pro Val Pro Pro Asn Ala Tyr Met Pro Tyr
385                 390                 395                 400

Tyr Leu Arg Glu Tyr Val Thr Arg Leu Val Asn Gly Phe Lys Pro Leu
                405                 410                 415

Val Ser Arg Ser Ala Arg Leu Tyr Arg Ile Leu Gly Val Leu Val His
            420                 425                 430

Leu Arg Ile Arg Thr Arg Glu Ala Ser Phe Glu Glu Trp Leu Arg Ser
        435                 440                 445

Lys Glu Val Ala Leu Asp Phe Gly Leu Thr Glu Arg Leu Arg Glu His
450                 455                 460

Glu Ala Gln Leu Val Ile Leu Ala Gln Ala Leu Asp His Tyr Asp Cys
465                 470                 475                 480

Leu Ile His Ser Thr Pro His Thr Leu Val Glu Arg Gly Leu Gln Ser
                485                 490                 495

Ala Leu Lys Tyr Glu Glu Phe Tyr Leu Lys Arg Phe Gly Gly His Tyr
            500                 505                 510

Met Glu Ser Val Phe Gln Met Tyr Thr Arg Ile Ala Gly Phe Leu Ala
        515                 520                 525

Cys Arg Ala Thr Arg Gly Met Arg His Ile Ala Leu Gly Arg Glu Gly
530                 535                 540

Ser Trp Trp Glu Met Phe Lys Phe Phe His Arg Leu Tyr Asp His
545                 550                 555                 560

Gln Ile Val Pro Ser Thr Pro Ala Met Leu Asn Leu Gly Thr Arg Asn
                565                 570                 575

Tyr Tyr Thr Ser Ser Cys Tyr Leu Val Asn Pro Gln Ala Thr Thr Asn
            580                 585                 590

Lys Ala Thr Leu Arg Ala Ile Thr Ser Asn Val Ser Ala Ile Leu Ala
        595                 600                 605

Arg Asn Gly Gly Ile Gly Leu Cys Val Gln Ala Phe Asn Asp Ser Gly
610                 615                 620

Pro Gly Thr Ala Ser Val Met Pro Ala Leu Lys Val Leu Asp Ser Leu
625                 630                 635                 640

Val Ala Ala His Asn Lys Glu Ser Ala Arg Pro Thr Gly Ala Cys Val
                645                 650                 655

Tyr Leu Glu Pro Trp His Thr Asp Val Arg Ala Val Leu Arg Met Lys
            660                 665                 670
```

```
Gly Val Leu Ala Gly Glu Ala Gln Arg Cys Asp Asn Ile Phe Ser
            675                 680                 685

Ala Leu Trp Met Pro Asp Leu Phe Phe Lys Arg Leu Ile Arg His Leu
690                 695                 700

Asp Gly Glu Lys Asn Val Thr Trp Thr Leu Phe Asp Arg Asp Thr Ser
705                 710                 715                 720

Met Ser Leu Ala Asp Phe His Gly Glu Phe Glu Lys Leu Tyr Gln
                725                 730                 735

His Leu Glu Val Met Gly Phe Gly Glu Gln Ile Pro Ile Gln Glu Leu
                740                 745                 750

Ala Tyr Gly Ile Val Arg Ser Ala Ala Thr Thr Gly Ser Pro Phe Val
            755                 760                 765

Met Phe Lys Asp Ala Val Asn Arg His Tyr Ile Tyr Asp Thr Gln Gly
770                 775                 780

Ala Ala Ile Ala Gly Ser Asn Leu Cys Thr Glu Ile Val His Pro Ala
785                 790                 795                 800

Ser Lys Arg Ser Ser Gly Val Cys Asn Leu Gly Ser Val Asn Leu Ala
            805                 810                 815

Arg Cys Val Ser Arg Gln Thr Phe Asp Phe Gly Arg Leu Arg Asp Ala
            820                 825                 830

Val Gln Ala Cys Val Leu Met Val Asn Ile Met Ile Asp Ser Thr Leu
835                 840                 845

Gln Pro Thr Pro Gln Cys Thr Arg Gly Asn Asp Asn Leu Arg Ser Met
            850                 855                 860

Gly Ile Gly Met Gln Gly Leu His Thr Ala Cys Leu Lys Leu Gly Leu
865                 870                 875                 880

Asp Leu Glu Ser Val Glu Phe Gln Asp Leu Asn Lys His Ile Ala Glu
                885                 890                 895

Val Met Leu Leu Ser Ala Met Lys Thr Ser Asn Ala Leu Cys Val Arg
            900                 905                 910

Gly Ala Arg Pro Phe Asn His Lys Arg Ser Met Tyr Arg Ala Gly
            915                 920                 925

Arg Phe His Trp Glu Arg Phe Pro Asp Ala Arg Pro Arg Tyr Glu Gly
930                 935                 940

Glu Trp Glu Met Leu Arg Gln Ser Met Met Lys His Gly Leu Arg Asn
945                 950                 955                 960

Ser Gln Phe Val Ala Leu Met Pro Thr Ala Ala Ser Ala Gln Ile Ser
                965                 970                 975

Asp Val Ser Glu Gly Phe Ala Pro Leu Phe Thr Asn Leu Phe Ser Lys
            980                 985                 990

Val Thr Arg Asp Gly Glu Thr Leu Arg Pro Asn Thr Leu Leu Leu Lys
            995                 1000                1005

Glu Leu Glu Arg Thr Phe Ser Gly Lys Arg Leu Leu Glu Val Met
    1010                1015                1020

Asp Ser Leu Asp Ala Lys Gln Trp Ser Val Ala Gln Ala Leu Pro
    1025                1030                1035

Cys Leu Glu Pro Thr His Pro Leu Arg Arg Phe Lys Thr Ala Phe
    1040                1045                1050

Asp Tyr Asp Gln Lys Leu Leu Ile Asp Leu Cys Ala Asp Arg Ala
    1055                1060                1065

Pro Tyr Val Asp His Ser Gln Ser Met Thr Leu Tyr Val Thr Glu
    1070                1075                1080

Lys Ala Asp Gly Thr Leu Pro Ala Ser Thr Leu Val Arg Leu Leu
```

```
                1085                1090                1095
        Val His Ala Tyr Lys Arg Gly Leu Lys Thr Gly Met Tyr Tyr Cys
            1100                1105                1110

Lys Val Arg Lys Ala Thr Asn Ser Gly Val Phe Gly Gly Asp Asp
            1115                1120                1125

Asn Ile Val Cys Thr Ser Cys Ala Leu
            1130                1135

<210> SEQ ID NO 51
<211> LENGTH: 747
<212> TYPE: DNA
<213> ORGANISM: Herpes simplex virus type 1

<400> SEQUENCE: 51
atggcccgcc gccgccgcca tcgcggcccc cgccgccccc ggccgcccgg gcccacgggc     60
gccgtcccaa ccgcacagtc ccaggtaacc tccacgccca actcggaacc cgcggtcagg    120
agcgcgcccg cggccgcccc gccgccgccc ccgccggtg ggccccgcc ttcttgttcg     180 ctgctgctgc gccagtggct ccacgttccc gagtccgcgt ccgacgacga cgatgacgac    240
gactggccgg acagcccccc gcccgagccg gcgccagagg cccggccac cgccgccgcc    300 ccccggcccc ggcccccacc gccggcgtg ggcccggggg cggggctga ccctcccac      360 cccccctcgc gccccttccg ccttccgccg ccctcgccc tccgcctgcg cgtcaccgcg    420
gagcacctgg cgcgcctgcg cctgcgacgc gcgggcgggg aggggcgcc ggagcccccc    480 gcgaccccg cgaccccgc gaccccgcga ccccgcgcg gtgcgcttc                 540 tcgcccacg tccgggtgcg ccacctggtg gtctgggcct cggccgcccg cctggcgcgc   600
cgcggctcgt gggcccgcga gcgggccgac cgggctcggt tccggcgccg ggtggcggag   660
gccgaggcgg tcatcgggcc gtgcctgggg cccgaggccc gtgcccgggc cctggcccgc   720
ggagccggcc cggcgaactc ggtctaa                                       747

<210> SEQ ID NO 52
<211> LENGTH: 248
<212> TYPE: PRT
<213> ORGANISM: Herpes simplex virus type 1

<400> SEQUENCE: 52

Met Ala Arg Arg Arg Arg His Arg Gly Pro Arg Pro Arg Pro Pro
1               5                   10                  15

Gly Pro Thr Gly Ala Val Pro Thr Ala Gln Ser Gln Val Thr Ser Thr
            20                  25                  30

Pro Asn Ser Glu Pro Ala Val Arg Ser Ala Pro Ala Ala Ala Pro Pro
        35                  40                  45

Pro Pro Ala Gly Gly Pro Pro Ser Cys Ser Leu Leu Leu Arg
    50                  55                  60

Gln Trp Leu His Val Pro Glu Ser Ala Ser Asp Asp Asp Asp Asp
65                  70                  75                  80

Asp Trp Pro Asp Ser Pro Pro Glu Pro Ala Pro Glu Ala Arg Pro
                85                  90                  95

Thr Ala Ala Ala Pro Arg Pro Arg Pro Pro Pro Gly Val Gly Pro
            100                 105                 110

Gly Gly Gly Ala Asp Pro Ser His Pro Pro Ser Arg Pro Phe Arg Leu
        115                 120                 125

Pro Pro Arg Leu Ala Leu Arg Leu Arg Val Thr Ala Glu His Leu Ala
    130                 135                 140
```

```
Arg Leu Arg Leu Arg Arg Ala Gly Gly Glu Gly Ala Pro Glu Pro Pro
145                 150                 155                 160

Ala Thr Pro Ala Thr Pro Ala Thr Pro Ala Thr Pro Ala Thr Pro Ala
                165                 170                 175

Arg Val Arg Phe Ser Pro His Val Arg Val His Leu Val Val Trp
            180                 185                 190

Ala Ser Ala Ala Arg Leu Ala Arg Arg Gly Ser Trp Ala Arg Glu Arg
        195                 200                 205

Ala Asp Arg Ala Arg Phe Arg Arg Val Ala Glu Ala Glu Ala Val
    210                 215                 220

Ile Gly Pro Cys Leu Gly Pro Glu Ala Arg Ala Arg Ala Leu Ala Arg
225                 230                 235                 240

Gly Ala Gly Pro Ala Asn Ser Val
                245
```

<210> SEQ ID NO 53
<211> LENGTH: 3229
<212> TYPE: DNA
<213> ORGANISM: Herpes simplex virus type 1
<220> FEATURE:
<221> NAME/KEY: Intron
<222> LOCATION: (58)..(822)
<223> OTHER INFORMATION: intron
<220> FEATURE:
<221> NAME/KEY: Intron
<222> LOCATION: (1490)..(1625)
<223> OTHER INFORMATION: intron

<400> SEQUENCE: 53

| | | | | | |
|---|---|---|---|---|---|
| atggagcccc | gccccggagc | gagtacccgc | cggcctgagg | ccgccccca | gcgcgaggtg | 60 |
| aggggccggg | cgccatgtct | ggggcgccat | attgggggc | gccatattgg | ggggcgccat | 120 |
| gttggggggac | ccccgaccct | tacactggaa | ccggccgcca | tgttgggga | ccccactca | 180 |
| tacacgggag | ccgggcgcca | tgttgggcg | ccatgttagg | gggcgtggaa | ccccgtgaca | 240 |
| ctatatatac | agggaccggg | ggcgccatgt | taggggggtgc | ggaaccccct | gaccctatat | 300 |
| atacagggac | cggggtcgcc | ctgttgggg | tcgccatgtg | accccctgac | tttatatata | 360 |
| cagaccccca | acacatacac | atggcccctt | tgactcagac | gcagggcccg | ggtcgccgt | 420 |
| ggaccccct | gactcataca | cagagacacg | ccccacaac | aaacacacag | gaccggggt | 480 |
| cgccgtgttg | ggggcgtggt | cccactgac | tcatacgcag | gcccccctta | ctcacacgca | 540 |
| tctagggggg | tggggaggag | ccgcccgcca | tatttgggggg | acgccgtggg | acccccgact | 600 |
| ccggtgcgtc | tggagggcgg | gagaagaggg | aagaagaggg | gtcgggatcc | aaaggacgga | 660 |
| cccagaccac | ctttggttgc | agaccccttt | ctccccctc | ttccgaggcc | agcaggggg | 720 |
| caggactttg | tgaggcgggg | gggggagagg | gggaactcgt | gggtgctgat | tgacgcggga | 780 |
| aatcccccc | cattcttacc | cgcccccctt | ttttcccctt | agcccgcccc | ggatgtctgg | 840 |
| gtgtttccct | gcgaccgaga | cctgccggac | agcagcgact | ctgaggcgga | gaccgaagtg | 900 |
| ggggggcggg | gggacgccga | ccaccatgac | gacgactccg | cctccgaggc | ggacagcacg | 960 |
| gacacggaac | tgttcgagac | ggggctgctg | gggccgcagg | gcgtggatgg | ggggcggtc | 1020 |
| tcgggggga | gcccccccg | cgaggaagac | cccggcagtt | gcggggcgc | cccccctcga | 1080 |
| gaggacgggg | ggagcgacga | gggcgacgtg | tgcgccgtgt | gcacggatga | gatcgcgccc | 1140 |
| cacctgcgct | gcgacacctt | cccgtgcatg | caccgcttct | gcatcccgtg | catgaaaacc | 1200 |
| tggatgcaat | tgcgcaacac | ctgcccgctg | tgcaacgcca | agctggtgta | cctgatagtg | 1260 |

```
ggcgtgacgc ccagcgggtc gttcagcacc atcccgatcg tgaacgaccc ccagacccgc    1320
atggaggccg aggaggccgt cagggcgggc acggccgtgg actttatctg gacgggcaat    1380
cagcggttcg ccccgcggta cctgacccctg ggggggcaca cggtgagggc cctgtcgccc    1440 acccaccccgg agcccaccac ggacgaggat gacgacgacc tggacgacgg tgaggcgggg    1500
ggcggcaagg accctggggg aggaggagga ggaggggggg ggagggagga ataggcgggc    1560
gggcgaggaa agggcgggcc ggggagggggg cgtaacctga tcgcgccccc cgttgtctct    1620
tgcagcagac tacgtaccgc ccgcccccg ccggacgccc cgcgcccccc cacgcagagg    1680
cgccgccgcg cccccgtga cgggcggggc gtctcacgca gccccccagc cggccgcggc    1740
tcggacagcg ccccccctcgg cgcccatcgg gccacacggc agcagtaaca ccaacaccac    1800
caccaacagc agcggcggcg gcggctcccg ccagtcgcga gccgcggcgc cgcgggggc    1860 gtctggcccc tccggggggg ttggggttgg ggttggggtt gttgaagcgg aggcggggcg    1920 gccgagggc cggacgggcc cccttgtcaa cagacccgcc ccccttgcaa acaacagaga    1980
ccccatagtg atcagcgact ccccccggc ctctccccac aggcccccg cggcgcccat    2040 gccaggctcc gccccccgcc cgggccccc cgcgtccgcg gccgcgtcgg gacccgcgcg    2100 ccccccgcgcg gccgtggccc cgtgcgtgcg agcgccgcct ccggggcccg gccccccgcgc    2160 cccggccccc ggggcggagc cggccgcccg cccccgcggac gcgcgccgtg tgccccagtc    2220
gcactcgtcc ctggctcagg ccgcgaacca agaacagagt ctgtgccggg cgcgtgcgac    2280
ggtggcgcgc ggctcggggg ggccgggcgt ggagggtggg cacgggcccct cccgcggcgc    2340 cgcccctcc ggcgccgccc cgctcccctc cgccgcctct gtcgagcagg aggcggcggt    2400
gcgtccgagg aagaggcgcg ggtcgggcca ggaaaacccc tccccccagt ccacgcgtcc    2460
ccccctcgcg ccggcagggg ccaagagggc ggcgacgcac ccccccctccg actcagggcc    2520 ggggggggcgc ggccagggtg ggccggggac ccccctgacg tcctcggcgg cctccgcctc    2580
ttcctcctct gcctcttcct cctcggcccc gacccccgcg ggggccgcct cttccgccgc    2640
cggggccgcg tcctcctccg cttccgcctc ctcgggcggg gccgtcggtg ccctgggagg    2700
gagacaagag gaaacctccc tcggcccccg cgctgcttct gggccgcggg ggccgaggaa    2760
gtgtgcccgg aagacgcgcc acgcggagac ttccggggcc gtccccgcgg gcggcctcac    2820
gcgctacctg cccatctcgg gggtctctag cgtggtcgcc ctgtcgcctt acgtgaacaa    2880
gactatcacg ggggactgcc tgcccatcct ggacatggag acggggaaca tcggggcgta    2940
cgtggtcctg gtggaccaga cgggaaacat ggcgacccgg ctgcgggccg cggtcccccgg    3000 ctggagccgc cgcaccctgc tccccgagac cgcgggtaac cacgtgatgc ccccccgagta    3060 cccgacggcc cccgcgtcgg agtggaacag cctctggatg accccccgtgg ggaacatgct    3120 gttcgaccag ggcacccctag tgggcgccct ggacttccgc agcctgcggt ctcggcaccc    3180
gtggtccggg gagcaggggg cgtcgacccg ggacgaggga aaacaataa              3229
```

SYNCYTIAL ONCOLYTIC HERPES SIMPLEX MUTANTS AS POTENT CANCER THERAPEUTICS

CROSS-REFERENCE TO RELATED APPLICATIONS

This application is a national stage entry under 35 U.S.C. § 371 of International Application No. PCT/US2020/022806, filed Mar. 13, 2020, which claims priority under 35 U.S.C. § 119(e) to U.S. Provisional Application Nos. 62/818,577 and 62/932,725, filed Mar. 14, 2019 and Nov. 8, 2019, respectively, the content of each of which is hereby incorporated by reference in its entirety.

STATEMENT OF GOVERNMENT SUPPORT

This invention was made with government support under the Grant No. CA223104 awarded by National Institute of Health and National Cancer Institute (NIH/NCI). The government has certain rights to the invention.

SEQUENCE LISTING

The instant application contains a Sequence Listing which has been submitted electronically in ASCII format and is hereby incorporated by reference in its entirety. Said ASCII copy, created on Mar. 13, 2020, is named 106887-7660_ST25.txt and is 245,014 bytes in size.

BACKGROUND

The antitumor efficacy of oncolytic herpes simplex viruses (oHSVs) such as Imlygic™, recently FDA approved to treat melanoma, is very promising. These vectors have two major mechanisms of action: (1) a lytic phase, determined by direct infection and lysis of cells, and (2) an immunologic phase, driven by the stimulation of antitumor immunity. However, not all cancers respond similarly as virus spread is intrinsically slow in some cancers. In culture, cells vary in their levels of permissivity to viruses. In animals, variations in the tumor's stromal and immune cell composition lead to variations in the capacity for virus spread and immune reactions. Therefore, strategies to improve the potency of the lytic phase to reach optimal therapeutic benefit are still needed. This disclosure satisfies these needs and provide related advantages as well.

SUMMARY

The present disclosure provides a non-natural herpes simplex virus ("HSV"), wherein the virus comprises, alternatively consists essentially of, or yet further consists of a mutation in one or more of: (a) a glycoprotein E ("gE")-encoding gene, (b) an Infected Cell Protein 0 ("ICP0")-encoding gene, (c) a DNA packaging terminase subunit 1-encoding gene, (d) an ICP8-encoding gene, or (e) an ICP34.5-encoding gene.

In another aspect, the present disclosure provides a composition or a pharmaceutical composition that comprises, alternatively consists essentially of, or yet further consists of the non-natural HSV of this disclosure. In another aspect, provided in this disclosure is a method to infect a cell, comprising, or alternatively consisting essentially of, or yet further consisting of contacting the cell with the non-natural HSV or a composition or pharmaceutical composition containing the non-natural HSV.

In one aspect, the present disclosure provides a method of preparing the non-natural HSV of this disclosure comprising, or alternatively consisting essentially of, or yet further consisting of mutating a gene in a non-natural HSV viral particle or introducing into the non-natural HSV a transgene. In another aspect, the method of producing the non-natural HSV vector, comprises, or alternatively consists essentially of, or yet further consists of: (a) introducing to a host cell a 17TermA HSV vector and an rRp450 HSV vector; (b) growing the host cell for at least 3 passages; and (c) isolating a HSV particle produced by the host cell.

Also provided is a method for inhibiting the growth or metastasis of a cancer cell or a metastatic cancer cell, the method comprising, or consisting essentially of, or yet further consisting of, contacting the cell with an effective amount of the non-natural HSV vector or a composition or a pharmaceutical composition containing the non-natural HSV vector as described herein. The contacting is in vitro or in vivo. In one aspect, the contacting is in vivo by administration of the non-natural HSV or a composition or a pharmaceutical composition to a subject. In vitro, the method is practiced by placing the non-natural HSV in contact with the cell. The in vitro method can be used to test for new therapies or as a personalized assay to determine if the therapy is suitable for the cancer to be treated. Additional cancer therapies can be combined with the therapy which can be concurrent or sequential to the disclosed methods.

The cancer cell to be treated can be a solid tumor or blood cancer, e.g., carcinoma or sarcoma and non-limiting examples of such include pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cell is of any species, e.g., mammalian and human and when performed in vitro, it can be from a cultured cell line or a primary cell, e.g., from a tissue biopsy. The cell can be an adult or juvenile cell or a cancer stem cell (i.e., cancer cells possessing characteristics associated with normal stem cells, specially the ability to give rise to all cell types found in a particular cancer sample) or a cancer cell without such characteristics associated with normal stem cells. In one embodiment, the cell expresses N-myc proto-oncogene protein (MYCN), and/or expresses MYCN at a level higher than non-cancer cells.

In another aspect, also provided in this disclosure is a method for treating cancer or a metastatic cancer, or inhibiting the growth or metastasis of a cancer cell in a subject in need thereof, comprising, or alternatively consisting essentially of, or yet further consisting of, administering to the subject an effective amount of the non-natural HSV, the composition or the pharmaceutical composition of this disclosure. The subject to be treated can be of any species, e.g., mammalian and human, e.g., canine, equine, bovine, feline, simian, rat or murine. The administration can be as a first line therapy, a second line therapy, a third line therapy, a fourth line therapy, or a fifth line therapy. Additional cancer therapies can be combined with the therapy which can be concurrent or sequential to the disclosed methods. The cancer to be treated can be a solid tumor or blood cancer, e.g., carcinoma or sarcoma and non-limiting examples of such include pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma.

The method of this disclosure can be combined with appropriate diagnostics to monitor disease remission or progression. Several methods for such monitoring are known in the art.

In one aspect, the disclosure provides a method of inducing cell lysis, comprising, or alternatively consisting essentially of, or yet further consisting of, contacting the cell with an effective amount of the non-natural HSV, the composition, and/or the pharmaceutical composition of this disclosure. The contacting is in vitro or in vivo. In one aspect, the contacting is in vivo by administration of the non-natural HSV or a composition or a pharmaceutical composition to a subject. In vitro, the method is practiced by placing the non-natural HSV in contact with the cell. The in vitro method can be used to test for new therapies or as a personalized assay to determine if the therapy is suitable for the subject to be treated. Additional cell lytic therapies can be combined with the therapy which can be concurrent or sequential to the disclosed methods.

The cell to be treated can be a solid tumor or blood cancer, e.g., carcinoma or sarcoma and non-limiting examples of such include pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cell is of any species, e.g., mammalian and human and when performed in vitro, it can be from a cultured cell line or a primary cell, e.g., from a tissue biopsy. The cell can be an adult or juvenile cell or a cancer stem cell or a cancer cell without characteristics associated with normal stem cells. The therapy can be combined with an appropriate assay to test for the effectiveness of the therapy, e.g., cancer remission or progression.

In another aspect, the disclosure also provides a kit comprising, or alternatively consisting essentially of, or yet further consisting of, the non-natural HSV, the composition, and/or the pharmaceutical composition of this disclosure.

BRIEF DESCRIPTION OF THE DRAWINGS

FIG. 1B shows the sequence comparison of Mut-3 with its parent viruses. Nonsynonamous mutations that differ from either parent in Mut-3 are shaded with backslashes, including UL15, UL29, US8, RL1 and RL2. Genome sequences that are identical to 17TermA are showed as blank boxes in the bottom panel; those identical to rRp450 are marked with forward slashes.

(FIG. 2A) Raw (top) and masked (bottom, numbered plaques) images of the four viruses. (FIG. 2B) The average plaque size of the four viruses (left) and the numbers of plaques were calculated (right). The plaque sizes of Mut-3 and Mut-3Δ34.5 are significantly larger than both parent viruses rRp450 and 17TermA. (FIG. 2C) In vitro cytotoxicity/MTS assay of CHO cell sets. Applicant infected CHO-K1 (as marked), CHO-Nectin-1 (as marked), CHO-Nectin-2 (as marked) and CHO-HVEM (as marked) with the four viruses with different multiplicity of infections (MOIs). Applicant measured cell survival colorimetric Cell Proliferation/MTS assay three days post-virus infections (pvi) relative to untreated control. Only CHO-Nectin-1 and CHO-HVEM but not CHO-K1 or CHO-Nectin-2 (mainly for HSV-2 entry) were sensitive to treatments of the four viruses, suggesting that Mut-3 and Mut-3Δ34.5 did not bypass the receptor barrier and could still relay on canonical HSV entry receptors to infect the cells.

(FIG. 3A) In vitro cytotoxicity/MTS assay of neuroblastoma cell lines. Applicant infected both human (SK-N-AS) and murine (975A2) neuroblastoma cells with Mut-3 (as marked), Mut-3Δ34.5 (as marked) or 17TermA (as marked) with different (MOIs). Applicant measured cell survival via MTS assay 4 days pvi relative to untreated control. N=6, error bars represent SEM. ****$p<0.0001$, 2-way ANOVA. (FIG. 3B) In vitro virus replication assay. Applicant infected neuroblastoma cell lines with 17TermA (as marked) or Mut-3Δ34.5 (as marked) at MOI=0.1 (upper panel, human line SK-N-AS) or MOI=0.5 (lower panel, murine line 975A2) and washed the cells with PBS 2 hours pvi. Applicant harvested cell lysate 2, 24, 48 and 72 h pvi and determined the virus yields by plaque assays. N=3. Error bars represent SD. *$p<0.05$,$p<0.001$,**$p<0.0001$, 2-way ANOVA. (FIG. 3C) Comparing relative free released virions in Mut-3Δ34.5 vs. 17TermA infected neuroblastoma cultures. Applicant performed the assays similar as described in (FIG. 3B), by harvesting supernatant and pellet to perform the plaque assay in the two separated portions over the time instead of measuring as a whole culture in FIG. 3B. Applicant calculated the relative free virion as proportion of infectious particle in the supernatant over the whole culture (supernatant+pellet). Mut-3Δ34.5 shows significant more relative released virions than 17TermA at 48 hrs. N=3. Error bars represent SD. *$p<0.05$.

(FIGS. 4A, 4B, 4E & 4F) The insets show Mut-3Δ34.5 virions were mainly found in endocytic vesicles (arrowheads except the right one in FIG. 4B) with very few found fused with plasma membrane (the right arrowhead in FIG. 4B). (FIGS. 4C, 4D, 4G & 4H) The insets show 17TermA virions were mainly found in endocytic vesicles (arrowheads except the bottom one in FIG. 4G), very few found fused with plasma membrane (the bottom arrowhead in FIG. 4G). TEM analysis was done via Hitachi H-7650 TEM. N: nucleus. Scale bar: 500 nm.

(FIG. 5A) Plaque images of 17Δ34.5 clones on Vero cells. Both B4 and G1 clones produce 100% GFP positive (left panels) non-syncytia (right panels, phase contrast) plaques after 3 rounds of plaque purification. Two days pvi. Imagines were taken via EVOS® FL Imaging System. Scale bar: 400 μm (FIG. 5B) In vitro cytotoxicity/MTS assay of neuroblastoma cell lines. Applicant infected neuroblastoma cell lines, SK-N-AS and 975A2, with wild-type strain 17$^+$ (as marked), 17TermA (as marked), 17Δ34.5 clone B4 (as marked) or 17Δ34.5 clone G1 (as marked) at different MOIs. Applicant measured cell survival via MTS assay 3 days pvi relative to untreated control. The potencies of both 17Δ34.5 clones were significantly lower than their wild-type counterpart, strain17+, but comparable to 17TermA. The EGFP cassette and EGFP DNA sequence are shown in FIG. 5C (SEQ ID NO: 11).

(FIG. 8A) maps of Mut-3ΔICP6 constructed via a CRISPR-Cas9 gene editing strategy wherein the UL39 gene that encodes ICP-6 was replaced with a CMV-driven GFP reporter cassette. MTS cell viability assays comparing the cytotoxicity profiles of Mut-3, rRp450 and Mut3-ΔICP6/D7-1 in the human neuroblastoma cell lines. Cells were plated in 96-well dishes at 4000 cells/well, incubated at 37° C. overnight and then infected with each listed virus at a multiplicity of infection (MOI) of 0.001, 0.01, 0.1, and 1 infectious viral particles per cell. The assays were performed using Cell Titer96 AQuesous Non-Radioactive Cell Proliferation Assay/MTS (Promega, Madison, WI) on days 3 or 4 post infection per the manufacturer's instructions. Each sample group was run in quadruplicate with the results presented as percent cell survival relative to uninfected controls. Error bars represent standard deviation. Statistical significance was assessed using t test. *p≤0.05, p≤0.01, *p≤0.001. FIG. 8B SK-N-AS and FIG. 8C CHP-134, graphically show the results.

FIGS. 9A-9B show the results of MTS cell viability assays comparing the cytotoxicity profiles of Mut-3, rRp450 and Mut3-ΔICP6/D7-1 in the murine neuroblastoma cell lines. Cells were plated in 96-well dishes at 4000 cells/well, incubated at 37° C. overnight and then infected with each listed virus at a multiplicity of infection (MOI) of 0.001, 0.01, 0.1, and 1 infectious viral particles per cell. The assays were performed using Cell Titer96 AQuesous Non-Radioactive Cell Proliferation Assay/MTS (Promega, Madison, WI) on days 3 or 4 post infection per the manufacturer's instructions. Each sample group was run in quadruplicate with the results presented as percent cell survival relative to uninfected controls. Error bars represent standard deviation. Statistical significance was assessed using t test. p≤0.01, *p≤0.001. FIG. 9A: Neuro-2a and FIG. 9B: 975A2.

FIG. 13A and FIG. 13B, graphically show the results from female and male mice, respectively.

FIG. 14 replicating HSV can be detected in the brains, kidneys and ovaries of mice receiving 1e6 pfu or more wild-type KOS virus. FIG. 14 is a Table summarizing the results of plaque assays from the tissues of mice injected with 1e6 or 1e7 pfu of wild-type KOS virus. The mice were sacrificed 5-6 days post virus injection (pvi) after they began displaying outward signs of morbidity (kyphosis, lethargy hind limb paralysis, etc.). A "+" indicates detectable plaque(s) and a "−" indicates their absence. A gray shaded box indicates that these data are not available.

FIG. 15 shows that replicating HSV can be detected in almost all the harvested tissues except lung of mice receiving 1e8 pfu of C8G5 or D7-1 24 hr pvi. The table summarizing the results of plaque assays from the tissues of mice injected with MutΔ34.5 or Mut3ΔICP6 24 hours post virus infection. A "+" indicates detectable plaque(s) and a "−" indicates their absence. A gray shaded box indicates that these data are not available.

FIG. 16 shows that no replicating HSV can be detected in any of the harvested tissues of mice receiving 1e8 pfu of C8G5 or D7-1 14 day pvi. Table summarizing the results of plaque assays from the tissues of mice injected with MutΔ34.5 or Mut3ΔICP6 14 post virus infection. A "−" indicates no detectable plaque(s).

FIG. 17 shows that no replicating HSV can be detected in any of the harvested tissues of mice receiving 1e8 pfu of C8G5 or D7-1 28 day pvi. Table summarizing the results of plaque assays from the tissues of mice injected with MutΔ34.5 or Mut3ΔICP6 28 post virus infection. A "−" indicates no detectable plaque(s). A gray shaded box indicates that these data are not available.

FIG. 18 is a table summarizing that no replicating HSV can be detected in any of the harvested tissues of mice receiving 1e8 pfu of C8G5 or D7-1 56 day pvi. The table summarizes the results of plaque assays from the tissues of mice injected with MutΔ34.5 or Mut3ΔICP6 56 post virus infection. A "−" indicates no detectable plaque(s).

FIG. 19 shows that no replicating HSV can be detected in any of the harvested tissues of mice receiving 1e8 pfu of C8G5 or D7-1 85 day pvi. Table summarizing the results of qPCR and plaque assays from the tissues of mice injected with MutΔ34.5 or Mut3ΔICP6 85 post virus infection. A "−" indicates no detectable plaque(s).

FIG. 20A: Mut-3ΔgE was constructed via a CRISPR-Cas9 gene editing strategy, wherein the Us8 gene that encodes glycoprotein gE is replaced with a CMV-driven GFP reporter cassette. FIG. 20B: Non-syncytial GFP positive plaque phenotype of Mut-3ΔgE clone 28D5-B4 & 28D5-H1—Vero cells were infected with serially diluted 28D5-B4 or 28D5-H1 for 2 hours and covered in overlay medium. Photos of plaques were taken 3 days pvi. FIG. 20C: qPCR analysis of Mut-3ΔgE clone 28D5-B4 & 28D5-H1 reveals the loss of Us8/gE. Baby hamster kidney (BHK) cells were infected with Mut-3ΔgE clone 28D5-B4 or 28D5-H1 and their lysates were harvested when ≥50% cytopathic effect was observed. 50-100 ng of genomic DNA isolated from virus infected BHK cell lysate was used in qPCR reaction. Results are presented as gE/Us8 or GFP fold relative to Us8a control HSV gene. FIG. 20D: A comparison of plaque sizes between Mut-3ΔgE clone 28D5-B4 & 28D5-H1 to Mut-3 or Mut-3Δ34.5/C8G5, taken from a standard plaque assay performed in Vero cells. Plaque photos of Mut-3, Mut-3Δ34.5, Mut-3ΔgE clone 28D5-B4 and clone 28D5-H1 were taken 3 days pvi.

FIG. 21A: 17ΔgE was constructed via a CRISPR-Cas9 gene editing strategy, wherein the Us8 gene that encodes glycoprotein gE is replaced with a CMV-driven GFP reporter cassette. FIG. 21B: Non-syncytial and small GFP positive plaque phenotype of 17ΔgE clone 12G5− Vero cells were infected with serially diluted 17ΔgE 12G5 for 2 hours and covered in overlay medium. Photos of plaques were taken 3 days pvi. FIG. 21C: qPCR analysis of 17ΔgE clone 12G5 reveals the loss of Us8/gE. Baby hamster kidney (BHK) cells were infected with 17ΔgE clone 12G5 and the lysate was harvested when ≥50% cytopathic effect was observed. 50-100 ng of genomic DNA isolated from virus infected BHK cell lysate was used in qPCR reaction. Results are presented as gE/Us8 or GFP fold relative to ICP6 control HSV gene. FIG. 21D: A comparison of plaque sizes between 17ΔgE clone 12G5 17syn+ or 17Δ34.5 clone B4, taken from a standard plaque assay performed in Vero cells. Plaque photos were taken 3 days pvi.

DETAILED DESCRIPTION

Figure 1A:
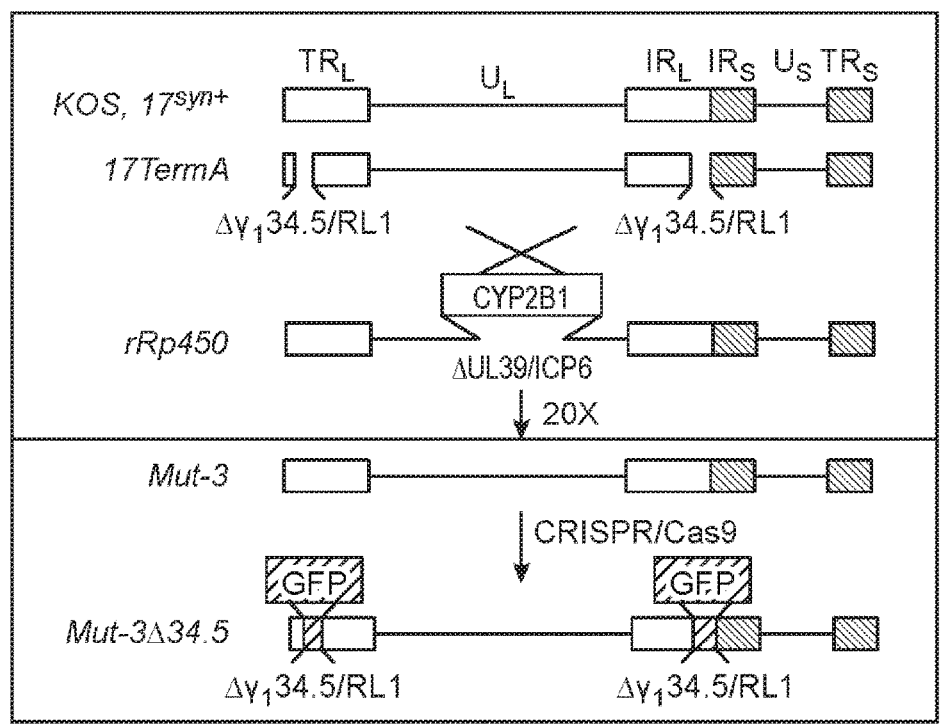
FIGS. 1A-1B show schematic diagram of generating Mut-3 and Mut-3Δ34.5 (FIG. 1A) and Mut-3 SNP (FIG. 1B). An HSV Mut-3 was isolated from the serial passage of mixing 17TermA and rRp450 in a non-permissive line ("Directed Evolution"); and an attenuated mutant Mut-3Δ34.5 was constructed via gene editing (labelled as the "CRISPR/Cas9" step) (FIG. 1A).

Embodiments according to the present disclosure will be described more fully hereinafter. Aspects of the disclosure may, however, be embodied in different forms and should not be construed as limited to the embodiments set forth herein. Rather, these embodiments are provided so that this disclosure will be thorough and complete, and will fully convey the scope of the invention to those skilled in the art. The terminology used in the description herein is for the purpose of describing particular embodiments only and is not intended to be limiting.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

The terminology used in the description herein is for the purpose of describing particular embodiments only and is not intended to be limiting of the invention. All publications, patent applications, patents and other references mentioned herein are incorporated by reference in their entirety.

The practice of the present technology will employ, unless otherwise indicated, conventional techniques of tissue culture, immunology, molecular biology, microbiology, cell biology, and recombinant DNA, which are within the skill of the art.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All numerical designations, e.g., pH, temperature, time, concentration, and molecular weight, including ranges, are approximations which are varied (+) or (−) by increments of 1.0 or 0.1, as appropriate, or alternatively by a variation of +/−15%, or alternatively 10%, or alternatively 5%, or alternatively 2%. It is to be understood, although not always explicitly stated, that all numerical designations are preceded by the term "about". It also is to be understood, although not always explicitly stated, that the reagents described herein are merely exemplary and that equivalents of such are known in the art.

As used herein, the term "comparable" refers to having a level same with that of the reference or within a variation of +/−50%, or alternatively 45%, or alternatively 40%, or alternatively 35%, or alternatively 30%, or alternatively 25%, or alternatively 20%, or alternatively 15%, or alternatively 10%, or alternatively 5%, or alternatively 2% compared to the reference level Throughout this disclosure, various publications, patents and published patent specifications are referenced by an identifying citation or by an Arabic numeral. The full citation for the publications identified by an Arabic numeral are found immediately preceding the claims. The disclosures of these publications, patents and published patent specifications are hereby incorporated by reference into the present disclosure in their entirety to more fully describe the state of the art to which this invention pertains.

Definitions

The practice of the present technology will employ, unless otherwise indicated, conventional techniques of organic chemistry, pharmacology, immunology, molecular biology, microbiology, cell biology and recombinant DNA, which are within the skill of the art. See, e.g., Sambrook, Fritsch and Maniatis, Molecular Cloning: A Laboratory Manual, 2nd edition (1989); Current Protocols In Molecular Biology (F. M. Ausubel, et al. eds., (1987)); the series Methods in Enzymology (Academic Press, Inc.): PCR 2: A Practical Approach (M. J. MacPherson, B. D. Hames and G. R. Taylor eds. (1995)), Harlow and Lane, eds. (1988) Antibodies, a Laboratory Manual, and Animal Cell Culture (R. I. Freshney, ed. (1987)).

As used in the description of the invention and the appended claims, the singular forms "a," "an" and "the" are intended to include the plural forms as well, unless the context clearly indicates otherwise.

As used herein, the term "comprising" is intended to mean that the compositions and methods include the recited elements, but do not exclude others. As used herein, the transitional phrase consisting essentially of (and grammatical variants) is to be interpreted as encompassing the recited materials or steps and those that do not materially affect the basic and novel characteristic(s) of the recited embodiment. These features are recited in the method embodiments. Thus, the term "consisting essentially of" as used herein should not be interpreted as equivalent to "comprising." "Consisting of" shall mean excluding more than trace elements of other ingredients and substantial method steps for administering the compositions disclosed herein. Aspects defined by each of these transition terms are within the scope of the present disclosure.

The term "about," as used herein when referring to a measurable value such as an amount or concentration and the like, is meant to encompass variations of 20%, 10%, 5%, 1%, 0.5%, or even 0.1% of the specified amount.

The terms or "acceptable," "effective," or "sufficient" when used to describe the selection of any components, ranges, dose forms, etc. disclosed herein intend that said component, range, dose form, etc. is suitable for the disclosed purpose.

As used herein, "and/or" refers to and encompasses any and all possible combinations of one or more of the associated listed items, as well as the lack of combinations when interpreted in the alternative ("or").

The term "cell" as used herein may refer to either a prokaryotic or eukaryotic cell, optionally obtained from a subject or a commercially available source.

"Eukaryotic cells" all of the life kingdoms except monera. They can be easily distinguished through a membrane-bound nucleus. Animals, plants, fungi, and protists are eukaryotes or organisms whose cells are organized into complex structures by internal membranes and a cytoskeleton. The most characteristic membrane-bound structure is the nucleus. Unless specifically recited, the term "host" includes a eukaryotic host, including, for example, yeast, higher plant, insect and mammalian cells. Non-limiting examples of eukaryotic cells or hosts include simian, bovine, porcine, murine, rat, avian, reptilian and human, e.g., HEK293 cells and 293T cells.

"Prokaryotic cells" that usually lack a nucleus or any other membrane-bound organelles and are divided into two domains, bacteria and archaea. In addition to chromosomal DNA, these cells can also contain genetic information in a circular loop called on episome. Bacterial cells are very small, roughly the size of an animal mitochondrion (about 1-2 μm in diameter and 10 μm long). Prokaryotic cells feature three major shapes: rod shaped, spherical, and spiral. Instead of going through elaborate replication processes like eukaryotes, bacterial cells divide by binary fission. Examples include but are not limited to *Bacillus* bacteria, *E. coli* bacterium, and *Salmonella* bacterium.

The term "encode" as it is applied to nucleic acid sequences refers to a polynucleotide which is said to "encode" a polypeptide if, in its native state or when manipulated by methods well known to those skilled in the art, can be transcribed and/or translated to produce the mRNA for the polypeptide and/or a fragment thereof. The antisense strand is the complement of such a nucleic acid, and the encoding sequence can be deduced therefrom.

The terms "equivalent" or "biological equivalent" are used interchangeably when referring to a particular molecule, biological, or cellular material and intend those having minimal homology while still maintaining desired structure or functionality. Non-limiting examples of equivalent polypeptides, include a polypeptide having at least 60%, or alternatively at least 65%, or alternatively at least 70%, or alternatively at least 75%, or alternatively 80%, or alternatively at least 85%, or alternatively at least 90%, or alternatively at least 95% identity thereto or for polypeptide sequences, or a polypeptide which is encoded by a polynucleotide or its complement that hybridizes under conditions of high stringency to a polynucleotide encoding such polypeptide sequences. Conditions of high stringency are described herein and incorporated herein by reference. Alternatively, an equivalent thereof is a polypeptide encoded by a polynucleotide or a complement thereto, having at least 70%, or alternatively at least 75%, or alternatively 80%, or alternatively at least 85%, or alternatively at least 90%, or alternatively at least 95% identity, or at least 97% sequence identity to the reference polynucleotide, e.g., the wild-type polynucleotide. In one aspect, the equivalent polypeptide or polynucleotide has the same or substantially similar biological function as the reference polypeptide or polynucleotide, respectively, e.g., cytolytic function, anti-tumor, anti-metastatic, or anti-cancer function, as determined by the appropriate cell assay or animal model as described herein.

Non-limiting examples of equivalent polypeptides, include a polynucleotide having at least 60%, or alternatively at least 65%, or alternatively at least 70%, or alternatively at least 75%, or alternatively 80%, or alternatively at least 85%, or alternatively at least 90%, or alternatively at least 95%, or alternatively at least 97%, identity to a reference polynucleotide. An equivalent also intends a polynucleotide or its complement that hybridizes under conditions of high stringency to a reference polynucleotide.

A polynucleotide or polynucleotide region (or a polypeptide or polypeptide region) having a certain percentage (for example, 80%, 85%, 90%, or 95%) of "sequence identity" to another sequence means that, when aligned, that percentage of bases (or amino acids) are the same in comparing the two sequences. The alignment and the percent homology or sequence identity can be determined using software programs known in the art, for example those described in Current Protocols in Molecular Biology (Ausubel et al., eds. 1987) Supplement 30, section 7.7.18, Table 7.7.1. In certain embodiments, default parameters are used for alignment. A non-limiting exemplary alignment program is BLAST, using default parameters. In particular, exemplary programs include BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR. Details of these programs can be found at the following Internet address: ncbi.nlm.nih.gov/cgi-bin/BLAST. Sequence identity and percent identity can be determined by incorporating them into clustalW (available at the web address: genome.jp/tools/clustalw/, last accessed on Jan. 13, 2017).

"Homology" or "identity" or "similarity" refers to sequence similarity between two peptides or between two nucleic acid molecules. Homology can be determined by comparing a position in each sequence that may be aligned for purposes of comparison. When a position in the compared sequence is occupied by the same base or amino acid, then the molecules are homologous at that position. A degree of homology between sequences is a function of the number of matching or homologous positions shared by the sequences. An "unrelated" or "non-homologous" sequence shares less than 40% identity, or alternatively less than 25% identity, with one of the sequences of the present disclosure.

"Homology" or "identity" or "similarity" can also refer to two nucleic acid molecules that hybridize under stringent conditions.

"Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise, or alternatively consist essentially of, or yet further consist of comprise, or alternatively consist essentially of, or yet further consist of two strands forming a duplex structure, three or more strands forming a multi-stranded complex, a single self-hybridizing strand, or any combination of these. A hybridization reaction may constitute a step in a more extensive process, such as the initiation of a PCR reaction, or the enzymatic cleavage of a polynucleotide by a ribozyme.

Examples of stringent hybridization conditions include: incubation temperatures of about 25° C. to about 37° C.; hybridization buffer concentrations of about 6×SSC to about 10×SSC; formamide concentrations of about 0% to about 25%; and wash solutions from about 4×SSC to about 8×SSC. Examples of moderate hybridization conditions include: incubation temperatures of about 40° C. to about 50° C.; buffer concentrations of about 9×SSC to about 2×SSC; formamide concentrations of about 30% to about 50%; and wash solutions of about 5×SSC to about 2×SSC. Examples of high stringency conditions include: incubation temperatures of about 55° C. to about 68° C.; buffer concentrations of about 1×SSC to about 0.1×SSC; formamide concentrations of about 55% to about 75%; and wash solutions of about 1×SSC, 0.1×SSC, or deionized water. In general, hybridization incubation times are from 5 minutes to 24 hours, with 1, 2, or more washing steps, and wash incubation times are about 1, 2, or 15 minutes. SSC is 0.15 M NaCl and 15 mM citrate buffer. It is understood that equivalents of SSC using other buffer systems can be employed.

As used herein, "expression" refers to the process by which polynucleotides are transcribed into mRNA and/or the process by which the transcribed mRNA is subsequently being translated into peptides, polypeptides, or proteins. If the polynucleotide is derived from genomic DNA, expression may include splicing of the mRNA in a eukaryotic cell.

A "gene" refers to a polynucleotide containing at least one open reading frame (ORF) that is capable of encoding a particular polypeptide or protein after being transcribed and translated. A "gene product" or alternatively a "gene expression product" refers to the amino acid (e.g., peptide or polypeptide) generated when a gene is transcribed and translated.

"Under transcriptional control" is a term well understood in the art and indicates that transcription of a polynucleotide sequence, usually a DNA sequence, depends on its being operatively linked to an element which contributes to the initiation of, or promotes, transcription. "Operatively linked" intends the polynucleotides are arranged in a manner that allows them to function in a cell. In one aspect, this invention provides promoters operatively linked to the downstream sequences, e.g., HSV virulence genes or their mutants.

The term "encode" as it is applied to polynucleotides refers to a polynucleotide which is said to "encode" a polypeptide if, in its native state or when manipulated by methods well known to those skilled in the art, it can be transcribed and/or translated to produce the mRNA for the polypeptide and/or a fragment thereof. The antisense strand is the complement of such a nucleic acid, and the encoding sequence can be deduced therefrom.

The term "isolated" as used herein refers to molecules or biologicals or cellular materials being substantially free from other materials.

As used herein, the term "functional" may be used to modify any molecule, biological, or cellular material to intend that it accomplishes a particular, specified effect.

As used herein, the terms "nucleic acid sequence" and "polynucleotide" are used interchangeably to refer to a polymeric form of nucleotides of any length, either ribonucleotides or deoxyribonucleotides. Thus, this term includes, but is not limited to, single-, double-, or multi-stranded DNA or RNA, genomic DNA, cDNA, DNA-RNA hybrids, or a polymer comprising, or alternatively consisting essentially of, or yet further consisting of purine and pyrimidine bases or other natural, chemically or biochemically modified, non-natural, or derivatized nucleotide bases.

The term "wild-type" refers to a gene or gene product having characteristics of that gene or gene product when isolated from a naturally occurring source. In some embodiments, the wild type genes or gene products, even for one viral strain, contain slight different sequences.

The term "mutant" refers to a gene or gene product which displays modifications in sequence and or functional properties (i.e., altered characteristics) when compared to the wild-type gene or gene product or the gene or gene product from other mutant strain(s). In one embodiment, the other mutant strain comprise a 17TermA or an rR450 strain.

The term "mutation" refers to a DNA sequence variation from a wild type or other mutant strain (s). A mutation produces or does not produce a function property in an organism. There are multiple types of mutations, including but not limited to an insertion, a deletion, a truncation, a frameshift, a substitution, or a point mutation.

The term "point mutation" refers to a mutation with a single nucleotide base change, insertion, or deletion of the genetic material, DNA or RNA.

"Deletion" refers to a mutation in which a part of chromosome or a sequence of DNA is missing.

"Frameshift" refers to a mutation caused by indels (insertions or deletions) of a number of nucleotides in a DNA sequence that is not divisible by three.

"Substitution" refers to a mutation with a substitution of one or a few nucleotides of a gene.

"Truncation" refers to a mutation with elimination of the N- or C-terminal portion of a protein by proteolysis or manipulation of the structural gene, or premature termination of protein elongation due to the presence of a termination codon in its structural gene as a result of a nonsense mutation.

In some embodiment, the mutation is a nonsynonymous mutation. The term "nonsynonymous mutation" refers to a mutation that alters the amino acid sequence of a protein, which is contrasted with a synonymous mutation that do not alter amino acid sequences.

The term "promoter" as used herein refers to any sequence that regulates the expression of a coding sequence, such as a gene. Promoters may be constitutive, inducible, repressible, or tissue-specific, for example. A "promoter" is a control sequence that is a region of a polynucleotide sequence at which initiation and rate of transcription are controlled. It may contain genetic elements at which regulatory proteins and molecules may bind such as RNA polymerase and other transcription factors. Non-limiting exemplary promoters include Rous sarcoma virus (RSV) LTR promoter (optionally with the RSV enhancer), a cytomegalovirus (CMV) promoter, an SV40 promoter, a dihydrofolate reductase promoter, a β-actin promoter, a phosphoglycerol kinase (PGK) promoter, a U6 promoter, or an EF1 promoter. In some embodiments, the promoter is a chicken β-actin ("CBA") promoter.

Additional non-limiting exemplary promoters with certain target specificity are provided herein below including but not limited to CMV, EF1a, SV40, PGK1 (human or mouse), P5, Ubc, human beta actin, CAG, TRE, UAS, Ac5, Polyhedrin, CaMKIIa, Gal1, TEF1, GDS, ADH1, CaMV35S, Ubi, H1, U6, and Alpha-1-antitrypsin. Synthetically-derived promoters may be used for ubiquitous or tissue specific expression. Further, virus-derived promoters, some of which are noted above, may be useful in the methods disclosed herein, e.g., CMV, HIV, adenovirus, and AAV promoters. In some embodiments, the promoter is coupled to an enhancer to increase the transcription efficiency.

An enhancer is a regulatory element that increases the expression of a target sequence. A "promoter/enhancer" is a polynucleotide that contains sequences capable of providing both promoter and enhancer functions. For example, the long terminal repeats of retroviruses contain both promoter and enhancer functions. The enhancer/promoter may be "endogenous" or "exogenous" or "heterologous." An "endogenous" enhancer/promoter is one which is naturally linked with a given gene in the genome. An "exogenous" or "heterologous" enhancer/promoter is one which is placed in juxtaposition to a gene by means of genetic manipulation (i.e., molecular biological techniques) such that transcription of that gene is directed by the linked enhancer/promoter.

The term "tumor-specific promoter or tissue-specific promoter" as used herein means a promoter permitting expression of a gene, which is under control of the promoter, specifically in a desired tumor cell or tissue. Non-limiting examples of tissue-specific promoters that can be used in the invention include a prostate-specific antigen (PSA) promoter, a prostate-specific membrane antigen (PSMA) promoter, a casein promoter, an IgG promoter, a chorionic embryonic antigen promoter, an elastase promoter, a porphobilinogen deaminase promoter, an insulin promoter, a growth hormone factor promoter, an acetylcholine receptor promoter, an alcohol dehydrogenase promoter, and an α or β globin promoter.

Non-limiting examples of tumor-specific promoters to be used in the present invention include the telomerase reverse transcriptase promoter, the glial fibrillary acidic protein promoter, an E2F promoter; a survivin promoter, a COX-2 promoter, an EGD-2 promoter; an ELF-1 promoter; a hypoxia-specific promoter; a carcinoembryonic antigen promoter, and the stromelysin 3 promoter.

The term "cryopreservative" refers to a compound or material that is capable of, protecting the one or more tissues, virus, or other biological agents from being damaged or compromised. Examples of cryopreservatives include, but are not limited to, chondroitin sulfate, glycosaminoglycan dimethylsulfoxide, cell penetrating organic solutes, polysaccharides, glycerol, Dulbecco's minimum essential medium (DMEM), glutamine, D-glucose, sodium pyruvate, fetal calf serum, papaverine, DMSO, glycerol, trehalose, KH2PO4, K2HPO4, KCl, mannitol, NaHCO3, sodium ascorbate, 1,2-propanediol, formamide, 2,3-butanediol, probuchol, curcumin and mixtures thereof.

The term "protein", "peptide" and "polypeptide" are used interchangeably and in their broadest sense to refer to a compound of two or more subunits of amino acids, amino acid analogs or peptidomimetics. The subunits may be linked by peptide bonds. In another aspect, the subunit may be linked by other bonds, e.g., ester, ether, etc. A protein or peptide must contain at least two amino acids and no limitation is placed on the maximum number of amino acids which may comprise, or alternatively consist essentially of, or yet further consist of comprise, or alternatively consist essentially of, or yet further consist of a protein's or peptide's sequence. As used herein the term "amino acid" refers to either natural and/or unnatural or synthetic amino acids, including glycine and both the D and L optical isomers, amino acid analogs and peptidomimetics.

As used herein, the term "vector" refers to a non-chromosomal nucleic acid comprising, or alternatively consisting essentially of, or yet further consisting of an intact replicon such that the vector may be replicated when placed within a cell, for example by a process of transformation. Vectors may be viral or non-viral. Viral vectors include retroviruses, adenoviruses, herpes simplex virus ("HSV"), baculoviruses, modified baculoviruses, papovirus, or otherwise modified naturally occurring viruses. Exemplary non-viral vectors for delivering nucleic acid include naked DNA; DNA complexed with cationic lipids, alone or in combination with cationic polymers; anionic and cationic liposomes; DNA-protein complexes and particles comprising, or alternatively consisting essentially of, or yet further consisting of DNA condensed with cationic polymers such as heterogeneous polylysine, defined-length oligopeptides, and polyethylene imine, in some cases contained in liposomes; and the use of ternary complexes comprising, or alternatively consisting essentially of, or yet further consisting of a virus and polylysine-DNA.

A "viral vector" is defined as a recombinantly produced virus or viral particle that comprises, alternatively consists essentially of, or yet further consists of a polynucleotide to be delivered into a host cell, either in vivo, ex vivo or in vitro. Examples of viral vectors include retroviral vectors, HSV vectors, AAV vectors, lentiviral vectors, adenovirus vectors, alphavirus vectors and the like. Alphavirus vectors, such as Semliki Forest virus-based vectors and Sindbis virus-based vectors, have also been developed for use in gene therapy and immunotherapy. See, Schlesinger and Dubensky (1999) Curr. Opin. Biotechnol. 5:434-439 and Ying, et al. (1999) Nat. Med. 5(7):823-827.

In another embodiment, the expression of an HSV virulence protein (e.g., wild type or mutants) is regulated by a promoter that is an inducible promoter. In a specific related embodiment, the promoter is an inducible tetracycline promoter. The Tet-Off and Tet-On Gene Expression Systems give researchers ready access to the regulated, high-level gene expression systems described as Tet-Off and Tet-On. In the Tet-Off system, gene expression is turned on when tetracycline (Tc) or doxycycline (Dox; a Tc derivative) is removed from the culture medium. In contrast, expression is turned on in the Tet-On system by the addition of Dox. Both systems permit gene expression to be tightly regulated in response to varying concentrations of Tc or Dox. Maximal expression levels in Tet systems are very high and compare favorably with the maximal levels obtainable from strong, constitutive mammalian promoters such as CMV. Unlike other inducible mammalian expression systems, gene regulation in the Tet Systems is highly specific, so interpretation of results is not complicated by pleiotropic effects or non-specific induction. In E. coli, the Tet repressor protein (TetR) negatively regulates the genes of the tetracycline-resistance operon on the Tn10 transposon. TetR blocks transcription of these genes by binding to the tet operator sequences (tetO) in the absence of Tc. TetR and tetO provide the basis of regulation and induction for use in mammalian experimental systems. In the Tet-On system, the regulatory protein is based on a "reverse" Tet repressor (rTetR) which was created by four amino acid changes in TetR (Hillen & Berens, Mechanisms underlying expression of Tn10 encoded tetracycline resistance. Annu Rev Microbiol. 1994; 48:345-69; Gossen et al., Transcriptional activation by tetracyclines in mammalian cells. Science. 1995 Jun. 23; 268(5218):1766-9). The resulting protein, rtTA (reverse tTA also referred to tetracycline activator protein), is encoded by the pTet-On regulator plasmid.

In a related embodiment, the vector further comprises, or alternatively consists essentially of, or yet further consists of a nucleic acid encoding a tetracycline activator protein; and a promoter that regulates expression of the tetracycline activator protein.

Other inducible systems useful in vectors, isolated cells, viral packaging systems, and methods described herein include regulation by ecdysone, by estrogen, progesterone, chemical inducers of dimerization, and isopropyl-beta-D1-thiogalactopyranoside (IPTG).

As used herein, the term "recombinant expression system" or "recombinant vector" refers to a genetic construct or constructs for the expression of certain genetic material formed by recombination.

A "gene delivery vehicle" is defined as any molecule that can carry inserted polynucleotides into a host cell. Examples of gene delivery vehicles are liposomes, micelles biocompatible polymers, including natural polymers and synthetic polymers; lipoproteins; polypeptides; polysaccharides; lipopolysaccharides; artificial viral envelopes; metal particles; and bacteria, or viruses, such as baculovirus, adenovirus and retrovirus, bacteriophage, cosmid, plasmid, fungal vectors and other recombination vehicles typically used in the art which have been described for expression in a variety of eukaryotic and prokaryotic hosts, and may be used for gene therapy as well as for simple protein expression.

A polynucleotide disclosed herein can be delivered to a cell or tissue using a gene delivery vehicle. "Gene delivery," "gene transfer," "transducing," and the like as used herein, are terms referring to the introduction of an exogenous polynucleotide (sometimes referred to as a "transgene") into a host cell, irrespective of the method used for the introduction. Such methods include a variety of well-known techniques such as vector-mediated gene transfer (by, e.g., viral infection/transfection, or various other protein-based or lipid-based gene delivery complexes) as well as techniques facilitating the delivery of "naked" polynucleotides (such as electroporation, "gene gun" delivery and various other techniques used for the introduction of polynucleotides). The introduced polynucleotide may be stably or transiently maintained in the host cell. Stable maintenance typically requires that the introduced polynucleotide either contains an origin of replication compatible with the host cell or integrates into a replicon of the host cell such as an extra-chromosomal replicon (e.g., a plasmid) or a nuclear or mitochondrial chromosome. A number of vectors are known to be capable of mediating transfer of genes to mammalian cells, as is known in the art and described herein.

A "plasmid" is an extra-chromosomal DNA molecule separate from the chromosomal DNA which is capable of replicating independently of the chromosomal DNA. In many cases, it is circular and double-stranded. Plasmids provide a mechanism for horizontal gene transfer within a population of microbes and typically provide a selective advantage under a given environmental state. Plasmids may carry genes that provide resistance to naturally occurring antibiotics in a competitive environmental niche, or alternatively the proteins produced may act as toxins under similar circumstances.

"Plasmids" used in genetic engineering are called "plasmid vectors". Many plasmids are commercially available for such uses. The gene to be replicated is inserted into copies of a plasmid containing genes that make cells resistant to particular antibiotics and a multiple cloning site (MCS, or polylinker), which is a short region containing several commonly used restriction sites allowing the easy insertion of DNA fragments at this location. Another major use of plasmids is to make large amounts of proteins. In this case, researchers grow bacteria containing a plasmid harboring the gene of interest. Just as the bacterium produces proteins to confer its antibiotic resistance, it can also be induced to produce large amounts of proteins from the inserted gene.

The term "herpes simplex virus" or "HSV" as used herein means a herpes simplex virus that produces the effect of the present invention, which includes a wild type or mutant herpes simplex virus. In one embodiment, the mutant non-natural HSV is obtained by mutating or modifying any of the genes of wild-type HSV or by inserting any of exogenous genes. The serum type of HSV comprises, alternatively consists essentially of, or yet further consists of a type 1 HSV (or HSV-1) or a type 2 HSV (or HSV-2). The HSV-1 is an enveloped, double-stranded DNA virus. In one embodiment, the HSV-1 can infect a human cell. In another embodiment, a sequence, a gene or multiple genes can be incorporated to the HSV-1. The size of incorporated sequence can be approximate 1 base, 5 bases, 10 bases, 100 bases, 1 kb, 10 kb, 100 kb, or 150 kb. HSV-1 can induce cell lysis at a relatively low multiplicity of infection (MOI), and its proliferation can be inhibited by anti-viral drugs. In one embodiment, the HSV viral DNA stays outside the chromosomes without being incorporated into the genome of host cells. The HSV-1 can encompass a variety of strains (e.g., KOS and McKrae). See Wang et al., (2013) Virus Res. 173(2):436-440. In one embodiment, the HSV-1 is an HSV-1 KOS strain. In another embodiment, the HSV-1 is an HSV-1 McKrae strain.

There are several HSV mutants, for example, 17TermA HSV and rRp450 HSV. The term "17TermA HSV" refers to mutant HSV-1 virus that comprises the entire ICP34.5 gene, but with a termination codon inserted before 100 bp of coding region, resulting in early termination of protein expression and expression of a 30 amino acid truncated protein. The 17TermA HSV mutant displays a growth defect because of the truncated ICP34.5 protein. See Orvedahl et al., (2007) Cell Host & Microbe, 1:1, 23-25. The term "rRp450" refers to an attenuated herpes simplex 1 vector deficient in the viral-encoded ribonucleotide reductase or ICP6. See Aghi M et al., (1999) Cancer Res., 59(16):3861-5.

The HSV genome encodes multiple virulence proteins, which include but are not limited to glycoprotein E ("gE"), Infected Cell Protein 0 ("ICP0"), Infected Cell Protein 6 ("ICP6"), DNA packaging terminase subunit 1, Infected Cell Protein 8 ("ICP8"), and Infected Cell Protein 34.5 ("ICP34.5"). An exemplary HSV1 genome can be found at NCBI Reference Sequence: NC_001806.2, last accessed on Mar. 13, 2020.

The term "gE-encoding gene" refers to a gene or its DNA fragment encoding a gE protein. An exemplary gE-encoding gene can be identified at positions 33-2555 of the HSV-1 genome sequence at NCBI Reference Sequence: NC_001806.2. The term "ICP6 protein" refers to an infected cell protein 6 encoded by the HSV genome. ICP6 is a subunit of ribonucleotide reductase ("RR") and a key enzyme for nucleotide metabolism and viral DNA synthesis in non-dividing cells.

A "dysfunctional" protein refers to a protein that has an impaired or no function of the original protein. In one embodiment, a dysfunctional protein is caused by deletion or substitution in the coding sequences. For example, with a dysfunctional ICP6 gene, be deletion or inactivation, HSV cannot replicate in normal non-dividing cells. In actively dividing cells with increased RR activity, however, the deficient enzyme activity of the virus is compensated, enabling the virus to replicate. The DNA and amino acid sequences of ICP 34.5 are provided in SEQ ID Nos: 1, 2, and 5-10. The DNA and amino acid sequences of gE are provided in SEQ ID Nos: 12-19. The DNA and amino acid sequences of ICP 0 are provided in SEQ ID Nos: 20-26. The DNA and amino acid sequences of DNA packaging terminase subunit 1 are provided in SEQ ID Nos: 35-42. The DNA and amino acid sequences of ICP 8 are provided in SEQ ID Nos: 27-34. The DNA and amino acid sequences of ICP 6 are provided in SEQ ID Nos: 43-50.

The term "ICP0-encoding gene" refers to a gene or its DNA fragment encoding an ICP0 protein. Exemplary DNA and amino acid sequences of ICP 0 are provided in SEQ ID Nos: 20-26. The term "DNA packaging terminase subunit 1-encoding gene" refers to a gene or its DNA fragment encoding a DNA packaging terminase subunit 1 protein or peptide. Exemplary DNA and amino acid sequences of DNA packaging terminase subunit 1 are provided in SEQ ID Nos: 35-42. The term "ICP 8-encoding gene" refers to a gene or its DNA fragment encoding an ICP 8 protein. Exemplary DNA and amino acid sequences of ICP 8 are provided in SEQ ID Nos: 27-34. The term "ICP 34.5-encoding gene" refers to a gene or its DNA fragment encoding an ICP 34.5 protein. Exemplary DNA and amino acid sequences of ICP 34.5 are provided in SEQ ID Nos: 1, 2, and 5-10. The term "glycoprotein E ("gE")-encoding gene" refers to a gene or its DNA fragment encoding an gE protein. Exemplary DNA and amino acid sequences of gE are provided in SEQ ID Nos: 12-19.

The term "deletion or inactivation of a gene" means deletion of the whole or portion of the gene or suppression of expression of the gene through substitution of some bases, modification, insertion of an unnecessary sequence or the like. The deletion or inactivation of the HSV gene (e.g., gE, ICP0, and ICP8) can be conducted by those skilled in the art in a known method or a method based thereon. For example, a method using homologous recombination can be employed. For example, it is possible to divide and inactivate the HSV gene by cloning a DNA fragment containing a portion of the HSV gene and a sequence unrelated to the HSV gene in a suitable plasmid vector and then introducing it into HSV to cause homologous recombination in some region of the HSV gene. Alternatively, the mutation or deletion of an HSV gene can be caused by spontaneous mutation in the viral passage.

In aspects where gene transfer is mediated by a DNA viral vector, such as an herpes simplex virus, a vector construct refers to the polynucleotide comprising, or alternatively consisting essentially of, or yet further consisting of the viral genome or part thereof, and a transgene. Thus, in one aspect, the non-natural HSV further comprises a transgene coding for a therapeutic polynucleotide or protein.

Vectors that contain both a promoter and a cloning site into which a polynucleotide can be operatively linked are well known in the art. Such vectors are capable of transcribing RNA in vitro or in vivo, and are commercially available from sources such as Agilent Technologies (Santa Clara, Calif.) and Promega Biotech (Madison, Wis.). In order to optimize expression and/or in vitro transcription, it may be necessary to remove, add or alter 5' and/or 3' untranslated portions of the clones to eliminate extra, potential inappropriate alternative translation initiation codons or other sequences that may interfere with or reduce expression, either at the level of transcription or translation. Alternatively, consensus ribosome binding sites can be inserted immediately 5' of the start codon to enhance expression.

Gene delivery vehicles also include DNA/liposome complexes, micelles and targeted viral protein-DNA complexes. Liposomes that also comprise, or alternatively consist essentially of, or yet further consist of comprise, or alternatively consist essentially of, or yet further consist of a targeting antibody or fragment thereof can be used in the methods disclosed herein. In addition to the delivery of polynucleotides to a cell or cell population, direct introduction of the proteins described herein to the cell or cell population can be done by the non-limiting technique of protein transfection, alternatively culturing conditions that can enhance the expression and/or promote the activity of the proteins disclosed herein are other non-limiting techniques.

As used herein, the term "signal peptide" or "signal polypeptide" intends an amino acid sequence usually present at the N-terminal end of newly synthesized secretory or membrane polypeptides or proteins. It acts to direct the polypeptide to a specific cellular location, e.g. across a cell membrane, into a cell membrane, or into the nucleus. In some embodiments, the signal peptide is removed following localization. Examples of signal peptides are well known in the art. Non-limiting examples are those described in U.S. Pat. Nos. 8,853,381, 5,958,736, and 8,795,965.

In one aspect, the HSV are detectably labeled. As used herein, the term "label" intends a directly or indirectly detectable compound or composition that is conjugated directly or indirectly to the composition to be detected, e.g., polynucleotide or protein such as an antibody so as to generate a "labeled" composition. The term also includes sequences conjugated to the polynucleotide that will provide a signal upon expression of the inserted sequences, such as green fluorescent protein (GFP) and the like. The label may be detectable by itself (e.g., radioisotope labels or fluorescent labels) or, in the case of an enzymatic label, may catalyze chemical alteration of a substrate compound or composition which is detectable. The labels can be suitable for small scale detection or more suitable for high-throughput screening. As such, suitable labels include, but are not limited to radioisotopes, fluorochromes, chemiluminescent compounds, dyes, and proteins, including enzymes. The label may be simply detected, or it may be quantified. A response that is simply detected generally comprises, alternatively consists essentially of, or yet further consists of a response whose existence merely is confirmed, whereas a response that is quantified generally comprises, alternatively consists essentially of, or yet further consists of a response having a quantifiable (e.g., numerically reportable) value such as an intensity, polarization, and/or other property. In luminescence or fluorescence assays, the detectable response may be generated directly using a luminophore or fluorophore associated with an assay component actually involved in binding, or indirectly using a luminophore or fluorophore associated with another (e.g., reporter or indicator) component.

Examples of luminescent labels that produce signals include but are not limited to bioluminescence and chemiluminescence. Detectable luminescence response generally comprises, alternatively consists essentially of, or yet further consists of a change in, or an occurrence of, a luminescence signal. Suitable methods and luminophores for luminescent labeling assay components are known in the art and described for example in Haugland, Richard P. (1996) Handbook of Fluorescent Probes and Research Chemicals (6th ed.). Examples of luminescent probes include, but are not limited to, aequorin and luciferases.

Examples of suitable fluorescent labels include, but are not limited to, fluorescein, rhodamine, tetramethylrhodamine, eosin, erythrosin, coumarin, methyl-coumarins, pyrene, Malacite green, stilbene, Lucifer Yellow, Cascade Blue™, and Texas Red. Other suitable optical dyes are described in the Haugland, Richard P. (1996) Handbook of Fluorescent Probes and Research Chemicals (6th ed.).

In another aspect, the fluorescent label is functionalized to facilitate covalent attachment to a cellular component present in or on the surface of the cell or tissue such as a cell surface marker. Suitable functional groups, including, but not are limited to, isothiocyanate groups, amino groups, haloacetyl groups, maleimides, succinimidyl esters, and sulfonyl halides, all of which may be used to attach the fluorescent label to a second molecule. The choice of the functional group of the fluorescent label will depend on the site of attachment to either a linker, the agent, the marker, or the second labeling agent.

Attachment of the fluorescent label may be either directly to the cellular component or compound or alternatively, can by via a linker. Suitable binding pairs for use in indirectly linking the fluorescent label to the intermediate include, but are not limited to, antigens/antibodies, e.g., rhodamine/anti-rhodamine, biotin/avidin and biotin/strepavidin.

The phrase "solid support" refers to non-aqueous surfaces such as "culture plates" "gene chips" or "microarrays." Such gene chips or microarrays can be used for diagnostic and therapeutic purposes by a number of techniques known to one of skill in the art. In one technique, oligonucleotides are attached and arrayed on a gene chip for determining the DNA sequence by the hybridization approach, such as that outlined in U.S. Pat. Nos. 6,025,136 and 6,018,041. The polynucleotides of this invention can be modified to probes, which in turn can be used for detection of a genetic sequence. Such techniques have been described, for example, in U.S. Pat. Nos. 5,968,740 and 5,858,659. A probe also can be attached or affixed to an electrode surface for the electrochemical detection of nucleic acid sequences such as described by Kayem et al. U.S. Pat. No. 5,952,172 and by Kelley et al. (1999) Nucleic Acids Res. 27:4830-4837.

A "composition" is intended to mean a combination of active polypeptide, polynucleotide or antibody and another compound or composition, inert (e.g., a detectable label) or active (e.g., a gene delivery vehicle).

A "pharmaceutical composition" is intended to include the combination of an active polypeptide, polynucleotide or antibody with a carrier, inert or active such as a solid support, making the composition suitable for diagnostic or therapeutic use in vitro, in vivo or ex vivo.

As used herein, the term "pharmaceutically acceptable carrier" encompasses any of the standard pharmaceutical carriers, such as a phosphate buffered saline solution, water, and emulsions, such as an oil/water or water/oil emulsion, and various types of wetting agents. The compositions also can include stabilizers and preservatives. For examples of carriers, stabilizers and adjuvants, see Martin (1975) Remington's Pharm. Sci., 15th Ed. (Mack Publ. Co., Easton).

A "subject" of diagnosis or treatment is a cell or an animal such as a mammal, or a human. A subject is not limited to a specific species and includes non-human animals subject to diagnosis or treatment and are those subject to infections or animal models, for example, simians, murines, such as, rats, mice, chinchilla, canine, such as dogs, cats, leporids, such as rabbits, livestock, sport animals, and pets. Human patients are included within the term as well.

The term "tissue" is used herein to refer to tissue of a living or deceased organism or any tissue derived from or designed to mimic a living or deceased organism. The tissue may be healthy, diseased, and/or have genetic mutations. The biological tissue may include any single tissue (e.g., a collection of cells that may be interconnected) or a group of tissues making up an organ or part or region of the body of an organism. The tissue may comprise, or alternatively consist essentially of, or yet further consist of comprise, or alternatively consist essentially of, or yet further consist of a homogeneous cellular material or it may be a composite structure such as that found in regions of the body including the thorax which for instance can include lung tissue, skeletal tissue, and/or muscle tissue. Exemplary tissues include, but are not limited to those derived from liver, lung, thyroid, skin, pancreas, blood vessels, bladder, kidneys, brain, biliary tree, duodenum, abdominal aorta, iliac vein, heart and intestines, including any combination thereof.

As used herein, "treating" or "treatment" of a disease in a subject refers to (1) preventing the symptoms or disease from occurring in a subject that is predisposed or does not yet display symptoms of the disease; (2) inhibiting the disease or arresting its development; or (3) ameliorating or causing regression of the disease or the symptoms of the disease. As understood in the art, "treatment" is an approach for obtaining beneficial or desired results, including clinical results. For the purposes of the present technology, beneficial or desired results can include one or more, but are not limited to, alleviation or amelioration of one or more symptoms, diminishment of extent of a condition (including a disease), stabilized (i.e., not worsening) state of a condition (including disease), delay or slowing of condition (including disease), progression, amelioration or palliation of the condition (including disease), states and remission (whether partial or total), whether detectable or undetectable.

As used herein the term "effective amount" intends to mean a quantity sufficient to achieve a desired effect. In the context of therapeutic or prophylactic applications, the effective amount will depend on the type and severity of the condition at issue and the characteristics of the individual subject, such as general health, age, sex, body weight, and tolerance to pharmaceutical compositions. In the context of gene therapy, in some embodiments the effective amount is the amount sufficient to result in regaining part or full function of a gene that is deficient in a subject. In one aspect, an effective amount is an amount to provide a multiplicity of infection (MOI) of from 0.001 to 1 infectious viral particles per cell in ranges in between. Non-limiting examples include a multiplicity of infection (MOI) of at least 0.001, or at least 0.01, or at least 0.1 or at least 1, or from 0.01 to 1, or from 0.1 to 1, or from about 0.01 to 0.1, or less than 1, or less than 0.1, or less than 0.01 infectious viral particles per cell. In other embodiments, the effective amount of an HSV viral particle is the amount sufficient to result in cell lysis in a subject. In some embodiments, the effective amount is the amount required to increase galactose metabolism in a subject in need thereof. The skilled artisan will be able to determine appropriate amounts depending on these and other factors.

In some embodiments the effective amount will depend on the size and nature of the application in question. It will also depend on the nature and sensitivity of the target subject and the methods in use. The skilled artisan will be able to determine the effective amount based on these and other considerations. The effective amount may comprise, or alternatively consist essentially of, or yet further consist of comprise, or alternatively consist essentially of, or yet further consist of one or more administrations of a composition depending on the embodiment.

As used herein, the term "administer" or "administration" intends to mean delivery of a substance to a subject such as an animal or human. Administration can be affected in one dose, continuously or intermittently throughout the course of treatment, e.g. intratumorally or intravenously. Methods of determining the most effective means and dosage of administration are known to those of skill in the art and will vary with the composition used for therapy, the purpose of the therapy, as well as the age, health or gender of the subject being treated. Single or multiple administrations can be carried out with the dose level and pattern being selected by the treating physician or in the case of pets and animals, treating veterinarian. Suitable dosage formulations and methods of administering the agents are known in the art. Route of administration can also be determined and method of determining the most effective route of administration are known to those of skill in the art and will vary with the composition used for treatment, the purpose of the treatment, the health condition or disease stage of the subject being treated and the target cell or tissue. Non-limiting examples of route of administration include direct and systemic, e.g., intravenous, intra-arterial, intramuscular, intracardiac, intrathecal, subventricular, epidural, intracerebral, intratumorally, intracranially, intracerebroventricular, sub-retinal, intravitreal, intraarticular, intraocular, intraperitoneal, intrauterine, intradermal, subcutaneous, transdermal, transmucosal, and inhalation.

Oncolytic Herpes Simplex Virus (oHSV)

The efficacy of oHSVs against tumors is derived from direct cell killing (lytic phase) and enhancing anticancer immunity (immune phase). These viruses have been constructed in various ways to selectively target cancer cells. To achieve cancer selectivity, the most common mutation is deletion of the neurovirulence gene, $\gamma_1 34.5$/RL1. Expression of ICP34.5, encoded by $\gamma_1 34.5$/RL1, is essential for HSV-1 to counteract the host cell anti-viral protein kinase RNA-activated (PKR)-pathway that normally phosphorylates e-IF2α in response to virus infection and stops protein translation. ICP34.5 redirects cellular protein phosphatase-1 (PP1) to dephosphorylate e-IF2α, allowing productive virus replication. Many cancer cells are defective in the PKR response, and therefore support the replication of HSV vectors including $\gamma_1 34.5$-null mutants. Some vectors are constructed by mutating critical metabolic viral genes such as ribonucleotide reductase (RR, the large subunit of which is encoded by the ICP6/UL39 gene). Since many malignant cells have increased expression and activity of RR, ICP6-null mutants selectively replicate in highly proliferating cancer cells because of the large ribonucleotide pools present.

HSV Entry, Cell-Cell Spread and Syncytia Formation

The entry of HSV-1 involves serial steps of viral glycoproteins interacting with cellular surface molecules. First, glycoproteins B and C (gB and gC) attach to cell heparan sulfate proteoglycans followed by binding of gD to virus entry receptors (i.e., nectin-1, herpesvirus entry mediator (HVEM), or 3-O-sulfated heparan sulfate (3-OS-HS)). The process further allows gH/gL to interact with gB and trigger fusion of the viral envelope to the target cell membrane, resulting in release of the virion capsid and tegument proteins into the cell. Several reports suggest that membrane fusion is also crucial for subsequent lateral spread of virus between neighboring cells. Viral cell-cell spread takes place when virus spread from infected cells to adjacent uninfected cells through areas of cell contact, which can even occur in the presence of virus neutralizing antibody. The presence of gE/gI enhances cell-cell spread, whereas gE hypomorph mutants reduce cell-cell fusion and plaque size. Syncytia are the result of multiple adjacent cells fusing together into multinucleated giant cells. Mutations that trigger syncytia have been discovered in at least four HSV viral genes (i.e., gB, gK, UL20 and UL24).

This disclosure provides a strategy to combine "directed evolution" and CRISPR/Cas9 technology for development of clinically relevant viral vectors. This effective combination represents a substantive departure from prior art approaches. Without being bound by theory, it is anticipated that unexpected mechanisms can lead to increased viral potency for killing tumors. This is anticipated to reveal previously unknown mutation(s) that cause a hyperfusogenic phenotype and increased potency, as well as the stepping stone for developing next generation oHSVs. The oHSVs so produced have an enhanced lytic phase, longer sustainability, and maximized therapeutic outcome, which is in line with the purpose of National Cancer Institute's Clinical and Translational Exploratory/Developmental Studies.

Although the focus is on the "lytic phase" of virotherapy, a longer sustained virus response would boost the inflammatory response in vivo, benefitting the subsequent "immune phase" of virotherapy to reach optimal anti-tumor efficacy. Efficacy studies in pediatric cancer models can address the use of the non-natural HSV in addressing childhood cancers. The resulting improved viruses are anticipated to be active across a variety of adult cancers as well.

Modes for Carrying Out the Disclosure

Despite HSVs can target or infect a broad range of cells to induce lysis, the viral infection itself has caused cytotoxicity and other disorders, e.g., encephalitis, esophagitis, and pneumonitis. A large number of HSV genes affects pathogenicity. For example, γ34.5 (RL1) can cause neuropathogenicity. ICP6 (UL39), ribonucleotide reductase, thymidine kinase (UL23), uracil DNA glycosylase (UL2), dUTPase (UL50), and DNA polymerase (UL30) are involved in nucleotide metabolism and virulence of HSVs. Therefore, there is a need to produce an attenuated, yet replication-competent HSV particle to carry out its function of tumor inhibition, while minimizing its side-effects.

Figure 1B:
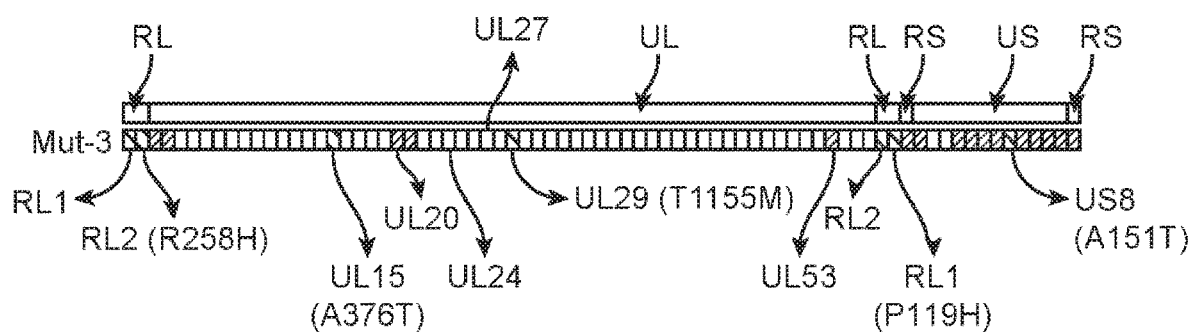

Provided herein is a new virus, named Mut-3, that exhibits a giant syncytial plaque phenotype. Applicant isolated Mut-3 from the serial passage of mixing 17TermA and rRp450 in a non-permissive line ("Directed Evolution") and constructed the attenuated mutant Mut-3Δ34.5 via gene editing (the "CRISPR/Cas9" step) (FIG. 1A). Whole genome sequence analysis revealed that Mut-3 acquired intact copies of both $\gamma_1$34.5/RL1 and UL39 (which encodes ICP6), making its genotype resemble that of a wild type (WT) virus. Without being bound by theory, Applicants found that the lytic activity of Mut-3 is even greater than many WT viruses, suggesting other genomic alterations (in addition to its complete virus genome) may be involved in its increased potency. Five nonsynonymous mutations in Mut-3 that are different from either parent virus including an Alanine to Threonine mutation at position 151 (A151T) in the gene that encodes gE were found. An attenuated version of Mut-3 virus is provided that replaces $\gamma_1$34.5/RL1 with green fluorescent protein (GFP) via CRISPR/Cas9 gene editing, designated as Mut-3Δ34.5 (FIG. 1A, bottom, labeled as the "CRISPR/Cas9" step). See, FIG. 1B showing a result summary of sequence comparison of Mut-3 with its parent viruses. Non-synonymous mutations that differ from either parent in Mut-3 are shaded with back slashes, including UL15, UL29, US8, RL1 and RL2. Genome sequences that are identical to 17TermA are indicated as blank boxes; those identical to rRp450 are shaded with forward slashes.

Therefore, this disclosure provides a non-natural herpes simplex virus ("HSV"), wherein the virus comprises, alternatively consists essentially of, or yet further consists of a mutation in a virulence gene that is one or more from the group of: (a) a glycoprotein E ("gE")-encoding gene, (b) an Infected Cell Protein 0 ("ICP0")-encoding gene, (c) a DNA packaging terminase subunit 1-encoding gene, (d) an ICP8-encoding gene, or (e) an ICP34.5-encoding gene. In one embodiment, the HSV further comprises, alternatively consists essentially of, or yet further consists of a gene encoding a dysfunctional ICP34.5 protein and/or a gene encoding a dysfunctional ICP6 protein. In another embodiment, the gene encoding the dysfunctional ICP34.5 protein comprises, alternatively consists essentially of, or yet further consists of a polynucleotide having a sequence at least 95% identical to SEQ ID No. 1, 5, 7, 9, or 51, and equivalents thereof with the proviso that the equivalent maintains the mutated or altered amino acid or nucleotides. In another embodiment, the gene encoding the dysfunctional ICP6 protein comprises, alternatively consists essentially of, or yet further consists of, or consists essentially of, or yet further consists of, a polynucleotide having a sequence at least 95% identical to SEQ ID No. 43, 45, 47, or 49, and equivalents thereof with the proviso that the equivalent maintains the mutated or altered amino acid or nucleotides as compared to wt sequence.

In certain embodiment, the gE encoding gene of the non-natural herpes simplex virus comprises, alternatively consists essentially of, or yet further consists of a polynucleotide having a sequence selected from SEQ ID NOs: 12, 14, 16, 18, a sequence at least 80%, 85%, 90%, 95%, 97% or 99% identical to any one of SEQ ID NOs: 12, 14, 16, and 18, and an equivalent thereof with the proviso that the equivalent maintains the mutated or altered amino acid or nucleotides as compared to wt sequence. In a further embodiment, the HSV comprising such equivalent enters cells and/or spread among the cells and/or replicates DNAs at a level comparable to a non-natural HSV comprising the mutated gE having an amino acid sequence of SEQ ID NO: 13. A non-limiting example of evaluating a HSV entering cells, spreading among the cells and replicating DNAs can be found in the Examples. In yet a further embodiment, the polynucleotide of the gE encoding gene encodes a polypeptide having an amino acid sequence selected from SEQ ID NOs: 13, 15, 17, and 19.

In certain embodiment, the ICP0 encoding gene of the non-natural herpes simplex virus comprises, alternatively consists essentially of, or yet further consists of a polynucleotide having a sequence selected from SEQ ID NOs: 20, 22, 24, 25, and 53, a sequence of any one of SEQ ID NOs: 20, 22, 24, 25, and 53 free of one or both of introns, a sequence at least 80%, 85%, 90%, 95%, 97% or 99% identical to SEQ ID NOs: 20, 22, 24, 25, and 53, and an equivalent thereof with the proviso that the equivalent maintains the mutated or altered amino acid or nucleotides as compared to wt sequence. In one embodiment, the introns are noted in the Sequence Listing as well as in the following: nucleotide (nt) 58 to nt 861 of SEQ ID NO: 20, nt 1529 to nt 1663 of SEQ ID NO: 20, nt 58 to nt 822 of SEQ ID NO: 22, nt 1490 to nt 1625 of SEQ ID NO: 22, 58 to nt 862 of SEQ ID NO: 24, nt 1530 to nt 1668 of SEQ ID NO: 24, nt 58 to nt 861 of SEQ ID NO: 25, nt 1529 to nt 1663 of SEQ ID NO: 25, nt 58 to nt 822 of SEQ ID NO: 53, and nt 1490 to nt 1625 of SEQ ID NO: 53. In a further embodiment, the equivalent encodes a polypeptide of ICP0 having a function (for example, of promoting transcription from viral genes, disrupting structures in the nucleus known as nuclear dots or promyelocytic leukemia (PML) nuclear bodies, and altering the expression of host and viral genes in combination with a neuron specific protein) at a level comparable to wild-type ICP0 or the mutated ICP0 having an amino acid sequence of SEQ ID NO: 21. Examples of evaluating such functions can be found, Lee H R, Kim D J, Lee J M, et al. (June 2004). "Ability of the human cytomegalovirus IE1 protein to modulate sumoylation of PML correlates with its functional activities in transcriptional regulation and infectivity in cultured fibroblast cells". J. Virol. 78 (12): 6527-42; Gu H, Liang Y, Mandel G, Roizman B (May 2005). "Components of the REST/CoREST/histone deacetylase repressor complex are disrupted, modified, and translocated in HSV-1-infected cells". Proc. Natl. Acad. Sci. U.S.A. 102 (21): 7571-6; and Pinnoji R C, Bedadala G R, George B, Holland T C, Hill J M, Hsia S C (2007). "Repressor element-1 silencing transcription factor/neuronal restrictive silencer factor (REST/NRSF) can regulate HSV-1 immediate-early transcription via histone modification". Virol. J. 4: 56. Additionally or alternatively, the HSV comprising such equivalent enters cells and/or spread among the cells and/or replicates DNAs at a level comparable to a non-natural HSV comprising the mutated ICP0 having an amino acid sequence of SEQ ID NO: 21. A non-limiting example of evaluating a HSV entering cells, spreading among the cells and replicating DNAs can be found in the Examples. In yet a further embodiment, the polynucleotide of the ICP0 encoding gene encodes a polypeptide having an amino acid sequence selected from SEQ ID NOs: 21, 23, and 26.

In certain embodiment, the ICP8 encoding gene of the non-natural herpes simplex virus comprises, alternatively consists essentially of, or yet further consists of a polynucleotide having a sequence selected from SEQ ID NOs: 27, 29, 31, 33, a sequence at least 80%, 85%, 90%, 95%, 97% or 99% identical to any one of SEQ ID NO: 27, 29, 31, and 33, and an equivalent thereof with the proviso that the equivalent maintains the mutated or altered amino acid or nucleotides as compared to wt sequence. In a further embodiment, the equivalent encodes a polypeptide of ICP8 having a function (for example, of annealing to single-stranded DNA (ssDNA), melting small fragments of double-stranded DNA, or destabilizing duplex DNA during initiation of replication) at a level comparable to wild-type ICP8 or the mutated ICP8 having an amino acid sequence of SEQ ID NO: 28. Such functions can be evaluated via methods available in the art, for example, Boehmer, P E; Lehman, I R (1993). "Herpes simplex virus type 1 ICP8: Helix-destabilizing properties". Journal of Virology. 67 (2): 711-5. Additionally or alternatively, the HSV comprising such equivalent enters cells and/or spread among the cells and/or replicates DNAs at a level comparable to a non-natural HSV comprising the mutated ICP8 having an amino acid sequence of SEQ ID NO: 28. A non-limiting example of evaluating a HSV entering cells, spreading among the cells and replicating DNAs can be found in the Examples. In yet a further embodiment, the polynucleotide of the ICP8 encoding gene encodes a polypeptide having an amino acid sequence selected from SEQ ID NOs: 28, 30, 32, and 34.

In certain embodiment, the DNA packaging terminase subunit 1 encoding gene of the non-natural herpes simplex virus comprises, alternatively consists essentially of, or yet further consists of a polynucleotide having a sequence selected from SEQ ID NOs: 35, 37, 39, 41, a sequence at least 80%, 85%, 90%, 95%, 97% or 99% identical to any one of SEQ ID NOs: 35, 37, 39, and 41, and an equivalent thereof with the proviso that the equivalent maintains the mutated or altered amino acid or nucleotides as compared to wt sequence. In a further embodiment, the HSV comprising such equivalent enters cells and/or spread among the cells and/or replicates DNAs at a level comparable to a non-natural HSV comprising the mutated DNA packaging terminase subunit 1 having an amino acid sequence of SEQ ID NO: 36. A non-limiting example of evaluating a HSV entering cells, spreading among the cells and replicating DNAs can be found in the Examples. In a further embodiment, the polynucleotide of the DNA packaging terminase subunit 1 encoding gene encodes a polypeptide having an amino acid sequence selected from SEQ ID NOs: 36, 38, 40, and 42.

In certain embodiment, the HSV comprises, alternatively consists essentially of, or yet further consists of one or more of polynucleotide(s) having a sequence selected from SEQ ID NOs: 12, 20, 27, and 35. In a further embodiment, the HSV does not have a functional ICP34.5 (i.e., encoding a dysfunctional ICP34.5 or not encoding an ICP34.5). Additionally or alternatively, the HSV does not have a functional ICP6 (i.e., encoding a dysfunctional ICP6 or not encoding an ICP6). In another embodiment, the mutation in the virulence gene comprises, or consists essentially of, or yet further consists of, an insertion, a deletion, a truncation, a frameshift, a substitution, or a point mutation, for example, of the ICP34.5 gene and/or of the ICP6 gene. In another embodiment, the HSV lacks a gene encoding a functional ICP34.5 protein and/or a functional ICP6 protein. In another embodiment, the mutation is a nonsynonymous mutation in the virulence gene.

In one embodiment, the mutation on the non-natural HSV of the disclosure encodes one or more of: (a) an alanine-to-threonine mutation at position 151 of the gE protein, (b) an arginine-to-histidine mutation at position 258 of the ICP0 protein, (c) an alanine-to-threonine mutation at position 376 of the DNA packaging terminase subunit 1 protein, (d) a threonine-to-methionine mutation at position 1155 of the ICP8 protein, or (e) a proline-to-histidine mutation at position 119 of the ICP34.5 protein. In another embodiment, the non-natural HSV comprises, or alternatively consists essentially of, or yet further consists of one or more of SEQ ID No. 2, SEQ ID No. 13, SEQ ID No. 21, SEQ ID No. 28, or SEQ ID No. 36, and equivalents thereof with the proviso that the equivalent maintains the mutated or altered amino acid or nucleotides.

In certain embodiment, provided is a non-natural herpes simplex virus ("HSV"), wherein the virus comprises, alternatively consists essentially of, or yet further consists of a mutation in one or more of: (a) a gE, (b) an ICP0, (c) a DNA packaging terminase subunit 1, (d) an ICP8, or (e) an ICP34.5. In certain embodiment, the HSV does not comprise a functional ICP34.5 protein (for example, an ICP34.5 of the 17TermA strain or of the rRp450 strain). In a further embodiment, the HSV does not comprise any ICP34.5 protein. Additionally or alternatively, the HSV does not comprise a functional ICP6 protein (for example, an ICP6 of the 17TermA strain or of the rRp450 strain). In yet a further embodiment, the HSV does not comprise any ICP6 protein.

In one embodiment, the mutation(s) on the non-natural HSV of the disclosure is/are one or more of: (a) an alanine-to-threonine mutation at position 151 of the gE protein, (b) an arginine-to-histidine mutation at position 258 of the ICP0 protein, (c) an alanine-to-threonine mutation at position 376 of the DNA packaging terminase subunit 1 protein, (d) a threonine-to-methionine mutation at position 1155 of the ICP8 protein, or (e) a proline-to-histidine mutation at position 119 of the ICP34.5 protein.

In certain embodiment, the gE of the non-natural HSV comprises, alternatively consists essentially of, or yet further consists of an amino acid sequence selected from SEQ ID NOs: 13, 15, 17 and 19. In a further embodiment, the non-natural HSV further comprises a polynucleotide encoding the amino acid sequence of the gE, for example, a polynucleotide having a sequence selected from SEQ ID NOs: 12, 14, 16, 18, and an equivalent thereof. In certain embodiment, the ICP0 of the non-natural HSV comprises, alternatively consists essentially of, or yet further consists of an amino acid sequence selected from SEQ ID NOs: 21, 23, and 26. In a further embodiment, the non-natural HSV further comprises a polynucleotide encoding the amino acid sequence of the ICP0, for example, a polynucleotide having a sequence selected from SEQ ID NOs: 20, 22, 24, 25, 53 and an equivalent thereof. In certain embodiment, the ICP8 of the non-natural HSV comprises, alternatively consists essentially of, or yet further consists of an amino acid sequence selected from SEQ ID NOs: 28, 30, 32 and 34. In a further embodiment, the non-natural HSV further comprises a polynucleotide encoding the amino acid sequence of the ICP8, for example, a polynucleotide having a sequence selected from SEQ ID NOs: 27, 29, 31, 33, and an equivalent thereof. In certain embodiment, the DNA packaging terminase subunit 1 of the non-natural HSV comprises, alternatively consists essentially of, or yet further consists of an amino acid sequence selected from SEQ ID NOs: 36, 38, 40 and 42. In a further embodiment, the non-natural HSV further comprises a polynucleotide encoding the amino acid sequence of the DNA packaging terminase subunit 1, for example, a polynucleotide having a sequence selected from SEQ ID NOs: 35, 37, 39, 41, or an equivalent thereof.

In certain embodiment, the non-natural HSV comprises, or alternatively consists essentially of, or yet further consists of one or more of polypeptide(s) having an amino acid sequence selected from SEQ ID NOs: 13, 21, 28, and 36. In a further embodiment, the non-natural HSV comprises, or alternatively consists essentially of, or yet further consists of one or more of polynucleotide(s) encoding one or more of an amino acid sequence selected from SEQ ID NOs: 13, 21, 28, and 36.

In certain embodiment, the non-natural HSV comprises, or alternatively consists essentially of, or yet further consists of one or more of the following: (a) a polynucleotide encoding an amino acid sequence selected from SEQ ID NOs. 2, 6, 8, 10, and 52, and/or a polynucleotide having a sequence selected from SEQ ID NOs. 1, 5, 7, 9, and 51; (b) a polypeptide having an amino acid sequence selected from SEQ ID NOs. 2, 6, 8, 10, and 52; (c) a polynucleotide encoding an amino acid sequence selected from SEQ ID NOs. 13, 15, 17 and 19, and/or a polynucleotide having a sequence selected from SEQ ID NOs. 12, 14, 16 and 18; (d) a polypeptide having an amino acid sequence selected from SEQ ID NOs. 13, 15, 17 and 19; (e) a polynucleotide encoding an amino acid sequence selected from SEQ ID NOs. 21, 23 and 26, and/or a polynucleotide having a sequence selected from SEQ ID NOs. 20, 22, 24, 25, and 53, or a sequence thereof free of one or two or more introns; (f) a polypeptide having an amino acid sequence selected from SEQ ID NOs. 21, 23 and 26; (g) a polynucleotide encoding an amino acid sequence selected from SEQ ID NOs. 28, 30, 32 and 34, and/or a polynucleotide having a sequence selected from SEQ ID NOs. 27, 29, 31, and 33; (h) a polypeptide having an amino acid sequence selected from SEQ ID NOs. 28, 30, 32 and 34; (i) a polynucleotide encoding an amino acid sequence selected from SEQ ID NOs. 36, 38, 40, and 42, and/or a polynucleotide having a sequence selected from SEQ ID NOs. 35, 37, 39 and 41; (j) a polypeptide having an amino acid sequence selected from SEQ ID NOs. 36, 38, 40, and 42; (k) a polynucleotide encoding an amino acid sequence selected from SEQ ID NOs. 44, 46, 48 and 50, and/or a polynucleotide having a sequence selected from SEQ ID NOs. 43, 45, 47 and 49; (l) a poly peptide having an amino acid sequence selected from SEQ ID NOs. 44, 46, 48 and 50.

In another embodiment, the non-natural HSV further comprises, or alternatively consists essentially of, or yet further consists of a polynucleotide having sequence that is identical to at least a fragment of a virulence gene from a 17TermA HSV and equivalents thereof. In another embodiment, the non-natural HSV further comprises, or alternatively consists essentially of, or yet further consists of a polynucleotide having sequence that is identical to at least a fragment of a virulent gene from an rRp450 HSV. The non-natural HSV, in some embodiments, is derived from an HSV type 1 ("HSV-1") or an HSV type 2 ("HSV-2") strain. In one embodiment, the non-natural HSV is derived from an HSV-1 KOS strain. In another embodiment, the non-natural HSV further comprises, or alternatively consists essentially of, or yet further consists of a transgene.

Because the HSVs as disclosed here retains its lytic function, in another aspect, this disclosure provides a method for treating cancer or inhibiting the growth or metastasis of cancer cell in a subject in need thereof, comprising, or consisting essentially of, or yet further consisting of, administering to the subject an effective amount of the non-natural HSV or a composition comprising, or alternatively consisting essentially of, or yet further consisting of the non-natural HSV. In one aspect, the cancer comprises pancreatic cancer, renal cancer, small cell lung cancer, brain cancer, neural cancer, neuroblastoma, bone cancer, lymphoma, myeloma, colon cancer, uterine cancer, breast cancer, leukemia, liver cancer, prostate cancer, skin cancer, or melanoma. The subject being treated can be an adult or a pediatric patient, e.g., a mammal or a human patient. In another embodiment, non-natural HSV vector or the composition or pharmaceutical composition is administered by locally or systemically by injection, infusion, instillation, and/or inhalation. In another embodiment, the subject is a mammal. In some embodiment, the mammal is a mouse, a rat, a guinea pig, a non-human primate, a dog, a cat, a horse, a cow, a pig, a goat, or a sheep. In another embodiment, the subject is human.

In another aspect, the disclosure provides a method for inducing cell lysis, which comprises, or consists essentially of, or yet further consists of, contacting the cell with a non-natural HSV of this disclosure or a composition comprising, or alternatively consisting essentially of, or yet further consisting of the non-natural HSV. In one embodiment, the cell is a cancer cell. In a further aspect, the cell is a cultured cell (for use as a pre-clinical model or pre-clinical assay) or a cell isolated from a subject. The cell can be cultured or within an isolated tissue. Non-limiting examples of such cells include cells from: pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cells can be isolated from mammal, e.g., humans can be adult or juvenile (pediatric).

In another aspect, the disclosure provides a method to infect a cell, the method comprising, or alternatively consisting essentially of, or yet further consisting of, contacting the cell with the non-natural HSV. In one embodiment, the cell is a eukaryotic cell. In another embodiment, the cell is a lymphocyte. In one embodiment, the cell is a cancer cell such as a blood cancer or a solid tumor cells, e.g., carcinoma or sarcoma In a further aspect, the cell is a cultured cell (for use as a pre-clinical model or pre-clinical assay) or a cell isolated from a subject. The cell can be cultured or within an isolated tissue. Non-limiting examples of such cells include cells from: pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cells can be isolated from mammal, e.g., humans can be adult or juvenile (pediatric).

Applicants discovered that the conventional a group of Epstein-Barr virus ("EBV")-infected lymphocytes were resistant to conventional oncolytic HSVs ("oHSVs"). Without being bound by a theory, the resistance is at least partly due to a low level of expression of HSV entry receptors on the EBV-infected lymphocytes. Surprisingly, the HSV of the claimed invention were able to induce lysis in the EBV-infected lymphocytes, which are resistant to wild type strain 17, KOS and McKrae HSV viruses. Therefore, in one embodiment, the cell comprises, or alternatively consists essentially of, or yet further consists of a cell infected by EBV or alternatively a cell resistant to EBV. In another embodiment, the cell comprises, or alternatively consists essentially of, or yet further consists of a virulence element of an Epstein-Barr virus ("EBV"). In another embodiment, the cell comprises, or alternatively consists essentially of, or yet further consists of a lymphocyte infected by the EBV. In another embodiment, the HSV of the claimed invention has a higher infection rate to the EBV-infected cell compared to a control. In one embodiment, the control comprises, or alternatively consists essentially of, or yet further consists of a conventional oHSV. In another embodiment, the conventional oHSV comprises wild type strain 17 HSV, KOS HSV, or McKrae HSV.

Production of HSV Mutants or Derivatives

The production of HSV mutants or derivatives involves a change or mutation of a gene or a combination of genes encoded by a parental HSV strain. For example, a derivative may have the sequence of a HSV-1 or HSV-2 genome modified by nucleotide substitutions, for example from 1, 2 or 3 to 10, 25, 50 or 100 substitutions. The HSV-1 or HSV-2 genome may alternatively or additionally be modified by one or more insertions and/or deletions and/or by an extension at either or both ends. The gene modification methods are known in the art, e.g., CRISPR, recombinant construction, or point mutation. A person with ordinary skill in the art would know how to produce a HSV mutant based on need.

In addition to the target genetic modification methods, a HSV mutant can be produced spontaneously. For example, the culture of viruses such as HSV involves a technique known as serial passage. To grow and maintain viruses, suitable cells are infected with the virus, the virus replicates within the cell and the virus is then harvested; fresh cells are then re-infected, this process constitutes one cycle of serial passage. Each such cycle may take, for example, a few days in the case of HSV. As discussed above, such serial passaging may lead to changes in the properties or gene sequences of the virus strain, in that selection takes places for properties that would favor the clinical applications of the HSVs. For example, the enhanced properties can include rapid replication, or the capacity to travel along axons to infect human cells. In addition, the spontaneous mutation can be produced by infecting a cell with one HSV or more than one HSVs.

Thus, the disclosure provides a method to prepare an HSV or its mutants or derivatives by mutating a gene in the HSV. In another embodiment, the method comprises, or alternatively consists essentially of, or yet further consists of inducing to the non-natural HSV a transgene.

In another aspect, provided herein is a method of producing an HSV viral particle, the method comprising, or alternatively consisting essentially of, or yet further consisting of: (a) introducing to a host cell a 17TermA HSV vector and an rRp450 HSV vector; (b) growing the host cell for at least 3 passages; and (c) isolating a HSV particle produced by the host cell. In one embodiment, the HSV is introduced to the host cell by transfection, infection, transformation, electroporation, injection, microinjection, or the combination thereof. In another embodiment, the host cell is grown for at least 3 passages, 10 passages, 20 passages, 30 passages, 40 passages, or 50 passages. In some embodiment, the host cell comprises, or alternatively consists essentially of, or yet further consists of a complementing gene product to support replication of the introduced HSV vectors. In another embodiment, the complementing gene encodes an ICP6 protein and/or an ICP34.5 protein. In another embodiment, the HSV particle so produced comprises, or alternatively consists essentially of, or yet further consists of the HSV vector in this disclosure.

In certain embodiment, provided herein is a method of producing a non-natural HSV viral particle of the disclosure. The method comprises, or alternatively consists essentially of, or yet further consists of: (a) introducing to a host cell a non-natural HSV vector; (b) growing the host cells; and (c) isolating a HSV particle produced by the host cell.

In certain embodiment, provided herein is a method of producing a non-natural HSV viral particle of the disclosure comprising, or alternatively consisting essentially of, or yet further consisting of: (a) introducing to a host cell a polynucleotide encoding a viral genome of the non-natural HSV vector; (b) growing the host cells; and (c) collecting and isolating the HSV particle produced by the host cell. In one embodiment, the nucleic acid sequence encoding the viral genome is introduced to the host cell by transfection, infection, transformation, electroporation, injection, microinjection, or the combination thereof. In one embodiment, the nucleic acid sequence encoding the viral genome is introduced to the host cell in a vector. In a further embodiment, the vector is a viral vector (such as an HSV) or a non-viral vector (such as a plasmid or a nanoparticle). In yet a further embodiment, the vector is an HSV. In some embodiment, the host cell comprises, or alternatively consists essentially of, or yet further consists of a complementing gene product to support replication of the introduced HSV vectors. In one embodiment, such complementing gene product is provided in the host cell via a helper virus. In another embodiment, the complementing gene encodes an ICP6 protein and/or an ICP34.5 protein. In another embodiment, the HSV particle so produced comprises, or alternatively consists essentially of, or yet further consists of the HSV vector in this disclosure.

In one embodiment, the isolating step refers to a process of substantially separating the HSV from other materials, such as host cells, cell debris, culture medium or any other agent used in culturing the host cells, for example by centrifuge, filtration, chromatography, or any combination thereof. A non-limiting example can be found at Sia et al, Optimal purification method for Herpes-based viral vectors that confers minimal cytotoxicity for systemic route of vector administration. J Virol Methods. 2007 February; 139(2):166-74.

Compositions

In another aspect, the disclosure provides a composition comprising, or consisting essentially of, or yet further consisting of, the non-natural HSV described here. Compositions, including pharmaceutical compositions comprising, or alternatively consisting essentially of, or yet further consisting of the agents or viral particles described herein can be manufactured by means of conventional mixing, dissolving, granulating, levigating, emulsifying, encapsulating, entrapping, or lyophilization processes. The compositions can be formulated in conventional manner using one or more physiologically acceptable carriers, diluents, excipients, or auxiliaries which facilitate processing of the viral particles provided herein into preparations which can be used pharmaceutically.

The agents and viral particles of the technology can be administered by parenteral (e.g., intramuscular, intraperitoneal, intravenous, intracerebroventricular ("ICV"), intracisternal injection or infusion, subcutaneous injection, or implant), oral, by inhalation spray nasal, vaginal, rectal, sublingual, urethral (e.g., urethral suppository) or topical routes of administration (e.g., gel, ointment, cream, aerosol, etc.) and can be formulated, alone or together, in suitable dosage unit formulations containing conventional non-toxic pharmaceutically acceptable carriers, adjuvants, excipients, and vehicles appropriate for each route of administration.

In one embodiment, this disclosure relates to a composition comprising, or consisting essentially of, or yet further consisting of: a non-natural HSV viral particle as described herein and a carrier.

In another embodiment, this disclosure relates to a pharmaceutical composition comprising, or consisting essentially of, or yet further consisting of: a non-natural viral particle as described herein and a pharmaceutically acceptable carrier. In another embodiment, the composition comprises, or alternatively consists essentially of, or yet further consists of a cryopreservative that facilitates the freezing and thawing of the non-natural HSV without loss of significant virulence.

In another embodiment, this disclosure relates to a pharmaceutical composition comprising, or alternatively consisting essentially of, or yet further consisting of a therapeutically effective amount of a non-natural HSV viral particle as described herein and a pharmaceutically acceptable carrier.

The pharmaceutical compositions for the administration of the HSV viral particles can be conveniently presented in dosage unit form and can be prepared by any of the methods well known in the art of pharmacy. The pharmaceutical compositions can be, for example, prepared by uniformly and intimately bringing the HSV viral particles provided herein into association with a liquid carrier, a finely divided solid carrier or both, and then, if necessary, shaping the product into the desired formulation. In the pharmaceutical composition the compound provided herein is included in an amount sufficient to produce the desired therapeutic effect. For example, pharmaceutical compositions of this disclosure may take a form suitable for virtually any mode of administration, including, for example, topical, ocular, oral, buccal, systemic, nasal, injection, infusion, transdermal, rectal, and vaginal, or a form suitable for administration by inhalation or insufflation.

For topical administration, the non-natural HSV viral particles can be formulated as solutions, gels, ointments, creams, suspensions, etc., as is well-known in the art.

Systemic formulations include those designed for administration by injection (e.g., subcutaneous, intravenous, infusion, intramuscular, intrathecal, or intraperitoneal injection) as well as those designed for transdermal, transmucosal, oral, or pulmonary administration.

Useful injectable preparations include sterile suspensions, solutions, or emulsions of the HSV viral particles provided herein in aqueous or oily vehicles. The compositions may also contain formulating agents, such as suspending, stabilizing, and/or dispersing agents. The formulations for injection can be presented in unit dosage form, e.g., in ampules or in multidose containers, and may contain added preservatives.

Alternatively, the injectable formulation can be provided in powder form for reconstitution with a suitable vehicle, including but not limited to sterile pyrogen free water, buffer, and dextrose solution, before use. To this end, the HSV viral particles provided herein can be dried by any art-known technique, such as lyophilization, and reconstituted prior to use.

For transmucosal administration, penetrants appropriate to the barrier to be permeated are used in the formulation. Such penetrants are known in the art.

For oral administration, the pharmaceutical compositions may take the form of, for example, lozenges, tablets, or capsules prepared by conventional means with pharmaceutically acceptable excipients such as binding agents (e.g., pregelatinised maize starch, polyvinylpyrrolidone, or hydroxypropyl methylcellulose); fillers (e.g., lactose, microcrystalline cellulose, or calcium hydrogen phosphate); lubricants (e.g., magnesium stearate, talc, or silica); disintegrants (e.g., potato starch or sodium starch glycolate); or wetting agents (e.g., sodium lauryl sulfate). The tablets can be coated by methods well known in the art with, for example, sugars, films, or enteric coatings.

Compositions intended for oral use can be prepared according to any method known to the art for the manufacture of pharmaceutical compositions, and such compositions may contain one or more agents selected from the group consisting of sweetening agents, flavoring agents, coloring agents, and preserving agents in order to provide pharmaceutically elegant and palatable preparations. Tablets contain the HSV viral particles provided herein in admixture with non-toxic pharmaceutically acceptable excipients which are suitable for the manufacture of tablets. These excipients can be for example, inert diluents, such as calcium carbonate, sodium carbonate, lactose, calcium phosphate or sodium phosphate; granulating and disintegrating agents (e.g., corn starch or alginic acid); binding agents (e.g., starch, gelatin, or acacia); and lubricating agents (e.g., magnesium stearate, stearic acid, or talc). The tablets can be left uncoated or they can be coated by known techniques to delay disintegration and absorption in the gastrointestinal tract and thereby provide a sustained action over a longer period. For example, a time delay material such as glyceryl monostearate or glyceryl distearate can be employed. They may also be coated by the techniques well known to the skilled artisan. The pharmaceutical compositions of the technology may also be in the form of oil-in-water emulsions.

Liquid preparations for oral administration may take the form of, for example, elixirs, solutions, syrups, or suspensions, or they can be presented as a dry product for constitution with water or other suitable vehicle before use. Such liquid preparations can be prepared by conventional means with pharmaceutically acceptable additives such as suspending agents (e.g., sorbitol syrup, cellulose derivatives, or hydrogenated edible fats); emulsifying agents (e.g., lecithin, or acacia); non-aqueous vehicles (e.g., almond oil, oily esters, ethyl alcohol, Cremophore™, or fractionated vegetable oils); and preservatives (e.g., methyl or propyl-p-hydroxybenzoates or sorbic acid). The preparations may also contain buffer salts, preservatives, flavoring, coloring, and sweetening agents as appropriate.

In one embodiment, provided is a method of preparing the non-natural HSV of this disclosure comprising, or alternatively consisting essentially of, or yet further consisting of mutating a gene in a non-natural HSV viral particle or introducing into the non-natural HSV a transgene. In another aspect, the method of producing the non-natural HSV vector, comprises, or alternatively consists essentially of, or yet further consists of: (a) introducing to a host cell a 17TermA HSV vector and an rRp450 HSV vector; (b) growing the host cell for at least 3 passages; and (c) isolating a HSV particle produced by the host cell.

Also provided is a method for inhibiting the growth or metastasis of a cancer cell or a metastatic cancer cell, the method comprising, or consisting essentially of, or yet further consisting of, contacting the cell with an effective amount of the non-natural HSV vector or a composition or a pharmaceutical composition containing the non-natural HSV vector as described herein. The contacting is in vitro or in vivo. In one aspect, the contacting is in vivo by administration of the non-natural HSV or a composition or a pharmaceutical composition to a subject. In vitro, the method is practiced by placing the non-natural HSV in contact with the cell. The in vitro method can be used to test for new therapies or as a personalized assay to determine if the therapy is suitable for the cancer to be treated. Additional cancer therapies can be combined with the therapy which can be concurrent or sequential to the disclosed methods.

The cancer cell to be treated can be a solid tumor or blood cancer, e.g., carcinoma or sarcoma and non-limiting examples of such include pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cell is of any species, e.g., mammalian and human and when performed in vitro, it can be from a cultured cell line or a primary cell, e.g., from a tissue biopsy. The cell can be an adult or juvenile cell or a cancer stem cell, from a tissue biopsy. The cell can be an adult or juvenile cell or a cancer stem cell (i.e., cancer cells possessing characteristics associated with normal stem cells, specially the ability to give rise to all cell types found in a particular cancer sample) or a cancer cell without such characteristics associated with normal stem cells. In one embodiment, the cell expresses N-myc proto-oncogene protein (MYCN), and/or expresses MYCN at a level higher than non-cancer cells.

Additionally provided in this disclosure is a method for treating cancer, or inhibiting the growth or metastasis of a cancer cell in a subject in need thereof, comprising, or alternatively consisting essentially of, or yet further consisting of, administering to the subject an effective amount of the non-natural HSV, the composition or the pharmaceutical composition of this disclosure. The subject to be treated can be of any species, e.g., mammalian and human, e.g., canine, equine, bovine, feline, simian, rat or murine. The administration can be as a first line therapy, a second line therapy, a third line therapy, a fourth line therapy, or a fifth line therapy. Additional cancer therapies can be combined with the therapy which can be concurrent or sequential to the disclosed methods. The cancer to be treated can be a solid tumor or blood cancer, e.g., carcinoma or sarcoma and non-limiting examples of such include pancreatic cancer, renal cancer, small cell lung cancer, brain cancer, neuroblas-toma, neural cancer, bone cancer, lymphoma, myeloma, colon cancer, uterine cancer, breast cancer, leukemia, liver cancer, prostate cancer, skin cancer, or melanoma.

The method of this disclosure can be combined with appropriate diagnostics to monitor disease remission or progression. Several methods for such monitoring are known in the art.

Further provided is a method of inducing cell lysis, comprising, or alternatively consisting essentially of, or yet further consisting of, contacting the cell with an effective amount of the non-natural HSV, the composition, and/or the pharmaceutical composition of this disclosure. The contacting is in vitro or in vivo. In one aspect, the contacting is in vivo by administration of the non-natural HSV or a composition or a pharmaceutical composition to a subject. In vitro, the method is practiced by placing the non-natural HSV in contact with the cell. The in vitro method can be used to test for new therapies or as a personalized assay to determine if the therapy is suitable for the subject to be treated. Additional cell lytic therapies can be combined with the therapy which can be concurrent or sequential to the disclosed methods.

The cell to be treated can be a solid tumor or blood cancer, e.g., carcinoma or sarcoma and non-limiting examples of such include pancreatic cancer, renal cancer, small cell lung cancer, brain cancer, neuroblastoma, neural cancer, bone cancer, lymphoma, myeloma, colon cancer, uterine cancer, breast cancer, leukemia, liver cancer, prostate cancer, skin cancer, or melanoma. The cell is of any species, e.g., mammalian and human and when performed in vitro, it can be from a cultured cell line or a primary cell, e.g., from a tissue biopsy. The cell can be an adult or juvenile cell or a cancer stem cell or a cancer cell without the characteristics associated with normal stem cells. The therapy can be combined with an appropriate assay to test for the effectiveness of the therapy, e.g., cancer remission or progression.

Use of HSV Viral Particles for Preparing Medicaments

The HSVs and compositions of the present invention are also useful in the preparation of medicaments to treat a variety of pathologies as described herein. The methods and techniques for preparing medicaments of a composition are known in the art. For the purpose of illustration only, pharmaceutical formulations and routes of delivery are detailed herein.

Thus, one of skill in the art would readily appreciate that any one or more of the compositions described above, including the many specific embodiments, can be used by applying standard pharmaceutical manufacturing procedures to prepare medicaments to treat the many disorders described herein. Such medicaments can be delivered to the subject by using delivery methods known in the pharmaceutical arts.

Administration of Additional Therapeutic Agents

The methods disclosed herein can further comprise, or alternatively consist essentially of, or yet further consist of administration of an effective amount of additional therapeutic agents to augment or enhance the therapeutic efficacy of the disclosed methods. In one embodiment, the additional therapeutic agents comprise, or alternatively consist essentially of, or yet further consist of surgical resection of a tumor, an anti-tumor agent such as a small molecule or immunotherapy or cell lytic therapy.

Administration of the therapeutic agent or substance of the present disclosure to a patient will follow general protocols for the administration of that particular primary or secondary therapy, taking into account the toxicity, if any, of the treatment. It is expected that the treatment cycles would be repeated as necessary. It also is contemplated that various standard therapies, as well as surgical intervention, may be applied in combination with the described therapy.

As is apparent to those skilled in the art, the combination therapy can take the form of a combined therapy for concurrent or sequential administration.

Kits

The agents or non-natural HSVs described herein may, in some embodiments, be assembled into pharmaceutical or diagnostic or research kits to facilitate their use in therapeutic, diagnostic, or research applications. A kit may include one or more containers housing the components of the invention and instructions for use. Specifically, such kits may include one or more agents described herein, along with instructions describing the intended application and the proper use of these agents. In certain embodiments, agents in a kit may be in a pharmaceutical formulation and dosage suitable for a particular application and for a method of administration of the agents. Kits for research purposes may contain the components in appropriate concentrations or quantities for running various experiments.

The kit may be designed to facilitate use of the methods described herein and can take many forms. Each of the compositions of the kit, where applicable, may be provided in liquid form (e.g., in solution), or in solid form, (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. In some embodiments, the compositions may be provided in a preservation solution (e.g., cryopreservation solution). Non-limiting examples of preservation solutions include DMSO, paraformaldehyde, and CryoStor® (Stem Cell Technologies, Vancouver, Canada). In some embodiments, the preservation solution contains an amount of metalloprotease inhibitors.

As used herein, "instructions" can define a component of instruction and/or promotion, and typically involve written instructions on or associated with packaging of the invention. Instructions also can include any oral or electronic instructions provided in any manner such that a user will clearly recognize that the instructions are to be associated with the kit, for example, audiovisual (e.g., videotape, DVD, etc.), internet, and/or web-based communications, etc. The written instructions may be in a form prescribed by a governmental agency regulating the manufacture, use, or sale of pharmaceuticals or biological products, which instructions can also reflect approval by the agency of manufacture, use, or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The HSVs may be in the form of a liquid, gel, or solid (powder). The HSVs may be prepared sterilely, packaged in syringe and shipped refrigerated. Alternatively, it may be housed in a vial or other container for storage. A second container may have other agents prepared sterilely. Alternatively, the kit may include the active agents premixed and shipped in a syringe, vial, tube, or other container. The kit may have one or more or all of the components required to administer the agents to a subject, such as a syringe, topical application devices, or IV needle tubing and bag.

Screening Assays

This disclosure also provides screening assays to identify potential therapeutic agents of known and new compounds and combinations. For example, one of skill in the art can also determine if the HSV provides a therapeutic benefit in vitro by contacting the HSV with a sample cell or tissue to be treated. The cell or tissue can be from any species, e.g., simian, canine, bovine, ovine, rat, mouse or human.

The contacting can also be performed in vivo in an appropriate animal model or human patient. When performed in vitro, the HSV can be directly added to the cell culture medium. When practiced in vitro, the method can be used to screen for novel combination therapies, formulations or treatment regimens, prior to administration to an animal or a human patient.

In another aspect, the assay requires contacting a first sample comprising suitable cells or tissue ("control sample") with an effective amount of an HSV as disclosed herein and contacting a second sample of the suitable cells or tissue ("test sample") with the HSV, agent or combination to be assayed. In one aspect in the case of cancer, the inhibition of growth of the first and second cell samples are determined. If the inhibition of growth of the second sample is substantially the same or greater than the first sample, then the agent is a potential drug for therapy. In one aspect, substantially the same or greater inhibition of growth of the cells is a difference of less than about 1%, or alternatively less than about 5% or alternatively less than about 10%, or alternatively greater than about 10%, or alternatively greater than about 20%, or alternatively greater than about 50%, or alternatively greater than about 90%. The contacting can be in vitro or in vivo. Means for determining the inhibition of growth of the cells are well known in the art.

In a further aspect, the test agent is contacted with a third sample of cells or tissue comprising normal counterpart cells or tissue to the control and test samples and selecting agents that treat the second sample of cells or tissue but does not adversely affect the third sample. For the purpose of the assays described herein, a suitable cell or tissue is described herein such as cancer or other diseases as described herein. Examples of such include but are not limited to cancer cell or tissue obtained by biopsy or from blood.

Efficacy of the test composition is determined using methods known in the art which include but are not limited to cell viability assays.

In yet a further aspect, the assay requires at least two cell types, the first being a suitable control cell.

The assays also are useful to predict whether a subject will be suitably treated by this disclosure by delivering an HSV to a sample containing the cell to be treated and assaying for treatment, which will vary with the pathology, or for screening for new drugs and combinations. In one aspect, the cell or tissue is obtained from the subject or patient by biopsy. This disclosure also provides kits for determining whether a pathological cell or a patient will be suitably treated by this therapy by providing at least one composition of this disclosure and instructions for use.

The test cells can be grown in small multi-well plates and is used to detect the biological activity of test compounds. For the purposes of this disclosure, the successful HSV or other agent will block the growth or kill the cancer cell but leave the control cell type unharmed.

The following examples are provided to illustrate and not limit the disclosure.

EXAMPLES

Production of HSV Mutant

A non-permissive cell line was infected with 17TermA and rRp450 ("directed evolution") and cultured after serial passage to isolate a HSV Mut-3 mutant that contains a WT-like genotype. The HSV Mut-3 mutant was then used to construct the attenuated mutant Mut-3Δ34.5 via gene editing (labelled as "CRISPR/Cas9") (FIG. 1A). The sequence comparison of Mut-3 with its parent viruses is shown in FIG. 1B. Nonsynonymous mutations that differ from either parent in Mut-3 are shaded with back slashes, including UL15, UL29, US8, RL1 and RL2. Genome sequences that are identical to 17TermA are indicated as blank boxes; those identical to rRp450 are shaded with slashes.

The potent oHSV mutant, Mut-3 was isolated that contains a WT-like genotype. Both Mut-3 and the attenuated version Mut-3Δ34.5 rely on the canonical HSV entry proteins, nectin-1 or herpes virus entry mediator (HVEM), to achieve successful infection (not shown). The kinetics of Mut-3Δ34.5 viral gene transfer as measured by the onset of detectable GFP positive area is much earlier when compared to 17Δ34.5, a $\gamma_1$34.5-null virus derived from wildtype strain 17 via same CRISPR/Cas9 gene editing strategy. In addition, Mut-3Δ34.5 infection leads to more cell killing as measured by its less cell confluence area. However, Mut-3Δ34.5 appears to be less replicative whether compared to 17Δ34.5 or to the Mut-3 Δ34.5-null parent virus, 17TermA. These results indicate that even in the attenuated Mut-3Δ34.5 version, a unique genomic alteration(s) results in a syncytial phenotype (not shown) and enhanced potency remains. In a study of an epidermal growth factor receptor (EGFR)-retargeted HSV, it was reported that introducing a syncytial mutation does not impair the specificity of entry and spread.

Without being bound by theory, Applicants believe that the underlying cause of a syncytial phenotypes in Mut-3Δ34.5 may result in altered kinetics upon virus fusion to the cell membrane that might affect entry and/or viral mediated cell-to-cell fusion, which leads to faster cell killing and diminished virus particle production.

Mutations were not found in gB, gD, gH and gL, which are the canonical glycoproteins involved in HSV-1 entry. However, five genes contain nonsynonymous (NS) mutation in Mut-3 that are different from either parent: RL1, RL2, UL15, UL29 and Us8/gE. Mut-3 and its attenuated version Mut-3Δ34.5 both display a fusogenic phenotype, suggesting this phenomenon is not RL1-associated. Whole-genome analysis also suggests that this phenotype is not linked to previously reported mutations since the amino acid sequences of Mut-3 are either identical to rRp450 and the reference strain 17 genome (not a syncytial virus) in gK/UL53 and UL20, or identical to 17TermA (not a syncytial virus) in gB/UL27 and UL24. The A151T mutation of gE/Us8 is the only glycoprotein (virion surface protein) in Mut-3 that has a NS alteration compared to its parent viruses. Although gE has not been linked to either virus attachment or entry, gE/gI dimerization mediates virus cell-to-cell spread as mutations in gE have been associated with smaller plaque sizes. **Applicant hypothesize that A151T of gE in Mut-3Δ34.5 may be the underlying cause of its syncytial and increased potency phenotypes. Based on applicant study priority (from top to bottom), in Table 1 applicant list all five NS mutations found in five genes in Mut-3 as well as each gene's corresponding function, possible role associated with Mut-3 increased potency phenotype, and applicant proposed studies. The other three mutations (except for RL1) may also be determined, as was done for gE A151T.

TABLE 1

Mutations of HSV proteins and functions thereof nt: nucleotide; a.a: amino acid.

| Gene | Protein Function | NS Mutation | Experiments |
|---|---|---|---|
| Us8 | glycoprotein E | nt 451 g to a, a.a A151T | As detailed later, for example, under the sections titled "The Us8/gE revertant in Mut-3Δ34.5 for loss-of-function study" and "The Us8/gE A151T mutation in Mut-3 parent 17TermA for a gain-of-function" |
| RL2 | ICP0, immediate early gene (IE) gene, ubiquitin E3 ligase. Regulate early genes expression | nt 1712 g to a, a.a R258H | Loss- and gain of function test: i) To validate faster entry or spread observed as detailed later, for example, under the section titled "Comparison of HSV mutants" ii) Evaluate the changes in HSV early gene (eg. ICP8 & TK) expression |
| UL15 | DNA packaging terminase subunit 1. Co-localized UL28, UL33 with UL29/ICP8 | nt 1126 g to a, a.a A376T | Loss- and gain of function test: iii) To validate faster entry or spread observed as detailed later, for example, under the section titled "Comparison of HSV mutants" iv) Evaluate the changes in HSV DNA replication |

TABLE 1-continued

Mutations of HSV proteins and functions thereof nt: nucleotide; a.a: amino acid.

| Gene | Protein Function | NS Mutation | Experiments |
|------|------------------|-------------|-------------|
| UL29 | ICP8, early (E) gene, single-stranded DNA-binding protein | nt 3464 c tot, a.a T1155M | Loss- and gain of function test: i) To validate faster entry or spread observed as detailed later, for example, under the section titled "Comparison of HSV mutants" ii) Evaluate the changes in HSV DNA replication. |
| RL1 | ICP34.5, neurovirulence protein | nt 356 c to a, P119H, H119 is same as 17+ | Rule out, as Mut-3Δ34.5 remains syncytial |

Comparison of HSV Mutants

Figure 2A:
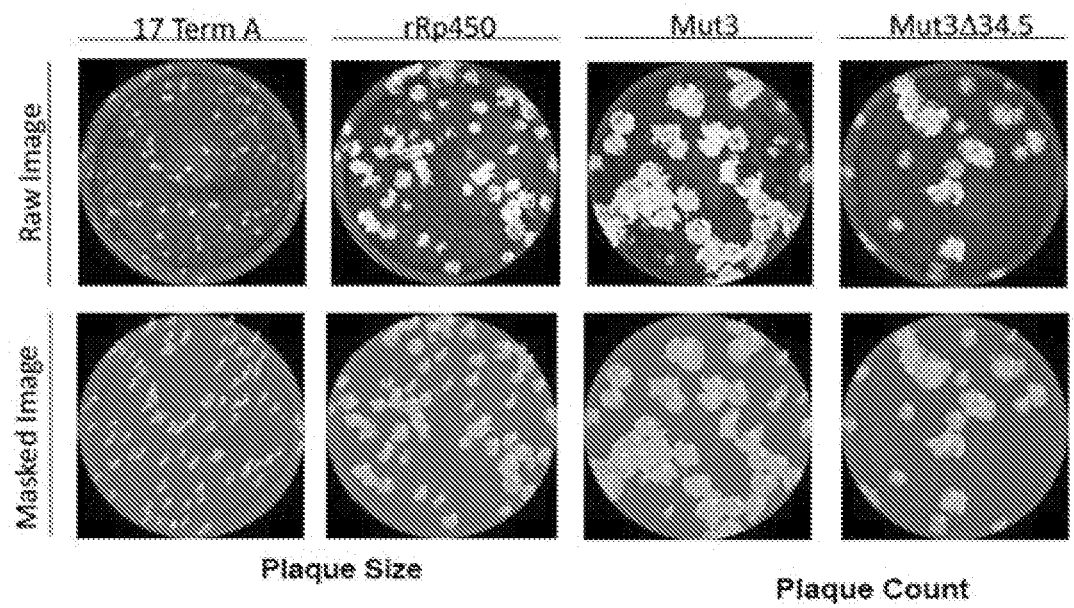
FIGS. 2A-2C show plaque sizes and receptor usage of Mut-3, Mut-3Δ34.5, rRp450 & 17TermA. Applicant performed plaque assay of the four viruses at the same time and scanned and analyzed the plaque images 3 days after via Keyence HS All-in-one Fluorescence Microscope BZ-II Analyzer.
Figure 2B:
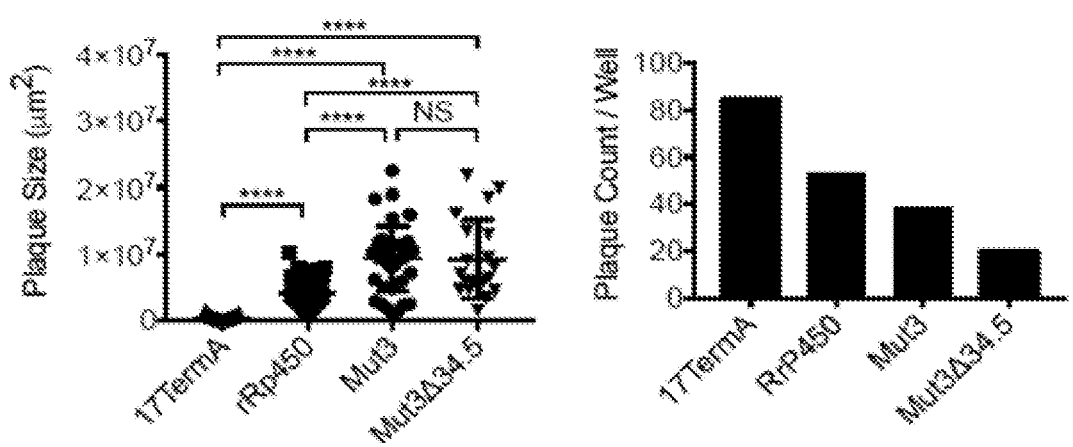
Figure 2C:
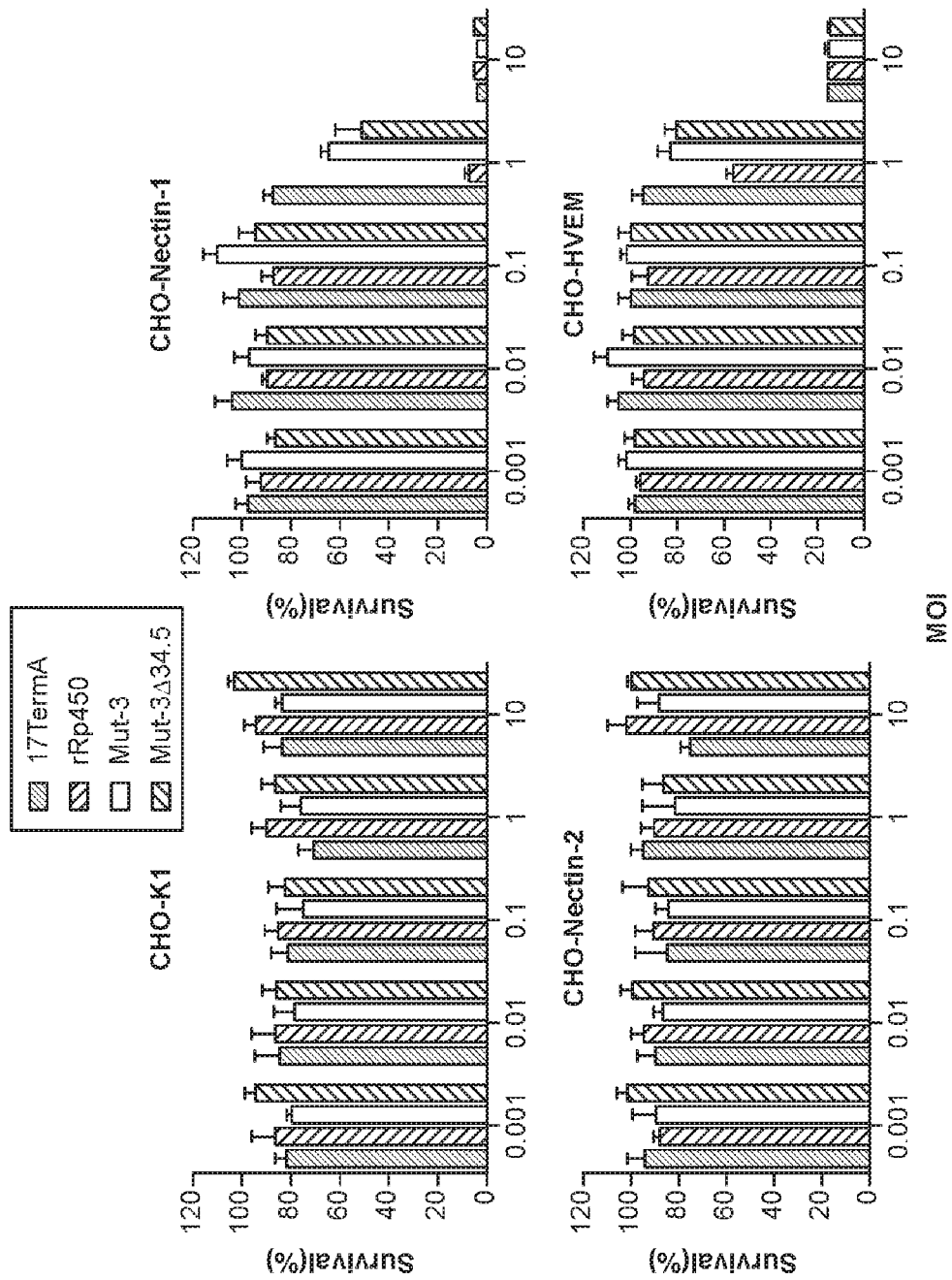

Plaque assays were performed on the four viruses shown in FIG. 1A at the same time and scanned and analyzed the plaque image 3 days after via Keyence HS All-in-one Fluorescence Microscope BZ-II Analyzer. As shown in FIGS. 1A and 1B, the plaque sizes of Mut-3 and Mut-3Δ34.5 were significantly larger than both parent viruses rRp450 and 17TermA. In an in vitro cytotoxicity/MTS assay of CHO cell sets, the CHO-K1, CHO-Nectin-1, CHO-Nectin-2 and CHO-HVEM were infected with the four viruses with different multiplicity of infections (MOIs). The cell survival colorimetric cell proliferation and MTS assay were measured 3 days post-virus infections (pvi) relative to untreated control. Only CHO-Nectin-1 and CHO-HVEM but not CHO-K1 or CHO-Nectin-2 (mainly for HSV-2 entry) were sensitive to treatments of the four viruses (FIG. 2C). Without being bound by a theory, the results suggested that Mut-3 and Mut-3Δ34.5 do not by pass the receptor barrier still relay on canonical HSV entry receptors to infect the cells.

Figure 3A:
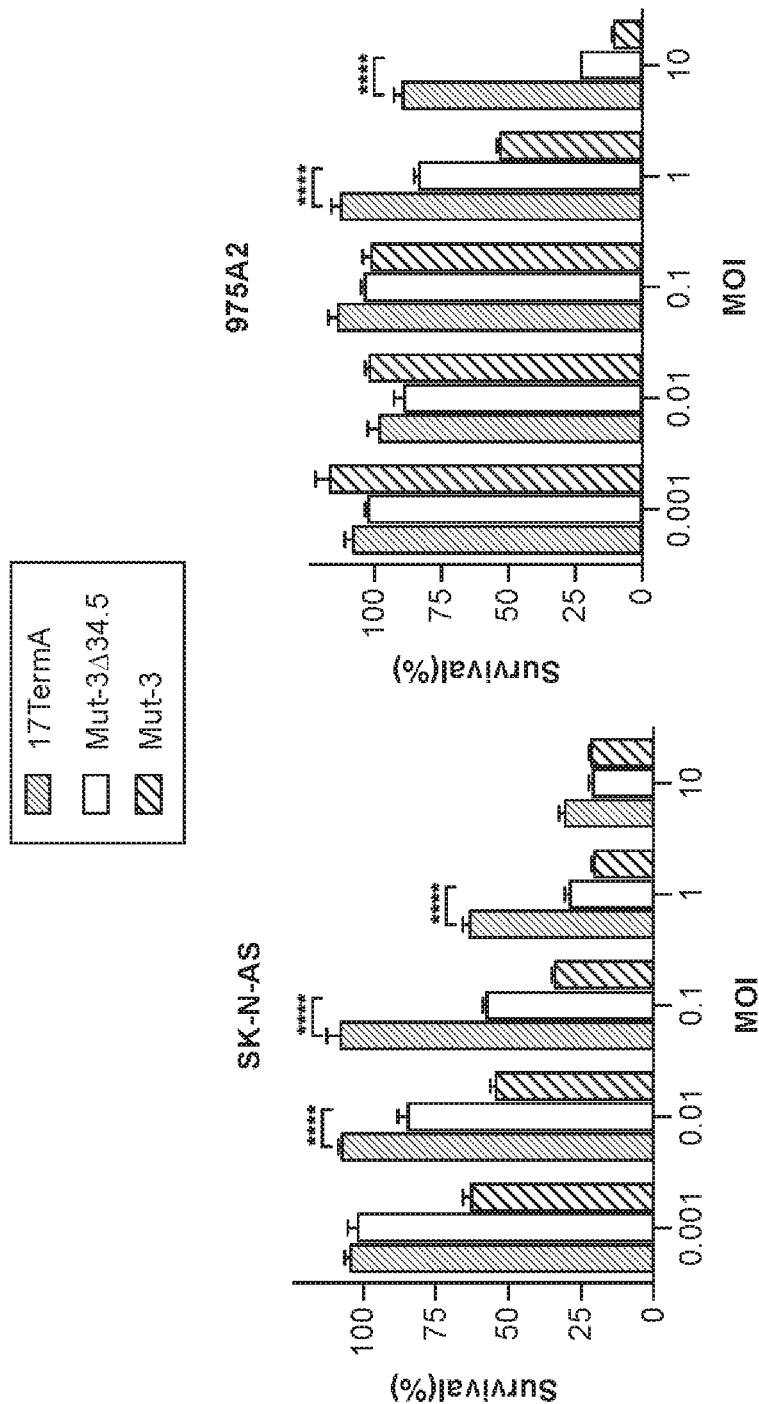
FIGS. 3A-3C: Mut-3Δ34.5 is more potent than 17TermA ($\gamma_1$34.5-null) at killing human and murine neuroblastoma cells, which is not due to increased yield of infectious virus particles in vitro.
Figure 3B:
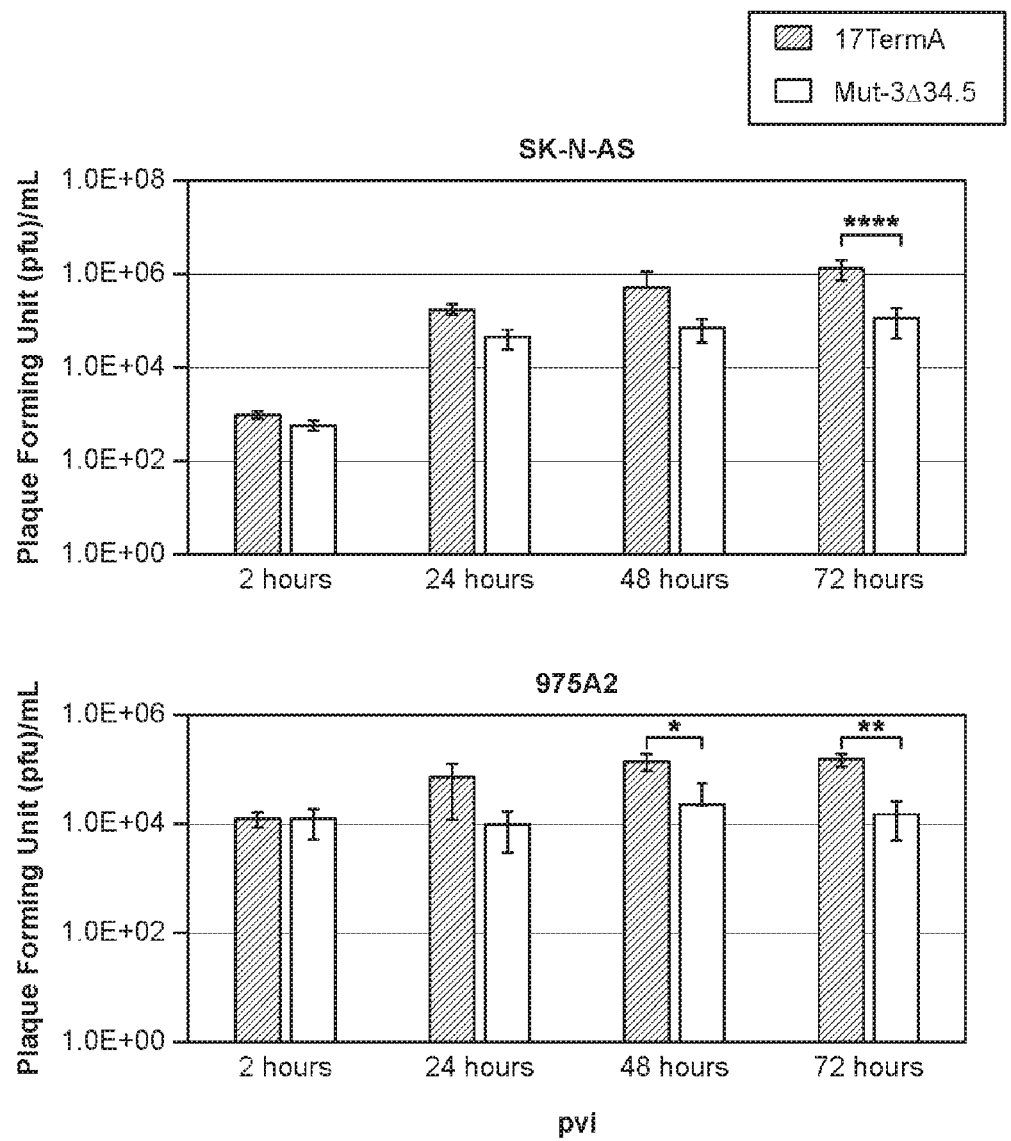
Figure 3C:
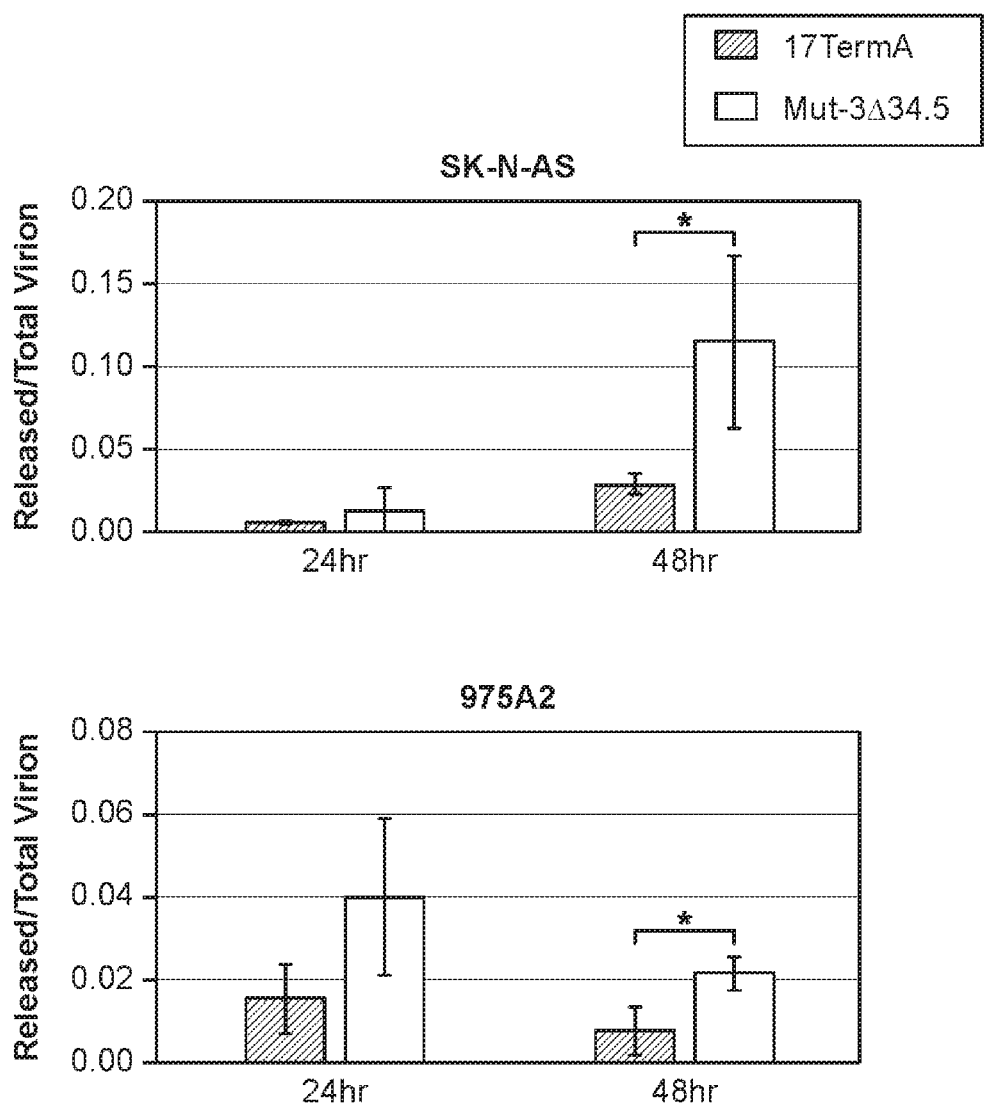
Figures 4A, 4B, 4C, 4D, 4E, 4F, 4G, 4H:
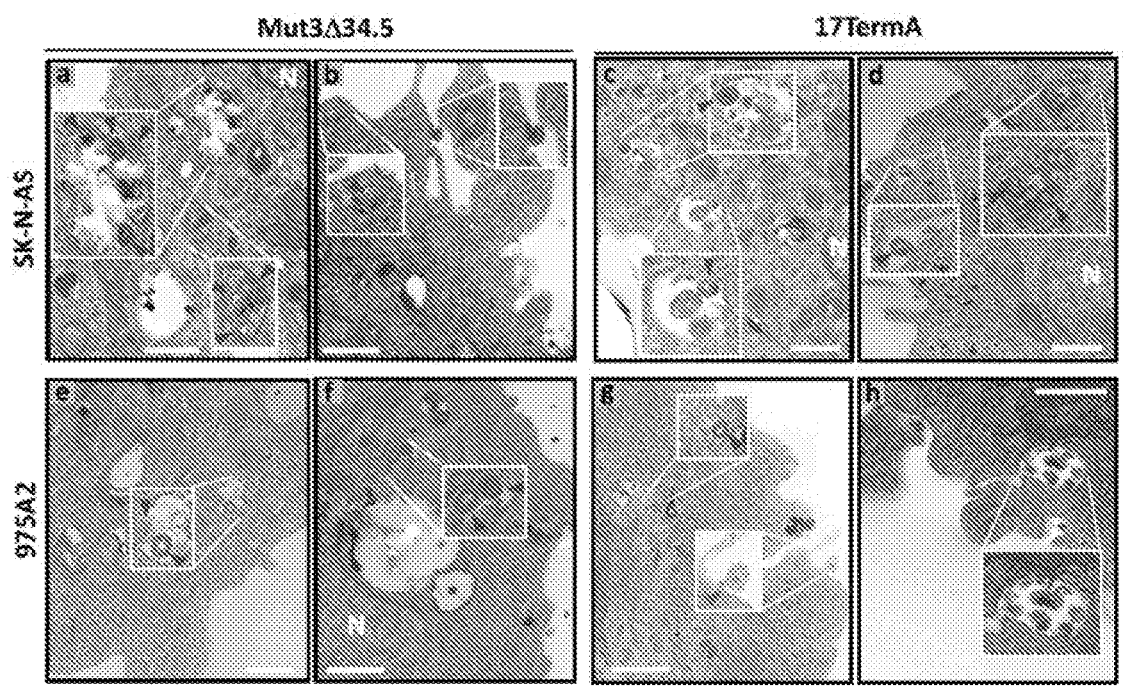
FIGS. 4A-4H: TEM analysis of Mut3Δ34.5 and 17TermA uptake in neuroblastoma cells. Neuroblastoma cells SK-N-AS and 975A2 were infected with Mut-3Δ34.5 or 17TermA at MOI of 50 for 20 mins at 37° C.

The increased potency for Mut-3Δ34.5 in killing human and murine neuroblastoma cells as compared to 17TermA was not due to an increased yield of infectious virus (FIG. 3). An analysis by the transmission electron microscopy ("TEM") also revealed that after infecting neuroblastoma cells, Mut-3Δ34.5 virions were mainly found in endocytic vesicles, while 17TermA virions were mainly found in endocytic vesicles (FIG. 4).

Figure 5A:
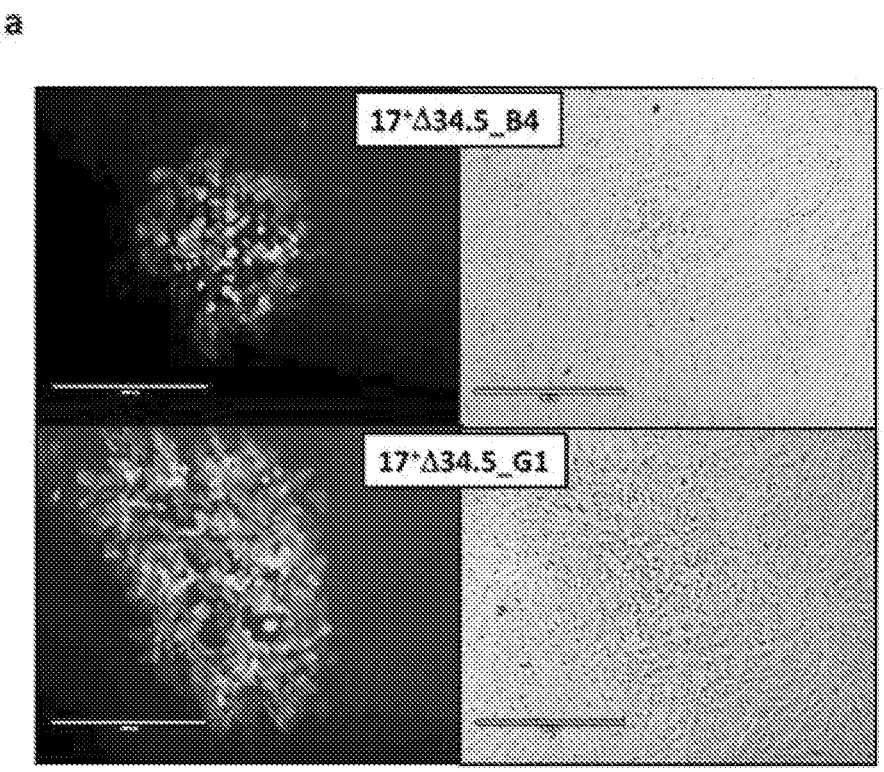
FIGS. 5A-5C: Attenuated 17Δ34.5 virions showed comparable potency to 17TermA in neuroblastoma cells. Applicant generated 17Δ34.5 via CRISPR-Cas9 gene editing technique to replace g134.5 gene in wild-type strain 17$^+$ with EGFP expressing cassette.
Figure 5B:
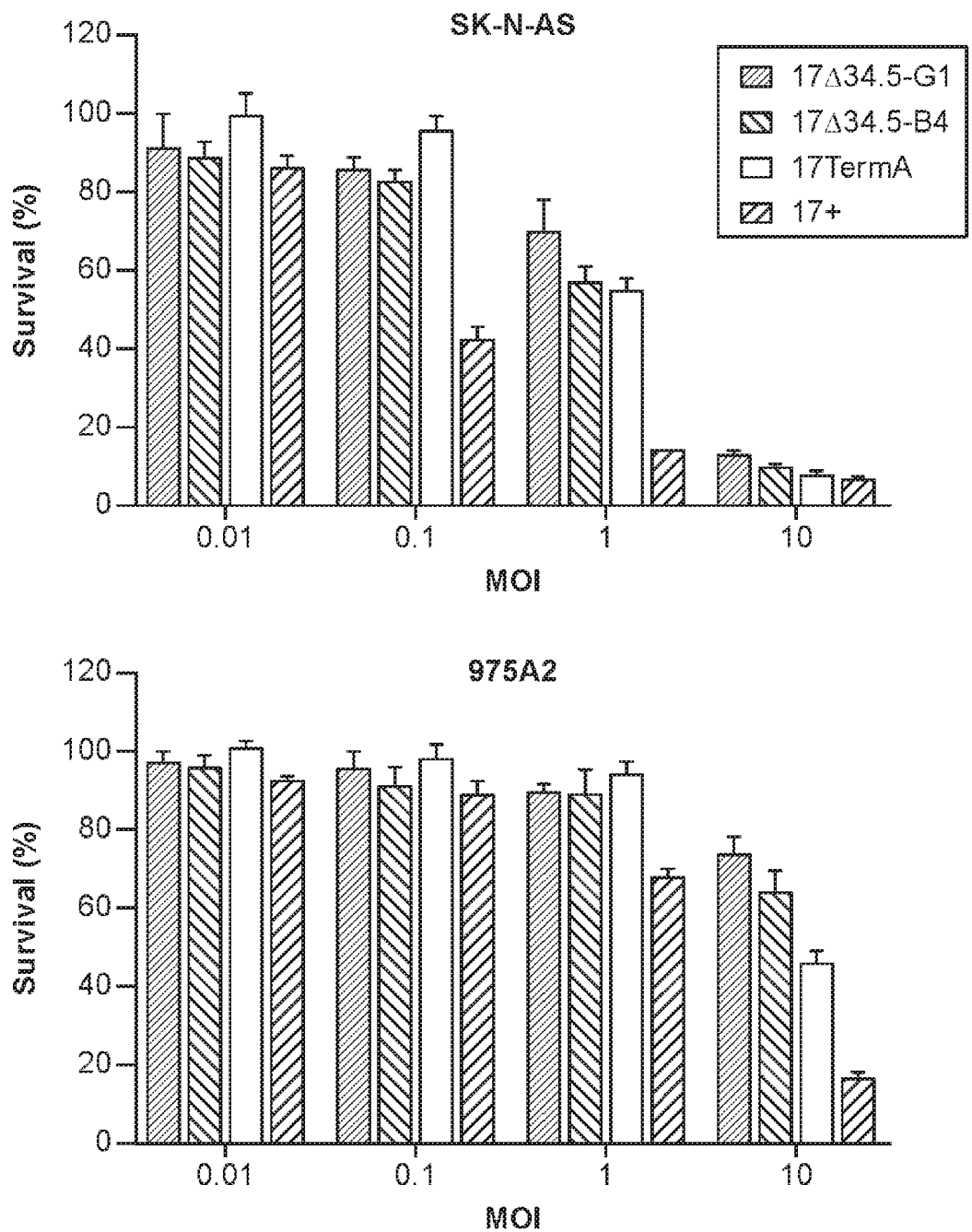
Figure 5C:
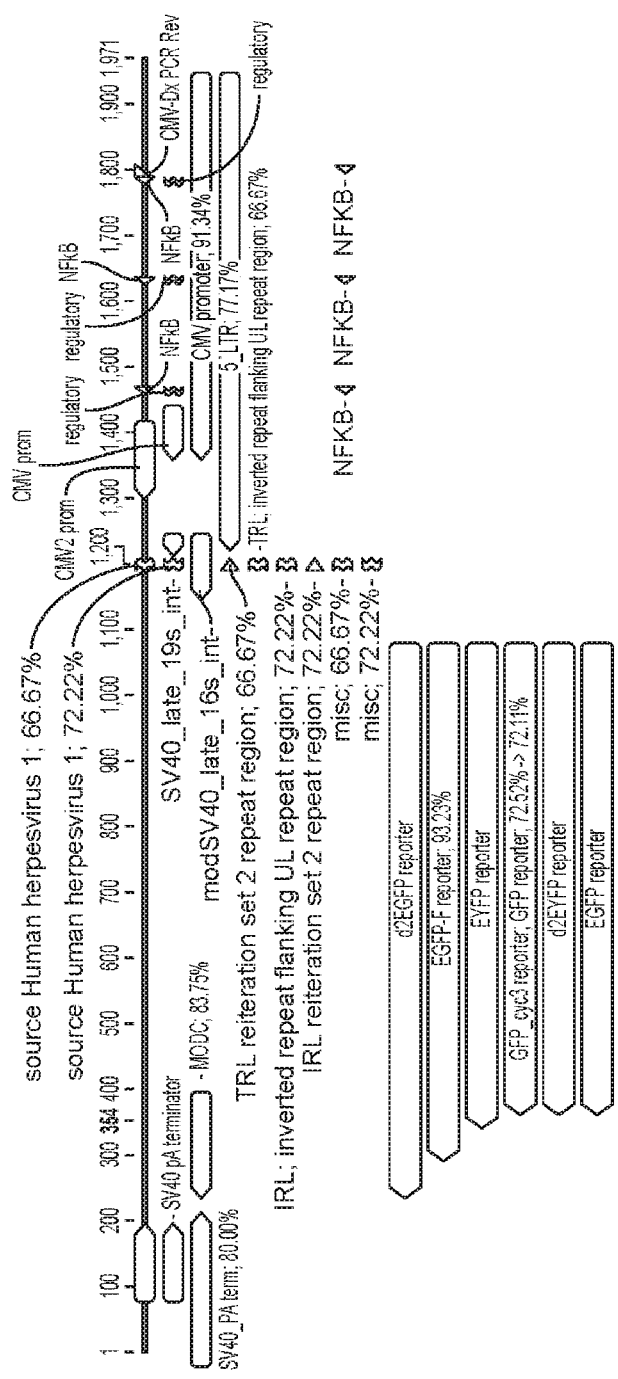
Figures 6A, 6B, 6C:
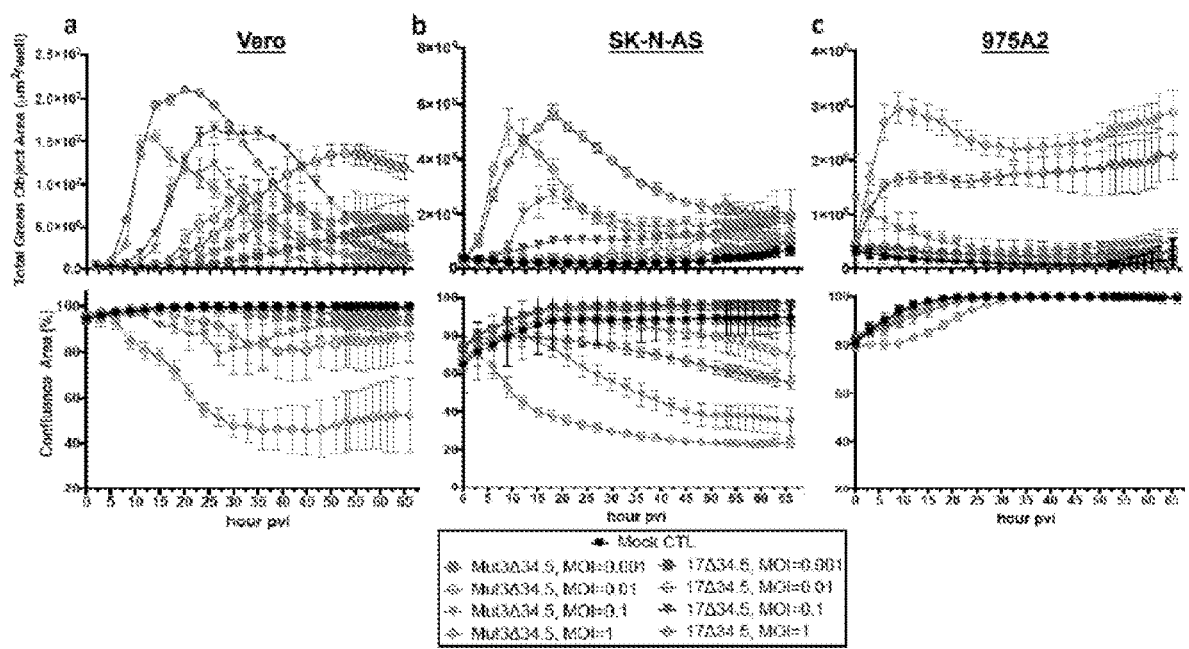
FIGS. 6A-6C: Mut-3Δ34.5 displays much faster viral gene transfer and cell killing compared to 17Δ34.5. Applicant treated (FIG. 6A) Vero (FIG. 6B) SK-N-AS (FIG. 6C) 975A2 cells with either mock CTL, Mut-3Δ34.5, or 17Δ34.5 at different MOIs and used IncuCyte ZOOM live cell to monitor GFP positive area (top panels) and cell confluence (bottom panels) over time. N=6 wells per condition, and n=2 measurements per well for each time point. Post virus infection (pvi). Mann-Whitney U test is used to compare time until maximum GFP area between viruses for (FIG. 6A). Error bars represent SD.
Figure 7:
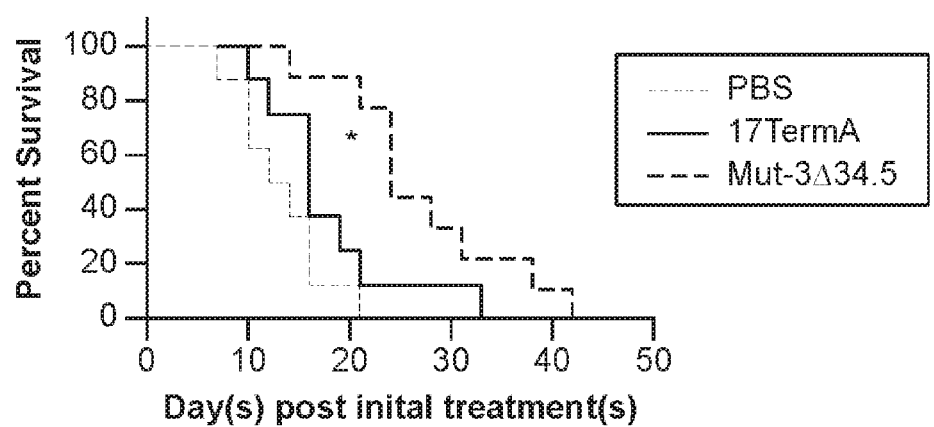
FIG. 7: Mut-3Δ34.5 is more effective than 17TermA to control human neuroblastoma growth in vivo. Athymic nude mice with sub-q SK-N-AS tumors were intratumorally injected with either phosphate-buffered saline (PBS) control (as marked, n=8), three doses of 1e7 pfu of 17TermA (as marked, n=8) or Mut-3Δ34.5 (as marked, n=9). Kaplan-Meier survival curves were plotted. Log-rank test was used to score the statistical significance between 17TermA and Mut-3Δ34.5. *p<0.05.
Figures 8A, 8B, 8C:
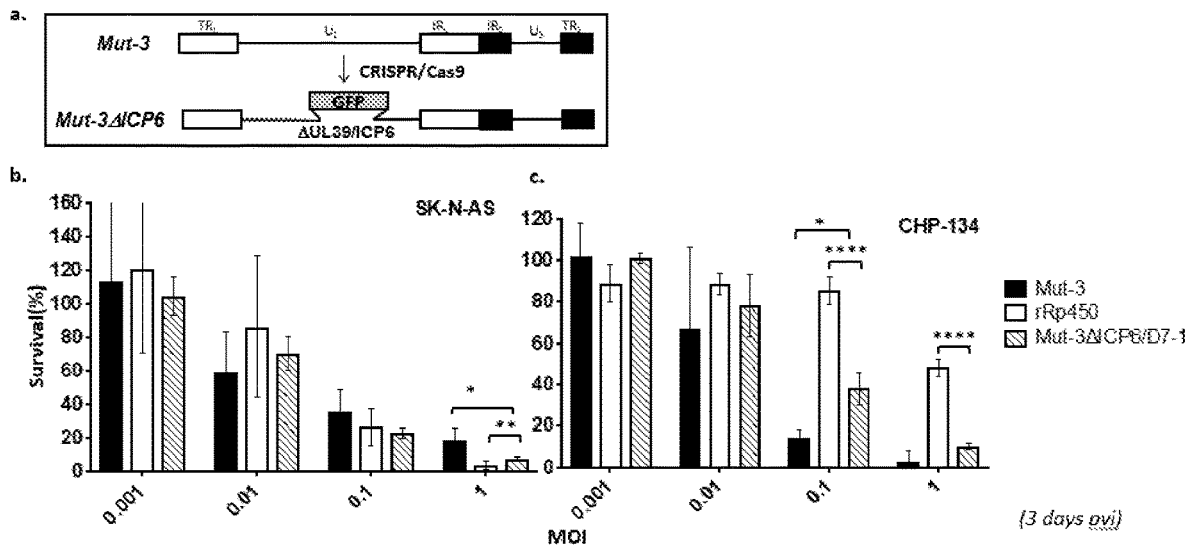
FIGS. 8A-8C: Mut-3ΔICP6, an attenuated version of Mut-3, induces superior cytotoxicity in the human neuroblastoma cell line CHP-134 compared to oncolytic herpes virus rRp450.
Figures 9A, 9B:
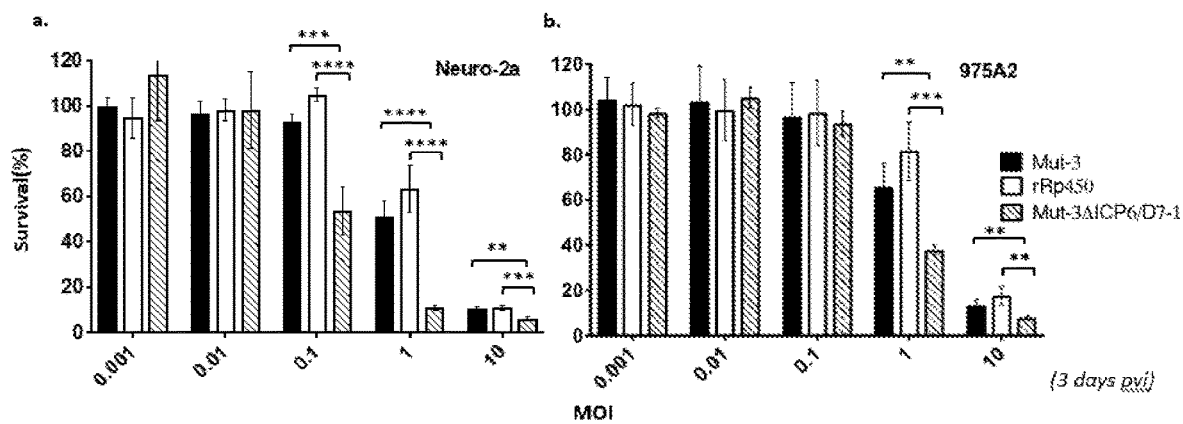
FIGS. 9A-9B: Mut-3ΔICP6 induces superior cytotoxicity in the murine neuroblastoma cell lines Neuro-2a & 975A2 compared to rRp450.
Figure 10A:
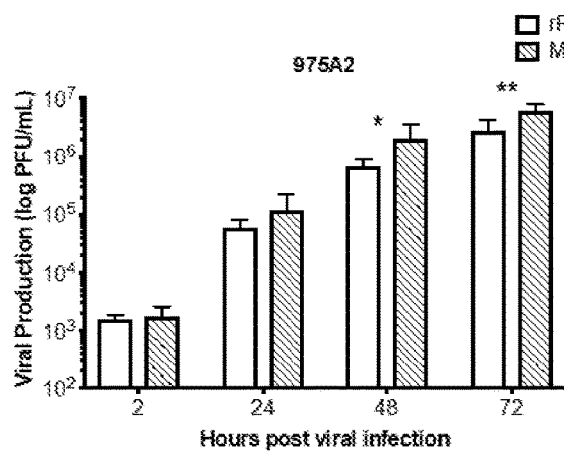
FIGS. 10A-10B: Mut-3ΔICP6 produces a significantly higher virus yield than rRp450 in the murine neuroblastoma cell line 975A2 over 48 and 72 hrs infection time periods. Murine 975A2 (FIG. 10A) and human SK-N-AS (FIG. 10B) neuroblastoma cells were plated in 12-well dishes at $2 \times 10^5$ cells per well, incubated at 37° C. overnight, and infected with each virus in 200 μL serum-free media at MOI 0.01 for SK-N-AS cells (FIG. 10B) or MOI 0.5 for 975A2 cells (FIG. 10A) for 2 hours with gentle shaking every 20 minutes. The cells were washed once with PBS and covered with 1 mL of complete media. The cells and supernatants were then collected at 2, 24, 48 and 72 hours post infection, freeze-thawed three times, and serially diluted and titrated on Vero cells to determine infectious virus yield by standard plaque assay. Each sample was assayed in triplicate. Error bars represent standard deviation. Statistical significance was assessed using t test. *p≤0.05, **p≤0.01.
Figure 10B:
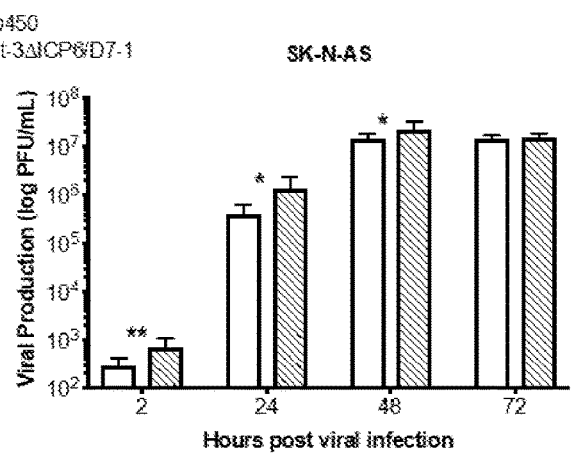
Figure 11A:
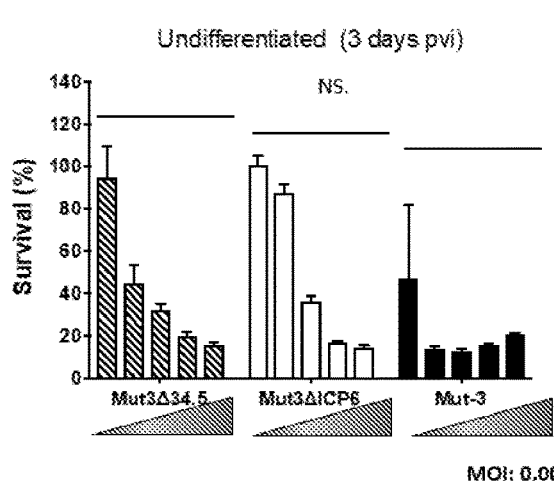
FIGS. 11A-11B: Mut-3Δ34.5 & Mut-3ΔICP6 are significantly less potent than the Mut-3 virus against differentiated human keratinocyte cells. Human keratinocyte (HFK) cells were grown in EpiLife Media (Cascade Biologics) supplemented with human keratinocyte growth supplement according to the manufacturer's instructions. Undifferentiated HFKs (FIG. 11A) were seeded into a 96-well plate at a density of 2000 cells per well and cultured overnight. The cultures were then infected with Mut-3, Mut-3Δ34.5/C8G5 or Mut-3ΔICP6 D7-1 at MOIs of 0.0004, 0.004, 0.04, 0.4, and 4. Cell survival was determined by MTS assay after 3 days of virus infection. Differentiated HFKs were produced by adding 10% FBS and 1 mmol/l $CaCl_2$ to their culture medium 24 hours after seeding and allowing them to incubate an additional 48 hours prior to infection. Differentiated cell survival (FIG. 11B) was determined by MTS assay after 4 days of virus infection. Each sample was assayed in quadruplicate. Error bars represent standard deviation. Statistical significance was assessed using t test. *p≤0.05, **p≤0.01.
Figure 11B:
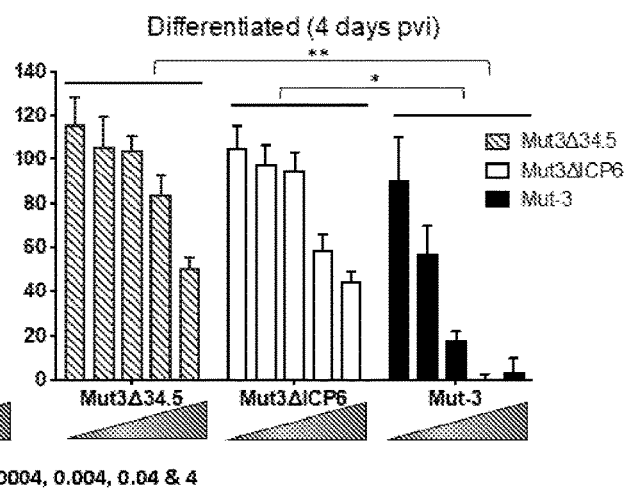
Figure 12:
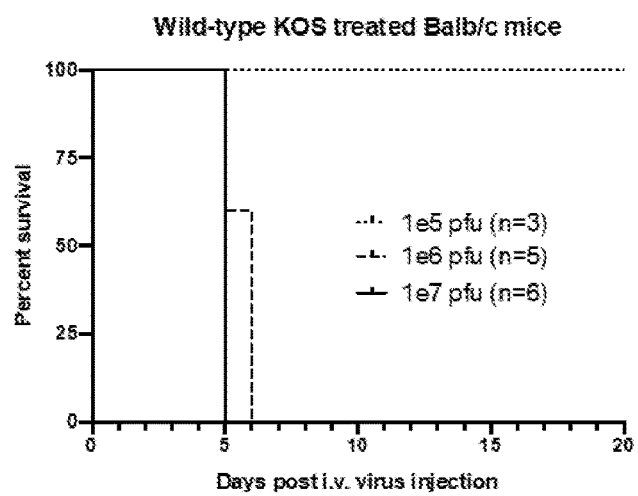
FIG. 12: Intravenous injection of 1e6 pfu of wild-type strain KOS virus is lethal to naïve Blab/c mice. Description of Safety Studies for Mut-3Δ34.5 & Mut-3ΔICP6. Applicant initiated a viral biodistribution study by injecting naïve non-tumor bearing Balb/c mice (20 male, 20 female) with 1e8 plaque-forming units (pfu) of each virus via tail vein. Applicant then sacrificed these animals at days 1, 14, 28, 56, and 85 (n=4 per time point) and collected their peripheral blood, testes (male), ovaries (female), spleens, lungs, kidneys, hearts, lungs and brains for analysis. Applicant observed each mouse daily for the first two weeks following virus administration, and then twice weekly until their scheduled day of sacrifice. The body weights of each mouse pre-virus were recorded and weekly thereafter. In parallel, the wild-type KOS virus was administered [dosage range: 1e5 to 1e7 pfu per mouse (n=3)] to groups of mice as the positive (non-safe) control. Applicant also performed pathological analysis of the harvested organs, comparing samples obtained from mice given the mutant viruses to those given the wild-type KOS virus. Applicant also utilized plaque assays to detect the replicative potential of these viruses. Result shows the survival curves of mice receiving a single dose of 1e5, 1e6 or 1e7 pfu of wild-type KOS virus.
Figures 13A, 13B:
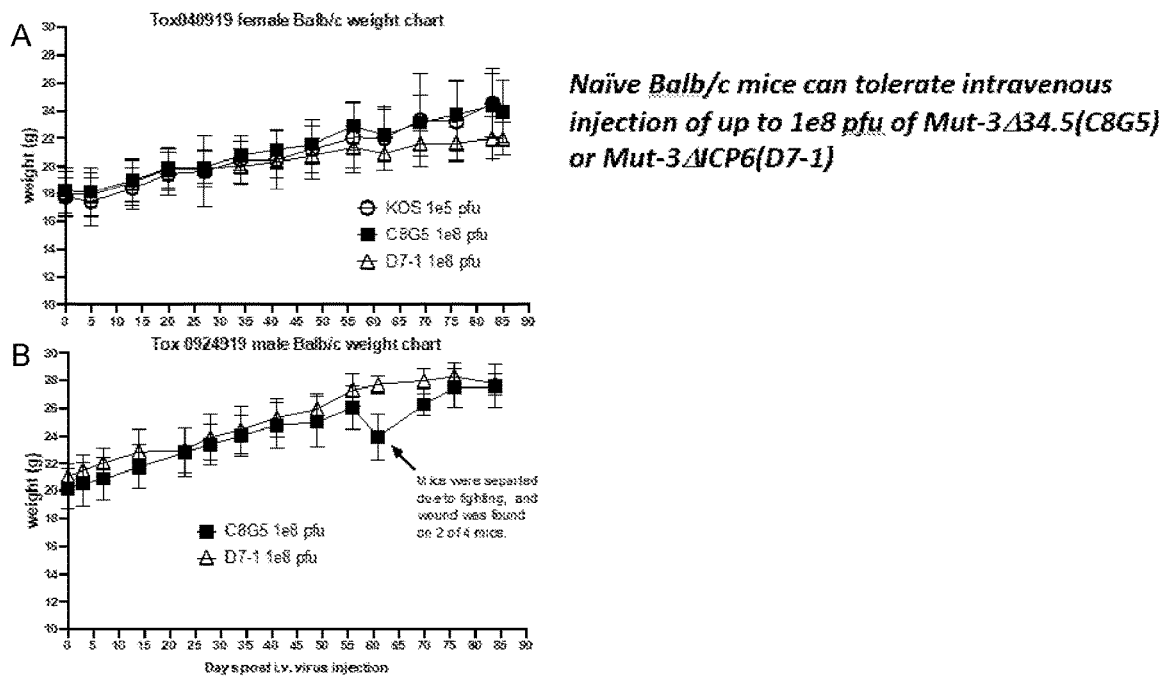
FIGS. 13A-13B: Naïve Balb/c mice can tolerate intravenous injection of up to 1e8 pfu of Mut-3Δ34.5(C8G5) or Mut-3ΔICP6(D7-1). Applicant completed the safety and biodistribution study and found that mice receiving up to 1e8 pfu of Mut-3Δ34.5(C8G5) or Mut-3ΔICP6(D7-1) remained healthy via physical examination until their designated day of sacrifice (up to day 85). In female mice, plaque assays revealed the presence of infectious virus in the heart, kidney, liver, ovary and spleen only at the 24 hour time point following infection.
Figures 20A, 20B, 20C, 20D:
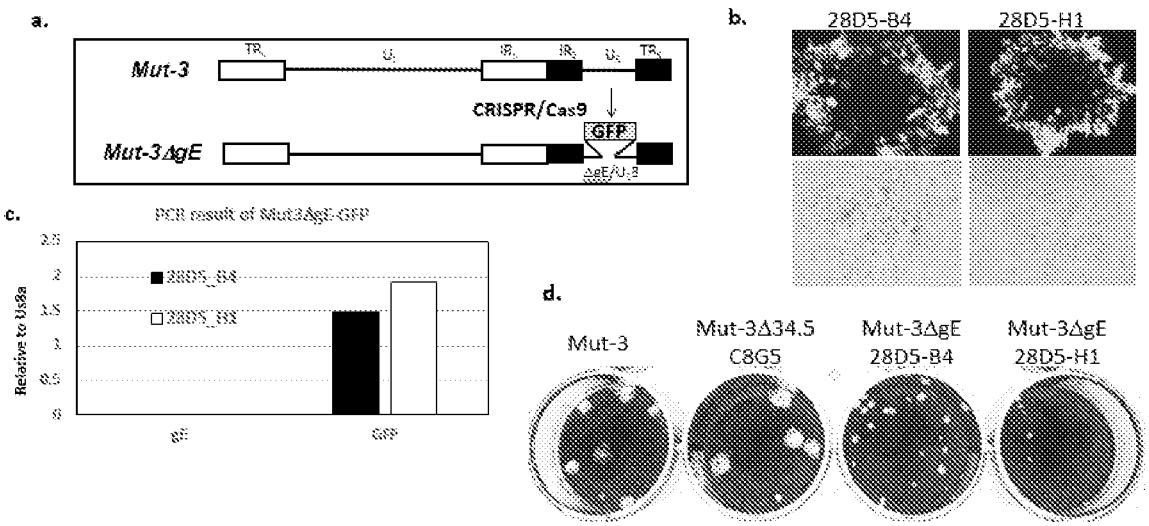
FIGS. 20A-20D show the result of a study showing plaque size of Mut-3ΔgE is much smaller compare to Mut-3 or Mut-3D34.5(C8G5).
Figures 21A, 21B, 21C, 21D:
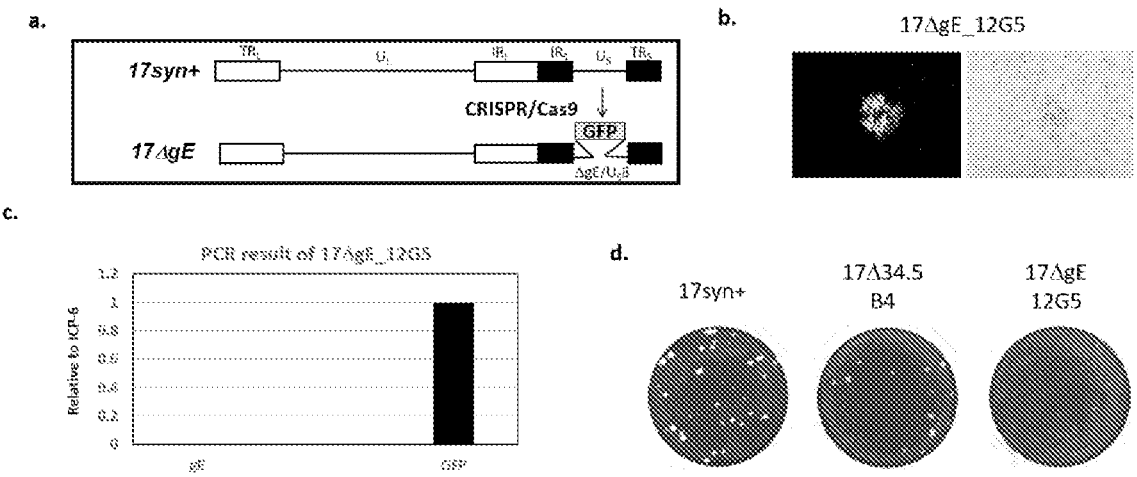
FIGS. 21A-21D provide the result of a study showing plaque size of 17ΔgE is much smaller compared to 17syn+ or 17Δ34.5.

An attenuated 17Δ34.5 mutant was produced by CRISPR-Cas9 gene editing technique to replace gI34.5 gene in wild-type strain 17+ with EGFP expressing cassette. 17Δ34.5 mutant had a lower potency than its wild-type strain 17+, but comparable to 17TermA (FIG. 5). The attenuation of 17Δ34.5 was further confirmed when Mut-3Δ34.5 displays much faster viral gene transfer and cell killing compared to 17 Δ34.5 (FIG. 6). In addition, Mut-3Δ34.5 was more effective than 17TermA to control human neuroblastoma growth in vivo (FIG. 7)

The Us8/gE Revertant in Mut-3Δ34.5 for Loss-Of-Function Study

Introducing a single nucleotide change in the HSV genome solely via CRISPR/Cas9 technology is difficult due to multiple copies of the genome during virus replication and the inability to accompany this gene editing with a selection marker. One construct can be the result of a two-step process in conjunction with CRISPR/Cas9 technology: replacing the whole gE coding region with a reporter gene (such as mCherry or red fluorescent protein (RFP)) to construct a gE-null Mut-3Δ34.5; then 2) replacing the reporter gene with the WT gE coding region, resulting in the gE-WT Mut-3Δ34.5 revertant. Examination of the extent to which both the gE-null intermediate and this gE revertant Mut-3Δ34.5 loses the phenotype can be observed as above. This disclosure provides this construct as well.

The Us8/gE A151T Mutation in Mut-3 Parent 17TermA for a Gain-Of-Function

As above, the gE mutant 17TermA can be constructed in two steps: 1) completely knocking out the gE coding region and replace it with a reporter gene (e.g., GFP); then 2) replacing the reporter gene by knocking in the gE coding region containing the A151T mutation. The phenotype of the Mut-3Δ34.5 will be determined. This disclosure provides this construct as well.

If gE A151T is only responsible for partial or none of the observed phenotypes, or even if so, other mutations in Mut-3 are provided by this disclosure. The mutants are constructed by systematically undertaking similar gain- and loss-of-function approaches as described herein, and as noted in Table 1, alone or in combination. Safety profile and efficacy of attenuated Mut-3Δ34.5 can be tested in mouse models. Thus, this disclosure provides the animal models used to test the mutants as well as the methods to do so.

The Mut-3 strain, a potent and WT-like HSV mutant was constructed from the recombination of 17TermA and rRp450. An attenuated version, Mut-3Δ34.5, was created through the deletion of $\gamma_1 34.5$/RL1, the viral virulence protein, to ensure its safety for clinical use. No adverse clinical signs or significant changes in body weight in Balb/c mice more than 85 days after intravenously administering up to 1e8 plaque-forming units (pfu) in applicant pilot toxicology study were observed (not shown). In addition, Mut-3Δ34.5 also shows anti-tumor efficacy in a highly aggressive neuroblastoma model both in vitro (FIG. 3A) and in vivo (FIG. 7) as compared to 17TermA.

The Biodistribution Profile of Mut-3Δ34.5 in Naïve Non-Tumor Bearing Mice

Applicant's own study shows that naïve Balb/c mice can tolerate up to 1e8 pfu of intravenously (iv) delivered Mut-3Δ34.5 virus without any physical sign of illness for more than 85 days. A biodistribution study was performed starting with iv administration of the previously tested highest dose (1e8 pfu of Mut-3Δ34.5 virus per mouse) to naïve non-tumor bearing Balb/c mice of both genders (30 mice per gender).

Peripheral blood is collected and then the mice are sacrificed. Testes, ovaries, spleen, lung, kidneys, heart, lungs and brain are harvested at 24 h, 14 d, 28 d, 56 d and 85 d pvi (n=6 each point). Half of the organs are embedded in formalin to preserve for pathology analysis, and the other half is homogenized for qPCR analysis of HSV genome and plaque assay to access the viral load in each organ. The mice are observed daily for the first two weeks following virus administration, and then observes twice weekly until the scheduled sacrificed day. The body weight of each mouse is measured pre-virus and weekly thereafter. The mice are sacrificed to show the existence or non-existence of adverse clinical signs or with >20% weight loss and are analyzed for viral activity in the organs as described above. In parallel, the wild type KOS virus [dosage range: $1\times10^5$ to $1\times10^7$ pfu per mouse (n=3)] is administered to groups of mice as the positive (non-safe) control. Applicant previously found a dose of $1\times10^6$ pfu KOS virus was uniformly lethal within 2 to 3 days in FVBN mice. qPCR is performed to analyze HSV genome copies, plaque assay to evaluate virus activities and pathology analysis in the organs of positive control mice that show signs of illness. These results can serve as positive indicators/threshold to evaluate the data collected from Mut-3Δ34.5-treated mice. The pathological changes in tissues/organs in Mut-3Δ34.5-treated groups are further evaluated to show comparable viral loads to the positive control. 6 mice per group for each gender are used to assess the biodistribution and safety and tolerance over different period of time. The biodistribution of Mut-3Δ34.5 is measured by the numbers of HSV genome copies per nanogram of genomic DNA in different organs over different times with descriptive statistics and compared with univariate analyses (if applicable).

Cytotoxicity of Mut-3Δ34.5 with Other $\gamma_1$34.5-Null Viruses (17TermA & T-VEC) in Various Pediatric Cancer Cell Lines In Vitro Superior killing by Mut-3Δ34.5 was observed compared to 17TermA in human and murine neuroblastoma cells (FIG. 3A). Using the same MTS in vitro assay shown in FIG. 3A, the same analysis is applied to other pediatric cancer cells, such as sarcomas, malignant peripheral nerve sheath tumor (MPNST) and brain tumors (applicant have access to numerous models) to determine if the increased potency phenotype is applicable across different tumor types. The most effective line from each cell type is used to perform in vivo efficacy studies.

Examine the Efficacy of Mut-3Δ34.5 in Human Pediatric Tumor Models Compared to Other oHSV Therapeutics, 17TermA & T-VEC.

One of the highly responsive models of each tumor type (three total) is chosen to conduct efficacy studies in xenografts using 5 to 6-week-old female athymic nude mice. When tumors reach 150–300 mm³, mice are pooled and randomized into 3 groups (n=11 each): i) phosphate-buffered saline (PBS) control, ii) Mut-3Δ34.5 virus, or iii) 17TermA or T-VEC virus. For efficacy between viruses, a minimum of 11 mice per group are used to detect large differences (20% vs. 80% at d20) in survival and tumor growth with a minimum 80% power. Each mouse is treated intratumorally with either $1\times10^7$ pfu of virus in 100 μl of PBS or PBS only (control) every other day with three injections total treatment regimen based on applicant previous study. The mice are monitored for tumor volumes (twice weekly) and body weight (weekly) for 80 days following virus injections. The endpoint criteria include tumor volume exceeding 2500 mm³, tumor diameter reaching 2 cm, or weight loss >20%. Animal survival can be displayed using Kaplan-Meier curves and survival can be compared between groups by log-rank tests.

Efficacy of Mut-3Δ34.5 in Murine Pediatric Tumor Models Compared to Other oHSV Therapeutics (17TermA & T-VEC)

One of the highly responsive murine tumor models of each tumor type (two total) is chosen to conduct applicant efficacy studies in (5-6)-week gender matched C57BL6 mice. Similarly, mice are pooled and randomized into 3 groups, n=11 each: i) PBS, ii) Mut-3Δ34, iii) 17TermA or T-VEC. Each mouse is treated intratumorally with either 1e8 pfu of virus in 100 μl of PBS or PBS only every other day with three injections total as applicant previous study. The endpoint criteria include tumor volume exceeding 2500 mm³, tumor diameter reaching 2 cm, or weight loss >20%. Animal survival will be displayed using Kaplan-Meier curves and survival will be compared between groups by log-rank tests.

Summary of Pathology Analysis

Tissues from 4 wild-type KOS injected mice (1e6 & 1e7 pfu, 2 mice per dose) were submitted for pathology analysis via the OSU Comparative Pathology & Mouse Phenotyping Shared Resource. Tissues from Mut-3D34.5/C8G5 and Mut-3DICP6/D7-1 injected mice (24 hr & 14 d pvi time points, 2 mice per time point) were subsequently submitted for pathology analysis.

Pathology Report (Female): KOS Injected Mice

Lymphoplasmacytic encephalitis of the brainstem is consistent with published reports of CNS pathology in Balb/c mice injected with HSV-1. All mice examined in this submission had this lesion, though one submitted brain included only a small segment of the brainstem and thus the lesion appeared milder than in the other three mice. Sections of adrenal gland were present with the kidney section from two of the mice. Both of these mice had marked necrosis of both the adrenal cortex and medulla.

Pathology Report (Female): 24 hrs & 14 Days for Both Mut-3Δ34.5/C8G5 and Mut-3ΔICP6/D7-1 Injected Mice Samples from mice sacrificed 24 hr following HSV infection all had the following lesions with moderate to marked severity: periportal to midzonal hepatic necrosis, including individual hepatocytes and necrosis of focally extensive hepatic cords; marked splenic red pulp necrosis and moderate white pulp necrosis with smaller than expected follicles. Several 24 hr mice had increased apoptosis/necrosis of cells in follicles and the corpus luteum in ovarian tissue. This was not noted beyond expected amounts in the control mice evaluated months ago, and in the mice noted here it was in excess of expected amounts.

In day 14 mice, oval cell hyperplasia is a common chronic reaction of livers undergoing damage and is likely a response to your infection. A few samples of lung had necrotic and inflammatory lesions which were not noted in 24 hr animals. Overall, day 14 mice had far fewer and much milder lesions than 24 hr animals.

The mutant viruses developed in the lab may be contributing to necrosis of a variety of cell types, particularly at 24 hrs, including hepatocytes, splenocytes in red and white pulp, and cells in the ovary.

EQUIVALENTS

Unless otherwise defined, all technical and scientific terms used herein have the same meaning as commonly understood by one of ordinary skill in the art to which this invention belongs.

The inventions illustratively described herein may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention.

The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

All publications, patent applications, patents, and other references mentioned herein are expressly incorporated by reference in their entirety, including all formulas and figures, to the same extent as if each were incorporated by reference individually. In case of conflict, the present specification, including definitions, will control.

Other embodiments are set forth within the following claims.

```
SEQ ID NO. 1: The DNA sequence of ICP34.5 in Mut 3 and Mut-3ΔICP6 viral strains. The
c356a mutation is shown in bold and italic in the sequence below.
ATGGCCCGCCGCCGCCGCCATCGCGGCCCCCGCCGCCCCCGGCCGCCCGG
GCCCACGGGCGCGGTCCCAACCGCACAGTCCCAGGTAACCTCCACGCCCA
ACTCGGAACCCGTGGTCAGGAGCGCGCCCGCGGCCGCCCCGCCGCCGCCC
CCCGCCAGTGGGCCCCCGCCTTCTTGTTCGCTGCTGCTGCGCCAGTGGCT
CCACGTTCCCGAGTCCGCGTCCGACGACGACGACGACTGGCCGGACA
GCCCCCCGCCCGAGCCGGCGCCAGAGGCCCGGCCCACCGCCGCCGCCCCC
CGCCCCCGGTCCCCACCGCCCGGCGCGGGCCCGGGGGGCGGGGCTAACCC
CTCCCACCCCCCCTCACGCCCCTTCCGCCTTCCGCCGCGCCTCGCCCTCC
GCCTGCGCGTCACCGCAGAGCACCTGGCGCGCCTGCGCCTGCGACGCGCG
GGCGGGGAGGGGGCGCCGAAGCCCCCGCGACCCCCGCGACCCCCGCGAC
CCCCACGCGGGTGCGCTTCTCGCCCCACGTCCGGGTGCGCCACCTGGTGG
TCTGGGCCTCGGCCGCCCGCCTGGCGCGCCGCGGCTCGTGGGCCCGCGAG
CGGGCCGACCGGGCTCGGTTCCGGCGCCGGGTGGCGGAGGCCGAGGCGGT
CATCGGGCCGTGCCTGGGGCCCGAGGCCCGTGCCCGGGCCCTGGCCCGCG
GAGCCGGCCCGGCGAACTCGGTCTAA SEQ ID NO. 2 The amino acid sequence of ICP34.5 in Mut3 & Mut-3ΔICP6. The P119H
mutation is shown in bold and italic in the sequence below.
MARRRRHRGPRRPRPPGPTGAVPTAQSQVTSTPNSEPVVRSAPAAAPPPP
PASGPPPSCSLLLRQWLHVPESASDDDDDDWPDSPPPEPAPEARPTAAAP
RPRSPPPGAGPGGGANPSHPPSRPFRLPPRLALRLRVTAEHLARLRLRRA
GGEGAPKPPATPATPATPTRVRFSPHVRVRHLVVWASAARLARRGSWARE
RADRARFRRRVAEAEAVIGPCLGPEARARALARGAGPANSV SEQ ID NO. 3: the DNA coding sequence of EGFP. The ICP34.5 coding region was
replaced with a EGFP expression cassette (FIG. 5C, SEQ ID NO: 11) in Mut3ΔIC34.5
ATGGTGAGCAAGGGCGAGGAGCTGTTCACCGGGGTGGTGCCCATCCTGGT
CGAGCTGGACGGCGACGTAAACGGCCACAAGTTCAGCGTGTCCGGCGAGG
GCGAGGGCGATGCCACCTACGGCAAGCTGACCCTGAAGTTCATCTGCACC
ACCGGCAAGCTGCCCGTGCCCTGGCCCACCCTCGTGACCACCCTGACCTA
CGGCGTGCAGTGCTTCAGCCGCTACCCCGACCACATGAAGCAGCACGACT
TCTTCAAGTCCGCCATGCCCGAAGGCTACGTCCAGGAGCGCACCATCTTC
TTCAAGGACGACGGCAACTACAAGACCCGCGCCGAGGTGAAGTTCGAGGG
CGACACCCTGGTGAACCGCATCGAGCTGAAGGGCATCGACTTCAAGGAGG
ACGGCAACATCCTGGGGCACAAGCTGGAGTACAACTACAACAGCCACAAC
GTCTATATCATGGCCGACAAGCAGAAGAACGGCATCAAGGTGAACTTCAA
GATCCGCCACAACATCGAGGACGGCAGCGTGCAGCTCGCCGACCACTACC
AGCAGAACACCCCCATCGGCGACGGCCCCGTGCTGCTGCCCGACAACCAC
TACCTGAGCACCCAGTCCGCCCTGAGCAAAGACCCCAACGAGAAGCGCGA
TCACATGGTCCTGCTGGAGTTCGTGACCGCCGCCGGGATCACTCTCGGCA
TGGACGAGCTGTACAAGAAGCTTAGCCATGGCTTCCCGCCGGAGGTGGAG
GAGCAGGATGATGGCACGCTGCCCATGTCTTGTGCCCAGGAGAGCGGGAT
GGACCGTCACCCTGCAGCCTGTGCTTCTGCTAGGATCATGTGTAG SEQ ID NO. 4: the amino acid coding sequence of EGFP.
MVSKGEELFTGVVPILVELDGDVNGHKFSVSGEGEGDATYGKLTLKFICT
TGKLPVPWPTLVTTLTYGVQCFSRYPDHMKQHDFFKSAMPEGYVQERTIF
FKDDGNYKTRAEVKFEGDTLVNRIELKGIDFKEDGNILGHKLEYNYNSHN
VYIMADKQKNGIKVNFKIRHNIEDGSVQLADHYQQNTPIGDGPVLLPDNH
YLSTQSALSKDPNEKRDHMVLLEFVTAAGITLGMDELYKKLSHGFPPEVE
EQDDGTLPMSCAQESGMDRHPAACASARINV
```

-continued

SEQ ID NO. 5: the DNA sequence of ICP34.5 in the 17TermA strain.
ATGGCCCGCCGCCGCCGCCATCGCGGCCCCCGCCGCCCCCGGCCGCCCGG
GCCCACGGGCGCCGTCCCAACCGCACAGTCCCAGGTAACCTAGACTAGTC
TAGCGTAACCTCCACGCCCAACTCGGAACCCGCGGTCAGGAGCGCGCCCG
CGGCCGCCCCGCCGCCGCCCCCGCCGGTGGGCCCCCGCCTTCTTGTTCG
CTGCTGCTGCGCCAGTGGCTCCACGTTCCCGAGTCCGCGTCCGACAACGA
CGATGACGACGACTGGCCGGACAGCCCCCGCCCGAGCCGGCGCCAGAGG
CCCGGCCCACCGCCGCCGCCCCCGGCCCCGGCCCCCACCGCCGGCGTG
GGCCCGGGGGGCGGGCTGACCCCTCCCACCCCCCCTCGCGCCCCTTCCG
CCTTCCGCCGCGCCTCGCCCTCCGCCTGCGCGTCACCGCGGAGCACCTGG
CGCGCCTGCGCCTGCGACGCGCGGGCGGGGAGGGGGCGCCGGAGCCCCCC
GCGACCCCCGCGACCCCCGCGACCCCCGCGACCCCCGCGACCCCCGCGCG
GGTGCGCTTCTCGCCCCACGTCCGGGTGCGCCACCTGGTGGTCTGGGCCT
CGGCCGCCCGCCTGGCGCGCCGCGGCTCGTGGGCCCGCGAGCGGGCCGAC
CGGGCTCGGTTCCGGCGCCGGGTGGCGGAGGCCGAGGCGGTCATCGGGCC
GTGCCTGGGGCCCGAGGCCCGTGCCCGGGCCCTGGCCCGCGGAGCCGGCC
CGGCGAACTCGGTCTAA SEQ ID NO. 6: the amino acid sequence of ICP34.5 in the 17TermA strain.
MARRRRHRGPRRPRPPGPTGAVPTAQSQVT*
(*Stop codon-sequences after * are predicted no expressed)

SEQ ID NO. 7: the DNA sequence of ICP34.5 in the rRp450 strain.
ATGGCCCGCCGCCGCCATCGCGGCCCCCGCCGCCCCCGGCCGCCCGGGCC
CACGGGCGCGGTCCCAACCGCACAGTCCCAGGTAACCTCCACGCCCAACT
CGGAACCCGTGGTCAGGAGCGCGCCCGCGGCCGCCCCGCCGCCGCCCCCC
GCCAGTGGGCCCCCGCCTTCTTGTTCGCTGCTGCTGCGCCAGTGGCTCCA
CGTTCCCGAGTCCGCGTCCGACGACGACGACGACGACTGGCCGGACAGCC
CCCCGCCCGAGCCGGCGCCAGAGGCCCGGCCCACCGCCGCCCCCCCGC
CCCCGGTCCCCACCGCCCGGCGCGGGCCCGGGGGGCGGGGCTAACCCCTC
CCCCCCCCCCTCACGCCCCTTCCGCCTTCCGCCGCGCCTCGCCCTCCGCC
TGCGCGTCACCGCAGAGCACCTGGCGCGCCTGCGCCTGCGACGCGCGGGC
GGGGAGGGGGCGCCGAAGCCCCCGCGACCCCCGCGACCCCCGCGACCCC
CACGCGGGTGCGCTTCTCGCCCCACGTCCGGGTGCGCCACCTGGTGGTCT
GGGCCTCGGCCGCCCGCCTGGCGCGCCGCGGCTCGTGGGCCCGCGAGCGG
GCCGACCGGGCTCGGTTCCGGCGCCGGGTGGCGGAGGCCGAGGCGGTCAT
CGGGCCGTGCCTGGGGCCCGAGGCCCGTGCCCGGGCCCTGGCCCGCGGAG
CCGGCCCGGCGAACTCGGTCTAA SEQ ID NO. 8: the amino acid sequence of ICP34.5 in the rRp450 strain.
MARRRHRGPRRPRPPGPTGAVPTAQSQVTSTPNSEPVVRSAPAAAPPPPP
ASGPPPSCSLLLRQWLHVPESASDDDDDWPDSPPPEPAPEARPTAAAPR
PRSPPPPGAGPGGGANPSPPPSRPFRLPPRLALRLRVTAEHLARLRLRRAG
GEGAPKPPATPATPATPTRVRFSPHVRVRHLVVWASAARLARRGSWARER
ADRARFRRRVAEAEAVIGPCLGPEARARALARGAGPANSV SEQ ID NO. 9: the DNA sequence of ICP34.5 in the wildtype 17 strain.
ATGGCCCGCCGCCGCCGCCATCGCGGCCCCCGCCGCCCCCGGCCGCCCGG
GCCCACGGGCGCGGTCCCAACCGCACAGTCCCAGGTAACCTCCACGCCCA
ACTCGGAACCCGTGGTCAGGAGCGCGCCCGGCCGCCCCCGCCGCCCCC
CCCGCCAGTGGGCCCCCGCCTTCTTGTTCGCTGCTGCTGCGCCAGTGGCT
CCACGTTCCCGAGTCCGCGTCCGACGACGACGACGACGACTGGCCGGACA
GCCCCCCGCCCGAGCCGGCGCCAGAGGCCCGGCCCACCGCCGCCGCCCCC
CGCCCCCGGTCCCCACCGCCCGGCGCGGGCCCGGGGGGCGGGGCTAACCC
CTCCCACCCCCCCTCACGCCCCTTCCGCCTTCCGCCGCGCCTCGCCCTCC
GCCTGCGCGTCACCGCAGAGCACCTGGCGCGCCTGCGCCTGCGACGCGCG
GGCGGGGAGGGGGCGCCGAAGCCCCCCGCGACCCCCGCGACCCCCGCGAC
CCCCACGCGGGTGCGCTTCTCGCCCCACGTCCGGGTGCGCCACCTGGTGG
TCTGGGCCTCGGCCGCCCGCCTGGCGCGCCGCGGCTCGTGGGCCCGCGAG
CGGGCCGACCGGGCTCGGTTCCGGCGCCGGGTGGCGGAGGCCGAGGCGGT
CATCGGGCCGTGCCTGGGGCCCGAGGCCCGTGCCCGGGCCCTGGCCCGCG
GAGCCGGCCCGGCGAACTCGGTCTAA SEQ ID NO. 51: the DNA sequence of ICP34.5 in the wild type 17 strain.
ATGGCCCGCCGCCGCCGCCATCGCGGCCCCCGCCGCCCCCGGCCGCCCGGGCCCACGGGCGC
CGTCCCAACCGCACAGTCCCAGGTAACCTCCACGCCCAACTCGGAACCCGCGGTCAGGAGCG
CGCCCGCGGCCGCCCCGCCGCCGCCCCCGCCGGTGGGCCCCCGCCTTCTTGTTCGCTGCTG
CTGCGCCAGTGGCTCCACGTTCCCGAGTCCGCGTCCGACGACGACGATGACGACGACTGGCC
GGACAGCCCCCGCCCGAGCCGGCGCCAGAGGCCCGGCCCACCGCCGCCGCCCCCCGGCCCC
GGCCCCCACCGCCCGGCGTGGGCCCGGGGGGCGGGGCTGACCCCTCCCACCCCCCCTCGCGC
CCCTTCCGCCTTCCGCCGCGCCTCGCCCTCCGCCTGCGCGTCACCGCGGAGCACCTGGCGCG
CCTGCGCCTGCGACGCGCGGGCGGGGAGGGGGCGCCGGAGCCCCCCGCGACCCCCGCGACCC
CCGCGACCCCCGCGACCCCCGCGCGGGTGCGCTTCTCGCCCCACGTCCGGGTG
CGCCACCTGGTGGTCTGGGCCTCGGCCGCCCGCCTGGCGCGCCGCGGCTCGTGGGCCCGCGA
GCGGGCCGACCGGGCTCGGTTCCGGCGCCGGGTGGCGGAGGCCGAGGCGGTCATCGGGCCGT
GCCTGGGGCCCGAGGCCCGTGCCCGGGCCCTGGCCCGCGGAGCCGGCCCGGCGAACTCGGTC
TAA SEQ ID NO. 10: the amino acid sequence of ICP34.5 in the wildtype 17 strain.
MARRRRHRGPRRPRPPGPTGAVPTAQSQVTSTPNSEPVVRSAPAAAPPPP
PASGPPPSCSLLLRQWLHVPESASDDDDDDWPDSPPPEPAPEARPTAAAP
RPRSPPPGAGPGGGANPSHPPSRPFRLPPRLALRLRVTAEHLARLRLRRA
GGEGAPKPPATPATPATPTRVRFSPHVRVRHLVVWASAARLARRGSWARE
RADRARFRRRVAEAEAVIGPCLGPEARARALARGAGPANSV SEQ ID NO. 52: the amino acid sequence of ICP34.5 in the wildtype 17 strain.
MARRRRHRGPRRPRPPGPTGAVPTAQSQVTSTPNSEPAVRSAPA
AAPPPPPAGGPPPSCSLLLRQWLHVPESASDDDDDDWPDSPPPEPAPEARPTAAAPR
PRPPPPGVGPGGGADPSHPPSRPFRLPPRLALRLRVTAEHLARLRLRRAGGEGAPEPP
ATPATPATPATPATPARVRFSPHVRVRHLVVWASAARLARRGSWARERADRARFRRRV
AEAEAVIGPCLGPEARARALARGAGPANSV SEQ ID NO: 11: the DNA sequence of EGFP cassette.
AACACATTAATTAAAAAACCTCCCACACCTCCCCCTGAACCTGAAACATA
AAATGAATGCAATTGTTGTTGTTAACTTGTTTATTGCAGCTTATAATGGT
TACAAATAAAGCAATAGCATCACAAATTTCACAAATAAAGCATTTTTTC
ACTGCATTCTAGTTGTGGTTTGTCCAAACTCATCAATGTATCTTATCATG
TCTGCTCGAAGCGGCCGGCCGCCCCGACTCTAGACTACACATTGATCCTA
GCAGAAGCACAGGCTGCAGGGTGACGGTCCATCCCGCTCTCCTGGGCACA
AGACATGGGCAGCGTGCCATCATCCTGCTCCTCCACCTCCGGCGGGAAGC
CATGGCTAAGCTTCTTGTACAGCTCGTCCATGCCGAGAGTGATCCCGGCG
GCGGTCACGAACTCCAGCAGGACCATGTGATCGCGCTTCTCGTTGGGGTC
TTTGCTCAGGGCGGACTGGGTGCTCAGGTAGTGGTTGTCGGGCAGCAGCA
CGGGGCCGTCGCCGATGGGGGTGTTCTGCTGGTAGTGGTCGGCGAGCTGC
ACGCTGCCGTCCTCGATGTTGTGGCGGATCTTGAAGTTCACCTTGATGCC
GTTCTTCTGCTTGTCGGCCATGATATAGACGTTGTGGCTGTTGTAGTTGT
ACTCCAGCTTGTGCCCCAGGATGTTGCCGTCCTCCTTGAAGTCGATGCCC
TTCAGCTCGATGCGGTTCACCAGGGTGTCGCCCTCGAACTTCACCTCGGC
GCGGGTCTTGTAGTTGCCGTCGTCCTTGAAGAAGATGGTGCGCTCCTGGA
CGTAGCCTTCGGGCATGGCGGACTTGAAGAAGTCGTGCTGCTTCATGTGG
TCGGGGTAGCGGCTGAAGCACTGCACGCCGTAGGTCAGGGTGGTCACGAG
GGTGGGCCAGGGCACGGGCAGCTTGCCGGTGGTGCAGATGAACTTCAGGG
TCAGCTTGCCGTAGGTGGCATCGCCCTCGCCCTCGCCGGACACGCTGAAC
TTGTGGCCGTTTACGTCGCCGTCCAGCTCGACCAGGATGGGCACCACCCC
GGTGAACAGCTCCTCGCCCTTGCTCACCATCCGGGAATTGCGGCCGCGGG
TACAATTCCGCAGCTTTTAGAGCAGAAGTAACACTTCCGTACAGGCCTAG
AAGTAAAGGCAACATCCACTGAGGAGCAGTTCTTTGATTTGCACCACCAC
CGGATCCGGGACCTGAAATAAAAGACAAAAAGACTAAACTTACCAGTTAA
CTTTCTGGTTTTTCAGTTCCTCGAGTACCGGATCCTCTAGAGTCCGAGG
CTGGATCGGTCCCGGTGTCTTCTATGGAGGTCAAAACAGCGTGGATGGCG
TCTCCAGGCGATCTGACGGTTCACTAAACGAGCTCTGCTTATATAGACCT
CCCACCGTACACGCCTACCGCCCATTTGCGTCAATGGGCGGAGTTGTTA
CGACATTTTGGAAAGTCCCGTTGATTTTGGTGCCAAAACAAACTCCCATT
GACGTCAATGGGGTGGAGACTTGGAAATCCCCGTGAGTCAAACCGCTATC
CACGCCCATTGATGTACTGCCAAAACCGCATCACCATGGTAATAGCGATG
ACTAATACGTAGATGTACTGCCAAGTAGGAAAGTCCCATAAGGTCATGTA
CTGGGCATAATGCCAGGCGGGCCATTTACCGTCATTGACGTCAATAGGGG
GCGTACTTGGCATATGATACACTTGATGTACTGCCAAGTGGGCAGTTTAC
CGTAAATACTCCACCCATTGACGTCAATGGAAAGTCCCTATTGGCGTTAC
TATGGGAACATACGTCATTATTGACGTCAATGGGCGGGGGTCGTTGGGCG
GTCAGCCAGGCGGGCCATTTACCGTAAGTTATGTAACGACCTGCAGGCAT
GCAAGCTCGAATTCGAACACGCAGATGCAGTCGGGGCGGCAGATCTTAAT
TAATGGCTGGTTGTTTGTTGT SEQ ID NO: 12: The DNA sequence of gE (glycoprotein E) in Mut-3, Mut-3Δ34.5 or Mut-
3ΔICP6 viral strain. The g451a mutation is shown in bold and italic in the sequence below.
ATGGATCGCGGGCGGTGGTGGGGTTTCTTCTCGGTGTTTGTGTTGTATC
GTGCTTGGCGGAACGCCCAAAACGTCCTGGAGACGGGTGAGTGTCGGCG
AGGACGTTTCGTTGCTTCCAGCTCCGGGGCCTACGGGGCGCGGCCCGACC
CAGAAACTACTATGGGCCGTGGAACCCCTGGATGGGTGCGGCCCCTTACA
CCCGTCGTGGGTCTCGCTGATGCCCCCCAAGCAGGTGCCCGAGACGGTCG
TGGATGCGGCGTGCATGCGCGCTCCGGTCCCGCTGGCGATGGCGTACGCC
CCCCCGGCCCCATCTGCGACCGGGGGTCTACGAACGGACTTCGTGTGGCA
GGAGCGCGCGGCCGTGGTTAACCGGAGTCTGGTTATTCACGGGGTCCGAG
AGACGGACAGCGGCCTGTATACCCTGTCCGTGGGCGACATAAAGGACCCG
*A*CTCGCCAAGTGGCCTCGGTGGTCCTGGTGGTGCAACCGGCCCAGTTCC
GACCCCACCCCCGACCCCAGCCGATTACGACGAGGATGACAATGACGAGG
GCGAGGACGAAAGTCTCGCCGGCACTCCCGCCAGCGGGACCCCCCGGCTC
CCGCCTCCCCCCGCCCCCCCGAGGTCTTGGCCCAGCGCCCCCGAAGTCTC
ACATGTGCGTGGGGTGACCGTGCGTATGGAGACTCCGGAAGCTATCCTGT
TTTCCCCCGGGGAGACGTTCAGCACGAACGTCTCCATCCATGCCATCGCC
CACGACGACCAGACCTACTCCATGGACGTCGTCTGGTTGAGGTTCGACGT
GCCGACCTCGTGTGCCGAGATGCGAATATACGAATCGTGTCTGTATCACC
CGCAGCTCCCAGAATGTCTGTCCCCGGCCGACGCGCCGTGCGCCGCGAGT
ACGTGGACGTCTCGCCTGGCCGTCCGCAGCTACGCGGGGTGTTCCAGAAC
AAACCCCCCACCGCGCTGTTCGGCCGAGGCTCACATGGAGCCCGTCCCGG
GGCTGGCGTGGCAGGCGGCCTCCGTCAATCTGGAGTTCCGGGACGCGTCC CCACAACACTCCGGCCTGTATCTGTGTGTGGTGTACGTCAACGACCATAT
TCACGCCTGGGGCCACATTACCATCAGCACCGCGGCGCAGTACCGGAACG
CGGTGGTGGAACAGCCCCTCCCACAGCGCGGCGCGGATTTGGCCGAGCCC
ACCCACCCGCACGTCGGGGCCCCTCCCCACGCGCCCCCAACCCACGGCGC
CCTGCGGTTAGGGGCGGTGATGGGGGCCGCCCTGCTGCTGTCTGCGCTGG
GGTTGTCGGTGTGGGCGTGTATGACCTGTTGGCGCAGGCGTGCCTGGCGG
GCGGTTAAAAGCAGGGCCTCGGGTAAGGGGCCCACGTACATTCGCGTGGC
CGACAGCGAGCTGTACGCGGACTGGAGCTCGGACAGCGAGGGAGAACGCG
ACCAGGTCCCGTGGCTGGCCCCCCCGGAGAGACCCGACTCTCCCTCCACC
AATGGATCCGGCTTTGAGATCTTATCACCAACGGCTCCGTCTGTATACCC
CCGTAGCGACGGGCATCAATCTCGCCGCCAGCTCACAACCTTTGGATCCG
GAAGGCCCGATCGCCGTTACTCCCAGGCCTCCGATTCGTCCGTCTTCTGG
TAA SEQ ID NO: 13: The amino acid sequence of gE (glycoprotein E) in Mut-3, Mut-3Δ34.5 or
Mut-3ΔICP6 viral strain. The A151T mutation is shown in bold and italic in the sequence
below.
MDRGAVVGFLLGVCVVSCLAGTPKTSWRRVSVGEDVSLLPAPGPTGRGPT
QKLLWAVEPLDGCGPLHPSWVSLMPPKQVPETVVDAACMRAPVPLAMAYA
PPAPSATGGLRTDFVWQERAAVVNRSLVIHGVRETDSGLYTLSVGDIKDP
*T*RQVASVVLVVQPAPVPTPPPTPADYDEDDNDEGEDESLAGTPASGTPRL
PPPPAPPRSWPSAPEVSHVRGVTVRMETPEAILFSPGETFSTNVSIHAIA
HDDQTYSMDVVWLRFDVPTSCAEMRIYESCLYHPQLPECLSPADAPCAAS
TWTSRLAVRSYAGCSRTNPPPRCSAEAHMEPVPGLAWQAASVNLEFRDAS
PQHSGLYLCVVYVNDHIHAWGHITISTAAQYRNAVVEQPLPQRGADLAEP
THPHVGAPPHAPPTHGALRLGAVMGAALLLSALGLSVWACMTCWRRRAWR
AVKSRASGKGPTYIRVADSELYADWSSDSEGERDQVPWLAPPERPDSPST
NGSGFEILSPTAPSVYPRSDGHQSRRQLTTFGSGRPDRRYSQASDSSVFW SEQ ID NO: 14: the DNA sequence of gE in the 17TermA strain.
ATGGATCGCGGGCGGTGGTGGGGTTTCTTCTCGGTGTTTGTGTTGTATC
GTGCTTGCGGGAACGCCCAAAACGTCCTGGAGACGGGTGAGTGTCGGCG
AGGACGTTTCGTTGCTTCCAGCTCCGGGGCCTACGGGGCGCGGCCCGACC
CAGAAACTACTATGGGCCGTGGAACCCCTGGATGGGTGCGGCCCCTTACA
CCCGTCGTGGGTCTCGCTGATGCCCCCCAAGCAGGTGCCCGAGACGGTCG
TGGATGCGGCGTGCATGCGCGCTCCGGTCCCGCTGGCGATGGCGTACGCC
CCCCCGGCCCCATCTGCGACCGGGGGTCTACGAACGGACTTCGTGTGGCA
GGAGCGCGCGGCCGTGGTTAACCGGAGTCTGGTTATTCACGGGGTCCGAG
AGACGGACAGCGGCCTGTATACCCTGTCCGTGGGCGACATAAAGGACCCG
GCTCGCCAAGTGGCCTCGGTGGTCCTGGTGGTGCAACCGGCCCCAGTTCC
GACCCCACCCCCGACCCCAGCCGATTACGACGAGGATGACAATGACGAGG
GCGAGGACGAAAGTCTCGCCGGCACTCCCGCCAGCGGGACCCCCCGGCTC
CCGCCTCCCCCGCCCCCCGAGGTCTTGGCCCAGCGCCCCGAAGTCTC
ACATGTGCGTGGGTGACCGTGCGTATGGAGACTCCGGAAGCTATCCTGT
TTTCCCCGGGGAGACGTTCAGCACGAACGTCTCCATCCATGCCATCGCC
CACGACGACCAGACCTACTCCATGGACGTCGTCTGGTTGAGGTTCGACGT
GCCGACCTCGTGTGCCGAGATGCGAATATACGAATCGTGTCTGTATCACC
CGCAGCTCCCAGAATGTCTGTCCCGGCCGACGCGCCGTGCGCCGCGAGT
ACGTGGACGTCTCGCCTGGCCGTCCGCAGCTACGCGGGGTGTTCCAGAAC
AAACCCCCCACCGCGCTGTTCGGCCGAGGCTCACATGGAGCCCGTCCCGG
GGCTGGCGTGGCAGGCGGCCTCCGTCAATCTGGAGTTCCGGGACGCGTCC
CCACAACACTCCGGCCTGTATCTGTGTGTGGTGTACGTCAACGACCATAT
TCACGCCTGGGGCCACATTACCATCAGCACCGCGGCGCAGTACCGGAACG
CGGTGGTGGAACAGCCCCTCCCACAGCGCGGCGCGGATTTGGCCGAGCCC
ACCCACCCGCACGTCGGGGCCCCTCCCCACGCGCCCCCAACCCACGGCGC
CCTGCGGTTAGGGGCGGTGATGGGGGCCGCCCTGCTGCTGTCTGCACTGG
GGTTGTCGGTGTGGGCGTGTATGACCTGTTGGCGCAGGCGTGCCTGGCGG
GCGGTTAAAAGCAGGGCCTCGGGTAAGGGGCCCACGTACATTCGCGTGGC
CGACAGCGAGCTGTACGCGGACTGGAGCTCGGACAGCGAGGGAGAACGCG
ACCAGGTCCCGTGGCTGGCCCCCCCGGAGAGACCCGACTCTCCCTCCACC
AATGGATCCGGCTTTGAGATCTTATCACCAACGGCTCCGTCTGTATACCC
CCGTAGCGATGGGCATCAATCTCGCCGCCAGCTCACAACCTTTGGATCCG
GAAGGCCCGATCGCCGTTACTCCCAGGCCTCCGATTCGTCCGTCTTCTGG
TAA SEQ ID NO: 15: the amino acid sequence of gE in the 17TermA strain.
MDRGAVVGFLLGVCVVSCLAGTPKTSWRRVSVGEDVSLLPAPGPTGRGPT
QKLLWAVEPLDGCGPLHPSWVSLMPPKQVPETVVDAACMRAPVPLAMAYA
PPAPSATGGLRTDFVWQERAAVVNRSLVIHGVRETDSGLYTLSVGDIKDP
ARQVASVVLVVQPAPVPTPPPTPADYDEDDNDEGEDESLAGTPASGTPRL
PPPPAPPRSWPSAPEVSHVRGVTVRMETPEAILFSPGETFSTNVSIHAIA
HDDQTYSMDVVWLRFDVPTSCAEMRIYESCLYHPQLPECLSPADAPCAAS
TWTSRLAVRSYAGCSRTNPPPRCSAEAHMEPVPGLAWQAASVNLEFRDAS
PQHSGLYLCVVYVNDHIHAWGHITISTAAQYRNAVVEQPLPQRGADLAEP
THPHVGAPPHAPPTHGALRLGAVMGAALLLSALGLSVWACMTCWRRRAWR
AVKSRASGKGPTYIRVADSELYADWSSDSEGERDQVPWLAPPERPDSPST
NGSGFEILSPTAPSVYPRSDGHQSRRQLTTFGSGRPDRRYSQASDSSVFW SEQ ID NO. 16: the DNA sequence of gE in the rRp450 strain.
ATGGATCGCGGGCGGTGGTGGGGTTTCTTCTCGGTGTTTGTGTTGTATC
GTGCTTGCGGGAACGCCCAAAACGTCCTGGAGACGGGTGAGTGTCGGCG
AGGACGTTTCGTTGCTTCCAGCTCCGGGGCCTACGGGGCGCGGCCCGACC
CAGAAACTACTATGGGCCGTGGAACCCCTGGATGGGTGCGGCCCCTTACA
CCCGTCGTGGGTCTCGCTGATGCCCCCAAGCAGGTGCCCGAGACGGTCG
TGGATGCGGCGTGCATGCGCGCTCCGGTCCCGCTGGCGATGGCGTACGCC
CCCCCGGCCCCATCTGCGACCGGGGGTCTACGAACGGACTTCGTGTGGCA
GGAGCGCGCGGCCGTGGTTAACCGGAGTCTGGTTATTCACGGGGTCCGAG
AGACGGACAGCGGCCTGTATACCCTGTCCGTGGGCGACATAAAGGACCCG
GCTCGCCAAGTGGCCTCGGTGGTCCTGGTGGTGCAACCGGCCCCAGTTCC
GACCCCACCCCCGACCCCAGCCGATTACGACGAGGATGACAATGACGAGG
GCGAGGACGAAAGTCTCGCCGGCACTCCCGCCAGCGGGACCCCCCGGCTC
CCGCCTCCCCCGCCCCCCGAGGTCTTGGCCCAGCGCCCCGAAGTCTC
ACATGTGCGTGGGGTGACCGTGCTATGGAGACTCCGGAAGCTATCCTGT
TTTCCCCCGGGGAGACGTTCAGCACGAACGTCTCCATCCATGCCATCGCC
CACGACGACCAGACCTACTCCATGGACGTCGTCTGGTTGAGGTTCGACGT
GCCGACCTCGTGTGCCGAGATGCGAATATACGAATCGTGTCTGTATCACC
CGCAGCTCCCAGAATGTCTGTCCCCGGCCGACGCGCCGTGCGCCGCGAGT
ACGTGGACGTCTCGCCTGGCCGTCCGCAGCTACGCGGGGTGTTCCAGAAC
AAACCCCCCACCGCGCTGTTCGGCCGAGGCTCACATGGAGCCCGTCCCGG
GGCTGGCGTGGCAGGCGGCCTCCGTCAATCTGGAGTTCCGGGACGCGTCC
CCACAACACTCCGGCCTGTATCTGTGTGTGGTGTACGTCAACGACCATAT
TCACGCCTGGGGCCACATTACCATCAGCACCGCGGCGCAGTACCGGAACG
CGGTGGTGGAACAGCCCCTCCCACAGCGCGGCGCGGATTTGGCCGAGCCC
ACCCACCCGCACGTCGGGGCCCCTCCCCACGCGCCCCCAACCCACGGCGC
CCTGCGGTTAGGGGCGGTGATGGGGGCCGCCCTGCTGCTGTCTGCGCTGG
GGTTGTCGGTGTGGGCGTGTATGACCTGTTGGCGCAGGCGTGCCTGGCGG
GCGGTTAAAAGCAGGGCCTCGGGTAAGGGGCCCACGTACATTCGCGTGGC
CGACAGCGAGCTGTACGCGGACTGGAGCTCGGACAGCGAGGGAGAACGCG
ACCAGGTCCCGTGGCTGGCCCCCCCCGGAGAGACCCGACTCTCCTCCACC
AATGGATCCGGCTTTGAGATCTTATCACCAACGGCTCCGTCTGTATACCC
CCGTAGCGACGGGCATCAATCTCGCCGCCAGCTCACAACCTTTGGATCCG
GAAGGCCCGATCGCCGTTACTCCCAGGCCTCCGATTCGTCCGTCTTCTGG
TAA SEQ ID NO. 17: the amino acid sequence of gE in the rRp450 strain.
MDRGAVVGFLLGVCVVSCLAGTPKTSWRRVSVGEDVSLLPAPGPTGRGPT
QKLLWAVEPLDGCGPLHPSWVSLMPPKQVPETVVDAACMRAPVPLAMAYA
PPAPSATGGLRTDFVWQERAAVVNRSLVIHGVRETDSGLYTLSVGDIKDP
ARQVASVVLVVQPAPVPTPPPTPADYDEDDNDEGEDESLAGTPASGTPRL
PPPPAPPRSWPSAPEVSHVRGVTVRMETPEATLESPGETFSTNVSIHATA
HDDQTYSMDVVWLRFDVPTSCAEMRIYESCLYHPQLPECLSPADAPCAAS
TWTSRLAVRSYAGCSRTNPPPRCSAEAHMEPVPGLAWQAASVNLEFRDAS
PQHSGLYLCVVYVNDHIHAWGHITISTAAQYRNAVVEQPLPQRGADLAEP
THPHVGAPPHAPPTHGALRLGAVMGAALLLSALGLSVWACMTCWRRRAWR
AVKSRASGKGPTYIRVADSELYADWSSDSEGERDQVPWLAPPERPDSPST
NGSGFEILSPTAPSVYPRSDGHQSRRQLTTFGSRPDRRYSQASDSSVFW SEQ ID NO. 18: the DNA sequence of gE in the wildtype 17 strain.
ATGGATCGCGGGCGGTGGTGGGGTTTCTTCTCGGTGTTTGTGTTGTATC
GTGCTTGCGGGAACGCCCAAAACGTCCTGGAGACGGGTGAGTGTCGGCG
AGGACGTTTCGTTGCTTCCAGCTCCGGGGCCTACGGGGCGCGGCCCGACC
CAGAAACTACTATGGGCCGTGGAACCCCTGGATGGGTGCGGCCCCTTACA
CCCGTCGTGGGTCTCGCTGATGCCCCCAAGCAGGTGCCCGAGACGGTCG
TGGATGCGGCGTGCATGCGCGCTCCGGTCCCGCTGGCGATGGCGTACGCC
CCCCCGGCCCCATCTGCGACCGGGGGTCTACGAACGGACTTCGTGTGGCA
GGAGCGCGCGGCCGTGGTTAACCGGAGTCTGGTTATTCACGGGGTCCGAG
AGACGGACAGCGGCCTGTATACCCTGTCCGTGGGCGACATAAAGGACCCG
GCTCGCCAAGTGGCCTCGGTGGTCCTGGTGGTGCAACCGGCCCCAGTTCC
GACCCCACCCCCGACCCCAGCCGATTACGACGAGGATGACAATGACGAGG
GCGAGGACGAAAGTCTCGCCGGCACTCCCGCCAGCGGGACCCCCCGGCTC
CCGCCTCCCCCGCCCCCCGAGGTCTTGGCCCAGCGCCCCGAAGTCTC
ACATGTGCGTGGGGTGACCGTGCTATGGAGACTCCGGAAGCTATCCTGT
TTTCCCCCGGGGAGACGTTCAGCACGAACGTCTCCATCCATGCCATCGCC
CACGACGACCAGACCTACTCCATGGACGTCGTCTGGTTGAGGTTCGACGT
GCCGACCTCGTGTGCCGAGATGCGAATATACGAATCGTGTCTGTATCACC
CGCAGCTCCCAGAATGTCTGTCCCCGGCCGACGCGCCGTGCGCCGCGAGT
ACGTGGACGTCTCGCCTGGCCGTCCGCAGCTACGCGGGGTGTTCCAGAAC
AAACCCCCCACCGCGCTGTTCGGCCGAGGCTCACATGGAGCCCGTCCCGG
GGCTGGCGTGGCAGGCGGCCTCCGTCAATCTGGAGTTCCGGGACGCGTCC
CCACAACACTCCGGCCTGTATCTGTGTGTGGTGTACGTCAACGACCATAT
TCACGCCTGGGGCCACATTACCATCAGCACCGCGGCGCAGTACCGGAACG
CGGTGGTGGAACAGCCCCTCCCACAGCGCGGCGCGGATTTGGCCGAGCCC
ACCCACCCGCACGTCGGGGCCCCTCCCCACGCGCCCCCAACCCACGGCGC
CCTGCGGTTAGGGGCGGTGATGGGGGCCGCCCTGCTGCTGTCTGCGCTGG
GGTTGTCGGTGTGGGCGTGTATGACCTGTTGGCGCAGGCGTGCCTGGCGG
GCGGTTAAAAGCAGGGCCTCGGGTAAGGGGCCCACGTACATTCGCGTGGC -continued

```
CGACAGCGAGCTGTACGCGGACTGGAGCTCGGACAGCGAGGGAGAACGCG
ACCAGGTCCCGTGGCTGGCCCCCCCGGAGAGACCCGACTCTCCCTCCACC
AATGGATCCGGCTTTGAGATCTTATCACCAACGGCTCCGTCTGTATACCC
CCGTAGCGACGGGCATCAATCTCGCCGCCAGCTCACAACCTTTGGATCCG
GAAGGCCCGATCGCCGTTACTCCCAGGCCTCCGATTCGTCCGTCTTCTGG
TAA
```

SEQ ID NO. 19: the amino acid sequence of gE in the wildtype 17 strain.
```
MDRGAVVGFLLGVCVVSCLAGTPKTSWRRVSVGEDVSLLPAPGPTGRGPT
QKLLWAVEPLDGCGPLHPSWVSLMPPKQVPETVVDAACMRAPVPLAMAYA
PPAPSATGGLRTDFVWQERAAVVNRSLVIHGVRETDSGLYTLSVGDIKDP
ARQVASVVLVVQPAPVPTPPPTPADYDEDDNDEGEDESLAGTPASGTPRL
PPPPAPPRSWPSAPEVSHVRGVTVRMETPEATLESPGETFSTNVSIHATA
HDDQTYSMDVVWLRFDVPTSCAEMRIYESCLYHPQLPECLSPADAPCAAS
TWTSRLAVRSYAGCSRTNPPPRCSAEAHMEPVPGLAWQAASVNLEFRDAS
PQHSGLYLCVVYVNDHIHAWGHITISTAAQYRNAVVEQPLPQRGADLAEP
THPHVGAPPHAPPTHGALRLGAVMGAALLLSALGLSVWACMTCWRRRAWR
AVKSRASGKGPTYIRVADSELYADWSSDSEGERDQVPWLAPPERPDSPST
NGSGFEILSPTAPSVYPRSDGHQSRRQLTTFGSGRPDRRYSQASDSSVFW
```

SEQ ID NO. 20: the DNA sequence of ICP0 in Mut 3, Mut-3Δ34.5 and Mut-3ΔICP6 viral strains.
The a848c (within intron) and g1712a (for R258c) mutations are shown in bold and italic
in the following sequence. Two introns are included (i.e., nucleotide (nt) 58 to nt 861, and
nt 1529 to nt 1663 of the following sequence, also see the sequences within the brackets).
```
ATGGAGCCCCGCCCCGGAGCGAGTACCCGCCGGCCTGAGGGCCGCCCCCA
GCGCGAG(GTGAGGGGCCGGGCGCCATGTCTGGGGCGCCATGTCTGGGGCG
CCATGTCTGGGGCGCCATGTCTGGGGCGCCATGTTGGGGGGCGCCATGTT
GGGGGGGCGCCATGTTGGGGGACCCCCGACCCTTACACTGGAACCGGCCGC
CATGTTGGGGGACCCCCACTCATACACGGGAGCCGGGCGCCATGTTGGGG
CGCCATGTTAGGGGGCGTGGAACCCCGTGACACTATATATACAGGGACCG
GGGGCGCCATGTTAGGGGGCGCGGAACCCCCTGACCCTATATATACAGGG
ACCGGGGTCGCCCTGTTAGGGGTCGCCATGTGACCCCCTGACTTTATATA
TACAGACCCCCAACACCTACACATGGCCCCTTTGACTCAGACGCAGGGCC
CGGGGTCGCCGTGGGACCCCCCTGACTCATACACAGAGACACGCCCCCAC
AACAAACACACAGGGACCGGGGTCGCCGTGTTAGGGGGCGTGGTCCCCAC
TGACTCATACGCAGGGCCCCCTTACTCACACGCATCTAGGGGGGTGGGGA
GGAGCCGCCCGCCATATTTGGGGGACGCCGTGGGACCCCCGACTCCGGTG
CGTCTGGAGGGCGGGAGAAGAGGGAAGAAGAGGGGGTCGGGATCCAAAGGA
CGGACCCAGACCACCTTTGGTTGCAGACCCCTTTCTCCCCCCTCTTCCGA
GGCCAGCAGGGGGGCAGGACTTTGTGAGGCGGGGGGGGAGGGGGAACTCG
TGGGCGCTGATTGACGCGGGAAATCCCCCCATTCTTACCCGCCCCC*C*TT
TTTCCCCTCAG)CCCGCCCCGGATGTCTGGGTGTTTCCCTGCGACCGAGAC
CTGCCGGACAGCGACGACTCGGAGGCGGAGACCGAAGTGGGGGGGCGGGG
GGACGCCGACCACCATGACGACGACTCCGCCTCCGAGGCGGACAGCACGG
ACACGGAACTGTTCGAGACGGGGCTGCTGGGGCCGCAGGGCGTGGATGGG
GGGGCGGTCTCGGGGGGGAGCCCCCCCCGCGAGGAAGACCCCGGCAGTTG
CGGGGGCGCCCCCCCCTCGAGAGGACGGGGGGAGCGACGAGGGCGACGTGT
GCGCCGTGTGCACGGATGAGATCGCGCCCCACCTGCGCTGCGACACCTTC
CCGTGCATGCACCGCTTCTGCATCCCGTGCATGAAAACCTGGATGCAATT
GCGCAACACCTGCCCGCTGTGCAACGCCAAGCTGGTGTACCTGATAGTGG
GCGTGACGCCCAGCGGGTCGTTCAGCACCATCCCGATCGTGAACGACCCC
CAGACCCGCATGGAGGCCGAGGAGGCCGTCAGGGCGGGCACGGCCGTGGA
CTTTATCTGGACGGGCAATCAGCGGTTCGCCCCGCGGTACCTGACCCTGG
GGGGCACACGGTGAGGGCCCTGTCGCCCACCCACCCGGAACCCACCACG
GACGAGGATGACGACGACCTGGACGACG(GTGAGGCGGGGGCGGCAAGGA
CCCTGGGGGAGGAGGAGGAGGAGGGGGGGAGGGAGGAATAGGCGGGCGG
GCGAGGAAAGGGCGGGCCGGGAGGGGGCGTAACCTGATCGCGCCCCCG
TTGTCTCTTGCAG)CAGACTACGTACCGCCCGCCCCCGCCGGACGCCCCG
CGCCCCCCCAG*A*CAGAGGCGCCGCCGCGCCCCCCGTGACGGGCGGGGCGT
CTCACGCAGCCCCCAGCCGGCCGCGGCTCGGACAGCGCCCCCTCGGCG
CCCATCGGGCCACACGGCAGCAGTAACACCAACACCACCACCAACAGCAG
CGGCGGCGGCGGCTCCCGCCAGTCGCGAGCCGCGGCGCCGCGGGGGGCGT
CTGGCCCCTCCGGGGGGGTTGGGGTTGGGGTTGGGGTTGTTGAAGCGGAG
GCGGGGCGGCCGAGGGGCCGGACGGGCCCCCTTGTCAACAGACCCGCCCC
CCTTGCAAACAACAGAGACCCCATAGTGATCAGCGACTCCCCCCCGGCCT
CTCCCCACAGGCCCCCGCGGCGCCCATGCCAGGCTCCGCCCCCCGCCCC
GGGCCCCCCGCGTCCGCGGCCGCGTCGGGACCCGCGCGCCCCCGCGCGGC
CGTGGCCCCGTGCGTGCGAGCGCCGCCTCCGGGGCCCGGCCCCGCGGCC
CGGCCCCCGGGGCGGAGCCGGCCGCCCGCCCCGCGGACGCGCGCCGTGTG
CCCCAGTCGCACTCGTCCCTGGCTCAGGCCGCGAACCAAGAACAGAGTCT
GTGCCGGGCGCGTGCGACGGTGGCGCGCGGCTCGGGGGGGCCGGGCGTGG
AGGGTGGGCACGGGCCCTCCCGCGGCGCCGCCCCTCCGGCGCCGCCCCG
CTCCCCTCCGCCGCCTCTGTCGAGCAGGAGGCGGCGGTGCGTCCGAGGAA
GAGGCGCGGGTCGGGCCAGGAAAACCCCTCCCCCCAGTCCACGCGTCCCC
CCCTCGCGCCGGCAGGGGCCAAGAGGGCGGCGACGCACCCCCCCTCCGAC
TCAGGGCCGGGGGGCGCGGCCAGGGTGGGCCCGGGACCCCCTGACGTC
CTCGGCGGCCTCCGCCTCTTCCTCCTCTGCCTCTTCCTCCTCGGCCCCGA
CCCCCGCGGGGGCCGCCTCTTCCGCCGCCGGGGCCGCGTCCTCCTCCGCT
TCCGCCTCCTCGGGCGGGGCCGTCGGTGCCCTGGGAGGGAGACAAGAGGA
```

-continued

```
AACCTCCCTCGGCCCCCGCGCTGCTTCTGGGCCGCGGGGCCGAGGAAGT
GTGCCCGGAAGACGCGCCACGCGGAGACTTCCGGGGCCGTCCCCGCGGGC
GGCCTCACGCGCTACCTGCCCATCTCGGGGGTCTCTAGCGTGGTCGCCCT
GTCGCCTTACGTGAACAAGACGATCACGGGGGACTGCCTGCCCATCCTGG
ACATGGAGACGGGGAACATCGGGGCGTACGTGGTCCTGGTGGACCAGACG
GGAAACATGGCGACCCGGCTGCGGGCCGCGGTCCCCGGCTGGAGCCGCCG
CACCCTGCTCCCCGAGACCGCGGGTAACCACGTGATGCCCCCCGAGTACC
CGACGGCCCCCGCGTCGGAGTGGAACAGCCTCTGGATGACCCCCGTGGGG
AACATGCTGTTCGACCAGGGCACCCTAGTGGGCGCCCTGGACTTCCGCAG
CCTGCGGTCTCGGCACCCGTGGTCCGGGGAGCAGGGGGCGTCGACCCGGG
ACGAGGGAAAACAATAA
```

SEQ ID NO. 21: The amino acid sequence of ICP0 in Mut 3, Mut-3Δ34.5 and Mut-3ΔICP6.
The R258H mutation is shown in italic and bold in the sequence below.
```
MEPRPGASTR RPEGRPQREP APDVWVFPCD RDLPDSSDSE AETEVGGRGD ADHHDDDSAS
EADSTDTELF ETGLLGPQGV DGGAVSGGSP PREEDPGSCG GAPPREDGGS DEGDVCAVCT
DEIAPHLRCD TFPCMHRFCI PCMKTWMQLR NTCPLCNAKL VYLIVGVTPS GSFSTIPIVN
DPQTRMEAEE AVRAGTAVDF IWTGNQRFAP RYLTLGGHTV RALSPTHPEP TTDEDDDDLD
DADYVPPAPR RTPRAPPHRG AAAPPVTGGA SHAAPQPAAA RTAPPSAPIG PHGSSNTNTT
TNSSGGGGSR QSRAAAPRGA SGPSGGVGVG VGVVEAEAGR PRGRTGPLVN RPAPLANNRD
PIVISDSPPA SPHRPPAAPM PGSAPRPGPP ASAAASGPAR PRAAVAPCVR APPPGPGPRA
PAPGAEPAAR PADARRVPQS HSSLAQAANQ EQSLCRARAT VARGSGGPGV EGGHGPSRGA
APSGAAPLPS AASVEQEAAV RPRKRRGSGQ ENPSPQSTRP PLAPAGAKRA ATHPPSDSGP
GGRGQGGPGT PLTSSAASAS SSSASSSSAP TPAGAASSAA GAASSSASAS SGGAVGALGG
RQEETSLGPR AASGPRGPRK CARKTRHAET SGAVPAGGLT RYLPISGVSS VVALSPYVNK
TITGDCLPIL DMETGNIGAY VVLVDQTGNM ATRLRAAVPG WSRRTLLPET AGNHVMPPEY
PTAPASEWNS LWMTPVGNML FDQGTLVGAL DFRSLRSRHP WSGEQGASTR DEGKQ
```

SEQ ID NO. 22: the DNA sequence of ICP0 in the 17TermA strain. Two introns are
included (i.e., nucleotide (nt) 58 to nt 822, and nt 1490 to nt 1625 of the following
sequence, also see the sequences within the brackets)
```
ATGGAGCCCCGCCCCGGAGCGAGTACCCGCCGGCCTGAGGGCCGCCCCA
GCGCGAG(GTGAGGGGCCGGGCGCCATGTCTGGGGCGCCATATTGGGGGGC
GCCATATTGGGGGGCGCCATGTTGGGGGACCCCCGACCCTTACACTGGAA
CCGGCCGCCATGTTGGGGGACCCCCACTCATACACGGGAGCCGGCGCCA
TGTTGGGGCGCCATGTTAGGGGGCGTGGAACCCCGTGACACTATATATAC
AGGGACCGGGGCGCCATGTTAGGGGGTGCGGAACCCCCTGACCCTATAT
ATACAGGGACCGGGGTCGCCCTGTTGGGGGTCGCCATGTGACCCCCTGAC
TTTATATATACAGACCCCCAACACATACACATGGCCCCTTTGACTCAGAC
GCAGGGCCCGGGTCGCCGTGGGACCCCCTGACTCATACACAGAGACACG
CCCCCACAACAAACACACAGGGACCGGGGTCGCCGTGTTGGGGGCGTGGT
CCCCACTGACTCATACGCAGGCCCCCCTTACTCACACGCATCTAGGGGGG
TGGGGAGGAGCCGCCCGCCATATTTGGGGGACGCCGTGGGACCCCCGACT
CCGGTGCGTCTGGAGGGCGGGAGAAGAGGGAAGAAGAGGGGTCGGGATCC
AAAGGACGGACCCAGACCACCTTTGGTTGCAGACCCCTTTCTCCCCCCTC
TTCCGAGGCCAGCAGGGGGCAGGACTTTGTGAGGCGGGGGGGGAGAGG
GGGAACTCGTGGGTGCTGATTGACGCGGGAAATCCCCCCCATTCTTACC
CGCCCCCCTTTTTTCCCCTTAG)CCCGCCCCGGATGTCTGGGTGTTTCCCT
GCGACCGAGACCTGCCGGACAGCAGCGACTCTGAGGCGGAGACCGAAGTG
GGGGGGCGGGGGACGCCGACCACCATGACGACGACTCCGCCTCCGAGGC
GGACAGCACGGACACGGAACTGTTCGAGACGGGGCTGCTGGGGCCGCAGG
GCGTGGATGGGGGGCGGTCTCGGGGGGGAGCCCCCCCCGCGAGGAAGAC
CCCGGCAGTTGCGGGGGCGCCCCCCCTCGAGAGGACGGGGGGAGCGACGA
GGGTGACGTGTGCGCCGTGTGCACGGATGAGATCGCGCCCCACCTGCGCT
GCGACACCTTCCCGTGCATGCACCGCTTCTGCATCCCGTGCATGAAAACC
TGGATGCAATTGCGCAACACCTGCCCGCTGTGCAACGCCAAGCTGGTGTA
CCTGATAGTGGGCGTGACGCCCAGCGGGTCGTTCAGCACCATCCCGATCG
TGAACGACCCCCAGACCCGCATGGAGGCCGAGGAGGCCGTCAGGGCGGGC
ACGGCCGTGGACTTTATCTGGACGGGCAATCAGCGGTTCGCCCCCGGTA
CCTGACCCTGGGGGGGCACACGGTGAGGGCCCTGTCGCCCACCCACCCGG
AACCCACCACGGACGAGGATGACGACGACCTGGACACG(GTGAGGCGGGG
GGCGGCAAGGACCCTGGGGGAGGAGGAGGAGGAGGGGGGGGAGGGAGGA
ATAGGCGGGCGGGCGAGGAAAGGGCGGGCCGGGGAGGGGGCGTAACCTGA
TCGCGCCCCCCGTTGTCTCTTGCAG)CAGACTACGTACCGCCCGCCCCCG
CCGGACGCCCCGCGCCCCCCACGCAGAGGCGCCGCCGCGCCCCCCGTGA
CGGGCGGGGCGTCTCACGCAGCCCCCAGCCGGCCGCGGCTCGGACAGCG
CCCCCCTCGGCGCCCATCGGGCCACACGGCAGCAGTAACACCAACACCAC
CACCAACAGCAGCGGCGGCGGCGGCTCCCGCCAGTCGCGAGCCGCGGCGC
CGCGGGGGGCGTCTGGCCCCTCCGGGGGGGTGGGGTTGGGGTTGGGGTT
GTTGAAGCGGAGGCGGGCGGCCGAGGGGCCGGACGGGCCCCCTTGTCAA
CAGACCCGCCCCCCTTGCAAACAACAGAGACCCCATAGTGATCAGCGACT
CCCCCCCCGGCCTCTCCCCACAGGCCCCCCGCGGCGCCCATGCCAGGCTCC
GCCCCCCGCCCCGGGCCCCGCGTCCGCGGCCGCGTCGGGACCCGCGCG
CCCCCGCGCGGCCGTGGCCCCGTGCGTGCGAGCGCCGCCTCCGGGGCCCG
GCCCCCGCGCCCCGGCCCCGGGGCGGAGCCGGCCGCCCGCCCCGCGGAC
GCGCGCCGTGTGCCCCAGTCGCACTCGTCCCTGGCTCAGGCCGCGAACCA
AGAACAGAGTCTGTGCCGGGCGCGTGCGACGGTGGCGCGCGGCTCGGGGG
GGCCGGGCGTGAGGGTGGGCACGGGCCCTCCCGCGCGCCGCCCCCTCC
GGCGCCGCCCCGCTCCCCTCCGCCGCCTCTGTCGAGCAGGAGGCGGCGGT
```

```
GCGTCCGAGGAAGAGGCGCGGGTCGGGCCAGGAAAACCCCTCCCCCCAGT
CCACGCGTCCCCCCCTCGCGCCGGCAGGGGCCAAGAGGGCGGCGACGCAC
CCCCCCTCCGACTCAGGGCCGGGGGGGCGCGGCCAGGGTGGGCCCGGGAC
CCCCCTGACGTCCTCGGCGGCCTCCGCCTCTTCCTCCTCTGCCTCTTCCT
CCTCGGCCCCGACCCCCGCGGGGGCCGCCTCTTCCGCCGCCGGGGCCGCG
TCCTCCTCCGCTTCCGCCTCCTCGGGCGGGGCCGTCGGTGCCCTGGGAGG
GAGACAAGAGGGAAACCTCCCTCGGCCCCCGCGCTGCTTCTGGGCCGCGGG
GGCCGAGGAAGTGTGCCCGGAAGACGCGCCACGCGGAGACTTCCGGGGCC
GTCCCCGCGGGCGGCCTCACGCGCTACCTGCCCATCTCGGGGGTCTCTAG
CGTGGTCGCCCTGTCGCCTTACGTGAACAAGACTATCACGGGGGACTGCC
TGCCCATCCTGGACATGGAGACGGGGAACATCGGGGCGTACGTGGTCCTG
GTGGACCAGACGGGAAACATGGCGACCCGGCTGCGGGCCGCGGTCCCCGG
CTGGAGCCGCCGCACCCTGCTCCCCGAGACCGCGGGTAACCACGTGATGC
CCCCCGAGTACCCGACGGCCCCCGCGTCGGAGTGGAACAGCCTCTGGATG
ACCCCCGTGGGGAACATGCTGTTCGACCAGGGCACCCTAGTGGGCGCCCT
GGACTTCCGCAGCCTGCGGTCTCGGCACCCGTGGTCCGGGGAGCAGGGGG
CGTCGACCCGGGACGAGGGAAAACAATAA

SEQ ID NO. 23: the amino acid sequence of ICP0 in the 17TermA strain.
MEPRPGASTR RPEGRPQREP APDVWVFPCD RDLPDSSDSE AETEVGGRGD ADHHDDDSAS
EADSTDTELF ETGLLGPQGV DGGAVSGGSP PREEDPGSCG GAPPREDGGS DEGDVCAVCT
DEIAPHLRCD TFPCMHRFCI PCMKTWMQLR NTCPLCNAKL VYLIVGVTPS GSFSTIPIVN
DPQTRMEAEE AVRAGTAVDF IWTGNQRFAP RYLTLGGHTV RALSPTHPEP TTDEDDDDLD
DADYVPPAPR RTPRAPPRRG AAAPPVTGGA SHAAPQPAAA RTAPPSAPIG PHGSSNTNTT
TNSSGGGGSR QSRAAAPRGA SGPSGGVGVG VGVVEAEAGR PRGRTGPLVN RPAPLANNRD
PIVISDSPPA SPHRPPAAPM PGSAPRPGPP ASAAASGPAR PRAAVAPCVR APPPGPGPRA
PAPGAEPAAR PADARRVPQS HSSLAQAANQ EQSLCRARAT VARGSGGPGV EGGHGPSRGA
APSGAAPLPS AASVEQEAAV RPRKRRGSGQ ENPSPQSTRP PLAPAGAKRA ATHPPSDSGP
GGRGQGGPGT PLTSSAASAS SSSASSSSAP TPAGAASSAA GAASSSASAS SGGAVGALGG
RQEETSLGPR AASGPRGPRK CARKTRHAET SGAVPAGGLT RYLPISGVSS VVALSPYVNK
TITGDCLPIL DMETGNIGAY VVLVDQTGNM ATRLRAAVPG WSRRTLLPET AGNHVMPPEY
PTAPASEWNS LWMTPVGNML FDQGTLVGAL DFRSLRSRHP WSGEQGASTR DEGKQ SEQ ID NO. 24: the DNA sequence of ICP0 in the rRp450 strain. Two introns are included
(i.e., nucleotide (nt) 58 to nt 862, and nt 1530 to nt 1668 of the following sequence, also
see the sequences within the brackets)
ATGGAGCCCCGCCCCGGAGCGAGTACCCGCCGGCCTGAGGGCCGCCCCCA
GCGCGAG(GTGAGGGGCCGGGCGCCATGTCTGGGGCGCCATGTCTGGGGCG
CCATGTCTGGGGCGCCATGTCTGGGGCGCCATGTTGGGGGGCGCCATGTT
GGGGGGCGCCATGTTGGGGGACCCCCGACCCTTACACTGGAACCGGCCGC
CATGTTGGGGACCCCCACTCATACACGGGAGCCGGGCGCCATGTTGGGG
CGCCATGTTAGGGGGCGTGGAACCCCGTGACACTATATATACAGGGACCG
GGGGCGCCATGTTAGGGGGCGCGGAACCCCCTGACCCTATATATACAGGG
ACCGGGGTCGCCCTGTTAGGGGTCGCCATGTGACCCCCTGACTTTATATA
TACAGACCCCCAACACCTACACATGGCCCCTTTGACTCAGACGCAGGGCC
CGGGGTCGCCGTGGGACCCCCCTGACTCATACACAGAGACACGCCCCCAC
AACAAACACACAGGGACCGGGGTCGCCGTGTTAGGGGGCGTGGTCCCCAC
TGACTCATACGCAGGGCCCCCCTTACTCACACGCATCTAGGGGGGTGGGGA
GGAGCCGCCCGCCATATTTGGGGGACGCCGTGGGACCCCCGACTCCGGTG
CGTCTGGAGGGCGGGAGAAGAGGGAAGAAGAGGGGTCGGGATCCAAAGGA
CGGACCCAGACCCACCTTTGGTTGCAGACCCCTTTCTCCCCCCTCTTCCGA
GGCCAGCAGGGGGGCAGGACTTTGTGAGGCGGGGGGGGAGGGGGAACTCG
TGGGCGCTGATTGACGCGGGAAATCCCCCATTCTTACCCGCCCCCCCTT
TTTTTCCCCTCAG)CCCGCCCCGGATGTCTGGGTGTTTCCCTGCGACCGAGA
CCTGCCGGACAGCAGCGACTCGGAGGCGGAGACCGAAGTGGGGGGGCGGG
GGGACGCCGACCACCATGACGACGACTCCGCCTCCGAGGCGGACAGCACG
GACACGGAACTGTTCGAGACGGGGCTGCTGGGGCCGCAGGGCGTGGATGG
GGGGGCGGTCTCGGGGGGGAGCCCCCCCCGCGAGGAAGACCCCGGCAGTT
GCGGGGGCGCCCCCCCTCGAGAGGACGGGGGGAGCGACGAGGGCGACGTG
TGCGCCGTGTGCACGGATGAGATCGCGCCCCACCTGCGCTGCGACACCTT
CCCGTGCATGCACCGCTTCTGCATCCCGTGCATGAAAACCTGGATGCAAT
TGCGCAACACCTGCCCGCTGTGCAACGCCAAGCTGGTGTACCTGATAGTG
GGCGTGACGCCCAGCGGGTCGTTCAGCACCATCCCGATCGTGAACGACCC
CCAGACCCGCATGGAGGCCGAGGAGGCCGTCAGGGCGGGCACGGCCGTGG
ACTTTATCTGGACGGGCAATCAGCGGTTCGCCCCCGCGGTACCTGACCCTG
GGGGGGCACACGGTGAGGGCCCTGTCGCCCACCCACCCTGAGCCCACCAC
GGACGAGGATGACGACGACCTGGACGACG(GTGAGGCGGGGGGGCGGCGAG
GACCCTGGGGGAGGAGGAGGAGGGGGGGGGGGGAGGAATAGGCGGGGG
GGCGGGCGAGGAAAGGGCGGGCCGGGAGGGGGCGTAACCTGATCGCGCC
CCCCGTTGTCTCTTGCAG)CAGACTACGTACCGCCCGCCCCCCGCCGGACG
CCCCGCGCCCCCCACGCAGAGGCGCCGCCGCGCCCCCGTGACGGGCGG
GGCGTCTCACGCAGCCCCCAGCCGGCCGCGGCTCGGACAGCGCCCCCCT
CGGCGCCCATCGGGCCACACGGCAGCAGTAACACTAACACCACCACCAAC
AGCAGCGGCGGCGGCGGCTCCCGCCAGTCGCGAGCCGCGGTGCCGCGGGG
GGCGTCTGGCCCCTCCGGGGGGTTGGGGTTGTTGAAGCGGAGGCGGGGC
GGCCGAGGGGCGGACGGGCCCCCTTGTCAACAGACCCGCCCCCCTTGCA
AACAACAGAGACCCCATAGTGATCAGCGACTCCCCCCCGGCCTCTCCCCA
CAGGCCCCCCGCGGCGCCCATGCCAGGCTCCGCCCCCCGCCCCGGTCCCC
CCGCGTCCGCGGCCGCGTCGGGCCCCGCGCGCCCCCGCGCGGCCGTGGCC
```

```
CCGTGTGTGCGGGCGCCGCCTCCGGGGCCCGGCCCCCGCGCCCCGGCCCC
CGGGGCGGAGCCGGCCGCCCGCCCCGCGGACGCGCGCCGTGTGCCCCAGT
CGCACTCGTCCCTGGCTCAGGCCGCGAACCAAGAACAGAGTCTGTGCCGG
GCGCGTGCGACGGTGGCGCGCGGCTCGGGGGGCCGGGCGTGGAGGGTGG
ACACGGGCCCTCCCGCGGCGCCGCCCCCTCCGGCGCCGCCCCCTCCGGCG
CCCCCCCGCTCCCCTCCGCCGCCTCTGTCGAGCAGGAGGCGGCGGTGCGT
CCGAGGAAGAGGCGCGGGTCGGGCCAGGAAAACCCCTCCCCCCAGTCCAC
GCGTCCCCCCTCGCGCCGGCAGGGGCCAAGAGGGCGGCGACGCACCCCC
CCTCCGACTCAGGGCCGGGGGGGCGCGGCCAGGGAGGGCCCGGGACCCC
CTGACGTCCTCGGCGGCCTCCGCCTCTTCCTCCTCCGCCTCTTCCTCCTC
GGCCCCGACTCCCGCGGGGGCCACCTCTTCCGCCACCGGGGCCGCGTCCT
CCTCCGCTTCCGCCTCCTCGGGCGGGGCCGTCGGTGCCCTGGGAGGGAGA
CAAGAGGGAAACCTCCCTCGGCCCCCGCGCTGCTTCTGGGCCGCGGGGCC
GAGGAAGTGTGCCGGAAGACGCGCCACGCGGAGACTTCCGGGGCCGTCC
CCGCGGGCGGCCTCACGCGCTACCTGCCCATCTCGGGGGTCTCTAGCGTG
GTCGCCCTGTCGCCTTACGTGAACAAGACGATCACGGGGGACTGCCTGCC
CATCCTGGACATGGAGACGGGGAACATCGGGGCGTACGTGGTCCTGGTGG
ACCAGACGGGAAACATGGCGACCCGGCTGCGGGCCGGTCCCCGGCTGG
AGCCGCCGCACCCTGCTCCCCGAGACCGCGGGTAACCACGTGACGCCCCC
CGAGTACCCGACGGCCCCCGCGTCGGAGTGGAACAGCCTCTGGATGACCC
CCGTGGGAACATGCTGTTCGACCAGGGCACCCTAGTGGGCGCCCTGGAC
TTCCGCAGCCTGCGGTCTCGGCACCCGTGGTCCGGGGAGCAGGGGGCGTC
GACCCGGGACGAGGGAAAACAATAA

SEQ ID NO. 25: the DNA sequence of ICP0 in the wildtype 17 strain. Two introns are
included (i.e., nucleotide (nt) 58 to nt 861, and nt 1529 to nt 1663 of the following
sequence, also see the sequences within the brackets)
ATGGAGCCCCGCCCGGAGCGAGTACCCGCCGGCCTGAGGGCCGCCCCCA
GCGCGAG(GTGAGGGGCCGGGCGCCATGTCTGGGGCGCCATGTCTGGGGCG
CCATGTCTGGGGCGCCATGTCTGGGGCGCCATGTTGGGGGCGCCATGTT
GGGGGGCGCCATGTTGGGGGACCCCCGACCCTTACACTGGAACCGGCCGC
CATGTTGGGGGACCCCCACTCATACACGGGAGCCGGGCGCCATGTTGGGG
CGCCATGTTAGGGGGCGTGGAACCCCGTGACACTATATATACAGGGACCG
GGGGCGCCATGTTAGGGGGCGCGGAACCCCCTGACCCTATATATACAGGG
ACCGGGGTCGCCCTGTTAGGGGTCGCCATGTGACCCCCTGACTTTATATA
TACAGACCCCCAACACCTACACATGGCCCCTTTGACTCAGACGCAGGGCC
CGGGGTCGCCGTGGGACCCCCCTGACTCATACACAGAGACACGCCCCCAC
AACAAACACACAGGGACCGGGGTCGCCGTGTTAGGGGGCGTGGTCCCCAC
TGACTCATACGCAGGGCCCCCTTACTCACACGCATCTAGGGGGGTGGGGA
GGAGCCGCCCGCCATATTTGGGGGACGCCGTGGGACCCCCGACTCCGGTG
CGTCTGGAGGGCGGGAGAAGAGGGAAGAAGAGGGGTCGGGATCCAAAGGA
CGGACCCAGACCACCTTTGGTTGCAGACCCCTTTCTCCCCCCTCTTCCGA
GGCCAGCAGGGGGGCAGGACTTTGTGAGGCGGGGGGGGGAGGGGGAACTCG
TGGGCGCTGATTGACGCGGGAAATCCCCCATTCTTACCCGCCCCCCTTT
TTTCCCCTCAG)CCCGCCCCGGATGTCTGGGTGTTTCCCTGCGACCGAGAC
CTGCCGGACAGCAGCGACTCGGAGGCGGAGACCGAAGTGGGGGGCGGGG
GGACGCCGACCACCATGACGACGACTCCGCCTCCGAGGCGGACAGCACGG
ACACGGAACTGTTCGAGACGGGGCTGCTGGGGCCGCAGGGCGTGGATGGG
GGGGCGGTCTCGGGGGGAGCCCCCCCCCGCGAGGAAGACCCCGGCAGTTG
CGGGGGCGCCCCCCCTCGAGAGGACGGGGGGAGCGACGAGGGCGACGTGT
GCGCCGTGTGCACGGATGAGATCGCGCCCACCTGCGCTGCGACACCTTC
CCGTGCATGCACCGCTTCTGCATCCCGTGCATGAAAACCTGGATGCAATT
GCGCAACACCTGCCCGCTGTGCAACGCCAAGCTGGTGTACCTGATAGTGG
GCGTGACGCCCAGCGGGTCGTTCAGCACCATCCCGATCGTGAACGACCCC
CAGACCCGCATGGAGGCCGAGGAGGCCGTCAGGGCGGGCACGGCCGTGGA
CTTTATCTGGACGGGCAATCAGCGGTTCGCCCCGCGGTACCTGACCCTGG
GGGGCACACGGTGAGGGCCCTGTCGCCCACCCACCCGGAACCCACCACG
GACGAGGATGACGACGACCTGGACGACG(GTGAGGCGGGGGCGGCAAGGA
CCCTGGGGGAGGAGGAGGAGGAGGGGGGAGGGAGGAATAGGCGGGCGG
GCGAGGAAAGGGCGGGCCGGGAGGGGGCGTAACCTGATCGCGCCCCCCG
TTGTCTCTTGCAG)CAGACTACGTACCGCCCGCCCCCGCCGGACGCCCCG
CGCCCCCCACGCAGAGGCGCCGCCGCGCCCCCCGTGACGGGCGGGGCGT
CTCACGCAGCCCCCAGCCGGCCGCGGCTCGACAGCGCCCCCCTCGGCG
CCCATCGGGCCACACGGCAGCAGTAACACCAACACCACCACCAACAGCAG
CGGCGGCGGCGGCTCCCGCCAGTCGCGAGCCGCGGCGCCGCGGGGGCGT
CTGGCCCCTCCGGGGGGTTGGGGTTGGGGTTGGGGTTGTTGAAGCGGAG
GCGGGGCGGCCGAGGGGCCGGACGGGCCCCTTGTCAACAGACCCGCCCC
CCTTGCAAACAACAGAGACCCCATAGTGATCAGCGACTCCCCCCCGCCT
CTCCCCACAGGCCCCCGCGGCGCCCATGCCAGGCTCCGCCCCCCGCCCC
GGGCCCCCCGCGTCCGCGGCCGCGTCGGGACCCGCGCGCCCCGCGCGGC
CGTGGCCCCGTGCGTGCGAGCGCCGCCTCCGGGGCCCGGCCCCCGCGCCC
CGGCCCCCGGGGCGGAGCCGGCCGCCCGCCCCGCGGACGCGCGCCGTGTG
CCCCAGTCGCACTCGTCCCTGGCTCAGGCCGCGAACCAAGAACAGAGTCT
GTGCCGGGCGCGTGCGACGGTGGCGCGCGGCTCGGGGGGCCGGGCGTGG
AGGGTGGGCACGGGCCCTCCCGCGGCGCCGCCCCCTCCGGCGCCGCCCCG
CTCCCCTCCGCCGCCTCTGTCGAGCAGGAGGCGGCGGTGCGTCCGAGGAA
GAGGCGCGGGTCGGGCCAGGAAAACCCCTCCCCCAGTCCACGCGTCCCC
CCCTCGCGCCGGCAGGGGCCAAGAGGGCGGCGACGCACCCCCCCTCCGAC
TCAGGGCCGGGGGGGCGCGGCCAGGGTGGGCCCGGGACCCCCCTGACGTC
```

-continued

```
CTCGGCGGCCTCCGCCTCTTCCTCCTCTGCCTCTTCCTCCTCGGCCCCGA
CCCCCGCGGGGCCGCCTCTTCCGCCGCCGGGGCCGCGTCCTCCTCCGCT
TCCGCCTCCTCGGGCGGGGCCGTCGGTGCCCTGGGAGGGAGACAAGAGGA
AACCTCCCTCGGCCCCCGCGCTGCTTCTGGGCCGCGGGGGCCGAGGAAGT
GTGCCCGGAAGACGCGCCACGCGGAGACTTCCGGGGCCGTCCCCGCGGGC
GGCCTCACGCGCTACCTGCCCATCTCGGGGGTCTCTAGCGTGGTCGCCCT
GTCGCCTTACGTGAACAAGACGATCACGGGGGACTGCCTGCCCATCCTGG
ACATGGAGACGGGGAACATCGGGGCGTACGTGGTCCTGGTGGACCAGACG
GGAAACATGGCGACCCGGCTGCGGGCCGCGGTCCCCGGCTGGAGCCGCCG
CACCCTGCTCCCCGAGACCGCGGGTAACCACGTGATGCCCCCCGAGTACC
CGACGGCCCCCGCGTCGGAGTGGAACAGCCTCTGGATGACCCCCGTGGGG
AACATGCTGTTCGACCAGGGCACCCTAGTGGGCGCCCTGGACTTCCGCAG
CCTGCGTCTCGGCACCCGTGGTCCGGGGAGCAGGGGCGTCGACCCGGG
ACGAGGGAAAACAATAA
```

SEQ ID NO. 53: the DNA sequence of ICP0 in the wildtype 17 strain. Two introns are
included (i.e., nucleotide (nt) 58 to nt 822, and nt 1490 to nt 1625 of the following
sequence, also see the sequences within the brackets)
```
ATGGAGCCCGCCCCGGAGCGAGTACCCGCCGGCCTGAGGGCCGCCCCCA
GCGCGAG(GTGAGGGGCCGGGCGCCATGTCTGGGGCGCCATATTGGGGGC
GCCATATTGGGGGGCGCCATGTTGGGGGACCCCCGACCCTTACACTGGAA
CCGGCCGCCATGTTGGGGGACCCCCACTCATACACGGGAGCCGGGCGCCA
TGTTGGGGCGCCATGTTAGGGGGCGTGGAACCCCGTGACACTATATATAC
AGGGACCGGGGCGCCATGTTAGGGGGTGCGGAACCCCCTGACCCTATAT
ATACAGGGACCGGGGTCGCCCTGTTGGGGGTCGCCATGTGACCCCCTGAC
TTTATATATACAGACCCCCAACACATACACATGGCCCCTTTGACTCATGAC
GCAGGGCCCGGGGTCGCCGTGGGACCCCCTGACTCATACACAGAGACACG
CCCCCACAACAAACACACAGGGACCGGGGTCGCCGTGTTGGGGGCGTGGT
CCCCACTGACTCATACGCAGGCCCCCCTTACTCACACGCATCTAGGGGGG
TGGGGAGGAGCCGCCCGCCATATTTGGGGGACGCCGTGGGACCCCCGACT
CCGGTGCGTCTGGAGGGCGGGAGAAGAGGGAAGAAGAGGGGTCGGGATCC
AAAGGACGGACCCAGACCACCTTTGGTTGCAGACCCCTTTCTCCCCCCTC
TTCCGAGGCCAGCAGGGGGGCAGGACTTTGTGAGGCGGGGGGGGAGAGG
GGGAACTCGTGGGTGCTGATTGACGCGGGAAATCCCCCCCATTCTTACC
CGCCCCCCTTTTTTCCCCTTAG)CCCGCCCCGGATGTCTGGGTGTTTCCCT
GCGACCGAGACCTGCCGGACAGCAGCGACTCTGAGGCGGAGACCGAAGTG
GGGGGGCGGGGGACGCCGACCACCATGACGACGACTCCGCCTCCGAGGC
GGACAGCACGGACACGGAACTGTTCGAGACGGGGCTGCTGGGGCCGCAGG
GCGTGGATGGGGGGCGGTCTCGGGGGGGAGCCCCCCCGCGAGGAAGAC
CCCGGCAGTTGCGGGGGCGCCCCCCCTCGAGAGGACGGGGGGAGCGACGA
GGGCGACGTGTGCGCCGTGTGCACGGATGAGATCGCGCCCCACCTGCGCT
GCGACACCTTCCCGTGCATGCACCGCTTCTGCATCCCGTGCATGAAAACC
TGGATGCAATTGCGCAACACCTGCCCGCTGTGCAACGCCAAGCTGGTGTA
CCTGATAGTGGGCGTGACGCCCAGCGGGTCGTTCAGCACCATCCCGATCG
TGAACGACCCCCAGACCCGCATGGAGGCCGAGGAGGCCGTCAGGCGGGC
ACGGCCGTGGACTTTATCTGGACGGGCAATCAGCGGTTCGCCCCGCGGTA
CCTGACCCTGGGGGGGCACACGGTGAGGGCCCTGTCGCCCACCCACCCGG
AGCCCACCACGGACGAGGATGACGACGACCTGGACGACG(GTGAGGCGGGG
GGCGGCAAGGACCCTGGGGGAGGAGGAGGAGGAGGGGGGGAGGGAGGA
ATAGGCGGGCGGGCGAGGAAAGGGCGGGCCGGGAGGGGCGTAACCTGA
TCGCGCCCCCGTTGTCTCTTGCAG)CAGACTACGTACCGCCCGCCCCCCG
CCGGACGCCCCGCGCCCCCCACGCAGAGGCGCCGCCGCGCCCCCCGTGA
CGGGCGGGGCGTCTCACGCAGCCCCCCAGCCGGCCGCGGCTCGGACAGCG
CCCCCCTCGGCGCCCATCGGGCCACACGGCAGCAGTAACACCAACACCAC
CACCAACAGCAGCGGCGGCGGCGGCTCCGCCAGTCGCGAGCCGCGGCGC
CGCGGGGGGCGTCTGGCCCCTCCGGGGGGTTGGGGTTGGGGTTGGGGTT
GTTGAAGCGGAGGCGGGCGGCCGAGGGGCGGACGGGCCCCCTTGTCAA
CAGACCCGCCCCCCTTGCAAACAACAGAGACCCCATAGTGATCAGCGACT
CCCCCCGGCCTCTCCCCACAGGCCCCCGCGGCGCCCATGCCAGGCTCC
GCCCCCCGCCCCGGGCCCCCCGCGTCCGCGGCCGCGTCGGGACCCGCGCG
CCCCCGCGCGGCCGTGGCCCCGTGCGTGCGAGCGCCGCCTCCGGGGCCCG
GCCCCGCGCCCCGGCCCCGGGGCGGAGCCGGCCGCCCGCCCCGCGGAC
GCGCGCCGTGTGCCCCAGTCGCACTCGTCCCTGGCTCAGGCCGCGAACCA
AGAACAGAGTCTGTGCCGGGCGCGTGCGACGGTGGCGCGCGGCTCGGGGG
GGCCGGGCGTGGAGGGTGGGCACGGGCCCTCCCGCGGCGCCGCCCCCTCC
GGCGCCGCCCCGCTCCCCTCCGCCGCCTCTGTCGAGCAGGAGGCGGCGGT
GCGTCCGAGGAAGAGGCGCGGGTCGGGCCAGGAAAACCCCTCCCCCCAGT
CCACGCGTCCCCCCCTCGCGCCGGCAGGGGCCAAGAGGGCGGCGACGCAC
CCCCCCTCCGACTCAGGGCCGGGGGGGCGCGGCCAGGGTGGGCCCGGGAC
CCCCCCTGACGTCCTCGGCGGCCTCCGCCTCTTCCTCCTCTGCCTCTTCCT
CCTCGGCCCCGACCCCCGCGGGGCCGCCTCTTCCGCCGCCGGGGCCGCG
TCCTCCTCCGCTTCCGCCTCCTCGGGCGGGGCCGTCGGTGCCCTGGGAGG
GAGACAAGAGGAAACCTCCCTCGGCCCCCGCGCTGCTTCTGGGCCGCGG
GGCCGAGGAAGTGTGCCCGGAAGACGCGCCACGCGGAGACTTCCGGGGCC
GTCCCCGCGGGCGGCCTCACGCGCTACCTGCCCATCTCGGGGGTCTCTAG
CGTGGTCGCCCTGTCGCCTTACGTGAACAAGACTATCACGGGGACTGCC
TGCCCATCCTGGACATGGAGACGGGGAACATCGGGGCGTACGTGGTCCTG
GTGGACCAGACGGGAAACATGGCGACCCGGCTGCGGGCCGCGGTCCCCGG
CTGGAGCCGCCGCACCCTGCTCCCCGAGACCGCGGGTAACCACGTGATGC
```

```
CCCCCGAGTACCCGACGGCCCCCGCGTCGGAGTGGAACAGCCTCTGGATG
ACCCCCGTGGGGAACATGCTGTTCGACCAGGGCACCCTAGTGGGCGCCCT
GGACTTCCGCAGCCTGCGGTCTCGGCACCCGTGGTCCGGGGAGCAGGGGG
CGTCGACCCGGGACGAGGGAAAACAATAA

SEQ ID NO. 26: the amino acid sequence of ICP0 in the wildtype 17 strain.
MEPRPGASTR RPEGRPQREP APDVWVFPCD RDLPDSSDSE AETEVGGRGD ADHHDDDSAS
EADSTDTELF ETGLLGPQGV DGGAVSGGSP PREEDPGSCG GAPPREDGGS DEGDVCAVCT
DEIAPHLRCD TFPCMHRFCI PCMKTWMQLR NTCPLCNAKL VYLIVGVTPS GSFSTIPIVN
DPQTRMEAEE AVRAGTAVDF IWTGNQRFAP RYLTLGGHTV RALSPTHPEP TTDEDDDDLD
DADYVPPAPR RTPRAPPRRG AAAPPVTGGA SHAAPQPAAA RTAPPSAPIG PHGSSNTNTT
TNSSGGGGSR QSRAAAPRGA SGPSGGVGVG VGVVEAEAGR PRGRTGPLVN RPAPLANNRD
PIVISDSPPA SPHRPPAAPM PGSAPRPGPP ASAAASGPAR PRAAVAPCVR APPPGPGPRA
PAPGAEPAAR PADARRVPQS HSSLAQAANQ EQSLCRARAT VARGSGGPGV EGGHGPSRGA
APSGAAPLPS AASVEQEAAV RPRKRRGSGQ ENPSPQSTRP PLAPAGAKRA ATHPPSDSGP
GGRGQGGPGT PLTSSAASAS SSSASSSSAP TPAGAASSAA GAASSSASAS SGGAVGALGG
RQEETSLGPR AASGPRGPRK CARKTRHAET SGAVPAGGLT RYLPISGVSS VVALSPYVNK
TITGDCLPIL DMETGNIGAY VVLVDQTGNM ATRLRAAVPG WSRRTLLPET AGNHVMPPEY
PTAPASEWNS LWMTPVGNML FDQGTLVGAL DFRSLRSRHP WSGEQGASTR DEGKQ SEQ ID NO. 27: The DNA sequence of ICP8 from Mut-3, Mut-3Δ34.5 and Mut-3ΔICP6
viral strains. The c3464t mutation is shown in bold and italic in the sequence below.
ATGGAGACAAAGCCCAAGACGGCAACCACCATCAAGGTCCCCCCGGGCC
CCTGGGATACGTGTACGCTCGCGTGTCCGTCCGAAGGCATCGAGCTTC
TGGCGTTACTGTCGGCACGCAGCGGCGATTCCGACGTCGCCGTGGCGCCC
CTGGTCGTGGGCCTGACCGTGGAGAGCGGCTTTGAGGCCAACGTGGCCGT
GGTCGTGGGTTCTCGCACGACGGGGCTCGGGGGTACCGCGGTGTCCCTGA
AACTGACGCCCTCGCACTACAGCTCGTCCGTGTACGTCTTTCACGGCGGC
CGGCACCTGGACCCCAGCACCCAGGCCCCGAACCTGACGCGACTTTGCGA
GCGGGCACGCCGCCATTTTGGCTTTTCGGACTACACCCCCGGCCCGGCG
ACCTCAAACACGAGACGACGGGGGAGGCGCTGTGTGAGCGCCTCGGCCTG
GACCCGGACCGCGCCCTCCTGTATCTGGTCGTTACCGAGGGCTTCAAGGA
GGCCGTGTGCATCAACAACACCTTTCTGCACCTGGGAGGCTCGGACAAGG
TAACCATAGGCGGGGCGGAGGTGCACCGACATACCCGTGTACCCGTTGCAG
CTGTTCATGCCGGATTTTAGCCGTGTCATCGCAGAGCCGTTCAACGCCAA
CCACCGATCGATCGGGGAGAATTTTACCTACCCGCTTCCGTTTTTTAACC
GCCCCCTCAACCGCCTCCTGTTCGAGGCGGTCGTGGGACCCGCCGCCGTG
GCACTGCGATGCCGAAACGTGGACGCCGTGGCCCGCGCGGCCGCCCACCT
GGCGTTTGACGAAAACCACGAGGGCGCCGCCCTCCCCGCCGACATTACGT
TCACGGCCTTCGAAGCCAGCCAGGGTAAGACCCCGCGGGGCGGGCGCGAC
GGCGGCGGCAAGGGCCCGGCGGGCGGGTTCGAACAGCGCCTGGCCTCCGT
CATGGCCGGAGACGCCGCCCTGGCCCTCGATTCTATCGTGTCGATGGCCG
TCTTTGACGAGCCGCCCACCGACATCTCCGCGTGGCCGCTGTTCGAGGGC
CAGGACACGGCCGCGGCCCGCGCCAACGCCGTGGGGCGTACCTGGCGCG
CGCCGCGGGACTCGTGGGGGCCATGGTATTTAGCACCAACTCGGCCCTCC
ATCTCACCGAGGTGGACGACGCCGGCCCGGCGGACCCAAAGGACCACAGC
AAACCCTCCTTTTACCGCTTCTTCCTCGTGCCCGGGACCCACGTGGCGGC
CAACCCACAGGTGGACCGCGAGGGACACGTGGTGCCCGGGTTCGAGGGTC
GGCCCACCGCGCCCCTCGTCGGCGGAACCCAGGAATTTGCCGGCGAGCAC
CTGGCCATGCTGTGTGGGTTTTCCCCGGCGCTGCTGGCCAAGATGCTGTT
TTACCTGGAGCGCTGCGACGGCGGCGTGATCGTCGGGCGCCAGGAGATGG
ACGTGTTTCGATACGTCGCGGACTCCAACCAGACCGACGTGCCCTGTAAC
CTATGCACCTTCGACACGCGCCACGCCTGCGTACACACGACGCTCATGCG
CCTCCGGGCGCGCCATCCAAAGTTCGCCAGCGCCGCCCGCGGAGCCATCG
GCGTCTTCGGGACCATGAACAGCATGTACAGCGACTGCGACGTTCTGGGA
AACTACGCCGCCTTCTCGGCCCTGAAGCGCGCGGACGGATCCGAGACCGC
CCGGACCATCATGCAGGAGACGTACCGCGCGGCGACCGAGCGCGTCATGG
CCGAACTCGAGACCCTGCAGTACGTGGACCAGGCGGTCCCCACGGCCATG
GGGCGGCTGGAGACCATCATCACCAACCGCGAGGCCCTGCATACGGTGGT
GAACAACGTCAGGCAGGTCGTGGACCGCGAGGTGGAGCAGCTGATGCGCA
ACCTGGTGGAGGGGAGGAACTTCAAGTTTCGCGACGGTCTGGGCGAGGCC
AACCACGCCATGTCCCTGACGCTGGACCCGTACGCGTGCGGGCCGTGCCC
CCTGCTTCAGCTTCTCGGGCGGCGATCCAACCTCGCCGTGTACCAGGACC
TGGCCCTGAGTCAGTGCCACGGGGTGTTCGCCGGGCAGTCGGTCGAGGGG
CGCAACTTTCGCAATCAATTCCAACCGGTGCTGCGGCGGCGCGTGATGGA
CATGTTTAACAACGGGTTTCTGTCGGCCAAAACGCTGACGGTCGCGCTCT
CGGAGGGGGCGGCTATCTGCGCCCCCAGCCTAACGGCCGGCCAGACGGCC
CCCGCCGAGAGCAGCTTCGAGGGCGACGTTGCCCGCGTGACCCTGGGGTT
TCCCAAGGAGCTGCGCGTCAAGAGCCGCGTGTTGTTCGCGGGCGCGAGCG
CCAACGCGTCCGAGGCCGCCAAGGCGCGGGTCGCCAGCCTCCAGAGCGCC
TACCAGAAGCCCGACAAGCGCGTGGACATCCTCCTCGGACCGCTGGGCTT
TCTGCTGAAGCAGTTCCACGCGGCCATCTTCCCCAACGGCAAGCCCCCGG
GGTCCAACCAGCCGAACCCGCAGTGGTTCTGGACGGCCCTCCAACGCAAC
CAGCTTCCCGCCCGGCTCCTGTCGCGCGAGGACATCGAGACCATCGCGTT
CATTAAAAAGTTTTCCCTGGACTACGGCGCGATAAACTTTATTAACCTGG
CCCCCAACAACGTGAGCGAGCTGGCGATGTACTACATGGCAAACCAGATT
CTGCGGTACTGCGATCACTCGACATACTTCATCAACACCCTTACGGCCAT
CATCGCGGGTCCCGCCGTCCCCCAGCGTGCAGGCTGCGGCCGCGTGGT
CCGCGCAGGGCGGGGCGGGCCTGGAGGCCGGGGCCCGCGCGCTGATGGAC
```

```
GCCGTGGACGCGCATCCGGGCGCGTGGACGTCCATGTTCGCCAGCTGCAA
CCTGCTGCGGCCCGTCATGGCGGCGCGCCCCATGGTCGTGTTGGGGTTGA
GCATCAGCAAGTACTACGGCATGGCCGGCAACGACCGTGTGTTTCAGGCC
GGGAACTGGGCCAGCCTGATGGGCGGCAAAAACGCGTGCCCGCTCCTTAT
TTTTGACCGCACCCGCAAGTTCGTCCTGGCCTGTCCCCGGGCCGGGTTTG
TGTGCGCGGCCTCAAGCCTCGGCGGCGGAGCGCACGAAAGCTCGCTGTGC
GAGCAGCTCCGGGGCATTATCTCCGAGGGCGGGGCGGCCGTCGCCAGTAG
CGTGTTCGTGGCGACCGTGAAAAGCCTGGGGCCCCGCACCCAGCAGCTGC
AGATCGAGGACTGGCTGGCGCTCCTGGAGGACGAGTACCTAAGCGAGGAG
ATGATGGAGCTGACCGCGCGTGCCCTGGAGCGCGGCAACGGCGAGTGGTC
GACGGACGCGGCCCTGGAGGTGGCGCACGAGGCCGAGGCCCTAGTCAGCC
AACTCGGCAACGCCGGGGAGGTGTTTAACTTTGGGGATTTTGGCTGCGAG
GACGACAACGCGA*T*GCCGTTCGGCGGCCCGGGGGCCCCGGGACCGGCATT
TGCCGGCCGCAAACGGGCGTTCCACGGGGATGACCCGTTTGGGGAGGGGC
CCCCCGACAAAAAGGGAGACCTGACGTTGGATATGCTGTGA
```

SEQ ID NO. 28: The amino acid sequence of ICP8 in Mut-3, Mut-3Δ34.5 and Mut-3ΔICP6 viral strains. The T1155M mutation is shown in bold and italic in the sequence below.
```
METKPKTATTIKVPPGPLGYVYARACPSEGIELLALLSARSGDSDVAVAP
LVVGLTVESGFEANVAVVVGSRTTGLGGTAVSLKLTPSHYSSSVYVFHGG
RHLDPSTQAPNLTRLCERARRHFGFSDYTPRPGDLKHETTGEALCERLGL
DPDRALLYLVVTEGFKEAVCINNTFLHLGGSDKVTIGGAEVHRIPVYPLQ
LFMPDESRVIAEPFNANHRSIGENFTYPLPFFNRPLNRLLFEAVVGPAAV
ALRCRNVDAVARAAAHLAFDENHEGAALPADITFTAFEASQGKTPRGGRD
GGGKGPAGGFEQRLASVMAGDAALALDSIVSMAVFDEPPTDISAWPLFEG
QDTAAARANAVGAYLARAAGLVGAMVFSTNSALHLTEVDDAGPADPKDHS
KPSFYRFFLVPGTHVAANPQVDREGHVVPGFEGRPTAPLVGGTQEFAGEH
LAMLCGFSPALLAKMLFYLERCDGGVIVGRQEMDVFRYVADSNQTDVPCN
LCTFDTRHACVHTTLMRLRARHPKFASAARGAIGVFGTMNSMYSDCDVLG
NYAAFSALKRADGSETARTIMQETYRAATERVMAELETLQYVDQAVPTAM
GRLETIITNREALHTVVNNVRQVVDREVEQLMRNLVEGRNFKFRDGLGEA
NHAMSLTLDPYACGPCPLLQLLGRRSNLAVYQDLALSQCHGVFAGQSVEG
RNFRNQFQPVLRRRVMDMFNNGFLSAKTLTVALSEGAAICAPSLTAGQTA
PAESSFEGDVARVTLGFPKELRVKSRVLFAGASANASEAAKARVASLQSA
YQKPDKRVDILLGPLGFLLKQFHAAIFPNGKPPGSNQPNPQWFWTALQRN
QLPARLLSREDIETTAFTKKFSLDYGAINFINLAPNNVSELAMYYMANQI
LRYCDHSTYFINTLTAITAGSRRPPSVQAAAAWSAQGGAGLEAGARALMD
AVDAHPGAWTSMFASCNLLRPVMAARPMVVLGLSISKYYGMAGNDRVFQA
GNWASLMGGKNACPLLIFDRTRKFVLACPRAGFVCAASSLGGGAHESSLC
EQLRGIISEGGAAVASSVFVATVKSLGPRTQQLQIEDWLALLEDEYLSEE
MMELTARALERGNGEWSTDAALEVAHEAEALVSQLGNAGEVFNFGDFGCE
DDNA*M*PFGGPGAPGPAFAGRKRAFHGDDPFGEGPPDKKGDLTLDML
```

SEQ ID NO. 29: the DNA sequence of ICP8 in the 17TermA strain.
```
ATGGAGACAAAGCCCAAGACGGCAACCACCATCAAGGTCCCCCCCGGGCC
CCTGGGATACGTGTACGCTCGCGCGTGTCCGTCCGAAGGCATCGAGCTTC
TGGCCGTTACTGTCGAGAGCGGCGATTCCGACGTCGCCGTGGCGCCC
CTGGTCGTGGGCCTGACCGTGGAGAGCGGCTTTGAGGCCAACGTGGCCGT
GGTCGTGGGTTCTCGCACGACGGGGCTCGGGGGTACCGCGGTGTCCCTGA
AACTGACGCCCTCGCACTACAGCTCGTCCGTGTACGTCTTTCACGGCGGC
CGGCACCTGGACCCCAGCACCCAGGCCCCGAACCTGACGCGACTTTGCGA
GCGGGCACGCCGCCATTTTGGCTTTTCGGACTACACCCCCGGCCCGGCG
ACCTCAAACACGAGACGACGGGGGAGGCGCTGTGTGAGCGCCTCGGCCTG
GACCCGGACCGCGCCCTCCTGTATCTGGTCGTTACCGAGGGCTTCAAGGA
GGCCGTGTGCATCAACAACACCTTTCTGCACCTGGGAGGCTCGGACAAGG
TAACCATAGGCGGGGCGGAGGTGCACCGCATACCCGTGTACCCGTTGCAG
CTGTTCATGCCGGATTTTAGCCGTGTCATCGCAGAGCCGTTCAACGCCAA
CCACCGATCGATCGGGGAGAATTTTACCTACCCGCTTCCGTTTTTTAACC
GCCCCCTCAACCGCCTCCTGTTCGAGGCGGTCGTGGGACCCGCCGCCGTG
GCACTGCGATGCCGAAACGTGGACGCCGTGGCCCGCGCGGCCGCCCACCT
GGCGTTTGACGAAAACCACGAGGGCGCCGCCCTCCCCGCCGACATTACGT
TCACGGCCTTCGAAGCCAGCCAGGGTAAGACCCCGCGGGCGGGCGCGAC
GGCGGCGGCAAGGGCCCGCGGGCGGGTTCGAACAGCGCCTGGCCTCCGT
CATGCCGGAGACGCCGCCCTGGCCCTCGATTCTATCGTGTCGATGCCG
TCTTTGACGAGCCGCCCACCGACATCTCCGCGTGGCCGCTGTTCGAGGGC
CAGGACACGGCCGCGGCCCGCGCCAACGCCGTCGGGGCGTACCTGGCGCG
CGCCGCGGGACTCGTGGGGGCCATGGTATTTAGCACCAACTCGGCCCTCC
ATCTCACCGAGGTGGACGACGCCGGCCCGGCGGACCCAAAGGACCACAGC
AAACCCTCCTTTTACCGCTTCTTCCTCGTGCCCGGGACCCACGTGGCGGC
CAACCCACAGGTGGACCGCGAGGGACACGTGGTGCCCGGGTTCGAGGGTC
GGCCCACCGCGCCCCTCGTCGGCGGAACCCAGGAATTTGCCGGCGAGCAC
CTGGCCATGCTGTGTGGGTTTTCCCCGGCGCTGCTGGCCAAGATGCTGTT
TTACCTGGAGCGCTGCGACGGCGGCGTGATCGTCGGGCGCCAGGAGATGG
ACGTGTTTCGATACGTCGCGGACTCCAACCAGACCGACGTGCCCTGTAAC
CTATGCACCTTCGACACGCGCCACGCCTGCGTACACACGACGCTCATGCG
CCTCCGGGCGCGCCATCCAAAGTTCGCCAGCGCCGCCCGCGGAGCCATCG
GCGTCTTCGGGACCATGAACAGCATGTACAGCGACTGCGACGTGCTGGGA
AACTACGCCGCCTTCTCGGCCCTGAAGCGCGCGGACGGATCCGAGACCGC
CCGGACCATCATGCAGGAGACGTACCGCGCGGCGACCGAGCGCGTCATGG
```

```
CCGAACTCGAGACCCTGCAGTACGTGGACCAGGCGGTCCCCACGGCCATG
GGGCGGCTGGAGACCATCATCACCAACCGCGAGGCCCTGCATACGGTGGT
GAACAACGTCAGGCAGGTCGTGGACCGCGAGGTGGAGCAGCTGATGCGCA
ACCTGGTGGAGGGGAGGAACTTCAAGTTTCGCGACGGTCTGGGCGAGGCC
AACCACGCCATGTCCCTGACGCTGGACCCGTACGCGTGCGGGCCGTGCCC
CCTGCTTCAGCTTCTCGGGCGGCGATCCAACCTCGCCGTGTACCAGGACC
TGGCCCTGAGTCAGTGCCACGGGGTGTTCGCGGGCAGTCGGTCGAGGGG
CGCAACTTTCGCAATCAATTCCAACCGGTGCTGCGGCGGCGCGTGATGGA
CATGTTTAACAACGGGTTTCTGTCGGCCAAAACGCTGACGGTCGCGCTCT
CGGAGGGGGCGGCTATCTGCGCCCCCAGCCTAACGGCCGGCCAGACGGCC
CCCGCCGAGAGCAGCTTCGAGGGCGACGTTGCCCGCGTGACCCTGGGGTT
TCCCAAGGAGCTGCGCGTCAAGAGCCGCGTGTTGTTCGCGGGCGCGAGCG
CCAACGCGTCCGAGGCCGCCAAGGCGCGGGTCGCCAGCCTCCAGAGCGCC
TACCAGAAGCCCGACAAGCGCGTGGACATCCTCCTCGGACCGCTGGGCTT
TCTGCTGAAGCAGTTCCACGCGGCCATCTTCCCCAACGGCAAGCCCCCGG
GGTCCAACCAGCCGAACCCGCAGTGGTTCTGGACGGCCCTCCAACGCAAC
CAGCTTCCCGCCCGGCTCCTGTCGCGCGAGGACATCGAGACCATCGCGTT
CATTAAAAAGTTTTCCCTGGACTACGGCGCGATAAACTTTATTAACCTGG
CCCCCAACAACGTGAGCGAGCTGGCGATGTACTACATGGCAAACCAGATT
CTGCGGTACTGCGATCACTCGACATACTTCATCAACACCCTTACGGCCAT
CATCGCGGGGTCCCGCCGTCCCCCCAGCGTGCAGGCTGCGGCCGCGTGGT
CCGCGCAGGGCGGGGCGGGCCTGGAGGCCGGGGCCCGCGCGCTGATGGAC
GCCGTGGACGCGCATCCGGGCGCGTGGACGTCCATGTTCGCCAGCTGCAA
CCTGCTGCGGCCCGTCATGGCGGCGCGCCCCATGGTCGTGTTGGGGTTGA
GCATCAGCAAGTACTACGGCATGGCCGGCAACGACCGTGTGTTTCAGGCC
GGGAACTGGGCCAGCCTGATGGGCGGCAAAAACGCGTGCCCGCTCCTTAT
TTTTGACCGCACCCGCAAGTTCGTCCTGGCCTGTCCCCGGGCCGGGTTTG
TGTGCGCGGCCTCAAGCCTCGGCGGCGGAGCGCACGAAAGCTCGCTGTGC
GAGCAGCTCCGGGGCATTATCTCCGAGGGCGGGGCGGCCGTCGCCAGTAG
CGTGTTCGTGGCGACCGTGAAAAGCCTGGGGCCCCGCACCCAGCAGCTGC
AGATCGAGGACTGGCTGGCGCTCCTGGAGGACGAGTACCTAAGCGAGGAG
ATGATGGAGCTGACCGCGCGTGCCCTGGAGCGCGGCAACGGCGAGTGGTC
GACGGACGCGGCCCTGGAGGTGGCGCACGAGGCCGAGGCCCTAGTCAGCC
AACTCGGCAACGCCGGGGAGGTGTTTAACTTTGGGGATTTTGGCTGCGAG
GACGACAACGCGACGCCGTTCGGCGGCCCGGGGGCCCCGGGACCGGCATT
TGCCGGCCGCAAACGGGCGTTCCACGGGGATGACCCGTTTGGGGAGGGGC
CCCCCGACAAAAAGGGAGACCTGACGTTGGATATGCTGTGA

SEQ ID NO. 30: the amino acid sequence of ICP8 in the 17TermA strain.
METKPKTATTIKVPPGPLGYVYARACPSEGIELLALLSARSGDSDVAVAP
LVVGLTVESGFEANVAVVVGSRTTGLGGTAVSLKLTPSHYSSSVYVFHGG
RHLDPSTQAPNLTRLCERARRHFGFSDYTPRPGDLKHETTGEALCERLGL
DPDRALLYLVVTEGFKEAVCINNTFLHLGGSDKVTIGGAEVHRIPVYPLQ
LFMPDFSRVIAEPFNANHRSIGENFTYPLPFFNRPLNRLLFEAVVGPAAV
ALRCRNVDAVARAAAHLAFDENHEGAALPADITFTAFEASQGKTPRGGRD
GGGKGPAGGFEQRLASVMAGDAALALDSIVSMAVFDEPPTDISAWPLFEG
QDTAAARANAVGAYLARAAGLVGAMVFSTNSALHLTEVDDAGPADPKDHS
KPSFYRFFLVPGTHVAANPQVDREGHVVPGFEGRPTAPLVGGTQEFAGEH
LAMLCGFSPALLAKMLFYLERCDGGVIVGRQEMDVFRYVADSNQTDVPCN
LCTFDTRHACVHTTLMRLRARHPKFASAARGAIGVFGTMNSMYSDCDVLG
NYAAFSALKRADGSETARTIMQETYRAATERVMAELETLQYVDQAVPTAM
GRLETIITNREALHTVVNNVRQVVDREVEQLMRNLVEGRNFKFRDGLGEA
NHAMSLTLDPYACGPCPLLQLLGRRSNLAVYQDLALSQCHGVFAGQSVEG
RNFRNQFQPVLRRRVMDMFNNGFLSAKILTVALSEGAAICAPSLTAGQTA
PAESSFEGDVARVTLGFPKELRVKSRVLFAGASANASEAAKARVASLQSA
YQKPDKRVDILLGPLGFLLKQFHAAIFPNGKPPGSNQPNPQWFWTALQRN
QLPARLLSREDIETIAFIKKFSLDYGAINFINLAPNNVSELAMYYMANQI
LRYCDHSTYFINTLTAIIAGSRRPPSVQAAAAWSAQGGAGLEAGARALMD
AVDAHPGAWTSMFASCNLLRPVMAARPMVVLGLSISKYYGMAGNDRVFQA
GNWASLMGGKNACPLLIFDRTRKFVLACPRAGFVCAASSLGGGAHESSLC
EQLRGIISEGGAAVASSVFVATVKSLGPRTQQLQIEDWLALLEDEYLSEE
MMELTARALERGNGEWSTDAALEVAHEAEALVSQLGNAGEVFNFGDFGCE
DDNATPFGGPGAPGPAFAGRKRAFHGDDPFGEGPPDKKGDLTLDML SEQ ID NO. 31: the DNA sequence of ICP8 in the rRp450 strain.
ATGGAGACAAAGCCCAAGACGGCAACCACCATCAAGGTCCCCCCCGGGCC
CCTGGGATACGTGTACGCTCGCGCGTGTCCGTCCGAAGGCATCGAGCTTC
TGGCGTTACTGTCGGCGCGCAGCGGCGATGCCGACGTCGCCGTGGCGCCC
CTGGTCGTGGGCCTGACCGTGGAGAGCGGCTTTGAGGCCAACGTAGCCGT
GGTCGTGGGTTCTCGCACGACGGGGCTCGGGGGTACCGCGGTGTCCCTGA
AACTGACGCCATCGCACTACAGCTCGTCCGTGTACGTCTTTCACGGCGGC
CGGCACCTGGACCCCAGCACCCAGGCCCCAAACCTGACGCGACTCTGCGA
GCGGGCACGCCGCCATTTTGGCTTTTCGGACTACACCCCCCGGCCCGGCG
ACCTCAAACACGAGACGACGGGGGAGGCGCTGTGTGAGCGCCTCGGCCTG
GACCCGGACCGCGCCCTCCTGTATCTGGTCGTTACCGAGGGCTTCAAGGA
GGCCGTGTGCATCAACAACACCTTTCTGCACCTGGGAGGCTCGGACAAGG
TAACCATAGGCGGGGCGGAGGTGCACCGCATACCCGTGTATCCGTTGCAG
CTGTTCATGCCGGATTTTAGCCGGGTCATCGCCGAGCCGTTCAACGCCAA
CCACCGATCGATCGGGGAGAATTTTACCTACCCGCTTCCGTTTTTTAACC
```

```
GCCCCCTCAACCGCCTCCTGTTCGAGGCGGTCGTGGGACCCGCCGCCGTG
GCACTGCGATGCCGAAACGTGGACGCCGTGGCCCGCGCGGCCGCCCACCT
GGCGTTTGACGAAAACCACGAGGGCGCCGCCCTCCCCGCCGACATTACGT
TCACGGCCTTCGAAGCCAGCCAGGGTAAGACCCCGCGGGGTGGGCGCGAC
GGCGGCGGCAAGGGCCCGGCGGGCGGGTTCGAACAGCGCCTGGCCTCCGT
CATGGCCGGAGACGCCGCCCTGGCCCTCGAGTCTATCGTGTCGATGGCCG
TCTTCGACGAGCCGCCCACCGACATCTCCGCGTGGCCGCTGTGCGAGGGC
CAGGACACGGCCGCGGCCCGCGACAACGCCGTCGGGGCGTACCTGGCGCG
CGCCGCGGGACTCGTGGGGGCCATGGTATTTAGCACCAACTCGGCCCTCC
ATCTCACCGAGGTGGACGACGCCGGTCCGGCGGACCCAAAGGACCACAGC
AAACCCTCCTTTTACCGCTTCTTCCTCGTGCCCGGGACCCACGTGGCGGC
CAACCCACAGGTGGACCGCGAGGGACACGTGGTGCCCGGGTTCGAGGGTC
GGCCCACCGCGCCCCTCGTCGGCGGAACCCAGGAATTTGCCGGCGAGCAC
CTGGCCATGCTGTGTGGGTTTTCCCCGGCGCTGCTGGCCAAGATGCTGTT
TTACCTGGAGCGCTGCGACGGCGGCGTGATCGTCGGGCGCCAGGAGATGG
ACGTGTTTCGATACGTCGCGGACTCCAACCAGACCGACGTGCCCTGCAAC
CTGTGCACCTTCGACACGCGCCACGCCTGCGTACACACGACGCTCATGCG
CCTCCGGGCGCGCCATCCCAAGTTCGCCAGCGCCGCCCGCGGAGCCATCG
GCGTCTTCGGGACCATGAACAGCATGTACAGCGACTGCGACGTGCTGGGA
AACTACGCCGCCTTCTCGGCCCTGAAGCGCGCGGACGGATCCGAGACCGC
CCGGACCATCATGCAGGAGACGTACCGCGCGGCGACCGAGCGCGTCATGG
CCGAACTCGAGACCCTGCAGTACGTGGACCAGGCGGTCCCCACGGCCATG
GGGCGGCTGGAGACCATCATCACCAACCGCGAGGCCCTGCATACGGTGGT
GAACAACGTCAGGCAGGTCGTGGACCGCGAGGTGGAGCAGCTGATGCGCA
ACCTGGTGGAGGGGAGGAACTTCAAGTTTCGCGACGGTCTGGGCGAGGCC
AACCACGCCATGTCCCTGACGCTGGACCCGTACGCGTGCGGGCCATGCCC
CCTGCTTCAGCTTCTCGGGCGGCGATCCAACCTCGCCGTGTATCAGGACC
TGGCCCTGAGCCAGTGCCACGGGGTGTTCGCGGGCAGTCGGTCGAGGGG
CGCAACTTTCGCAATCAATTCCAACCGGTGCTGCGGCGGCGCGTGATGGA
CATGTTTAACAACGGGTTTCTGTCGGCCAAAACGCTGACGGTCGCGCTCT
CGGAGGGGGCGGCTATCTGCGCCCCCAGCCTAACGGCCGGCCAGACGGCC
CCCGCCGAGAGCAGCTTCGAGGGCGACGTTGCCCGCGTGACCCTGGGGTT
TCCCAAGGAGCTGCGCGTCAAGAGCCGCGTGTTGTTCGCGGGCGCGAGCG
CCAACGCGTCCGAGGCCGCCAAGGCGCGGGTCGCCAGCCTCCAGAGCGCC
TACCAGAAGCCCGACAAGCGCGTGGACATCCTCCTCGGACCGCTGGGCTT
TCTGCTGAAGCAGTTCCACGCGGCCATCTTCCCCAACGGCAAGCCCCCGG
GGTCCAACCAGCCGAACCCGCAGTGGTTCTGGACGGCCCTCCAACGCAAC
CAGCTTCCCGCCCGGCTCCTGTCGCGCGAGGACATCGAGACCATCGCGTT
CATTAAAAAGTTTTCCCTGGACTACGGCGCGATAAACTTTATTAACCTGG
CCCCCAACAACGTGAGCGAGCTGGCGATGTACTACATGGCAAACCAGATT
CTGCGCGGTACTGCGATCACTCGACATACTTCATCAACACCCTCACGGCCAT
CATCGCGGGGTCCCGCCGTCCCCCCAGCGTGCAGGCGGCGGCCGCGTGGT
CCGCGCAGGGCGGGGCGGGCCTGGAGGCCGGGGCCCGCGCGCTGATGGAC
GCCGTGGACGCGCATCCGGGCGCGTGGACGTCCATGTTCGCCAGCTGCAA
CCTGCTGCGGCCCGTCATGGCGGCGCGCCCCATGGTCGTGTTGGGGTTGA
GCATCAGCAAATACTACGGCATGGCCGGCAACGACCGTGTGTTTCAGGCC
GGGAACTGGGCCAGCCTGATGGGCGGCAAAAACGCGTGCCCGCTCCTTAT
TTTTGACCGCACCCGCAAGTTCGTCCTGGCCTGTCCCCGGGCCGGGTTTG
TGTGCGCGGCCTCGAACCTCGGCGGCGGAGCGCACGAAAGCTCGCTGTGC
GAGCAGCTCCGGGGCATTATCTCCGAGGGCGGGCGGCCGTCGCCAGTAG
CGTGTTCGTGGCGACCGTGAAAAGCCTGGGGCCCCGCACCCAGCAGCTGC
AGATCGAGGACTGGCTGGCGCTCCTGGAGGACGAGTACCTAAGCGAGGAG
ATGATGGAGCTGACCGCGCGTGCCCTGGAGCGCGGCAACGGCGAGTGGTC
GACGGACGCGGCCCTGGAGGTGGCGCACGAGGCCGAGGCCCTAGTCAGCC
AACTCGGCAACGCCGGGGAGGTGTTTAACTTTGGGGATTTTGGCTGCGAG
GACGACAACGCGACGCCGTTCGGCGGCCCGGGGGCCCCGGGACCGGCATT
TGCCGGCCGCAAACGGGCGTTCCACGGGGATGACCCGTTTGGGGAGGGGC
CCCCCGACAAAAAGGGAGACCTGACGTTGGATATGCTGTGA
```

SEQ ID NO. 32: the amino acid sequence of ICP8 in the rRp450 strain.
```
METKPKTATTIKVPPGPLGYVYARACPSEGIELLALLSARSGDADVAVAP
LVVGLTVESGFEANVAVVVGSRTTGLGGTAVSLKLTPSHYSSSVYVFHGG
RHLDPSTQAPNLTRLCERARRHFGFSDYTPRPGDLKHETTGEALCERLGL
DPDRALLYLVVTEGFKEAVCINNTFLHLGGSDKVTIGGAEVHRIPVYPLQ
LFMPDFSRVIAEPFNANHRSIGENFTYPLPFFNRPLNRLLFEAVVGPAAV
ALRCRNVDAVARAAAHLAFDENHEGAALPADITFTAFEASQGKTPRGGRD
GGGKGPAGGFEQRLASVMAGDAALALESIVSMAVFDEPPTDISAWPLCEG
QDTAAARDNAVGAYLARAAGLVGAMVFSTNSALHLTEVDDAGPADPKDHS
KPSFYRFFLVPGTHVAANPQVDREGHVVPGFEGRPTAPLVGGTQEFAGEH
LAMLCGFSPALLAKMLFYLERCDGGVIVGRQEMDVFRYVADSNQTDVPCN
LCTFDTRHACVHTTLMRLRARHPKFASAARGAIGVFGTMNSMYSDCDVLG
NYAAFSALKRADGSETARTIMQETYRAATERVMAELETLQYVDQAVPTAM
GRLETIITNREALHTVVNNVRQVVDREVEQLMRNLVEGRNFKFRDGLGEA
NHAMSLTLDPYACGPCPLLQLLGRRSNLAVYQDLALSQCHGVFAGQSVEG
RNFRNQFQPVLRRRVMDMFNNGFLSAKILTVALSEGAAICAPSLTAGQTA
PAESSFEGDVARVTLGFPKELRVKSRVLFAGASANASEAAKARVASLQSA
YQKPDKRVDILLGPLGFLLKQFHAAIFPNGKPPGSNQPNPQWFWTALQRN
QLPARLLSREDIETIAFIKKFSLDYGAINFINLAPNNVSELAMYYMANQI
LRYCDHSTYFINTLTAIIAGSRRPPSVQAAAAWSAQGGAGLEAGARALMD
```

```
AVDAHPGAWTSMFASCNLLRPVMAARPMVVLGLSISKYYGMAGNDRVFQA
GNWASLMGGKNACPLLIFDRTRKFVLACPRAGFVCAASNLGGGAHESSLC
EQLRGIISEGGAAVASSVFVATVKSLGPRTQQLQIEDWLALLEDEYLSEE
MMELTARALERGNGEWSTDAALEVAHEAEALVSQLGNAGEVFNFGDFGCE
DDNATPFGGPGAPGPAFAGRKRAFHGDDPFGEGPPDKKGDLTLDML

SEQ ID NO. 33: the DNA sequence of ICP8 in the wildtype 17 strain.
ATGGAGACAAAGCCCAAGACGGCAACCACCATCAAGGTCCCCCCCGGGCC
CCTGGGATACGTGTACGCTCGCGCGTGTCCGTCCGAAGGCATCGAGCTTC
TGGCGTTACTGTCGGCACGCAGCGGCGATTCCGACGTCGCCGTGGCGCCC
CTGGTCGTGGGCCTGACCGTGGAGAGCGGCTTTGAGGCCAACGTGGCCGT
GGTCGTGGGTTCTCGCACGACGGGGCTCGGGGGTACCGCGGTGTCCCTGA
AACTGACGCCCTCGCACTACAGCTCGTCCGTGTACGTCTTTCACGGCGGC
CGGCACCTGGACCCCAGCACCCAGGCCCCGAACCTGACGCGACTTTGCGA
GCGGGCACGCCGCCATTTTGGCTTTTCGGACTACACCCCCGGCCCGGCG
ACCTCAAACACGAGACGACGGGGGAGGCGCTGTGTGAGCGCCTCGGCCTG
GACCCGGACCGCGCCCTCCTGTATCTGGTCGTTACCGAGGGCTTCAAGGA
GGCCGTGTGCATCAACAACACCTTTCTGCACCTGGGAGGCTCGGACAAGG
TAACCATAGGCGGGGCGGAGGTGCACCGCATACCCGTGTACCCGTTGCAG
CTGTTCATGCCGGATTTTAGCCGTGTCATCGCAGAGCCGTTCAACGCCAA
CCACCGATCGATCGGGGAGAATTTTACCTACCCGCTTCCGTTTTTTAACC
GCCCCCTCAACCGCCTCCTGTTCGAGGCGGTCGTGGGACCCGCCGCCGTG
GCACTGCGATGCCGAAACGTGGACGCCGTGGCCCGCGCGGCCGCCCACCT
GGCGTTTGACGAAAACCACGAGGGCGCCGCCCTCCCCGCCGACATTACGT
TCACGGCCTTCGAAGCCAGCCAGGGTAAGACCCCGCGGGGCGGGCGCGAC
GGCGGCGGCAAGGGCCCGGCGGGCGGGTTCGAACAGCGCCTGGCCTCCGT
CATGGCCGGAGACGCCGCCCTGGCCCTCGATTCTATCGTGTCGATGGCCG
TCTTTGACGAGCCGCCCACCGACATCTCCGCGTGGCCGCTGTTCGAGGGC
CAGGACACGGCCGCGGCCCGCGCCAACGCCGTCGGGGCGTACCTGGCGCG
CGCCGCGGGACTCGTGGGGGCCATGGTATTTAGCACCAACTCGGCCCTCC
ATCTCACCGAGGTGGACGACGCCGGCCCGGCGGACCCAAAGGACCACAGC
AAACCCTCCTTTTACCGCTTCTTCCTCGTGCCCGGGACCCACGTGGCGGC
CAACCCACAGGTGGACCGCGAGGGACACGTGGTGCCCGGGTTCGAGGGTC
GGCCCACCGCGCCCCTCGTCGGCGAACCCAGGAATTTGCCGGCGAGCAC
CTGGCCATGCTGTGTGGGTTTTCCCCGGCGCTGCTGGCCAAGATGCTGTT
TTACCTGGAGCGCTGCGACGGCGGCGTGATCGTCGGGCGCCAGGAGATGG
ACGTGTTTCGATACGTCGCGGACTCCAACCAGACCGACGTGCCCTGTAAC
CTATGCACCTTCGACACGCGCCACGCCTGCGTACACACGACGCTCATGCG
CCTCCGGGCGCGCCATCCAAAGTTCGCAGCGCCGCCCGCGGAGCCATCG
GCGTCTTCGGGACCATGAACAGCATGTACAGCGACTGCGACGTGCTGGGA
AACTACGCCGCCTTCTCGGCCCTGAAGCGCGCGGACGGATCCGAGACCGC
CCGGACCATCATGCAGGAGACGTACCGCGCGGCGACCGAGCGCGTCATGG
CCGAACTCGAGACCCTGCAGTACGTGGACCAGGCGGTCCCCACGGCCATG
GGGCGGCTGGAGACCATCATCACCAACCGCGAGGCCCTGCATACGGTGGT
GAACAACGTCAGGCAGGTCGTGGACCGCGAGGTGGAGCAGCTGATGCGCA
ACCTGGTGGAGGGGAGGAACTTCAAGTTTCGCGACGGTCTGGGCGAGGCC
AACCACGCCATGTCCCTGACGCTGGACCCGTACGCGTGCGGGCCGTGCCC
CCTGCTTCAGCTTCTCGGGCGGCGATCCAACCTCGCCGTGTACCAGGACC
TGGCCCTGAGTCAGTGCCACGGGTGTTCGCGGGCAGTCGGTCGAGGGG
CGCAACTTTCGCAATCAATTCCAACCGGTGCTGCGGCGGCGCGTGATGGA
CATGTTTAACAACGGGTTTCTGTCGGCCAAAACGCTGACGGTCGCGCTCT
CGGAGGGGGCGGCTATCTGCGCCCCCAGCCTAACGGCCGGCCAGACGGCC
CCCGCCGAGAGCAGCTTCGAGGGCGACGTTGCCCGCGTGACCCTGGGGTT
TCCCAAGGAGCTGCGCGTCAAGAGCCGCGTGTTGTTCGCGGGCGCGAGCG
CCAACGCGTCCGAGGCCGCCAAGGCGCGGGTCGCCAGCCTCCAGAGCGCC
TACCAGAAGCCCGACAAGCGCGTGGACATCCTCCTCGGACCGCTGGGCTT
TCTGCTGAAGCAGTTCCACGCGGCCATCTTCCCCAACGGCAAGCCCCCGG
GGTCCAACCAGCCGAACCCGCAGTGGTCTGGACGGCCCTCCAACGCAAC
CAGCTTCCCGCCCGGCTCCTGTCGCGCGAGGACATCGAGACCATCGCGTT
CATTAAAAAGTTTTCCCTGGACTACGGCGCGATAAACTTTATTAACCTGG
CCCCCAACAACGTGAGCGAGCTGGCGATGTACTACATGGCAAACCAGATT
CTGCGGTACTGCGATCACTCGACATACTTCATCAACACCCTTACGGCCAT
CATCGCGGGGTCCCGCCGTCCCCCCAGCGTGCAGGCTGCGGCCGCGTGGT
CCGCGCAGGGCGGGGCGGGCCTGGAGGCCGGGGCCCGCGCGCTGATGGAC
GCCGTGGACGCGCATCGGGCGCGTGGACGTCCATGTTCGCCAGCTGCAA
CCTGCTGCGGCCCGTCATGGCGGCGCGCCCCATGGTCGTGTTGGGGTTGA
GCATCAGCAAGTACTACGGCATGGCCGGCAACGACCGTGTGTTTCAGGCC
GGGAACTGGGCCAGCCTGATGGGCGGCAAAAACGCGTGCCCGCTCCTTAT
TTTTGACCGCACCCGCAAGTTCGTCCTGGCCTGTCCCCGGGCCGGGTTTG
TGTGCGCGGCCTCAAGCCTCGGCGGCGGAGCGCACGAAAGCTCGCTGTGC
GAGCAGCTCCGGGGCATTATCTCCGAGGGCGGGGCGGCCGTCGCCAGTAG
CGTGTTCGTGGCGACCGTGAAAAGCCTGGGGCCCCGCACCCAGCAGCTGC
AGATCGAGGACTGGCTGGCGCTCCTGGAGGACGAGTACCTAAGCGAGGAG
ATGATGGAGCTGACCGCGCGTGCCCTGGAGCGCGGCAACGGCGAGTGGTC
GACGGACGCGGCCCTGGAGGTGGCGCACGAGGCCGAGGCCCTAGTCAGCC
AACTCGGCAACGCCGGGGAGGTGTTTAACTTTGGGGATTTTGGCTGCGAG
GACGACAACGCGACGCCGTTCGGCGGCCCGGGGGCCCCGGGACCGGCATT
TGCCGGCCGCAAACGGGCGTTCCACGGGGATGACCCGTTTGGGGAGGGGC
CCCCCGACAAAAAGGGGAGACCTGACGTTGGATATGCTGTGA
```

SEQ ID NO. 34: the amino acid sequence of ICP8 in the wildtype 17 strain.
METKPKTATTIKVPPGPLGYVYARACPSEGIELLALLSARSGDSDVAVAP
LVVGLTVESGFEANVAVVVGSRTTGLGGTAVSLKLTPSHYSSSVYVFHGG
RHLDPSTQAPNLTRLCERARRHFGFSDYTPRPGDLKHETTGEALCERLGL
DPDRALLYLVVTEGFKEAVCINNTFLHLGGSDKVTIGGAEVHRIPVYPLQ
LFMPDFSRVIAEPFNANHRSIGENFTYPLPFFNRPLNRLLFEAVVGPAAV
ALRCRNVDAVARAAAHLAFDENHEGAALPADITFTAFEASQGKTPRGGRD
GGGKGPAGGFEQRLASVMAGDAALALDSIVSMAVFDEPPTDISAWPLFEG
QDTAAARANAVGAYLARAAGLVGAMVFSTNSALHLTEVDDAGPADPKDHS
KPSFYRFFLVPGTHVAANPQVDREGHVVPGFEGRPTAPLVGGTQEFAGEH
LAMLCGFSPALLAKMLFYLERCDGGVIVGRQEMDVFRYVADSNQTDVPCN
LCTFDTRHACVHTTLMRLRARHPKFASAARGAIGVFGTMNSMYSDCDVLG
NYAAFSALKRADGSETARTIMQETYRAATERVMAELETLQYVDQAVPTAM
GRLETIITNREALHTVVNNVRQVVDREVEQLMRNLVEGRNFKFRDGLGEA
NHAMSLILDPYACGPCPLLQLLGRRSNLAVYQDLALSQCHGVFAGQSVEG
RNFRNQFQPVLRRRVMDMFNNGFLSAKILTVALSEGAAICAPSLTAGQTA
PAESSFEGDVARVTLGFPKELRVKSRVLFAGASANASEAAKARVASLQSA
YQKPDKRVDILLGPLGFLLKQFHAAIFPNGKPPGSNQPNPQWFWTALQRN
QLPARLLSREDIETIAFIKKFSLDYGAINFINLAPNNVSELAMYYMANQI
LRYCDHSTYFINTLTAIIAGSRRPPSVQAAAAWSAQGGAGLEAGARALMD
AVDAHPGAWTSMFASCNLLRPVMAARPMVVLGLSISKYYGMAGNDRVFQA
GNWASLMGGKNACPLLIFDRTRKFVLACPRAGFVCAASSLGGGAHESSLC
EQLRGIISEGGAAVASSVFVATVKSLGPRTQQLQIEDWLALLEDEYLSEE
MMELTARALERGNGEWSTDAALEVAHEAEALVSQLGNAGEVFNFGDFGCE
DDNATPFGGPGAPGPAFAGRKRAFHGDDPFGEGPPDKKGDLTLDML SEQ ID NO. 35: The DNA sequence of DNA packaging terminase sub1 from Mut-3, Mut-
3Δ34.5 and Mut-3ΔICP6 viral strains. The g1126a mutation is shown in bold and italic in the
sequence below.
ATGTTTGGTCAGCAGCTGGCGTCCGACGTCCAGCAGTACCTGGAGCGCCT
CGAGAAACAGAGGCAACTTAAGGTGGGCGCGGACGAGGCGTCGGCGGGCC
TCACCATGGGCGGCGATGCCCTACGAGTGCCCTTTTTAGATTTCGCGACC
GCGACCCCCAAGCGCCACCAGACCGTGGTCCCTGGCGTCGGGACGCTCCA
CGACTGCTGCGAGCACTCGCCGCTCTTCTCGGCCGTGGCGCGGCGGCTGC
TGTTTAATAGCCTGGTGCCGGCGCAACTAAAGGGGCGTGATTTCGGGGGC
GACCCACACGGCCAAGCTGGAATTCCTGGCCCCCGAGTTGGTACGGGCGGT
GGCGCGACTGCGGTTTAAGGAGTGCGCGCCGGCGGACGTGGTGCCTCAGC
GTAACGCCTACTATAGCGTTCTGAATACGTTTCAGGCCCTCCACCGCTCC
GAAGCCTTTCGCCAGCTGGTGCACTTTGTGCGGGACTTTGCCCAGCTGCT
CAAAACCTCCTTCCGGGCCTCCAGCCTCACGGAGACCACGGGCCCCCCA
AAAAACGGGCCAAGGTGGACGTGGCCACCCACGGCCGGACGTACGGCACG
CTGGAGCTGTTCCAAAAAATGATCCTTATGCACGCCACCTACTTTCTGGC
CGCCGTGCTCCTCGGGGACCACGCGGGAGCAGGTCAACACGTTCCTGCGTC
TCGTGTTTGAGATCCCCCTGTTTAGCGACGCGGCCGTGCGCCACTTCCGC
CAGCGCGCCACCGTGTTTCTCGTCCCCCGGCGCCACGGCAAGACCTGGTT
TCTGGTGCCCCTCATCGCGCTGTCGCTGGCCTCCTTTCGGGGGATCAAGA
TCGGCTACACGGCGCACATCCGCAAGGCGACCGAGCCGGTGTTTGAGGAG
ATCGACGCCTGCCTGCGGGGCTGGTTCGGTTCGGCCCCGAGTGGACCACGT
TAAAGGGGAAACCATCTCCTTCTCGTTTCCGGACGGGTCGCGCAGTACCA
TCGTGTTTGCCTCCAGCCACAACACAAACGGAATCCGAGGCCAGGACTTT
AACCTGCTCTTTGTCGACGAGGCCAACTTTATTCGCCCGGATGCGGTCCA
GACGATTATGGGCTTTCTCAACCAGACCAACTGCAAGATTATCTTCGTGT
CGTCCACCAACACCGGGAAGGCCAGTACGAGCTTTTTGTACAACCTCCGC
GGGGCCGCAGACGAGCTTCTCAACGTGGTGACCTATATATGCGATGATCA
CATGCCGAGGGTGGTGACGCACACAAACGCCACGGCCTGTTCTTGTTATA
TCCTCAACAAGCCCGTTTTCATCACGATGGACGGGGCGGTTCGCCGGACC
GCCGATTTGTTTCTGGCCGATTCCTTCATGCAGGAGATCATCGGGGGCCA
GGCCAGGGAGACCGGCGACGACCGGCCCGTTCTGACCAAGTCTGCGGGGG
AGCGGTTTCTGTTGTACCGCCCCTCGACCACCACCAACAGCGGCCTCATG
GCCCCCGATTTGTACGTGTACGTGGATCCCGCGTTCACGGCCAACACCCG
AGCCTCCGGGACCGGCGTCGCTGTCGTCGGGCGGTACCGCGACGATTATA
TCATCTTCGCCCTGGAGCACTTTTTTCTCCGCGCGCTCACGGGCTCGGCC
CCCGCCGACATCGCCCGCTGCGTCGTCCACAGTCTGACGCAGGTCCTGGC
CCTGCATCCCGGGGCGTTTCGCGGCGTCCGGGTGGCGGTCGAGGGAAATA
GCAGCCAGGACTCGGCCGTCGCCATCGCCACGCACGTGCACACAGAGATG
CACCGCCTACTGGCCTCGGAGGGGGCCGACGCGGGCTCGGGCCCCGAGCT
TCTCTTCTACCACTGCGAGCCTCCCGGGAGCGCGGTGCTGTACCCCTTTT
TCCTGCTCAACAAACAGAAGACGCCCGCCTTTGAACACTTTATTAAAAAG
TTTAACTCCGGGGGCGTCATGGCCTCCCAGGAGATCGTTTCCGCGACGGT
GCGCCTGCAGACCGACCCGGTCGAGTATCTGCTCGAGCAGCTAAATAACC
TCACCGAAACCGTCTCCCCCAACACTGACGTCCGTACGTATTCCGGAAAA
CGGAACGGCGCCTCGGATGACCTTATGGTCGCCGTCATTATGGCCATCTA
CCTCGCGGCCCAGGCCGGAACCTCCGCACACATTCGCTCCTATCATACGCG
TCTCGTGA SEQ ID NO. 36: The amino acid sequence of DNA packaging terminase sub1 from Mut-3,
Mut-3Δ34.5 and Mut-3ΔICP6 viral strains. The A376T mutation is shown in bold and italic
in the sequence below.
MFGQQLASDVQQYLERLEKQRQLKVGADEASAGLTMGGDALRVPFLDFAT
ATPKRHQTVVPGVGTLHDCCEHSPLFSAVARRLLFNSLVPAQLKGRDFGG
DHTAKLEFLAPELVRAVARLRFKECAPADVVPQRNAYYSVLNTFQALHRS
EAFRQLVHFVRDFAQLLKTSFRASSLTETTGPPKKRAKVDVATHGRTYGT
LELFQKMILMHATYFLAAVLLGDHAEQVNTFLRLVFEIPLFSDAAVRHFR
QRATVFLVPRRHGKTWFLVPLIALSLASFRGIKIGYTAHIRKATEPVFEE
IDACLRGWFGSARVDHVKGETISFSFPDGSRSTIVFASSHNTNGIRGQDF
NLLFVDEANFIRPDAVQTIMGFLN*T*NCKIIFVSSTNTGKASTSFLYNLR
GAADELLNVVTYICDDHMPRVVTHTNATACSCYILNKPVFITMDGAVRRT
ADLFLADSFMQEIIGGQARETGDDRPVLTKSAGERFLLYRPSTTTNSGLM
APDLYVYVDPAFTANTRASGTGVAVVGRYRDDYIIFALEHFFLRALTGSA
PADIARCVVHSLTQVLALHPGAFRGVRVAVEGNSSQDSAVAIATHVHTEM
HRLLASEGADAGSGPELLFYHCEPPGSAVLYPFFLLNKQKTPAFEHFIKK
FNSGGVMASQEIVSATVRLQTDPVEYLLEQLNNLTETVSPNTDVRTYSGK
RNGASDDLMVAVIMAIYLAAQAGPPHTFAPIIRVS SEQ ID NO. 37: The DNA sequence of DNA packaging terminase sub1 the 17TermA viral
strain.
ATGTTTGGTCAGCAGCTGGCGTCCGACGTCCAGCAGTACCTGGAGCGCCT
CGAGAAACAGAGGCAACTTAAGGTGGGCGCGGACGAGGCGTCGGCGGGCC
TCACCATGGGCGGCGATGCCCTACGAGTGCCCTTTTTAGATTTCGCGACC
GCGACCCCAAGCGCCACCAGACCGTGGTCCCTGGCGTCGGGACGCTCCA
CGACTGCTGCGAGCACTCGCCGCTCTTCTCGGCCGTGGCGCGGCGGCTGC
TGTTTAATAGCCTGGTGCCGGCGCAACTAAAGGGGCGTGATTTCGGGGGC
GACCACACGGCCAAGCTGGAATTCCTGGCCCCCGAGTTGGTACGGGCGGT
GGCGCGACTGCGGTTTAAGGAGTGCGCGCCGGCGGACGTGGTGCCTCAGC
GTAACGCCTACTATAGCGTTCTGAATACGTTTCAGGCCCTCCACCGCTCC
GAAGCCTTTCGCCAGCTGGTGCACTTTGTGCGGGACTTTGCCCAGCTGCT
CAAAACCTCCTTCCGGGCCTCCAGCCTCACGGAGACCACGGGCCCCCCCA
AAAAACGGGCCAAGGTGGACGTGGCCACCCACGGCCGGACGTACGGCACG
CTGGAGCTGTTCCAAAAAATGATCCTTATGCACGCCACCTACTTTCTGGC
CGCCGTGCTCCTCGGGGACCACGCGGAGCAGGTCAACACGTTCCTGCGTC
TCGTGTTTGAGATCCCCCTGTTTAGCGACGCGGCCGTGCGCCACTTCCGC
CAGCGCGCCACCGTGTTTCTCGTCCCCCGGCGCCACGGCAAGACCTGGTT
TCTGGTGCCCCTCATCGCGCTGTCGCTGGCCTCCTTTCGGGGGATCAAGA
TCGGCTACACGGCGCACATCCGCAAGGCGACCGAGCCGGTGTTTGAGGAG
ATCGACGCCTGCCTGCGGGGCTGGTTCGGTTCGGCCCGAGTGGACCACGT
TAAAGGGGAAACCATCTCCTTCTCGTTTCCGGACGGGTCGCGCAGTACCA
TCGTGTTTGCCTCCAGCCACAACACAAACGGAATCCGAGGCCAGGACTTT
AACCTGCTCTTTGTCGACGAGGCCAACTTTATTCGCCCGGATGCGGTCCA
GACGATTATGGGCTTTCTCAACCAGGCCAACTGCAAGATTATCTTCGTGT
CGTCCACCAACACCGGGAAGGCCAGTACGAGCTTTTTGTACAACCTCCGC
GGGGCCGCAGACGAGCTTCTCAACGTGGTGACCTATATATGCGATGATCA
CATGCCGAGGGTGGTGACGCACACAAACGCCACGGCCTGTTCTTGTTATA
TCCTCAACAAGCCCGTTTTCATCACGATGGACGGGGCGGTTCGCCGGACC
GCCGATTTGTTTCTGGCCGATTCCTTCATGCAGGAGATCATCGGGGGCCA
GGCCAGGGAGACCGGCGACGACCGGCCCGTTCTGACCAAGTCTGCGGGGG
AGCGGTTTCTGTTGTACCGCCCCTCGACCACCACCAACAGCGGCCTCATG
GCCCCCGATTTGTACGTGTACGTGGATCCCGCGTTCACGGCCAACACCCG
AGCCTCCGGGACCGGCGTCGCTGTCGTCGGGCGGTACCGCGACGATTATA
TCATCTTCGCCCTGGAGCACTTTTTTCTCCGCGCGCTCACGGGCTCGGCC
CCCGCCGACATCGCCCGCTGCGTCGTCCACAGTCTGACGCAGGTCCTGGC
CCTGCATCCCGGGGCGTTTCGCGGCGTCCGGGTGGCGGTCGAGGGAAATA
GCAGCCAGGACTCGGCCGTCGCCATCGCCACGCACGTGCACACAGAGATG
CACCGCCTACTGGCCTCGGAGGGGGCGGACGCGGGCTCGGGCCCCGAGCT
TCTCTTCTACCACTGCGAGCCTCCCGGGAGCGCGGTGCTGTACCCCTTTT
TCCTGCTCAACAAACAGAAGACGCCCGCCTTTGAACACTTTATTAAAAAG
TTTAACTCCGGGGGCGTCATGGCCTCCCAGGAGATCGTTTCCGCGACGGT
GCGCCTGCAGACCGACCCGGTCGAGTATCTGCTCGAGCAGCTAAATAACC
TCACCGAAACCGTCTCCCCCAACACTGACGTCCGTACGTATTCCGGAAAA
CGGAACGGCGCCTCGGATGACCTTATGGTCGCCGTCATTATGGCCATCTA
CCTCGCGGCCCAGGCCGGACCTCCGCACACATTCGCTCCTATCATACGCG
TCTCGTGA SEQ ID NO. 38: The amino acid sequence of DNA packaging terminase sub1 the 17TermA
viral strain.
MFGQQLASDVQQYLERLEKQRQLKVGADEASAGLTMGGDALRVPFLDFAT
ATPKRHQTVVPGVGTLHDCCEHSPLFSAVARRLLFNSLVPAQLKGRDFGG
DHTAKLEFLAPELVRAVARLRFKECAPADVVPQRNAYYSVLNTFQALHRS
EAFRQLVHFVRDFAQLLKTSFRASSLTETTGPPKKRAKVDVATHGRTYGT
LELFQKMILMHATYFLAAVLLGDHAEQVNTFLRLVFEIPLFSDAAVRHFR
QRATVFLVPRRHGKTWFLVPLIALSLASFRGIKIGYTAHIRKATEPVFEE
IDACLRGWFGSARVDHVKGETISFSFPDGSRSTIVFASSHNTNGIRGQDF
NLLFVDEANFIRPDAVQTIMGFLNQANCKIIFVSSTNTGKASTSFLYNLR
GAADELLNVVTYICDDHMPRVVTHTNATACSCYILNKPVFITMDGAVRRT

```
ADLFLADSFMQEIIGGQARETGDDRPVLTKSAGERFLLYRPSTTTNSGLM
APDLYVYVDPAFTANTRASGTGVAVVGRYRDDYIIFALEHFFLRALTGSA
PADIARCVVHSLTQVLALHPGAFRGVRVAVEGNSSQDSAVAIATHVHTEM
HRLLASEGADAGSGPELLFYHCEPPGSAVLYPFFLLNKQKTPAFEHFIKK
FNSGGVMASQEIVSATVRLQTDPVEYLLEQLNNLTETVSPNTDVRTYSGK
RNGASDDLMVAVIMAIYLAAQAGPPHTFAPIIRVS
```

SEQ ID NO. 39: The DNA sequence of DNA packaging terminase sub1 the rRp450 viral strain.
```
ATGTTTGGTCAGCAGCTGGCGTCCGACGTCCAGCAGTACCTGGAGCGCCT
CGAGAAACAGAGGCAACTTAAGGTGGGCGCGGACGAGGCGTCGGCGGGCC
TCACAATGGGCGGCGATGCCCTACGAGTGCCCTTTTTAGATTTCGCGACC
GCGACCCCCAAGCGCCACCAGACCGTGGTCCCGGGCGTCGGGACGCTCCA
CGACTGCTGCGAGCACTCGCCGCTCTTCTCGGCCGTGGCGCGGCGGCTGC
TGTTTAATAGCCTGGTGCCGGCGCAACTAAAGGGGCGTGATTTCGGGGGC
GACCACACGGCCAAGCTGGAATTCCTGGCCCCCGAGTTGGTACGGGCGGT
GGCGCGACTGCGGTTTAAGGAGTGCGCGCCGGCGGACGTGGTGCCCTCAGC
GTAACGCCTACTATAGCGTTCTGAACACGTTTCAGGCCCTCCACCGCTCC
GAAGCCTTTCGCCAGCTGGTGCACTTTGTGCGGGACTTTGCCCAGCTGCT
TAAAACCTCCTTCCGGGCCTCCAGCCTCACGGAGACCACGGGCCCCCCAA
AAAAACGGGCCAAGGTGGACGTGGCCACCCACGGCCGGACGTACGGCACG
CTGGAGCTGTTCCAAAAATGATCCTTATGCACGCCACCTACTTTCTGGC
CGCCGTGCTCCTCGGGGACCACGCGGAGCAGGTCAACACGTTCCTGCGTC
TCGTGTTTGAGATCCCCTGTTTAGCGACGCGGCCGTGCGCCACTTCCGC
CAGCGCGCCACCGTGTTTCTCGTCCCCGGCGCCACGGCAAGACCTGGTT
TCTAGTGCCCCTCATCGCGCTGTCGCTGGCCTCCTTTCGGGGGATCAAGA
TCGGCTACACGGCGCACATCCGCAAGGCGACCGAGCCGGTGTTTGAGGAG
ATCGACGCCTGCCTGCGGGGCTGGTTCGGTCGGCCCGAGTGGACCACGT
TAAAGGGGAAACCATCTCCTTCTCGTTTCCGGACGGGTCGCGCAGTACCA
TCGTGTTTGCCTCCAGCCACAACACAAACGGAATCCGAGGCCAGGACTTT
AACCTGCTCTTTGTCGACGAGGCCAACTTTATTCGCCCGGATGCGGTCCA
GACGATTATGGGCTTTCTCAACCAGGCCAACTGCAAGATTATCTTCGTGT
CGTCCACCAACACCGGGAAGGCCAGTACGAGCTTTTTGTACAACCTCCGC
GGGGCCGCCGACGAGCTTCTCAACGTGGTGACCTATATATGCGATGATCA
CATGCCGCGGGTGGTGACGCACACAAACGCCACGGCCTGTTCTTGTTATA
TCCTCAACAAGCCCGTTTTCATCACGATGGACGGGGCGGTTCGCCGGACC
GCCGATTTGTTTCTGGCCGATTCCTTCATGCAGGAGATCATCGGGGGCCA
GGCCAGGGAGACCGGCGACGACCGGCCCGTTCTGACCAAGTCTGCGGGGG
AGCGGTTTCTGTTGTACCGCCCCTCGACCACCACCAACAGCGGCCTCATG
GCCCCCGATTTGTACGTGTACGTGGATCCCGCGTTCACGGCCAACACCCG
AGCCTCCGGGACCGGCGTCGCTGTCGTCGGGCGGTACCGCGACGATTATA
TCATCTTCGCCCTGGAGCACTTTTTTCTCCGCGCGCTCACGGGCTCGGCC
CCCGCCGACATCGCCCGCTGCGTCGTCCACAGTCTGACGCAGGTCCTGGC
CCTGCATCCCGGGGCGTTTCGCGGCGTCCGGGTGGCGGTCGAGGGAAATA
GCAGCCAGGACTCGGCCGTCGCCATCGCCACGCACGTGCACACAGAGATG
CACCGCCTACTGGCCTCGGAGGGGGCCGACGCGGGCTCGGGCCCCGAGCT
TCTCTTCTACCACTGCGAGCCTCCCGGGAGCGCGGTGCTGTACCCCTTTT
TCCTGCTCAACAAACAGAAGACGCCCGCCTTTGAACACTTTATTAAAAAG
TTTAACTCCGGGGCGTCATGGCCTCCCAGGAGATCGTTTCCGCGACGGT
GCGCCTGCAGACCGACCCGGTCGAGTATCTGCTCGAGCAGCTGAATAACC
TCACCGAAACCGTCTCCCCCAACACGGACGTTCCGTACGTATTCCGGAAAA
CGGAACGGCGCCTCGGATGACCTTATGGTCGCCGTCATTATGGCCATCTA
CCTTGCGGCCCAGGCCGGACCTCCGCACACATTCGCTCCCATCACACGCG
TTTCGTGA
```

SEQ ID NO. 40: The amino acid sequence of DNA packaging terminase sub1 the rRp450 viral strain.
```
MFGQQLASDVQQYLERLEKQRQLKVGADEASAGLTMGGDALRVPFLDFAT
ATPKRHQTVVPGVGTLHDCCEHSPLFSAVARRLLFNSLVPAQLKGRDFGG
DHTAKLEFLAPELVRAVARLRFKECAPADVVPQRNAYYSVLNTFQALHRS
EAFRQLVHFVRDFAQLLKTSFRASSLTETTGPPKKRAKVDVATHGRTYGT
LELFQKMILMHATYFLAAVLLGDHAEQVNTFLRLVFEIPLFSDAAVRHFR
QRATVFLVPRRHGKTWFLVPLIALSLASFRGIKIGYTAHIRKATEPVFEE
IDACLRGWFGSARVDHVKGETISFSFPDGSRSTIVFASSHNTNGIRGQDF
NLLFVDEANFIRPDAVQTIMGFLNQANCKIIFVSSTNTGKASTSFLYNLR
GAADELLNVVTYICDDHMPRVVTHTNATACSCYILNKPVFITMDGAVRRT
ADLFLADSFMQEIIGGQARETGDDRPVLTKSAGERFLLYRPSTTTNSGLM
APDLYVYVDPAFTANTRASGTGVAVVGRYRDDYIIFALEHFFLRALTGSA
PADIARCVVHSLTQVLALHPGAFRGVRVAVEGNSSQDSAVAIATHVHTEM
HRLLASEGADAGSGPELLFYHCEPPGSAVLYPFFLLNKQKTPAFEHFIKK
FNSGGVMASQEIVSATVRLQTDPVEYLLEQLNNLTETVSPNTDVRTYSGK
RNGASDDLMVAVIMAIYLAAQAGPPHTFAPITRVS
```

SEQ ID NO. 41: The DNA sequence of DNA packaging terminase sub1 the wild-type 17 strain.
```
ATGTTTGGTCAGCAGCTGGCGTCCGACGTCCAGCAGTACCTGGAGCGCCT
CGAGAAACAGAGGCAACTTAAGGTGGGCGCGGACGAGGCGTCGGCGGGCC
TCACCATGGGCGGCGATGCCCTACGAGTGCCCTTTTTAGATTTCGCGACC
GCGACCCCCAAGCGCCACCAGACCGTGGTCCCTGGCGTCGGGACGCTCCA
```

-continued

```
CGACTGCTGCGAGCACTCGCCGCTCTTCTCGGCCGTGGCGCGGCGGCTGC
TGTTTAATAGCCTGGTGCCGGCGCAACTAAAGGGGCGTGATTTCGGGGGC
GACCACACGGCCAAGCTGGAATTCCTGGCCCCCGAGTTGGTACGGGCGGT
GGCGCGACTGCGGTTTAAGGAGTGCGCGCCGGCGGACGTGGTGCCTCAGC
GTAACGCCTACTATAGCGTTCTGAATACGTTTCAGGCCCTCCACCGCTCC
GAAGCCTTTCGCCAGCTGGTGCACTTTGTGCGGGACTTTGCCCAGCTGCT
CAAAACCTCCTTCCGGGCCTCCAGCCTCACGGAGACCACGGGCCCCCCCA
AAAAACGGGCCAAGGTGGACGTGGCCACCCACGGCCGGACGTACGGCACG
CTGGAGCTGTTCCAAAAAATGATCCTTATGCACGCCACCTACTTTCTGGC
CGCCGTGCTCCTCGGGGACCACGCGGAGCAGGTCAACACGTTCCTGCGTC
TCGTGTTTGAGATCCCCCTGTTTAGCGACGCGGCCGTGCGCCACTTCCGC
CAGCGCGCCACCGTGTTTCTCGTCCCCCGGCGCCACGGCAAGACCTGGTT
TCTGGTGCCCCTCATCGCGCTGTCGCTGGCCTCCTTTCGGGGGATCAAGA
TCGGCTACACGGCGCACATCCGCAAGGCGACCGAGCCGGTGTTTGAGGAG
ATCGACGCCTGCCTGCGGGGCTGGTTCGGTTCGGCCCGAGTGGACCACGT
TAAAGGGGAAACCATCTCCTTCTCGTTTCCGGACGGGTCGCGCAGTACCA
TCGTGTTTGCCTCCAGCCACAACACAAACGGAATCCGAGGCCAGGACTTT
AACCTGCTCTTTGTCGACGAGGCCAACTTTATTCGCCGGATCGGTCCA
GACGATTATGGGCTTTCTCAACCAGGCCAACTGCAAGATTATCTTCGTGT
CGTCCACCAACACCGGGAAGGCCAGTACGAGCTTTTTGTACAACCTCCGC
GGGGCCGCAGACGAGCTTCTCAACGTGGTGACCTATATATGCGATGATCA
CATGCCGAGGGTGGTGACGCACACAAACGCCACGGCCTGTTCTTGTTATA
TCCTCAACAAGCCCGTTTTCATCACGATGGACGGGGCGGTTCGCCGGACC
GCCGATTTGTTTCTGGCCGATTCCTTCATGCAGGAGATCATCGGGGCCA
GGCCAGGGAGACGGCGACGACCGGCCCGTTCTGACCAAGTCTGCGGGGG
AGCGGTTTCTGTTGTACCGCCCCTCGACCACCACCAACAGCGGCCTCATG
GCCCCCGATTTGTACGTGTACGTGGATCCCGCGTTCACGGCCAACACCCG
AGCCTCCGGGACCGGCGTCGCTGTCGTCGGGCGGTACCGCGACGATTATA
TCATCTTCGCCCTGGAGCACTTTTTTCTCCGCGCGCTCACGGGCTCGGCC
CCCGCCGACATCGCCCGCTGCGTCGTCCACAGTCTGACGCAGGTCCTGGC
CCTGCATCCCGGGGCGTTTCGCGGCGTCCGGGTGGCGGTCGAGGGAAATA
GCAGCCAGGACTCGGCCGTCGCCATCGCCACGCACGTGCACACAGAGATG
CACCGCCTACTGGCCTCGGAGGGGGCCGACGCGGGCTCGGGCCCCGAGCT
TCTCTTCTACCACTGCGAGCCTCCCGGGAGCGCGGTGCTGTACCCCTTTT
TCCTGCTCAACAAACAGAAGACGCCCGCCTTTGAACACTTTATTAAAAAG
TTTAACTCCGGGGGCGTCATGGCCTCCCAGGAGATCGTTTCCGCGACGGT
GCGCCTGCAGACCGACCCGGTCGAGTATCTGCTCGAGCAGCTAAATAACC
TCACCGAAACCGTCTCCCCCAACACTGACGTCCGTACGTATTCCGGAAAA
CGGAACGGCGCCTCGGATGACCTTATGGTCGCCGTCATTATGGCCATCTA
CCTCGCGGCCCAGGCCGGACCTCCGCACACATTCGCTCCTATCATACGCG
TCTCGTGA
```

SEQ ID NO. 42: The amino acid sequence of DNA packaging terminase sub1 the wild-type 17 strain.
```
MFGQQLASDVQQYLERLEKQRQLKVGADEASAGLTMGGDALRVPFLDFAT
ATPKRHQTVVPGVGTLHDCCEHSPLFSAVARRLLFNSLVPAQLKGRDFGG
DHTAKLEFLAPELVRAVARLRFKECAPADVVPQRNAYYSVLNTFQALHRS
EAFRQLVHFVRDFAQLLKTSFRASSLTETTGPPKKRAKVDVATHGRTYGT
LELFQKMILMHATYFLAAVLLGDHAEQVNTFLRLVFEIPLFSDAAVRHFR
QRATVFLVPRRHGKTWFLVPLIALSLASFRGIKIGYTAHIRKATEPVFEE
IDACLRGWFGSARVDHVKGETISFSFPDGSRSTIVFASSHNTNGIRGQDF
NLLFVDEANFIRPDAVQTIMGFLNQANCKIIFVSSTNTGKASTSFLYNLR
GAADELLNVVTYICDDHMPRVVTHTNATACSCYILNKPVFITMDGAVRRT
ADLFLADSFMQEIIGGQARETGDDRPVLTKSAGERFLLYRPSTTTNSGLM
APDLYVYVDPAFTANTRASGTGVAVVGRYRDDYIIFALEHFFLRALTGSA
PADIARCVVHSLTQVLALHPGAFRGVRVAVEGNSSQDSAVAIATHVHTEM
HRLLASEGADAGSGPELLFYHCEPPGSAVLYPFFLLNKQKTPAFEHFIKK
FNSGGVMASQEIVSATVRLQTDPVEYLLEQLNNLTETVSPNTDVRTYSGK
RNGASDDLMVAVIMAIYLAAQAGPPHTFAPIIRVS
```

SEQ ID NO. 43: the DNA sequence of ICP6 in the Mut 3 and Mut-3Δ34.5 viral strains. The sequence is identical to that in the wild-type 17 strain.
```
ATGGCCAGCCGCCCAGCCGCATCCTCTCCCGTCGAAGCGCGGGCCCCGGT
TGGGGGACAGGAGGCCGGCGGCCCCAGCGCAGCCACCCAGGGGGAGGCCG
CCGGGGCCCCTCTCGCCCACGGCCACCACGTGTACTGCCAGCGAGTCAAT
GGCGTGATGGTGCTTTCCGACAAGACGCCCGGGTCCGCGTCCTACCGCAT
CAGCGATAGCAACTTTGTCCAATGTGGTTCCAACTGCACCATGATCATCG
ACGGAGACGTGGTGCGCGGGCGCCCCCAGGACCCGGGGCCGCGGCATCC
CCCGCTCCCTTCGTTGCGGTGACAAACATCGGAGCCGGCAGCGACGGCGG
GACCGCCGTCGTGGCATTCGGGGGAACCCCACGTCGCTCGGCGGGGACGT
CTACCGGTACCCAGACGGCCGACGTCCCCACCGAGGCCCTTGGGGGCCCC
CCTCCTCCTCCCCGCTTCACCCTGGGTGGCGGCTGTTGTTCCTGTCGCGA
CACACGGCGCCGCTCTGCGGTATTCGGGGGGAGGGGGATCCAGTCGGCC
CCGCGGAGTTCGTCTCGGACGACCGGTCGTCCGATTCCGACTCGGATGAC
TCGGAGGACACGGACTCGGAGACGCTGTCACACGCCTCCTCGGACGTGTC
CGGCGGGGCCACGTACGACGACGCCCTTGACTCCGATTCGTCATCGGATG
ACTCCCTGCAGATAGATGGCCCCGTGTGTCGCCCGTGGAGCAATGACACC
GCGCCCCTGGATGTTTGCCCCGGGACCCCCGGCCCGGGCGCCGACGCCGG
TGGTCCCTCAGCGGTAGACCCACACGCGCCGACGCCAGAGGCCGGCGCTG
```

-continued

```
GTCTTGCGGCCGATCCCGCCGTGGCCCGGGACGACGCGGAGGGGCTTTCG
GACCCCCGGCCACGTCTGGGAACGGGCACGGCCTACCCCGTCCCCCTGGA
ACTCACGCCCGAGAACGCGGAGGCCGTGGCGCGCTTTCTGGGAGATGCCG
TGAACCGCGAACCCGCGCTCATGCTGGAGTACTTTTGCCGGTGCGCCCGC
GAGGAAACCAAGCGTGTCCCCCCCAGGACATTCGGCAGCCCCCCTCGCCT
CACGGAGGACGACTTTGGGCTTCTCAACTACGCGCTCGTGGAGATGCAGC
GCCTGTGTCTGGACGTTCCTCCGGTCCCGCCGAACGCATACATGCCCTAT
TATCTCAGGGAGTATGTGACGCGGCTGGTCAACGGGTTCAAGCCGCTGGT
GAGCCGGTCCGCTCGCCTTTACCGCATCCTGGGGGTTCTGGTGCACCTGC
GGATCCGGACCCGGGAGGCCTCCTTTGAGGAGTGGCTGCGATCCAAGGAA
GTGGCCCTGGATTTTGGCCTGACGGAAAGGCTTCGCGAGCACGAAGCCCA
GCTGGTGATCCTGGCCCAGGCTCTGGACCATTACGACTGTCTGATCCACA
GCACACCGCACACGCTGGTCGAGCGGGGGCTGCAATCGGCCCTGAAGTAT
GAGGAGTTTTACCTAAAGCGTTTTGGCGGGCACTACATGGAGTCCGTCTT
CCAGATGTACACCCGCATCGCCGGCTTTTTGGCCTGCCGGGCCACGCGCG
GCATGCGCCACATCGCCCTGGGGCGAGAGGGGTCGTGGTGGGAAATGTTC
AAGTTCTTTTTCCACCGCCTCTACGACCACCAGATCGTACCGTCGACCCC
CGCCATGCTGAACCTGGGGACCCGCAACTACTACACCTCCAGCTGCTACC
TGGTAAACCCCCAGGCCACCACAAACAAGGCGACCCTGCGGGCCATCACC
AGCAACGTCAGTGCCATCCTCGCCCGCAACGGGGGCATCGGGCTATGCGT
GCAGGCGTTTAACGACTCCGGCCCCGGGACGCCAGCGTCATGCCCGCCC
TCAAGGTCCTTGACTCGCTGGTGGCGGCGCACAACAAAGAGAGCGCGCGT
CCGACCGGCGCGTGCGTGTACCTGGAGCCGTGGCACACCGACGTGCGGGC
CGTGCTCCGGATGAAGGGGGTCCTCGCCGGCGAAGAGGCCCAGCGCTGCG
ACAATATCTTCAGCGCCCTCTGGATGCCAGACCTGTTTTTCAAGCGCCTG
ATTCGCCACCTGGACGGCGAGAAGAACGTCACATGGACCCTGTTCGACCG
GGACACCAGCATGTCGCTCGCCGACTTTCACGGGGAGGAGTTCGAGAAGC
TCTACCAGCACCTCGAGGTCATGGGGTTCGGCGAGCAGATACCCATCCAG
GAGCTGGCCTATGGCATTGTGCGCAGTGCGGCCACGACCGGGAGCCCCTT
CGTCATGTTCAAAGACGCGGTGAACCGCCACTACATCTACGACACCCAGG
GGGCGGCCATCGCCGGCTCCAACCTCTGCACCGAGATCGTCCATCCGGCC
TCCAAGCGATCCAGTGGGGTCTGCAACCTGGGAAGCGTGAATCTGGCCCG
ATGCGTCTCCAGGCAGACGTTTGACTTTGGGCGGCTCCGCGACGCCGTGC
AGGCGTGCGTGCTGATGGTGAACATCATGATCGACAGCACGCTACAACCC
ACGCCCCAGTGCACCCGCGGCAACGACAACCTGCGGTCCATGGGAATCGG
CATGCAGGGCCTGCACACGGCCTGCCTGAAGCTGGGGCTGGATCTGGAGT
CTGTCGAATTTCAGGACCTGAACAAACACATCGCCGAGGTGATGCTGCTG
TCGGCGATGAAGACCAGCAACGCGCTGTGCGTTCGCGGGGCCCGTCCCTT
CAACCACTTTAAGCGCAGCATGTATCGCGCCGGCCGCTTCACTGGGAGC
GCTTTCCGGACGCCCGGCCGCGGTACGAGGGCGAGTGGGAGATGCTACGC
CAGAGCATGATGAAACACGGCCTGCGCAACAGCCAGTTTGTCGCGCTGAT
GCCCACCGCCGCCTCGGCGCAGATCTCGGACGTCAGCGAGGGCTTTGCCC
CCCTGTTCACCAACCTGTTCAGCAAGGTGACCCGGGACGGCGAGACGCTG
CGCCCCAACACGCTCCTGCTAAAGGAACTGGAACGCACGTTTAGCGGGAA
GCGCCTCCTGGAGGTGATGGACAGTCTCGACGCCAAGCAGTGGTCCGTGG
CGCAGGCGCTCCCGTGCCTGGAGCCCACCCACCCCCTCCGGCGATTCAAG
ACCGCGTTTGACTACGACCAGAAGTTGCTGATCGACCTGTGTGCGGACCG
CGCCCCCTACGTCGACCATAGCCAATCCATGACCCTGTATGTCACGGAGA
AGGCGGACGGGACCCTCCCAGCCTCCACCCTGGTCCGCCTTCTGGTCCAC
GCATATAAGCGCGGACTAAAAACAGGGATGTACTACTGCAAGGTTCGCAA
GGCGACCAACAGCGGGGTCTTTGGCGGCGACGACAACATTGTCTGCACGA
GCTGCGCGCTGTGA
```

SEQ ID NO. 44: the amino acid sequence of ICP6 in the Mut 3 and Mut-3Δ34.5 viral strains.

```
MASRPAASSPVEARAPVGGQEAGGPSAATQGEAAGAPLAHGHHVYCQRVN
GVMVLSDKTPGSASYRISDSNFVQCGSNCTMIIDGDVVRGRPQDPGAAAS
PAPFVAVTNIGAGSDGGTAVVAFGGTPRRSAGTSTGTQTADVPTEALGGP
PPPPRFTLGGGCCSCRDTRRRSAVFGGEGDPVGPAEFVSDDRSSDSDSDD
SEDTDSETLSHASSDVSGGATYDDALDSDSSSDDSLQIDGPVCRPWSNDT
APLDVCPGTPGPGADAGGPSAVDPHAPTPEAGAGLAADPAVARDDAEGLS
DPRPRLGTGTAYPVPLELTPENAEAVARFLGDAVNREPALMLEYFCRCAR
EETKRVPPRTFGSPPRLTEDDFGLLNYALVEMQRLCLDVPPVPPNAYMPY
YLREYVTRLVNGFKPLVSRSARLYRILGVLVHLRIRTREASFEEWLRSKE
VALDFGLTERLREHEAQLVILAQALDHYDCLIHSTPHTLVERGLQSALKY
EEFYLKRFGGHYMESVFQMYTRIAGFLACRATRGMRHIALGREGSWWEMF
KFFFHRLYDHQIVPSTPAMLNLGTRNYYTSSCYLVNPQATTNKATLRAIT
SNVSAILARNGGIGLCVQAFNDSGPGTASVMPALKVLDSLVAAHNKESAR
PTGACVYLEPWHTDVRAVLRMKGVLAGEEAQRCDNIFSALWMPDLFFKRL
IRHLDGEKNVTWTLFDRDTSMSLADFHGEEFEKLYQHLEVMGFGEQIPIQ
ELAYGIVRSAATTGSPFVMFKDAVNRHYIYDTQGAAIAGSNLCTEIVHPA
SKRSSGVCNLGSVNLARCVSRQTFDFGRLRDAVQACVLMVNIMIDSTLQP
TPQCTRGNDNLRSMGIGMQGLHTACLKLGLDLESVEFQDLNKHIAEVMLL
SAMKTSNALCVRGARPFNHFKRSMYRAGRFHWERFPDARPRYEGEWEMLR
QSMMKHGLRNSQFVALMPTAASAQISDVSEGFAPLFTNLFSKVTRDGETL
RPNTLLLKELERTFSGKRLLEVMDSLDAKQWSVAQALPCLEPTHPLRRFK
TAFDYDQKLLIDLCADRAPYVDHSQSMTLYVTEKADGTLPASTLVRLLVH
AYKRGLKTGMYYCKVRKATNSGVFGGDDNIVCTSCAL
```

SEQ ID NO. 45: the DNA sequence of ICP6 in the 17TermA strain.
ATGGCCAGCCGCCCAGCCGCATCCTCTCCCGTCGAAGCGCGGGCCCCGGT
TGGGGGACAGGAGGCCGGCGGCCCCAGCGCAGCCACCCAGGGGGAGGCCG
CCCGGGGCCCCTCTCGCCCACGGCCACCACGTGTACTGCCAGCGAGTCAAT
GGCGTGATGGTGCTTTCCGACAAGACGCCCGGGTCCGCGTCCTACCGCAT
CAGCGATAGCAACTTTGTCCAATGTGGTTCCAACTGCACCATGATCATCG
ACGGAGACGTGGTGCGCGGGCGCCCCCAGGACCCGGGGGCCGCGGCATCC
CCCGCTCCCTTCGTTGCGGTGACAAACATCGGAGCCGGCAGCGACGGCGG
GACCGCCGTCGTGGCATTCGGGGGAACCCCACGTCGCTCGGCGGGGACGT
CTACCGGTACCCAGACGGCCGACGTCCCCACCGAGGCCCTTGGGGGCCCC
CCTCCTCCTCCCCGCTTCACCCTGGGTGGCGGCTGTTGTTCCTGTCGCGA
CACACGGCGCCGCTCTGCGGTATTCGGGGGGAGGGGGATCCAGTCGGCC
CCGCGGAGTTCGTCTCGGACGACCGGTCGTCCGATTCCGACTCGGATGAC
TCGGAGGACACGGACTCGGAGACGCTGTCACACGCCTCCTCGGACGTGTC
CGGCGGGGCCACGTACGACGACGCCCTTGACTCCGATTCGTCATCGGATG
ACTCCCTGCAGATAGATGGCCCCGTGTGTCGCCCGTGGAGCAATGACACC
GCGCCCCTGGATGTTTGCCCCGGGACCCCCGGCCGGGCGCCGACGCCGG
TGGTCCCTCAGCGGTAGACCCACACGCGCCGACGCCAGAGGCCGGCGCTG
GTCTTGCGGCCGATCCCGCCGTGGCCCGGGACGACGCGGAGGGGCTTTCG
GACCCCCGGCCACGTCTGGGAACGGGCACGGCCTACCCCGTCCCCCTGGA
ACTCACGCCCGAGAACGCGGAGGCCGTGGCCGCTTTCTGGGAGATGCCG
TGAACCGCGAACCCGCGCTCATGTGGAGTACTTTTGCCGGTGCGCCCGC
GAGGAAACCAAGCGTGTCCCCCCCAGGACATTCGGCAGCCCCCTCGCCT
CACGGAGGACGACTTTGGGCTTCTCAACTACGCGCTCGTGGAGATGCAGC
GCCTGTGTCTGGACGTTCCTCCGGTCCCGCCGAACGCATACATGCCCTAT
TATCTCAGGGAGTATGTGACGCGGCTGGTCAACGGGTTCAAGCCGCTGGT
GAGCCGGTCCGCTCGCCTTTACCGCATCCTGGGGGTTCTGGTGCACCTGC
GGATCCGGACCCGGGAGGCCTCCTTTGAGGAGTGGCTGCGATCCAAGGAA
GTGGCCCTGGATTTTGGCCTGACGGAAAGGCTTCGCGAGCACGAAGCCA
GCTGGTGATCCTGGCCCAGGCTCTGGACCATTACGACTGTCTGATCCACA
GCACACCGCACACGCTGGTCGAGCGGGGCTGCAATCGGCCCTGAAGTAT
GAGGAGTTTTACCTAAAGCGTTTTGGCGGGCACTACATGGAGTCCGTCTT
CCAGATGTACACCCGCATCGCCGGCTTTTTGGCCTGCCGGGCCACGCGCG
GCATGCGCCACATCGCCCTGGGGCGAGAGGGGTCGTGGTGGGAAATGTTC
AAGTTCTTTTTCCACCGCCTCTACGACCACCAGATCGTACCGTCGACCCC
CGCCATGCTGAACCTGGGGACCCGCAACTACTACACCTCCAGCTGCTACC
TGGTAAACCCCCAGGCCACCACAAACAAGGCGACCCTGCGGGCCATCACC
AGCAACGTCAGTGCCATCCTCGCCCCGCAACGGGGGCATCGGGCTATGCGT
GCAGGCGTTTAACGACTCCGGCCCCGGGACCGCCAGCGTCATGCCCGCCC
TCAAGGTCCTTGACTCGCTGGTGGCGGCGCACAACAAAGAGAGCGCGCGT
CCGACCGGCGCGTGCGTGTACCTGGAGCCGTGGCACACCGACGTGCGGGC
CGTGCTCCGGATGAAGGGGGTCCTCGCCGGCGAAGAGGCCCAGCGCTGCG
ACAATATCTTCAGCGCCCTCTGGATGCCAGACCTGTTTTTCAAGCGCCTG
ATTCGCCACCTGGACGGCGAGAAGAACGTCACATGGACCCTGTTCGACCG
GGACACCAGCATGTCGCTCGCCGACTTTCACGGGGAGGAGTTCGAGAAGC
TCTACCAGCACCTCGAGGTCATGGGGTTCGGCGAGCAGATACCCATCCAG
GAGCTGGCCTATGCATTGTGCGCAGTGCGGCCACGACCGGGAGCCCCTT
CGTCATGTTCAAAGACGCGGTGAACCGCCACTACATCTACGACACCCAGG
GGGCGGCCATCGCCGGCTCCAACCTCTGCACCGAGATCGTCCATCCGGCC
TCCAAGCGATCCAGTGGGGTCTGCAACCTGGAAGCGTGAATCTGGCCCG
ATGCGTCTCCAGGCAGACGTTTGACTTTGGGCGGCTCCGCGACGCCGTGC
AGGCGTGCGTGCTGATGGTGAACATCATGATCGACAGCACGCTACAACCC
ACGCCCCAGTGCACCCGCGGCAACGACAACCTGCGGTCCATGGGAATCGG
CATGCAGGGCCTGCACACGGCCTGCCTGAAGCTGGGGCTGGATCTGGAGT
CTGCCGAATTTCAGGACCTGAACAAACACATCGCCGAGGTGATGCTGCTG
TCGGCGATGAAGACCAGCAACGCGCTGTGCGTTCGCGGGGCCCGTCCCTT
CAACCACTTTAAGCGCAGCATGTATCGCGCCGGCCGCTTTCACTGGGAGC
GCTTTCCGGACGCCCGGCCGCGGTACGAGGGCGAGTGGGAGATGCTACGC
CAGAGCATGATGAAACACGGCCTGCGCAACAGCCAGTTTGTCGCGCTGAT
GCCCACCGCCGCCTCGGCGCAGATCTCGGACGTCAGCGAGGGCTTTGCCC
CCCTGTTCACCAACCTGTTCAGCAAGGTGACCCGGGACGGCGAGACGCTG
CGCCCCAACACGCTCCTGCTAAAGGAACTGGAACGCACGTTTAGCGGGAA
GCGCCTCCTGGAGGTGATGGACAGTCTCGACGCCAAGCAGTGGTCCGTGG
CGCAGGCGCTCCCGTGCCTGGAGCCCACCCACCCCCTCCGGCGATTCAAG
ACCGCGTTTGACTACGACCAGAAGTTGCTGATCGACCTGTGTGCGGACCG
CGCCCCCTACGTCGACCATAGCCAATCCATGACCCTGTATGTCACGGAGA
AGGCGGACGGGACCCTCCCAGCCTCCACCCTGGTCCGCCTTCTGGTCCAC
GCATATAAGCGCGGACTAAAAACAGGGATGTACTACTGCAAGGTTCGCAA
GGCGACCAACAGCGGGGTCTTTGGCGGCGACGACAACATTGTCTGCATGA
GCTGCGCGCTGTGA SEQ ID NO. 46: the amino acid sequence of ICP6 in the 17TermA strain.
MASRPAASSPVEARAPVGGQEAGGPSAATQGEAAGAPLAHGHHVYCQRVN
GVMVLSDKTPGSASYRISDSNFVQCGSNCTMIIDGDVVRGRPQDPGAAAS
PAPFVAVTNIGAGSDGGTAVVAFGGTPRRSAGTSTGTQTADVPTEALGGP
PPPPRFTLGGGCCSCRDTRRRSAVFGGEGDPVGPAEFVSDDRSSDSDSDD
SEDTDSETLSHASSDVSGGATYDDALDSDSSSDDSLQIDGPVCRPWSNDT
APLDVCPGTPGPGADAGGPSAVDPHAPTPEAGAGLAADPAVARDDAEGLS DPRPRLGTGTAYPVPLELTPENAEAVARFLGDAVNREPALMLEYFCRCAR
EETKRVPPRTFGSPPRLTEDDFGLLNYALVEMQRLCLDVPPVPPNAYMPY
YLREYVTRLVNGFKPLVSRSARLYRILGVLVHLRIRTREASFEEWLRSKE
VALDFGLTERLREHEAQLVILAQALDHYDCLIHSTPHTLVERGLQSALKY
EEFYLKRFGGHYMESVFQMYTRIAGFLACRATRGMRHIALGREGSWWEMF
KFFFHRLYDHQIVPSTPAMLNLGTRNYYTSSCYLVNPQATTNKATLRAIT
SNVSAILARNGGIGLCVQAFNDSGPGTASVMPALKVLDSLVAAHNKESAR
PTGACVYLEPWHTDVRAVLRMKGVLAGEEAQRCDNIFSALWMPDLFFKRL
IRHLDGEKNVTWTLFDRDTSMSLADFHGEEFEKLYQHLEVMGFGEQIPIQ
ELAYGIVRSAATTGSPFVMFKDAVNRHYIYDTQGAAIAGSNLCTEIVHPA
SKRSSGVCNLGSVNLARCVSRQTFDFGRLRDAVQACVLMVNIMIDSTLQP
TPQCTRGNDNLRSMGIGMQGLHTACLKLGLDLESAEFQDLNKHIAEVMLL
SAMKTSNALCVRGARPFNHFKRSMYRAGRFHWERFPDARPRYEGEWEMLR
QSMMKHGLRNSQFVALMPTAASAQISDVSEGFAPLFTNLFSKVTRDGETL
RPNTLLLKELERTFSGKRLLEVMDSLDAKQWSVAQALPCLEPTHPLRRFK
TAFDYDQKLLIDLCADRAPYVDHSQSMTLYVTEKADGTLPASTLVRLLVH
AYKRGLKTGMYYCKVRKATNSGVFGGDDNIVCMSCAL SEQ ID NO. 47: the DNA sequence of rat cyctochrome P450 2B1 in the rRp450 strain.
GAACCCCTTCGCCATGGAGCCCAGTATCTTGCTCCTCCTTGCTCTCCTTG
TGGGCTTCTTGTTACTCTTAGTCAGGGGACACCCAAAGTCCCGTGGCAAC
TTCCCACCAGGACCTCGTCCCCTTCCCCTCTTGGGGAACCTCCTGCAGTT
GGACAGAGGGGGCCTCCTCAATTCCTTCATGCAGCTTCGAGAAAAATATG
GAGATGTGTTCACAGTACACCTGGGACCAAGGCCTGTGGTCATGCTATGT
GGGACAGACACCATAAAGGAGGCTCTGGTGGGCCAAGCTGAGGATTTCTC
TGGTCGGGGAACAATCGCTGTGATTGAGCCAATCTTCAAGGAATATGGTG
TGATCTTTGCCAATGGGGAACGCTGGAAGGCCCTTCGGCGATTCTCTCTG
GCTACCATGAGAGACTTTGGGATGGGAAAGAGGAGTGTGGAAGAACGGAT
TCAGGAGGAAGCCCAATGTTTGGTGGAGGAACTGCGGAAATCCCAGGGAG
CCCCACTGGATCCCACCTTCCTCTTCCAGTGCATCACAGCCAACATCATC
TGCTCCATTGTGTTTGGAGAGCGCTTTGACTACACAGACCGCCAGTTCCT
GCGCCTGTTGGAGCTGTTCTACCGGACCTTTTCCCTCCTAAGTTCATTCT
CCAGCCAGGTGTTTGAGTTCTTCTCTGGGTTCCTGAAATACTTTCCTGGT
GCCCACAGACAAATCTCCAAAAACCTCCAGGAAATCCTCGATTACATTGG
CCATATTGTGGAGAAGCACAGGGCCACCTTAGACCCAAGCGCTCCACGAG
ACTTCATCGACACTTACCTTCTGCGCATGGAGAAGGAGAAGTCGAACCAC
CACACAGAGTTCCATCATGAGAACCTCATGATCTCCCTGCTCTCTCTCTT
CTTTGCTGGCACTGAGACCAGCAGCACCACACTCCGTATGGTTTCCTGC
TGATGCTCAAGTACCCCCATGTCGCAGAGAAAGTCCAAAAGGAGATTGAT
CAGGTGATCGGCTCACACCGGCTACCAACCCTTGATGACCGCAGTAAAAT
GCCATACACTGATGCAGTTATCCATGAGATTCAGAGGTTTTCAGATCTTG
TCCCTATTGGAGTACCACAGAGTCACCAAAGACACCATGTTCCGAGGG
TACCTGCTTCCCAAGAACACTGAAGTGTACCCCATCCTGAGTTCAGCTCT
CCATGACCCACAGTACTTTGACCACCCAGACAGCTTCAATCCTGAACACT
TCCTGGATGCCAATGGGGCACTGAAAAAGAGTGAAGCTTTCATGCCCTTC
TCCACAGGAAAGCGCATTTGTCTTGGCGAAGGCATTGCCCGAAATGAATT
GTTCCTCTTCTTCACCACCATCCTCCAGAACTTCTCTGTGTCAAGCCATT
TGGCTCCCAAGGACATTGACCTCACGCCCAAGGAGAGTGGCATTGGAAAA
ATACCTCCAACGTACCAGATCTGCTTCTCAGCTCGGTGATCCGGCTGAGG
CAGCCATGTGCCCCAGTTCTGTTGGGAATGGAACTTGTTTATTGCAGCTT
ATAATGGTTACAAATAAAGCAATAGCATCACAAATTTCACAAATAAAGCA
TTTTTTTCACTGCATTCTAGTTGTGGTTTGTCCAAACTCATCAATGTATC
TTATCATGTCTGGATCCCCGGGCGAGCTCGAATTCCTCCTTTGAGGAGTG
GCTGCGATCCAAGGAAGTGGCCCTGGACTTTGGCCTGACGGAAAGGCTTC
GCGAGCACGAAGCCCAGCTGGTGATCCTGGCCCAGGCTCTGGACCATTAC
GACTGTCTGATCCACAGCACACCGCACACGCTGGTCGAGGGGGCTGCA
ATCGGCCCTGAAGTATGAGGAGTTTTACCTAAAGCGCTTTGGCGGGCACT
ACATGGAGTCCGTCTTCCAGATGTACACCCGCATCGCCGGCTTTTTGGCC
TGCCGGGCCACGCGCGGCATGCGCCACATCGCCCTGGGGCGAGAGGGGTC
GTGGTGGGAAATGTTCAAGTTCTTTTTCCACCGCCTCTACGACCACCAGA
TCGTACCGTCGACCCCCGCCATGCTGAACCTGGGGACCCGCAACTACTAC
ACCTCCAGCTGCTACCTGGTAAACCCCCAGGCCACCACAAACAAGGCGAC
CCTGCGGGCCATCACCAGCAACGTCAGCGCCATCCTCGCCCGCAACGGGG
GCATCGGGCTATGCGTGCAGGCGTTTAACGACTCCGGCCCCGGGACCGCT
AGCGTCATACCCGCCCTCAAGGTCCTCGACTCGCTGGTGGCGGCGCACAA
CAAAGAGAGCGCGCGTCCAACCGGCGCGTGCGTGTACCTGGAGCCGTGGC
ACACCGACGTGCGGGCCGTGCTCCGGATGAAGGGGGTCCTCGCCGGCGAA
GAGGCCCAGCGCTGCGACAATATCTTCAGCGCCCTCTGGATGCCAGACCT
GTTTTTCAAGCGCCTGATTCGCCACCTGGACGGCGAGAAGAACGTCACAT
GGACCCTGTTCGACCGGGACACCAGCATGTCGCTCGCCGACTTTCACGGG
GAGGAGTTCGAGAAGCTCTACCAGCACCTCGAGGTCATGGGGTTCGGCGA
GCAGATACCCATCCAGGAGCTGGCCTATGGCATTGTGCGCAGTGCGGCCA
CGACCGGGAGCCCCTTCGTCATGTTCAAAGACGCGGTGAACCGCCACTAC
ATCTACGACACCCAGGGGGCGGCCATCGCCGGCTCCAACCTCTGCACCGA
GATCGTCCATCCGGCCTCCAAGCGATCCAGTGGGGTCTGCAATCTGGGAA
GCGTGAATCTGGCCCGATGCGTCTCCAGGCAGACGTTTGACTTTGGGCGG
CTCCGCGACGCCGTGCAGGCGTGCGTGCTGATGGTGAACATCATGATCGA
CAGCACGCTACAACCCACGCCCCAGTGCACCCGCGGCAACGACAACCTGC
GGTCCATGGGAATCGGCATGCAGGGCCTGCACACGGCCTGCCTGAAGCTG -continued

```
GGGCTGGATCTGGAGTCTGTCGAATTTCAGGACCTGAACAAACACATCGC
CGAGGTGATGCTGCTGTCGGCGATGAAGACCAGCAACGCGCTGTGCGTTC
GCGGGGCCCGTCCCTTCAACCACTTTAAGCGCAGCATGTATCGCGCCGGC
CGCTTTCACTGGGAGCGCTTTCCGGACGCCCGGCCGCGGTACGAGGGCGA
GTGGGAGATGCTACGCCAGAGCATGATGAAACACGGCCTGCGCAACAGCC
AGTTTGTCGCGCTGATGCCCACCGCCGCCTCGGCGCAGATCTCGGACGTC
AGCGAGGGCTTTGCCCCCCTGTTCACCAACCTGTTCAGCAAGGTGACCCG
GGACGGCGAGACGCTGCGCCCAACACGCTCCTGCTAAAGGAACTGGAAC
GCACGTTTAGCGGGAAGCGCCTCCTGGAGGTGATGGACAGTCTCGACGCC
AAGCAGTGGTCCGTGGCGCAGGCGCTCCCGTGCCTGGAGCCCACCCACCC
CCTCCGGCGATTCAAGACCGCGTTTGACTACGACCAGAAGTTGCTGATCG
ACCTGTGTGCGGACCGCGCCCCCTACGTCGACCATAGCCAATCCATGACC
CTGTATGTCACGGAGAAGGCGGACGGGACCCTCCCAGCCTCCACCCTGGT
CCGCCTTCTGGTCCACGCATATAAGCGCGGACTAAAAACAGGGATGTACT
ACTGCAAGGTTCGCAAGGCGACCAACAGCGGGGTCTTTGGCGGCGACGAC
AACATTGTCTGCACGAGCTGCGCGCTGTGA
```

SEQ ID NO. 48: the amino acid sequence of rat cyctochrome P450 2B1 in the rRp450 strain.
```
MEPSILLLLALLVGFLLLLVRGHPKSRGNFPPGPRPLPLLGNLLQL
DRGGLLNSFMQLREKYGDVFTVHLGPRPVVMLCGTDTIKEALVGQAEDFS
GRGTIAVIEPIFKEYGVIFANGERWKALRRFSLATMRDFGMGKRSVEERI
QEEAQCLVEELRKSQGAPLDPTFLFQCITANIICSIVFGERFDYTDRQFL
RLLELFYRTFSLLSSFSSQVFEFFSGFLKYFPGAHRQISKNLQEILDYIG
HIVEKHRATLDPSAPRDFIDTYLLRMEKEKSNHHTEFHHENLMISLLSLF
FAGTETSSTTLRYGFLLMLKYPHVAEKVQKEIDQVIGSHRLPTLDDRSKM
PYTDAVIHEIQRFSDLVPIGVPHRVTKDTMFRGYLLPKNTEVYPILSSAL
HDPQYFDHPDSFNPEHFLDANGALKKSEAFMPFSTGKRICLGEGIARNEL
FLFFTTILQNFSVSSHLAPKDIDLTPKESGIGKIPPTYQICFSAR*
```
*Stop codon-sequences after * are predicted no expressed SEQ ID NO. 49: the DNA sequence of ICP6 in the wild-type 17 strain.
```
ATGGCCAGCCGCCCAGCCGCATCCTCTCCCGTCGAAGCGCGGGCCCCGGT
TGGGGGACAGGAGGCCGGCGGCCCCAGCGCAGCCACCCAGGGGGAGGCCG
CCGGGGCCCCTCTCGCCCACGGCCACCACGTGTACTGCCAGCGAGTCAAT
GGCGTGATGGTGCTTTCCGACAAGACGCCCGGGTCCGCGTCCTACCGCAT
CAGCGATAGCAACTTTGTCCAATGTGGTTCCAACTGCACCATGATCATCG
ACGGAGACGTGGTGCGCGGGCGCCCCCAGGACCCGGGGGCCGCGGCATCC
CCCGCTCCCTTCGTTGCGGTGACAAACATCGGAGCCGGCAGCGACGGCGG
GACCGCCGTCGTGGCATTCGGGGGAACCCCACGTCGCTCGGCGGGGACGT
CTACCGGTACCCAGACGGCCGACGTCCCCACCGAGGCCCTTGGGGGCCCC
CCTCCTCCTCCCCGCTTCACCCTGGGTGGCGGCTGTTGTTCCTGTCGCGA
CACACGGCGCCGCTCTGCGGTATTCGGGGGGGGAGGGGGATCCAGTCGGCC
CCGCGGAGTTCGTCTCGGACGACCGGTCGTCCGATTCCGACTCGGATGAC
TCGGAGGACACGGACTCGGAGACGCTGTCACACGCCTCCTCGGACGTGTC
CGGCGGGGCCACGTACGACGACGCCCTTGACTCCGATTCGTCATCGGATG
ACTCCCTGCAGATAGATGGCCCCGTGTGTCGCCCGTGGAGCAATGACACC
GCGCCCCTGGATGTTTGCCCCGGGACCCCCGGCCCGGGCGCCGACGCCGG
TGGTCCCTCAGCGGTAGACCCACACGCGCCGACGCCAGAGGCCGGCGCTG
GTCTTGCGGCCGATCCCGCCGTGGCCCGGGACGACGCGGAGGGGCTTTCG
GACCCCCGGCCACGTCTGGGAACGGGCACGGCCTACCCCGTCCCCCTGGA
ACTCACGCCCGAGAACGCGGAGGCCGTGGCGCGCTTTCTGGGGAGATGCCG
TGAACCGCGAACCCGCGCTCATGCTGGAGTACTTTTGCCGGTGCGCCCGC
GAGGAAACCAAGCGTGTCCCCCCCAGGACATTCGGCAGCCCCCTCGCCT
CACGGAGGACGACTTTGGGCTTCTCAACTACGCGCTCGTGGAGATGCAGC
GCCTGTGTCTGGACGTTCCTCCGGTCCCGCCGAACGCATACATGCCCTAT
TATCTCAGGGAGTATGTGACGCGGCTGGTCAACGGGTTCAAGCCGCTGGT
GAGCCGGTCCGCTCGCCTTTACCGCATCCTGGGGGTTCTGGTGCACCTGC
GGATCCGGACCCGGGAGGCCTCCTTTGAGGAGTGGCTGCGATCCAAGGAA
GTGGCCCTGGATTTTGGCCTGACGGAAAGGCTTCGCGAGCACGAAGCCCA
GCTGGTGATCCTGGCCCAGGCTCTGGACCATTACGACTGTCTGATCCACA
GCACACCGCACACGCTGGTCGAGCGGGGCTGCAATCGGCCCTGAAGTAT
GAGGAGTTTTACCTAAAGCGTTTTGGCGGGCACTACATGGAGTCCGTCTT
CCAGATGTACACCCGCATCGCCGGCTTTTTGGCCTGCCGGGCCACGCGCG
GCATGCGCCACATCGCCCTGGGGCGAGAGGGGTCGTGGTGGGAAATGTTC
AAGTTCTTTTTCCACCGCCTCTACGACCACCAGATCGTACCGTCGACCCC
CGCCATGCTGAACCTGGGGACCCGCAACTACTACACCTCCAGCTGCTACC
TGGTAAACCCCCAGGCCACCACAAACAAGGCGACCCTGCGGGCCATCACC
AGCAACGTCAGTGCCATCCTCGCCCGCAACGGGGCATCGGGCTATGCGT
GCAGGCGTTTAACGACTCCGGCCCCGGGACCGCCAGCGTCATGCCCGCCC
TCAAGGTCCTTGACTCGCTGGTGGCGGCGCACAACAAAGAGAGCGCGCGT
CCGACCGGCGCGTGCGTGTACCTGGAGCCGTGGCACACCGACGTGCGGGC
CGTGCTCCGGATGAAGGGGGTCCTCGCCGGCGAAGAGGCCCAGCGCTGCG
ACAATATCTTCAGCGCCCTCTGGATGCCAGACCTGTTTTTCAAGCGCCTG
ATTCGCCACCTGGACGGCGAGAAGAACGTCACATGGACCCTGTTCGACCG
GGACACCAGCATGTCGCTCGCCGACTTTCACGGGGAGGAGTTCGAGAAGC
TCTACCAGCACCTCGAGGTCATGGGGTTCGGCGAGCAGATACCCATCCAG
GAGCTGGCCTATGGCATTGTGCGCAGTGCGGCCACGACCGGGAGCCCCTT
CGTCATGTTCAAAGACGCGGTGAACCGCCACTACATCTACGACACCCAGG
GGGCGGCCATCGCCGGCTCCAACCTCTGCACCGAGATCGTCCATCCGGCC
```

-continued

```
TCCAAGCGATCCAGTGGGGTCTGCAACCTGGGAAGCGTGAATCTGGCCCG
ATGCGTCTCCAGGCAGACGTTTGACTTTGGGCGGCTCCGCGACGCCGTGC
AGGCGTGCGTGCTGATGGTGAACATCATGATCGACAGCACGCTACAACCC
ACGCCCCAGTGCACCCGCGGCAACGACAACCTGCGGTCCATGGGAATCGG
CATGCAGGGCCTGCACACGGCCTGCCTGAAGCTGGGGCTGGATCTGGAGT
CTGTCGAATTTCAGGACCTGAACAAACACATCGCCGAGGTGATGCTGCTG
TCGGCGATGAAGACCAGCAACGCGCTGTGCGTTCGCGGGGCCCGTCCCTT
CAACCACTTTAAGCGCAGCATGTATCGCGCCGGCCGCTTTCACTGGGAGC
GCTTTCCGGACGCCCGGCCGCGGTACGAGGGCGAGTGGGAGATGCTACGC
CAGAGCATGATGAAACACGGCCTGCGCAACAGCCAGTTTGTCGCGCTGAT
GCCCACCGCCGCCTCGGCGCAGATCTCGGACGTCAGCGAGGGCTTTGCCC
CCCTGTTCACCAACCTGTTCAGCAAGGTGACCCGGGACGGCGAGACGCTG
CGCCCCAACACGCTCCTGCTAAAGGAACTGGAACGCACGTTTAGCGGGAA
GCGCCTCCTGGAGGTGATGGACAGTCTCGACGCCAAGCAGTGGTCCGTGG
CGCAGGCGCTCCCGTGCCTGGAGCCCACCCACCCCCTCCGGCGATTCAAG
ACCGCGTTTGACTACGACCAGAAGTTGCTGATCGACCTGTGTGCGGACCG
CGCCCCCTACGTCGACCATAGCCAATCCATGACCCTGTATGTCACGGAGA
AGGCGGACGGGACCCTCCCAGCCTCCACCCTGGTCCGCCTTCTGGTCCAC
GCATATAAGCGCGGACTAAAAACAGGGATGTACTACTGCAAGGTTCGCAA
GGCGACCAACAGCGGGGTCTTTGGCGGCGACGACAACATTGTCTGCACGA
GCTGCGCGCTGTGA
```

SEQ ID NO. 50: the amino acid sequence of ICP6 in the wild-type 17 strain.

```
MASRPAASSPVEARAPVGGQEAGGPSAATQGEAAGAPLAHGHHVYCQRVN
GVMVLSDKTPGSASYRISDSNFVQCGSNCTMIIDGDVVRGRPQDPGAAAS
PAPFVAVTNIGAGSDGGTAVVAFGGTPRRSAGTSTGTQTADVPTEALGGP
PPPPRFTLGGGCCSCRDTRRRSAVFGGEGDPVGPAEFVSDDRSSDSDSDD
SEDTDSETLSHASSDVSGGATYDDALDSDSSSDDSLQIDGPVCRPWSNDT
APLDVCPGTPGPGADAGGPSAVDPHAPTPEAGAGLAADPAVARDDAEGLS
DPRPRLGTGTAYPVPLELTPENAEAVARFLGDAVNREPALMLEYFCRCAR
EETKRVPPRTFGSPPRLTEDDFGLLNYALVEMQRLCLDVPPVPPNAYMPY
YLREYVTRLVNGFKPLVSRSARLYRILGVLVHLRIRTREASFEEWLRSKE
VALDFGLTERLREHEAQLVILAQALDHYDCLIHSTPHTLVERGLQSALKY
EEFYLKRFGGHYMESVFQMYTRIAGFLACRATRGMRHIALGREGSWWEMF
KFFFHRLYDHQIVPSTPAMLNLGTRNYYTSSCYLVNPQATTNKATLRAIT
SNVSAILARNGGIGLCVQAFNDSGPGTASVMPALKVLDSLVAAHNKESAR
PTGACVYLEPWHTDVRAVLRMKGVLAGEEAQRCDNIFSALWMPDLFFKRL
IRHLDGEKNVTWTLFDRDTSMSLADFHGEEFEKLYQHLEVMGFGEQIPIQ
ELAYGIVRSAATTGSPFVMFKDAVNRHYIYDTQGAAIAGSNLCTEIVHPA
SKRSSGVCNLGSVNLARCVSRQTFDFGRLRDAVQACVLMVNIMIDSTLQP
TPQCTRGNDNLRSMGIGMQGLHTACLKLGLDLESVEFQDLNKHIAEVMLL
SAMKTSNALCVRGARPFNHFKRSMYRAGRFHWERFPDARPRYEGEWEMLR
QSMMKHGLRNSQFVALMPTAASAQISDVSEGFAPLFTNLFSKVTRDGETL
RPNTLLLKELERTFSGKRLLEVMDSLDAKQWSVAQALPCLEPTHPLRRFK
TAFDYDQKLLIDLCADRAPYVDHSQSMTLYVTEKADGTLPASTLVRLLVH
AYKRGLKTGMYYCKVRKATNSGVFGGDDNIVCTSCAL
```

What is claimed is:

1. A non-natural herpes simplex virus ("HSV"), wherein the virus comprises at least one mutation in a virulence gene selected from:
(a) an alanine-to-threonine mutation at position 151 of the gE protein, wherein the alanine-to-threonine mutation at position 151 is with respect to SEQ ID NO: 19,
(b) an arginine-to-histidine mutation at position 258 of the ICP0 protein, wherein the arginine-to-histidine mutation at position 258 is with respect to SEQ ID NO: 26,
(c) an alanine-to-threonine mutation at position 376 of the DNA packaging terminase subunit 1 protein, wherein the alanine-to-threonine mutation at position 376 is with respect to SEQ ID NO: 42, or
(d) a threonine-to-methionine mutation at position 1155 of the ICP8 protein, wherein the threonine-to-methionine mutation at position 1155 is with respect to SEQ ID NO: 34;
and wherein the non-natural HSV has improved lytic activity compared to an HSV that does not comprise the at least one mutation.

2. The non-natural HSV of claim 1, wherein the HSV further comprises a gene encoding a dysfunctional ICP34.5 protein and/or a gene encoding a dysfunctional ICP6 protein.

3. The non-natural HSV of claim 2, wherein the gene encoding the dysfunctional ICP34.5 protein comprises a polynucleotide having a sequence selected from SEQ ID NO. 5 or SEQ ID NO. 7; and
wherein the gene encoding the dysfunctional ICP6 protein comprises a polynucleotide having a sequence selected from SEQ ID NO. 45 or SEQ ID NO. 47.

4. The non-natural HSV of claim 1, wherein the HSV lacks a gene encoding a functional ICP34.5 protein and/or a functional ICP6 protein.

5. The non-natural HSV of claim 1, comprising one or more of the following:
(a) a polynucleotide encoding an amino acid sequence selected from SEQ ID NOs. 2, 6, 8, 10, and 52, and/or a polynucleotide having a sequence selected from SEQ ID NOs. 1, 5, 7, 9, and 51;
(b) a polypeptide having an amino acid sequence selected from SEQ ID NOs. 2, 6, 8, 10, and 52;
(c) a polynucleotide encoding an amino acid sequence selected from SEQ ID NOs. 13, 15, 17 and 19, and/or a polynucleotide having a sequence selected from SEQ ID NOs. 12, 14, 16 and 18;
(d) a polypeptide having an amino acid sequence selected from SEQ ID NOs. 13, 15, 17 and 19;
(e) a polynucleotide encoding an amino acid sequence selected from SEQ ID NOs. 21, 23 and 26, and/or a polynucleotide having a sequence selected from SEQ ID NOs. 20, 22, 24, 25, and 53, or a sequence thereof free of one or two or more introns;
(f) a polypeptide having an amino acid sequence selected from SEQ ID NOs. 21, 23 and 26;
(g) a polynucleotide encoding an amino acid sequence selected from SEQ ID NOs. 28, 30, 32 and 34, and/or a polynucleotide having a sequence selected from SEQ ID NOs. 27, 29, 31, and 33;
(h) a polypeptide having an amino acid sequence selected from SEQ ID NOs. 28, 30, 32 and 34;
(i) a polynucleotide encoding an amino acid sequence selected from SEQ ID NOs. 36, 38, 40, and 42, and/or a polynucleotide having a sequence selected from SEQ ID NOs. 35, 37, 39 and 41;
(j) a polypeptide having an amino acid sequence selected from SEQ ID NOs. 36, 38, 40, and 42;
(k) a polynucleotide encoding an amino acid sequence selected from SEQ ID NOs. 44, 46, 48 and 50, and/or a polynucleotide having a sequence selected from SEQ ID NOs. 43, 45, 47 and 49; or
(l) a poly peptide having an amino acid sequence selected from SEQ ID NOs. 44, 46, 48 and 50.

6. The non-natural HSV of claim 1, further comprising a polynucleotide having sequence that is identical to at least a fragment of a virulence gene from a 17TermA HSV or a virulence gene from an rRp450 HSV.

7. A composition comprising a carrier and a non-natural herpes simplex virus ("HSV"), wherein the virus comprises at least one mutation in a virulence gene selected from:
(a) an alanine-to-threonine mutation at position 151 of the gE protein, wherein the alanine-to-threonine mutation at position 151 is with respect to SEQ ID NO: 19,
(b) an arginine-to-histidine mutation at position 258 of the ICP0 protein, wherein the arginine-to-histidine mutation at position 258 is with respect to SEQ ID NO: 26,
(c) an alanine-to-threonine mutation at position 376 of the DNA packaging terminase subunit 1 protein, wherein the alanine-to-threonine mutation at position 376 is with respect to SEQ ID NO: 42, or
(d) a threonine-to-methionine mutation at position 1155 of the ICP8 protein, wherein the threonine-to-methionine mutation at position 1155 is with respect to SEQ ID NO: 34;
and wherein the non-natural HSV has improved lytic activity compared to an HSV that does not comprise the at least one mutation.

8. A cell infected with a non-natural herpes simplex virus ("HSV"), wherein the virus comprises at least one mutation in a virulence gene selected from:
(a) an alanine-to-threonine mutation at position 151 of the gE protein, wherein the alanine-to-threonine mutation at position 151 is with respect to SEQ ID NO: 19,
(b) an arginine-to-histidine mutation at position 258 of the ICP0 protein, wherein the arginine-to-histidine mutation at position 258 is with respect to SEQ ID NO: 26,
(c) an alanine-to-threonine mutation at position 376 of the DNA packaging terminase subunit 1 protein, wherein the alanine-to-threonine mutation at position 376 is with respect to SEQ ID NO: 42, or
(d) a threonine-to-methionine mutation at position 1155 of the ICP8 protein, wherein the threonine-to-methionine mutation at position 1155 is with respect to SEQ ID NO: 34; and wherein the non-natural HSV has improved lytic activity compared to an HSV that does not comprise the at least one mutation.

9. A method to infect a cell, comprising contacting the cell with a non-natural herpes simplex virus ("HSV"), wherein the virus comprises at least one mutation in a virulence gene selected from:
(a) an alanine-to-threonine mutation at position 151 of the gE protein, wherein the alanine-to-threonine mutation at position 151 is with respect to SEQ ID NO: 19,
(b) an arginine-to-histidine mutation at position 258 of the ICP0 protein, wherein the arginine-to-histidine mutation at position 258 is with respect to SEQ ID NO: 26,
(c) an alanine-to-threonine mutation at position 376 of the DNA packaging terminase subunit 1 protein, wherein the alanine-to-threonine mutation at position 376 is with respect to SEQ ID NO: 42, or
(d) a threonine-to-methionine mutation at position 1155 of the ICP8 protein, wherein the threonine-to-methionine mutation at position 1155 is with respect to SEQ ID NO: 34; and wherein the non-natural HSV has improved lytic activity compared to an HSV that does not comprise the at least one mutation.

10. A method for inhibiting the growth or metastasis of cancer cell, comprising contacting the cell with an effective amount of a non-natural herpes simplex virus ("HSV"), wherein the virus comprises at least one mutation in a virulence gene selected from:
   (a) an alanine-to-threonine mutation at position 151 of the gE protein, wherein the alanine-to-threonine mutation at position 151 is with respect to SEQ ID NO: 19,
   (b) an arginine-to-histidine mutation at position 258 of the ICP0 protein, wherein the arginine-to-histidine mutation at position 258 is with respect to SEQ ID NO: 26,
   (c) an alanine-to-threonine mutation at position 376 of the DNA packaging terminase subunit 1 protein, wherein the alanine-to-threonine mutation at position 376 is with respect to SEQ ID NO: 42, or
   (d) a threonine-to-methionine mutation at position 1155 of the ICP8 protein, wherein the threonine-to-methionine mutation at position 1155 is with respect to SEQ ID NO: 34; and wherein the non-natural HSV has improved lytic activity compared to an HSV that does not comprise the at least one mutation.

11. A method for treating cancer in a subject, comprising administering to the subject an effective amount of a non-natural herpes simplex virus ("HSV"), wherein the virus comprises at least one mutation in a virulence gene selected from:
   (a) an alanine-to-threonine mutation at position 151 of the gE protein, wherein the alanine-to-threonine mutation at position 151 is with respect to SEQ ID NO: 19,
   (b) an arginine-to-histidine mutation at position 258 of the ICP0 protein, wherein the arginine-to-histidine mutation at position 258 is with respect to SEQ ID NO: 26,
   (c) an alanine-to-threonine mutation at position 376 of the DNA packaging terminase subunit 1 protein, wherein the alanine-to-threonine mutation at position 376 is with respect to SEQ ID NO: 42, or
   (d) a threonine-to-methionine mutation at position 1155 of the ICP8 protein, wherein the threonine-to-methionine mutation at position 1155 is with respect to SEQ ID NO: 34; and wherein the non-natural HSV has improved lytic activity compared to an HSV that does not comprise the at least one mutation.

12. A method of producing the non-natural herpes simplex virus ("HSV") of claim 1, comprising
   (a) introducing to a host cell a 17TermA HSV vector and an rRp450 HSV vector;
   (b) growing the host cell for at least 3 passages; and
   (c) isolating an HSV produced by the host cell.

13. A method for inducing cell lysis, comprising contacting the cell with the non-natural HSV of claim 1.

14. A kit comprising a non-natural herpes simplex virus ("HSV"), wherein the virus comprises at least one mutation in a virulence gene selected from:
   (a) an alanine-to-threonine mutation at position 151 of the gE protein, wherein the alanine-to-threonine mutation at position 151 is with respect to SEQ ID NO: 19,
   (b) an arginine-to-histidine mutation at position 258 of the ICP0 protein, wherein the arginine-to-histidine mutation at position 258 is with respect to SEQ ID NO: 26,
   (c) an alanine-to-threonine mutation at position 376 of the DNA packaging terminase subunit 1 protein, wherein the alanine-to-threonine mutation at position 376 is with respect to SEQ ID NO: 42, or
   (d) a threonine-to-methionine mutation at position 1155 of the ICP8 protein, wherein the threonine-to-methionine mutation at position 1155 is with respect to SEQ ID NO: 34; and wherein the non-natural HSV has improved lytic activity compared to an HSV that does not comprise the at least one mutation and instructions for use.

15. A method of producing a non-natural HSV particle, comprising
   (a) introducing to a host cell a vector comprising a polynucleotide encoding the non-natural HSV of claim 1;
   (b) growing the host cell; and
   (c) isolating the non-natural HSV particle produced by the host cell.

16. The cell of claim 8, wherein the cell is a lymphocyte.

* * * * *